INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 2

INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 3

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY

INVENTORS
WAYNE D. WINGER
PHILIP W. JACKSON
VICTOR R. WITT
BY
ATTORNEY

INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956 64 Sheets-Sheet 7

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY

*INVENTORS*
WAYNE D. WINGER
PHILIP W. JACKSON
VICTOR R. WITT
BY John F. Hanifin
ATTORNEY

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 14

INVENTORS
WAYNE D. WINGER
PHILIP W. JACKSON
VICTOR R. WITT

BY John F. Hanifin
ATTORNEY

*INVENTORS*
WAYNE D. WINGER
PHILIP W. JACKSON
VICTOR R. WITT
BY John F. Hanifin
ATTORNEY

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY

DATA TRANSMISSION SYSTEM

Filed Feb. 20, 1956

*INVENTORS*
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956 64 Sheets-Sheet 23

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 25

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY April 4, 1961

W. D. WINGER ET AL

DATA TRANSMISSION SYSTEM 2,978,678

Filed Feb. 20, 1956

64 Sheets-Sheet 28

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956

64 Sheets-Sheet 31

INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 32

April 4, 1961 W. D. WINGER ET AL 2,978,678

DATA TRANSMISSION SYSTEM

Filed Feb. 20, 1956

64 Sheets-Sheet 33

INVENTORS
WAYNE D. WINGER
PHILIP W. JACKSON
VICTOR R. WITT

BY John F. Hanifin

ATTORNEY

*INVENTORS*
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY

*INVENTORS*
WAYNE D. WINGER
PHILIP W. JACKSON
VICTOR R. WITT
BY John F. Hanifin
ATTORNEY

INVENTORS
WAYNE D. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 39

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956 64 Sheets-Sheet 42

INVENTORS
WAYNE D. WINGER
PHILIP W. JACKSON
VICTOR R. WITT

BY John F. Hanifin
ATTORNEY

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956 64 Sheets-Sheet 45

INVENTORS
WAYNE R. WINGER
PHILIP W. JACKSON
VICTOR R. WITT

BY John F. Hanifin
ATTORNEY

April 4, 1961 W. D. WINGER ET AL 2,978,678

DATA TRANSMISSION SYSTEM

Filed Feb. 20, 1956 64 Sheets-Sheet 46

INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956

64 Sheets-Sheet 52

INVENTORS
WAYNE D. WINGER
PHILIP W. JACKSON
VICTOR R. WITT
BY John F. Hanifin
ATTORNEY April 4, 1961 W. D. WINGER ET AL 2,978,678

DATA TRANSMISSION SYSTEM

Filed Feb. 20, 1956 64 Sheets-Sheet 53

LOAD - REWIND OPERATION
STARTING UNLOADED AND IN BACKWARD AREA

April 4, 1961 W. D. WINGER ET AL 2,978,678

DATA TRANSMISSION SYSTEM

Filed Feb. 20, 1956

64 Sheets-Sheet 55

LOAD-REWIND OPERATION
STARTING UNLOADED AND IN RAPID REWIND AREA

April 4, 1961 W. D. WINGER ET AL 2,978,678

DATA TRANSMISSION SYSTEM

Filed Feb. 20, 1956

64 Sheets-Sheet 56

LOAD - REWIND OPERATION
STARTING LOADED AND IN RAPID REWIND AREA

April 4, 1961 W. D. WINGER ET AL 2,978,678

DATA TRANSMISSION SYSTEM

Filed Feb. 20, 1956

64 Sheets-Sheet 63

FIG. 5a

| | CHAR C BA 8421 | CHAR C BA 8421 | CHAR C BA 8421 | ACC MARK |
|---|---|---|---|---|
| | & 0 11 0000 | – 1 10 0000 | BLANK 1 01 0000 | 0 0 00 0000 |
| | | | | CHAR C BA 8421 |
| ALPHABETIC | A 1 11 0001 | J 0 10 0001 | / 0 01 0001 | 1 1 00 0001 |
| ALPHABETIC | B 1 11 0010 | K 0 10 0010 | S 0 01 0010 | 2 1 00 0010 |
| ALPHABETIC | C 0 11 0011 | L 1 10 0010 | T 1 01 0011 | 3 0 00 0011 |
| ALPHABETIC | D 1 11 0100 | M 0 10 0100 | U 0 01 0100 | 4 1 00 0100 |
| ALPHABETIC | E 0 11 0101 | N 1 10 0101 | V 1 01 0101 | 5 0 00 0101 (NUMERICAL) |
| ALPHABETIC | F 0 11 0110 | O 1 10 0110 | W 1 01 0110 | 6 0 00 0110 (NUMERICAL) |
| ALPHABETIC | G 1 11 0111 | P 0 10 0111 | X 0 01 0111 | 7 1 00 0111 (NUMERICAL) |
| | H 1 11 1000 | Q 0 10 1000 | Y 0 01 1000 | 8 1 00 1000 |
| | I 0 11 1001 | R 1 10 1001 | Z 1 01 1001 | 9 0 00 1001 |
| | PLUS ZERO 0 0 11 1010 | MINUS ZERO 0 1 10 1010 | RECORD MARK 1 01 1010 | NUMERICAL ZERO 0 0 00 1010 |
| SPECIAL CHAR | • 1 11 1011 | $ 0 10 1011 | , 0 01 1011 | # 1 00 1011 |
| SPECIAL CHAR | ¤ 0 11 1100 | * 1 10 1100 | % 1 01 1100 | @ 0 00 1100 |

CHARACTER CODE CHART

INVENTORS
WAYNE D. WINGER
PHILIP W. JACKSON
VICTOR R. WITT
BY John F. Hanifin
ATTORNEY United States Patent Office 2,978,678

Patented Apr. 4, 1961

2,978,678

DATA TRANSMISSION SYSTEM

Wayne D. Winger and Philip W. Jackson, Wappingers Falls, and Victor R. Witt, Poughkeepsie, N.Y., assignors to International Business Machines Corporation, New York, N.Y., a corporation of New York Filed Feb. 20, 1956, Ser. No. 566,401

20 Claims. (Cl. 340—172.5)

Figure 1A:
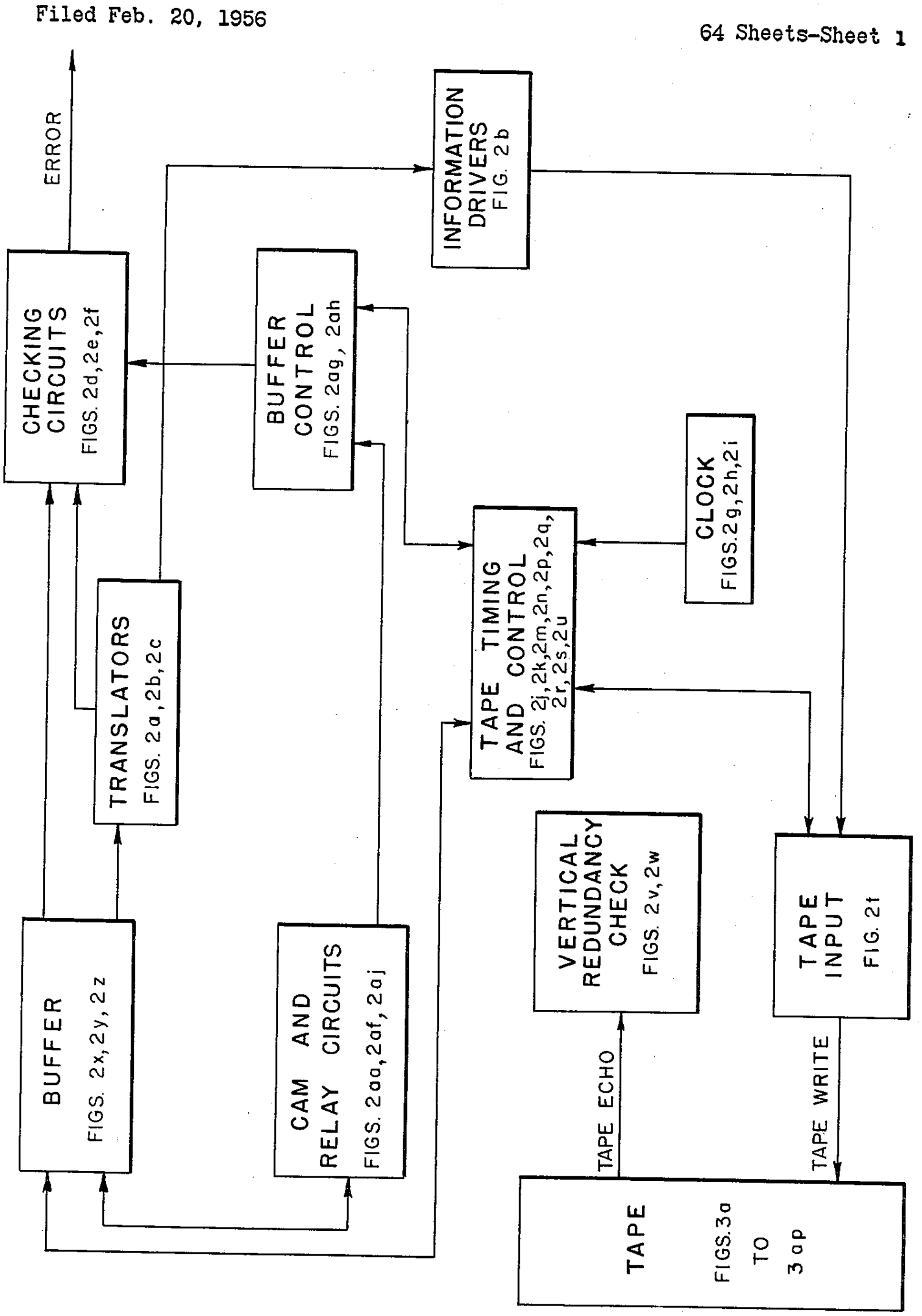

This invention relates to a data transmission system. More particularly the invention relates to error checking apparatus for indicating errors which occur during the transmission of coded information.

Present day electronic data processing machines utilize a variety of input and output devices such as Card Readers, Card Punches, Printers, Magnetic Tape Read/Record units and the like. In some instances such devices are operated, independently of the central processing unit, as Card to Tape, Tape to Card, Tape to Printer machines. In all types of operation, an unusually large amount of information transfer is required. Even though such equipment has reached a state of development whereby transfer of information is extremely reliable and virtually error free, an occasional error may occur. It is desirable, of course, to detect these transmission errors and to indicate that they have occurred.

Consequently, it is an object of this invention to provide novel error detecting apparatus for machines transmitting data representations.

Another object of this invention is the provision of electronic checking circuits which operate in a fast accurate manner to check data representations expressed in coded form.

Another object of this invention is the provision of a multichannel recording system wherein data is represented by recording an even number of representations transversely in two or more channels and an even number of representations are recorded, longitudinally, in each channel.

Another object of the invention is to provide a system to translate representations expressing certain data in a first code to representations expressing the data in a second code in combination with checking circuits which operate to check the accuracy of the translation and the accuracy of transmission of the representations.

Another object of the present invention is the provision of circuit means for determining the accuracy of reading, translation, transmission and recording of data expressed in coded notations.

Other objects of the invention will be pointed out in the following descriptions and claims and illustrated in the accompanying drawings, which disclose, by way of example, the principle of the invention and the best mode, which has been contemplated, of applying that principle.

In the drawings:

Fig. 1*a* is an overall block diagram showing the general organization of the system.

Figure 2A:
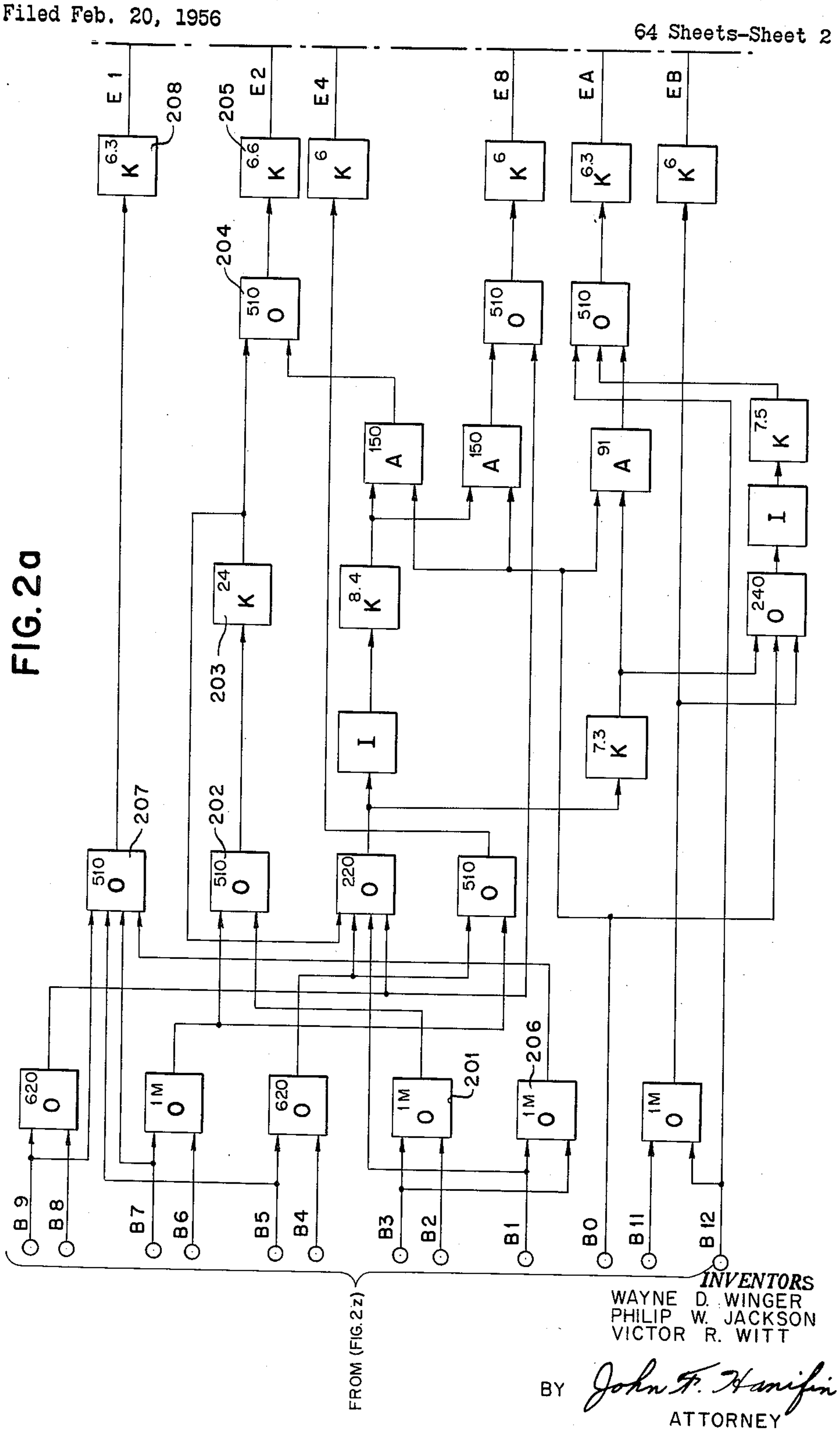
Figure 2B:
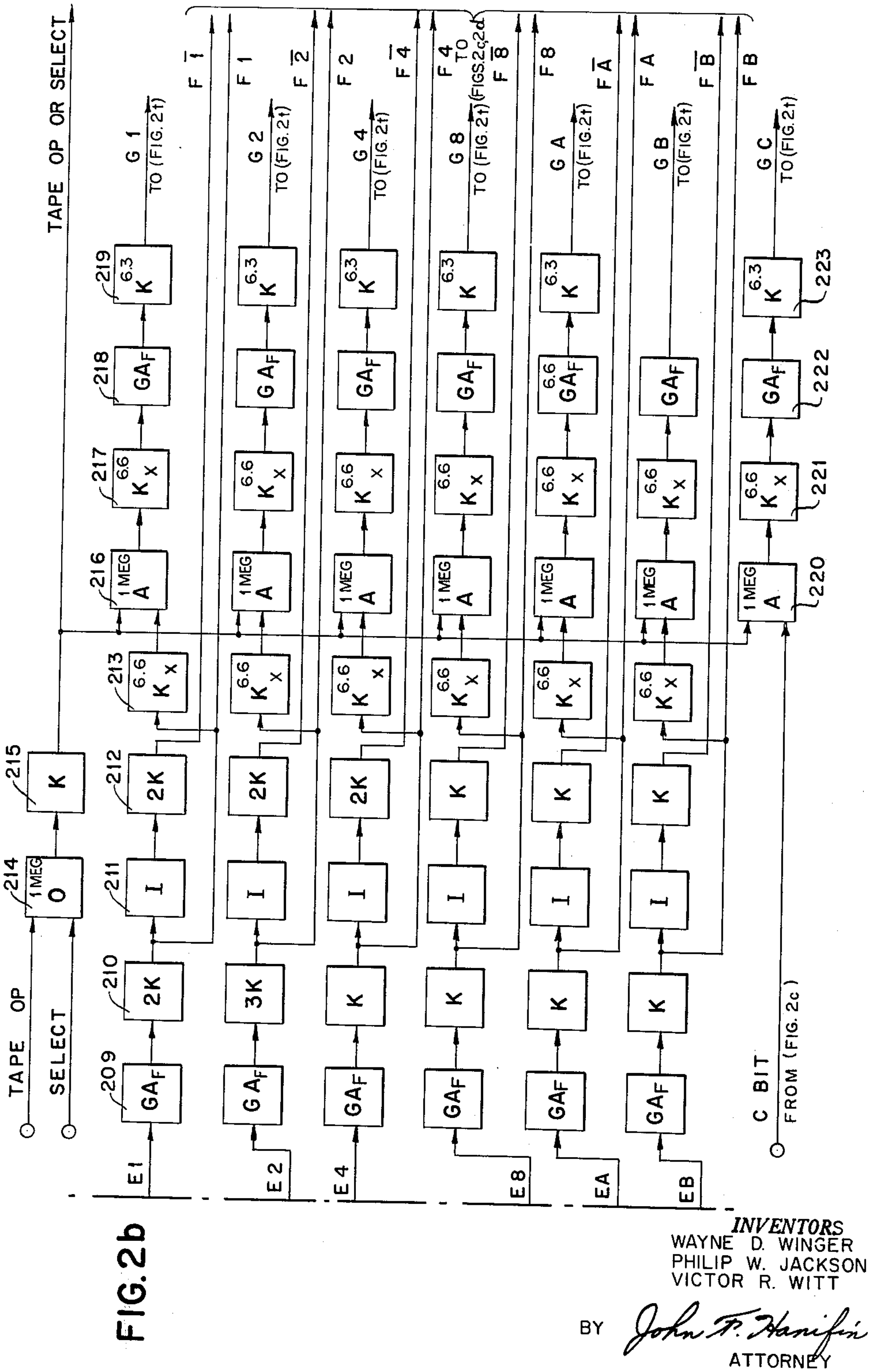

Figs. 2*a* and 2*b*, taken together, with Fig. 2*b* arranged to the right of Fig. 2*a*, comprise a block diagram of the Translator circuits.

Figure 2C:
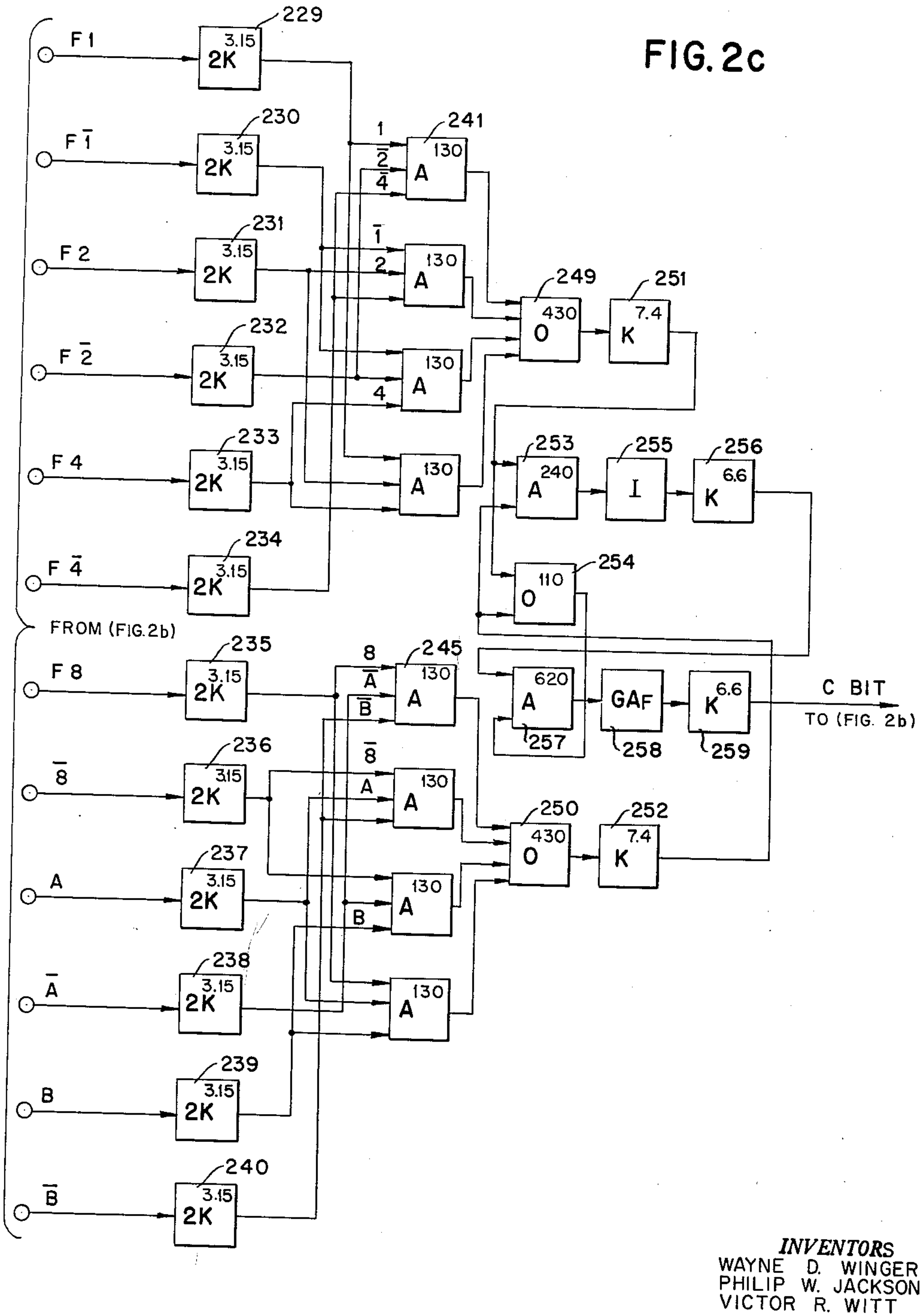

Fig. 2*c* is a block diagram of a "C" bit generator.

Figure 2D:
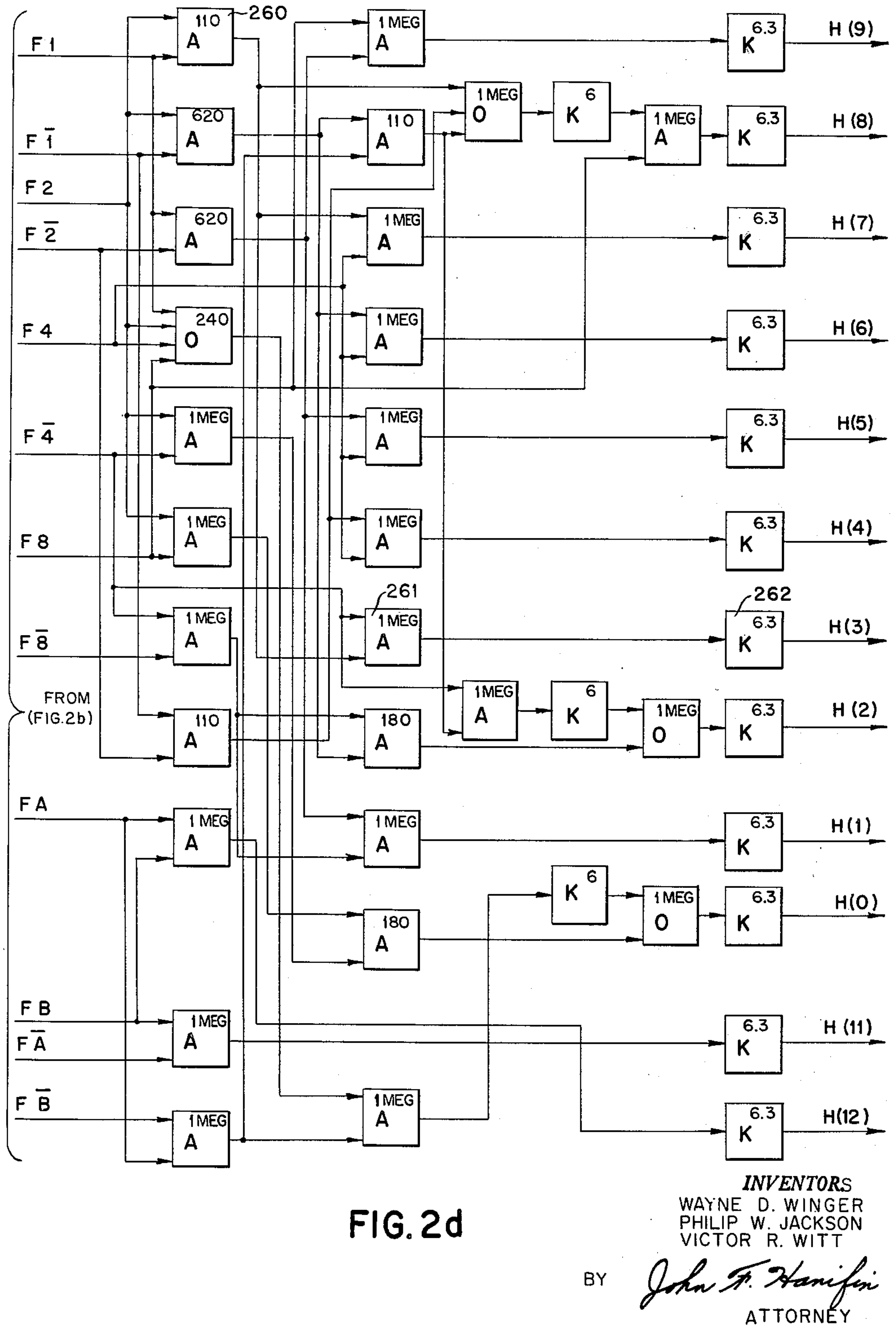

Fig. 2*d* is a block diagram of a Translator for translating from a six bit code to the IBM code.

Figure 2E:
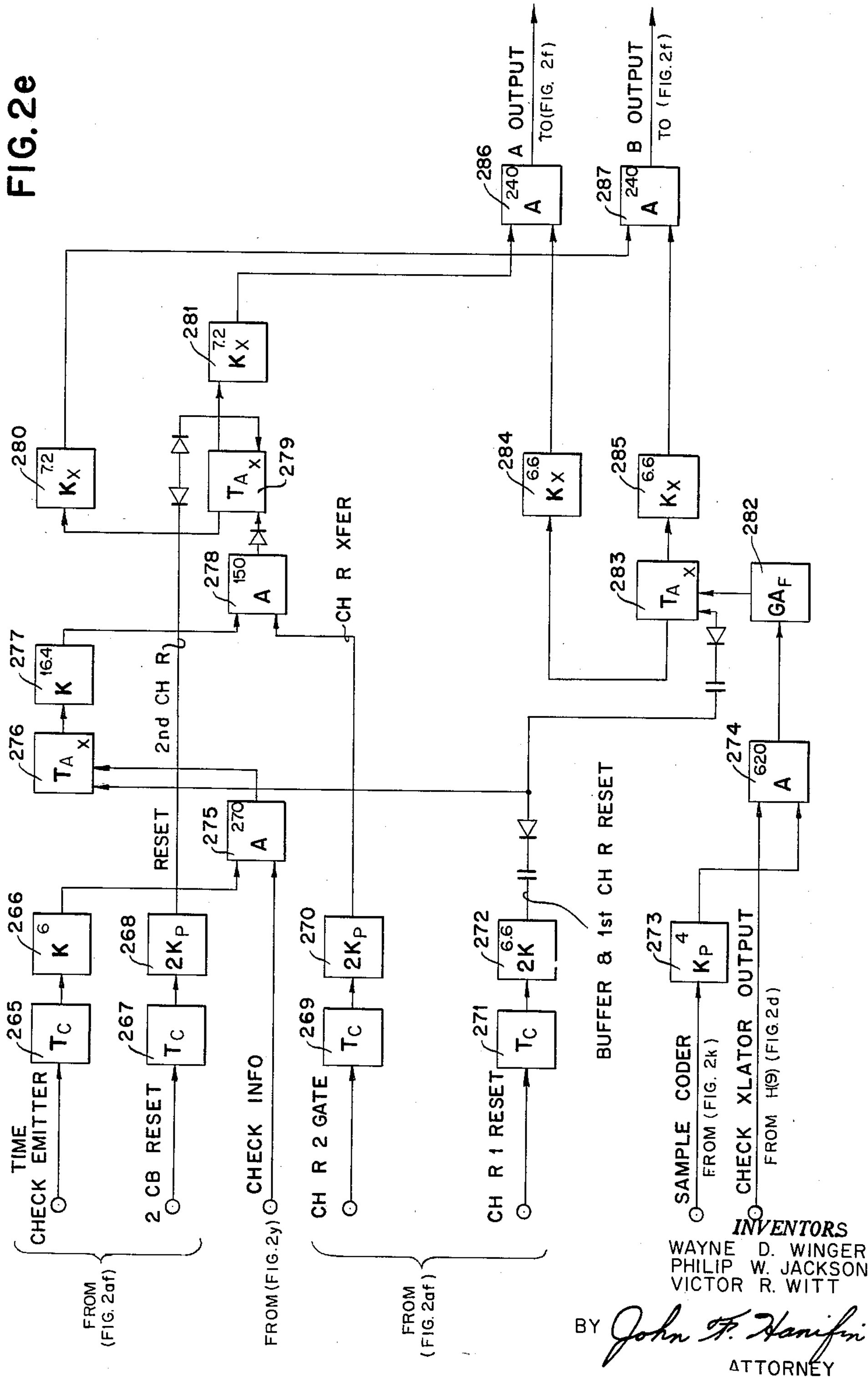

Fig. 2*e* is a block diagram of a portion of checking circuits.

Figure 2F:
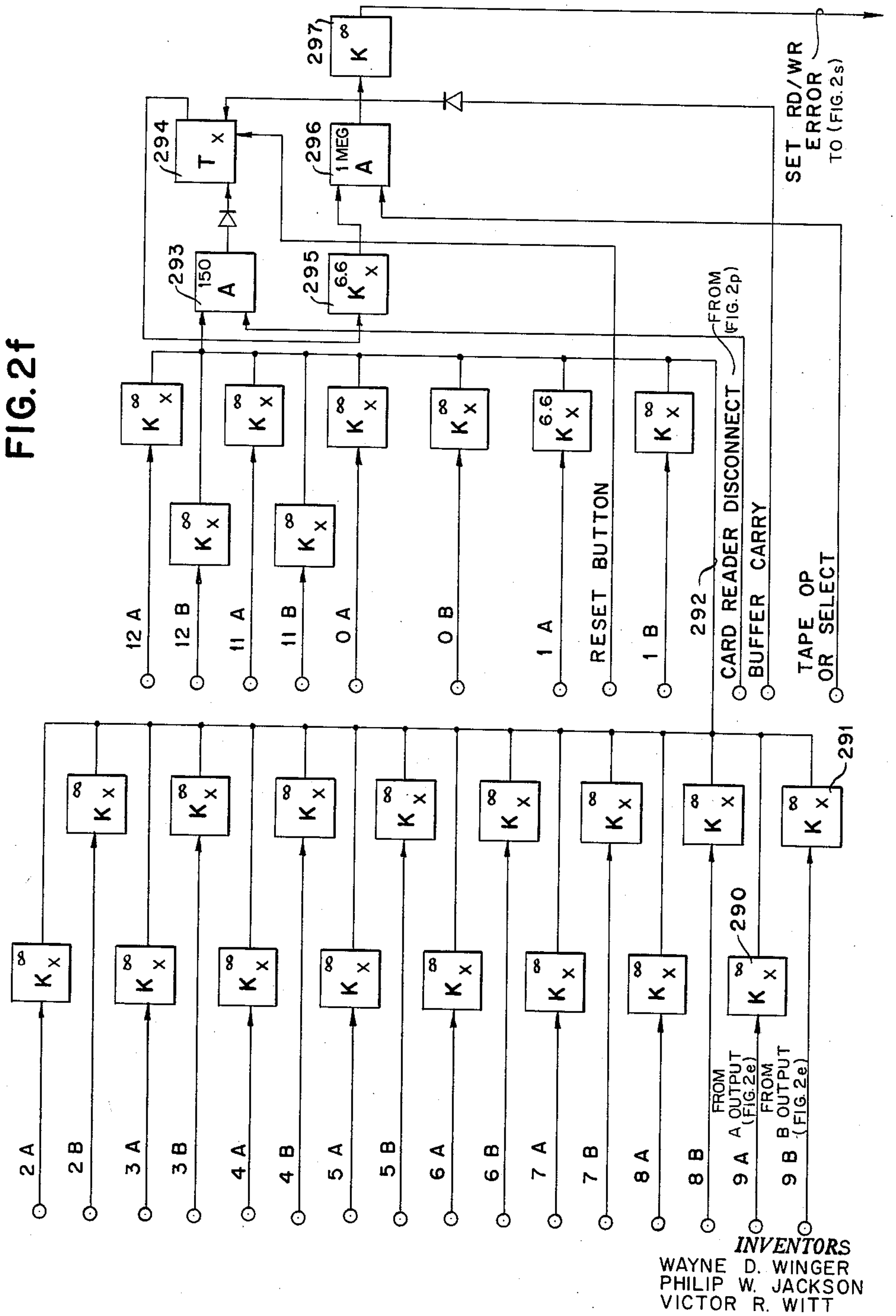

Fig. 2*f* is a block diagram of another portion of the checking circuits.

Figure 2G:
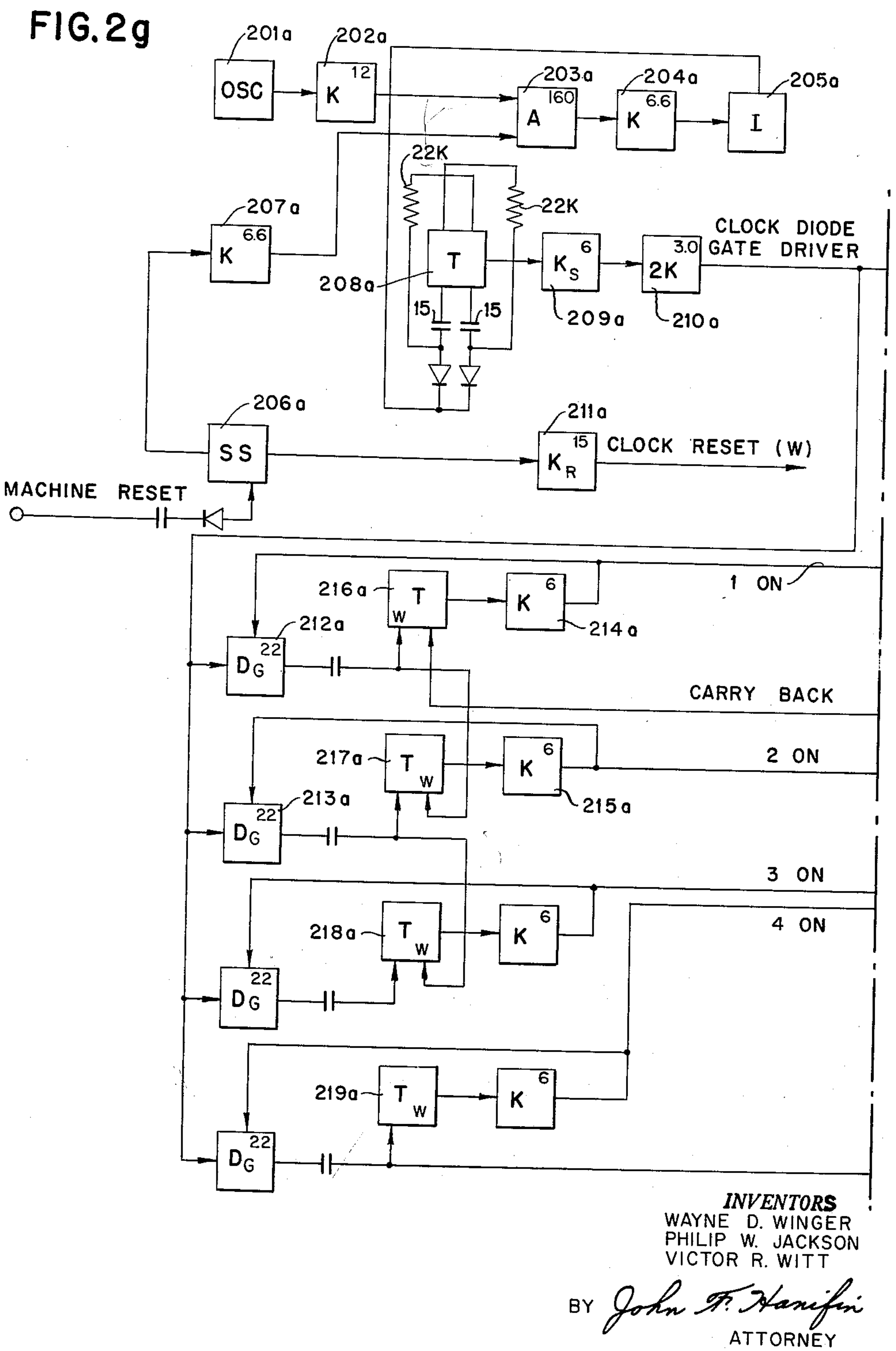
Figure 2H:
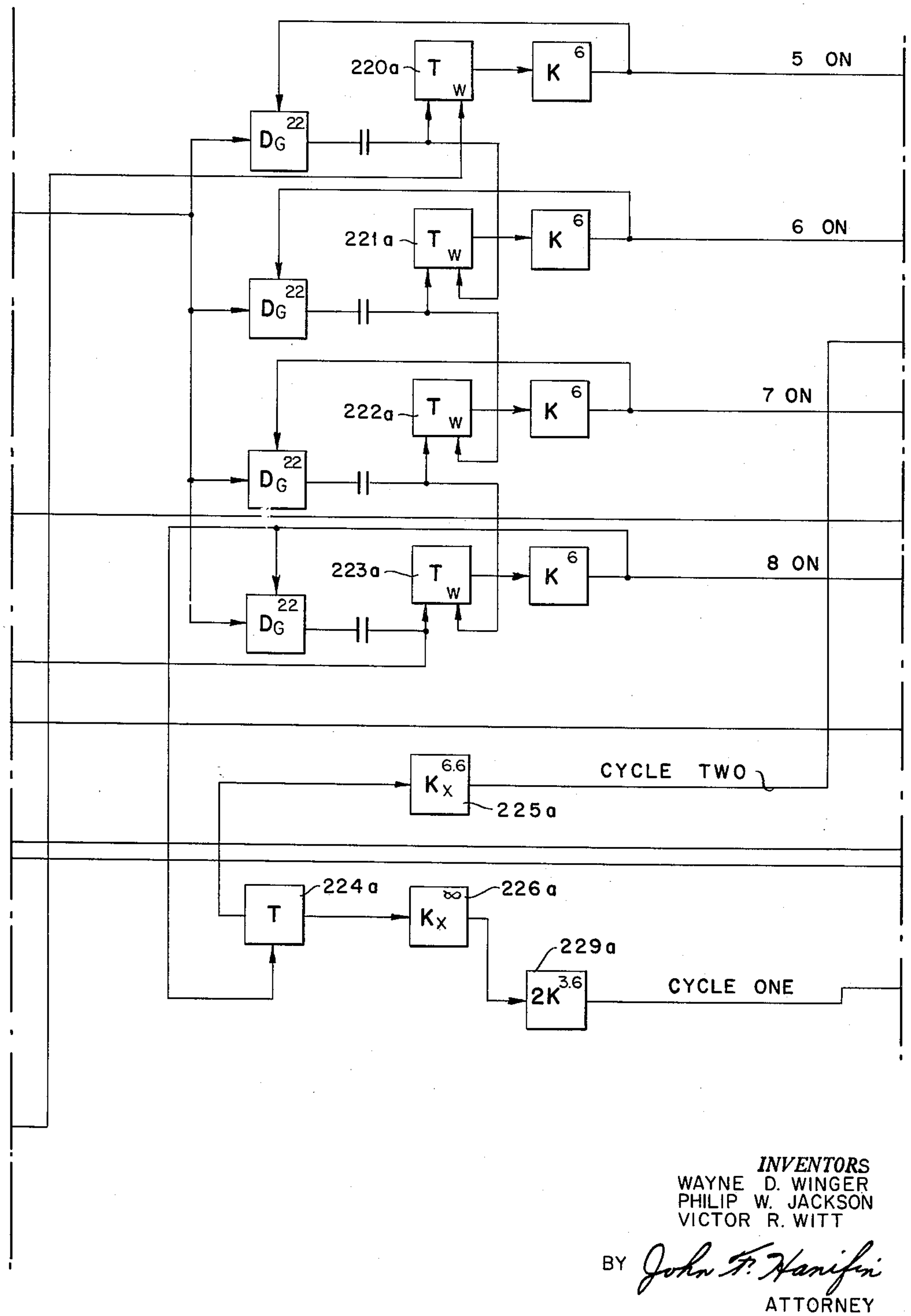
Figure 2I:
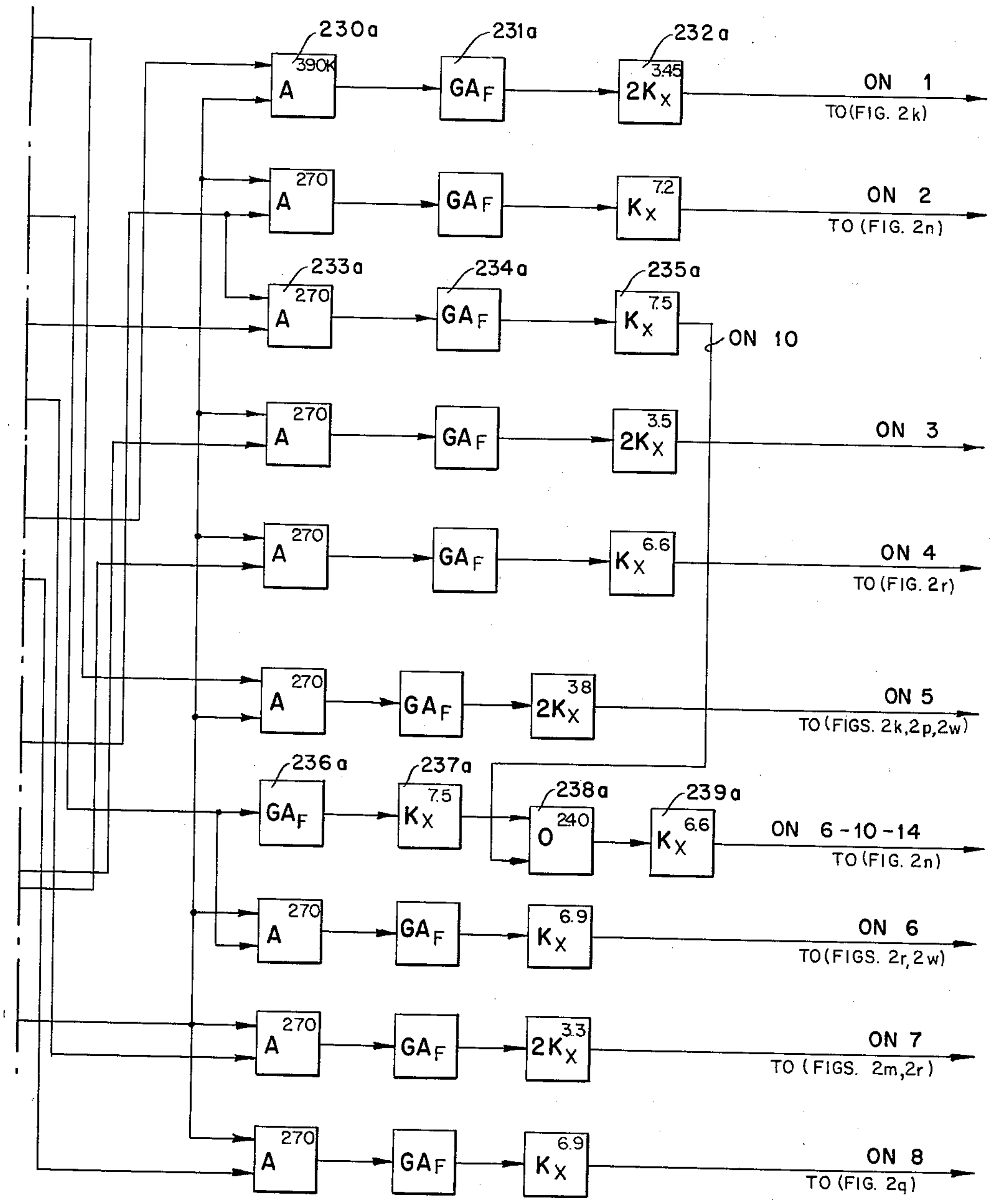

Figs. 2*g*, 2*h* and 2*i*, taken together, with Fig. 2*h* located to the right of Fig. 2*g* and Fig. 2*i* to the right of Fig. 2*h*, comprise a block diagram of the clock.

Figs. 2*j*, 2*k*, 2*m*, 2*n*, 2*p*, 2*q*, 2*r*, 2*s* and 2*u* are block diagrams of various portions of the Tape Timing and Control circuits.

Figures 2J, 2K:
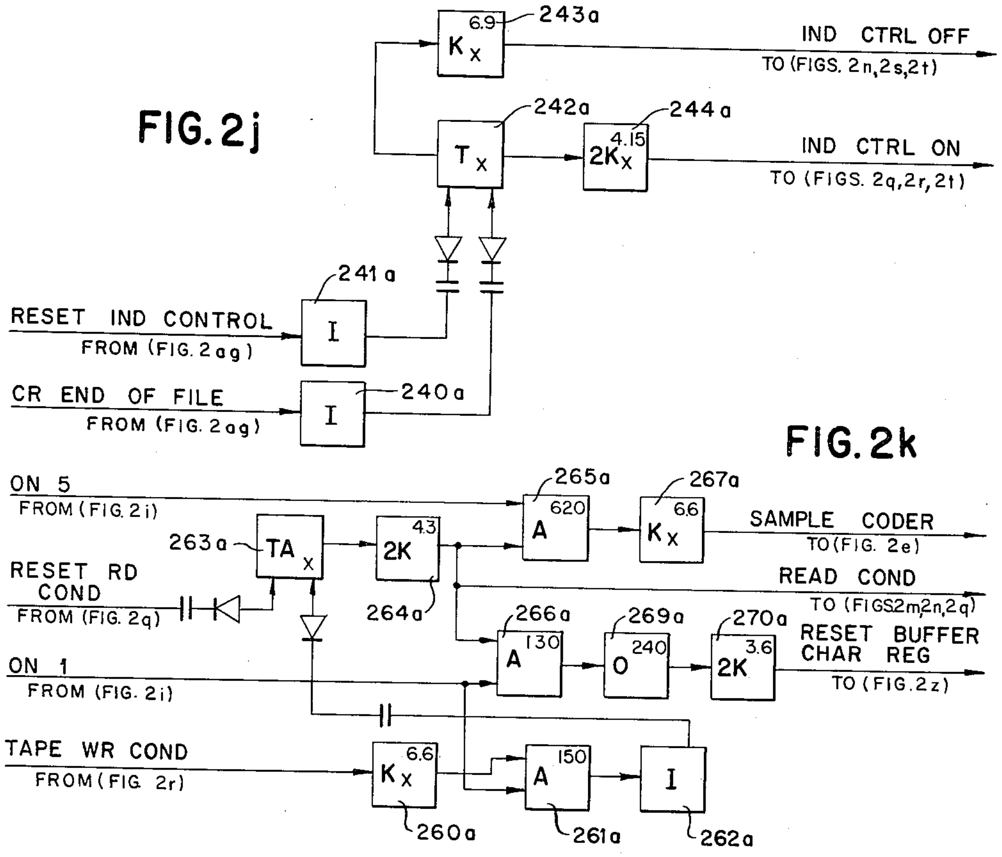
Figure 2M:
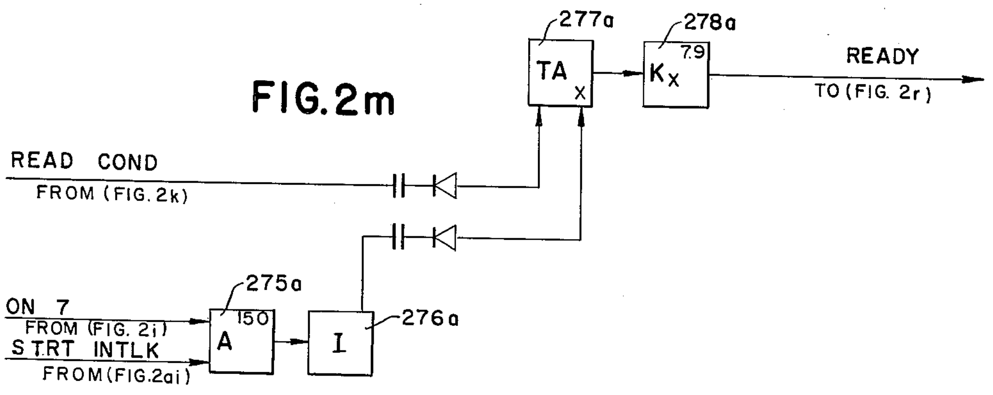
Figures 2N, 2P, 2Q:
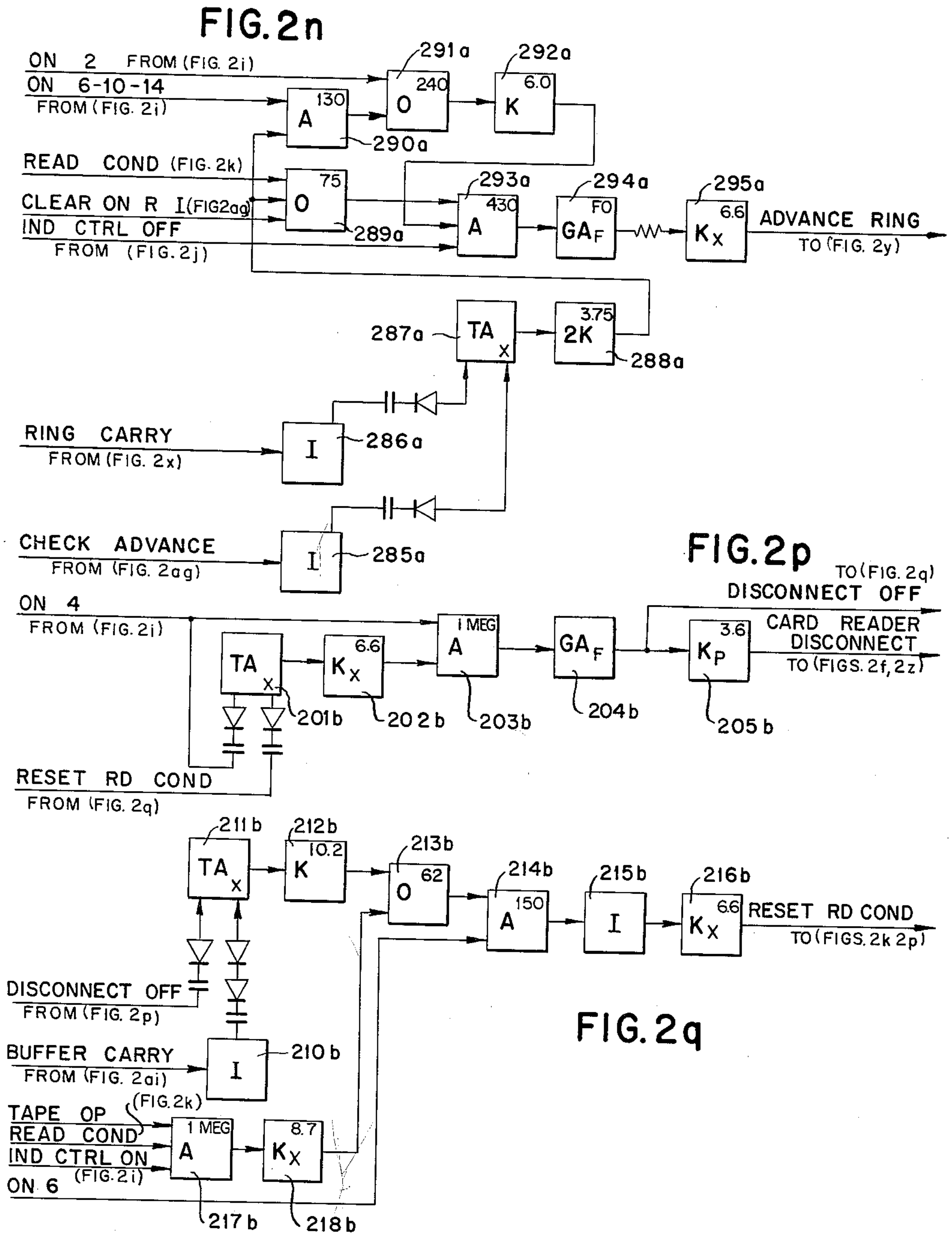
Figure 2R:
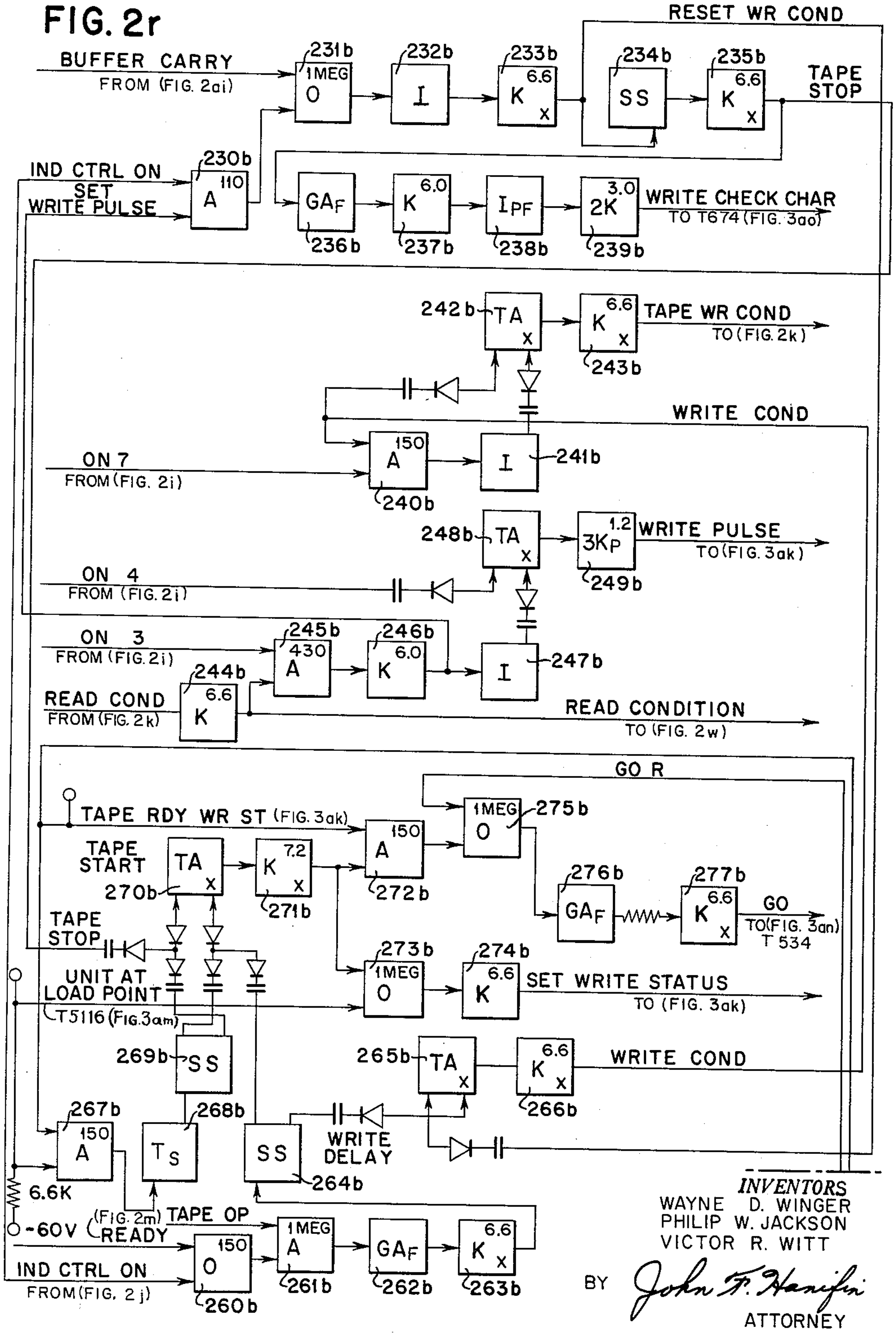
Figure 2S:
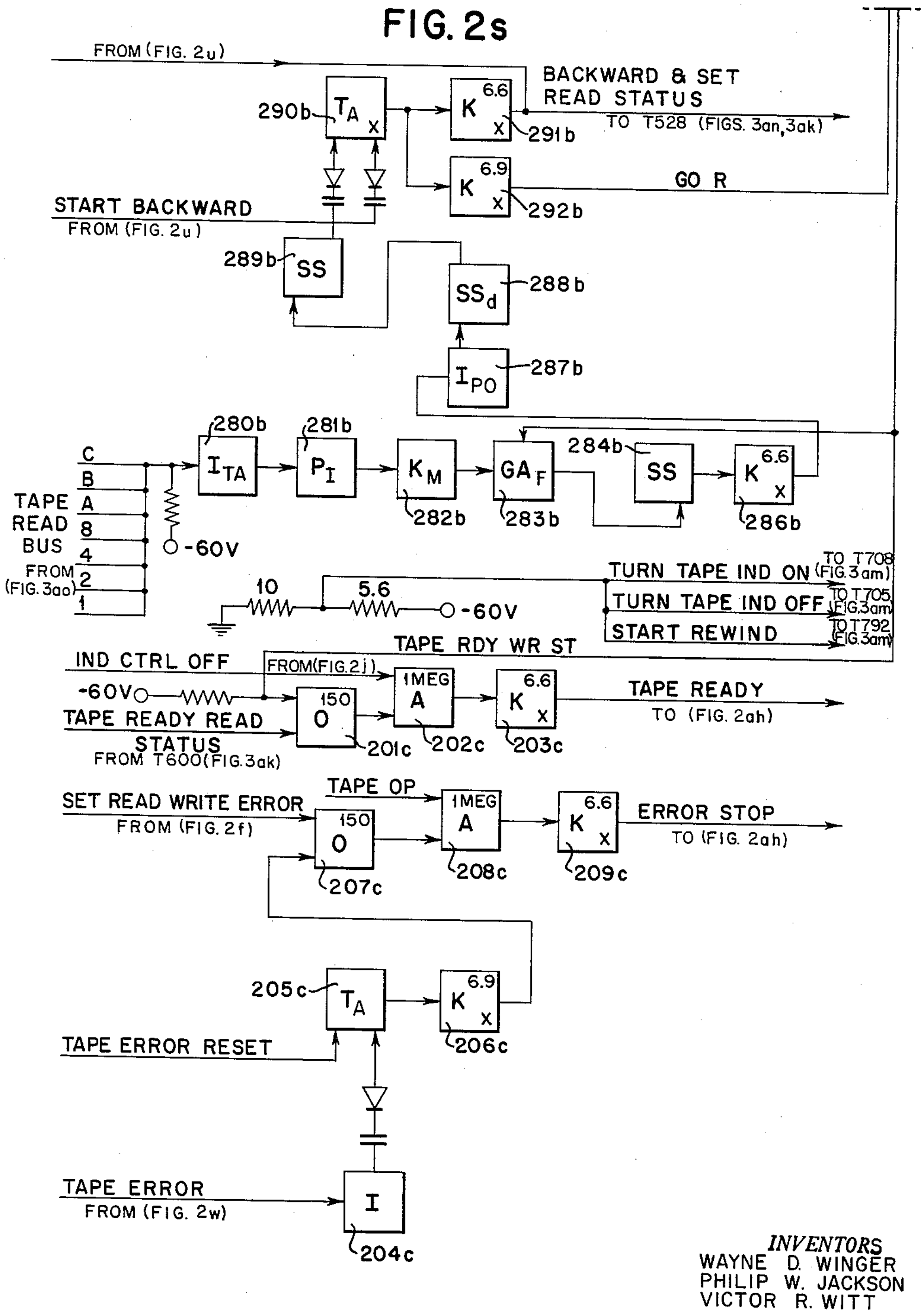
Figure 2T:
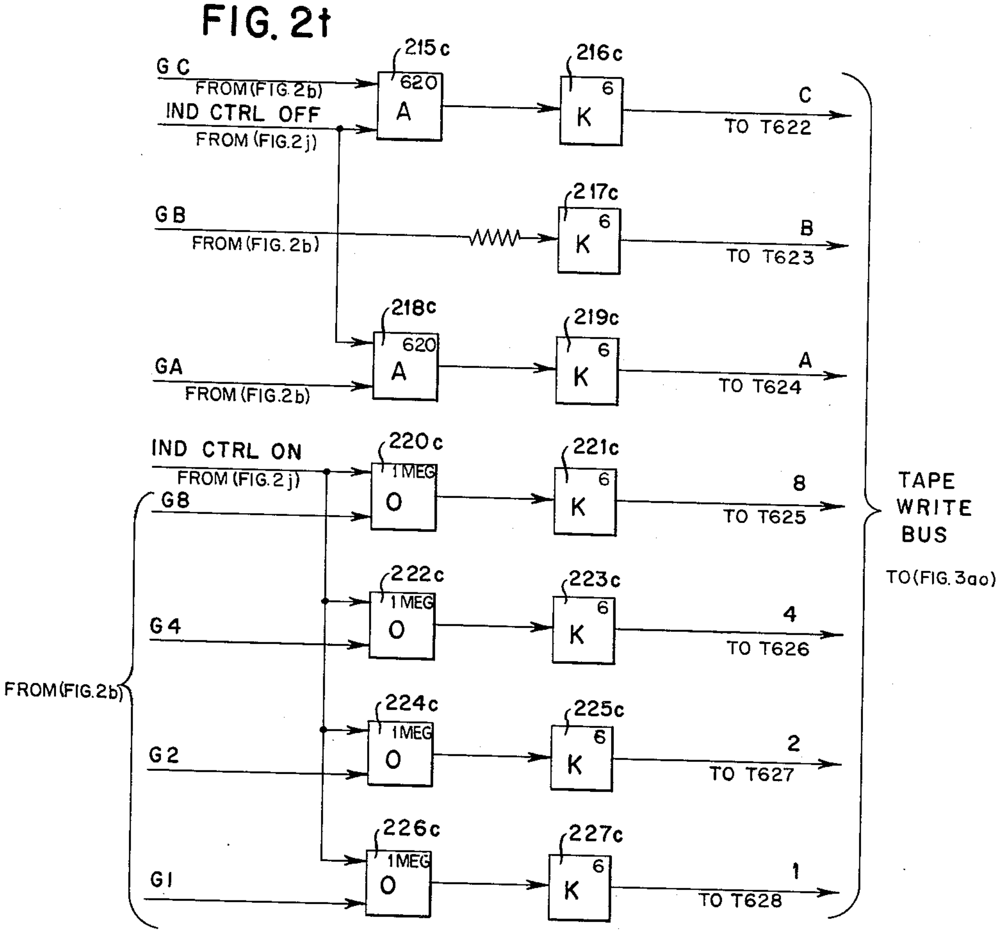

Fig. 2*t* is a block diagram of the Tape Input circuits.

Figure 2U:
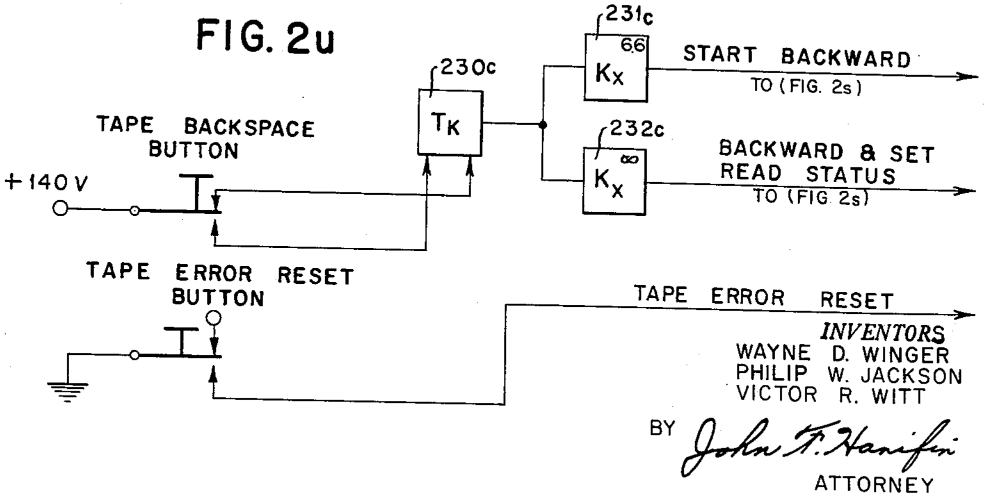
Figure 2V:
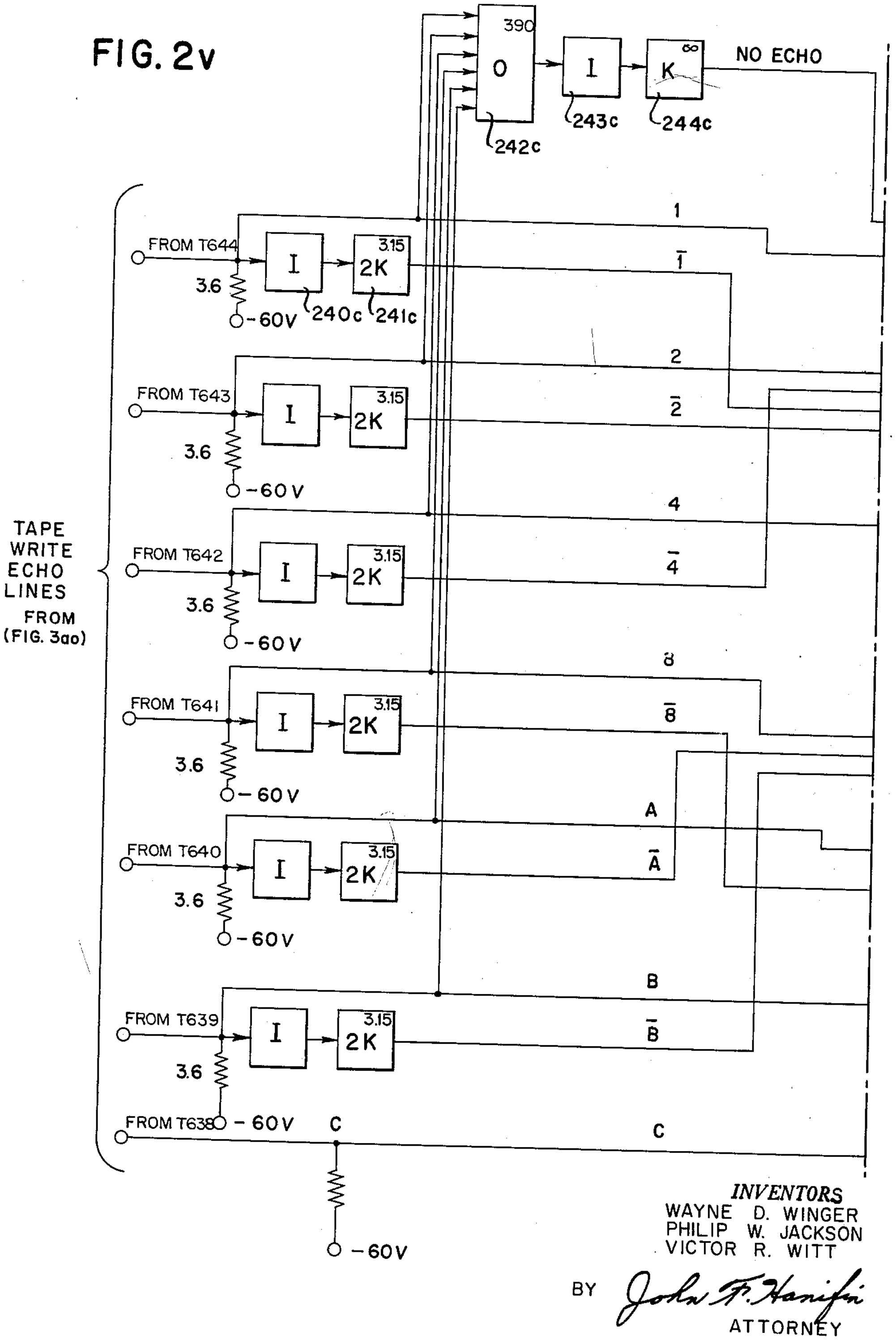
Figure 2W:
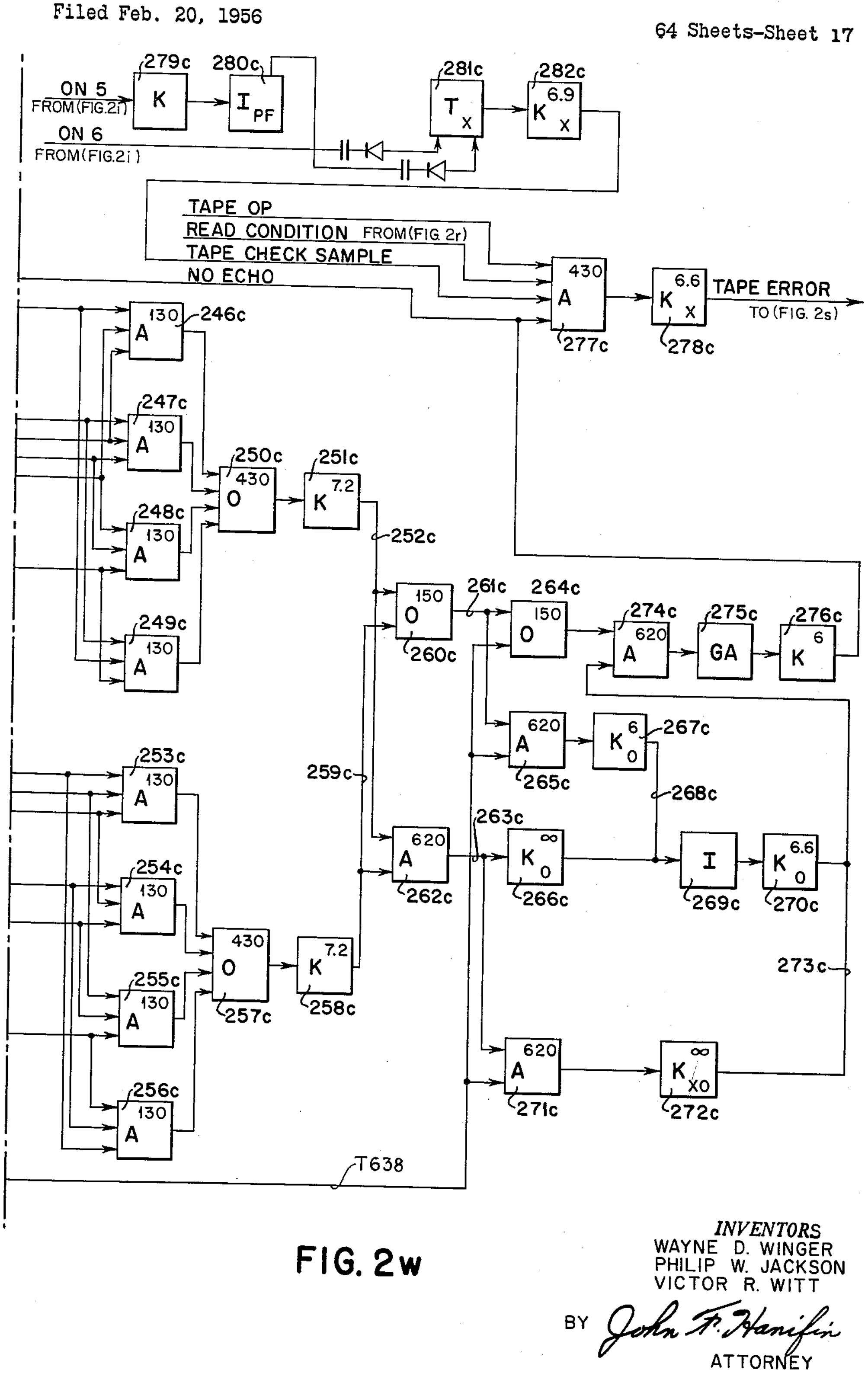

Figs. 2*v* and 2*w*, taken together, with Fig. 2*w* arranged to the right of Fig. 2*v*, comprise a block diagram of Vertical Redundancy Check circuits.

Figure 2X:
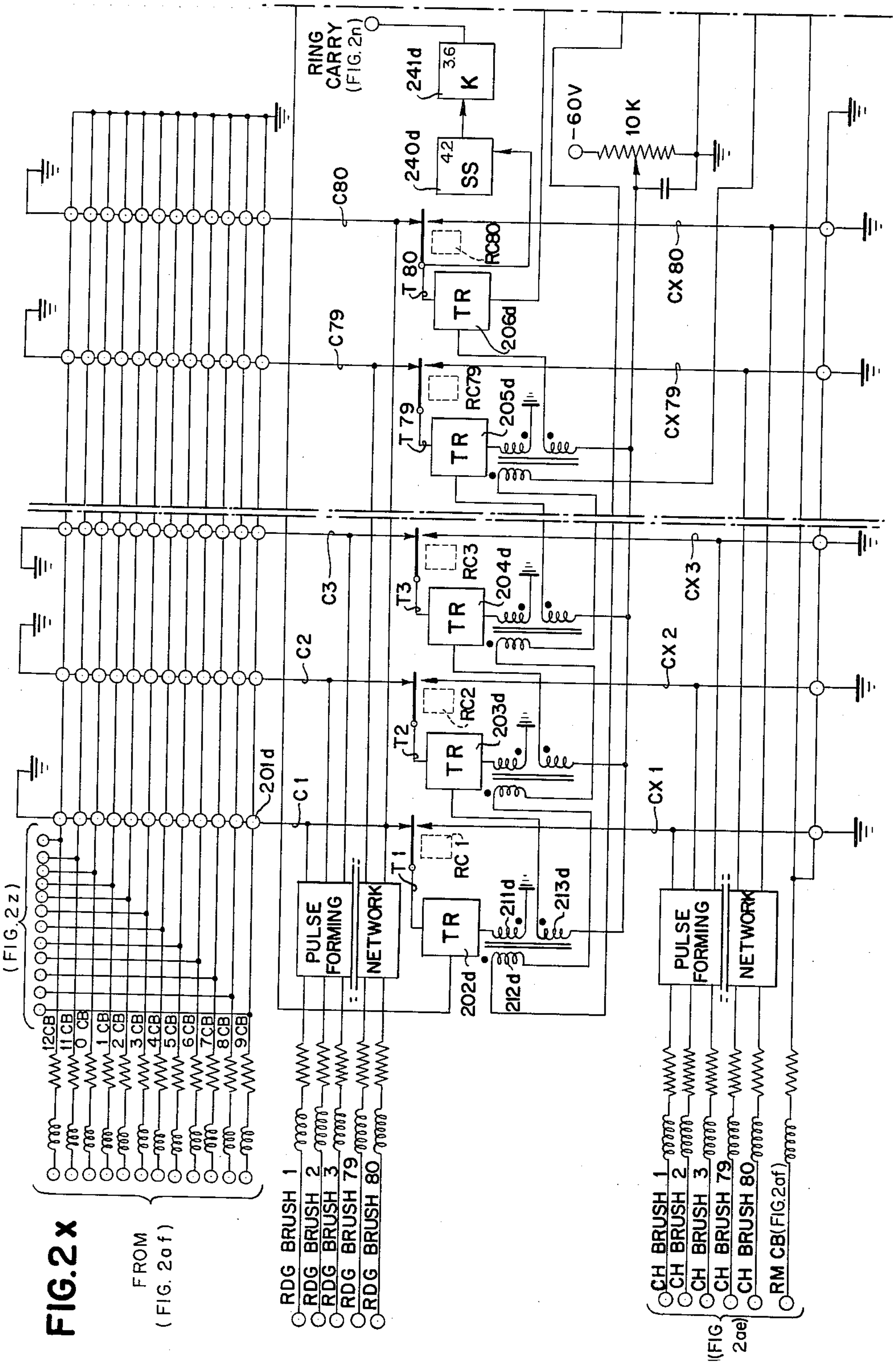
Figure 2Y:
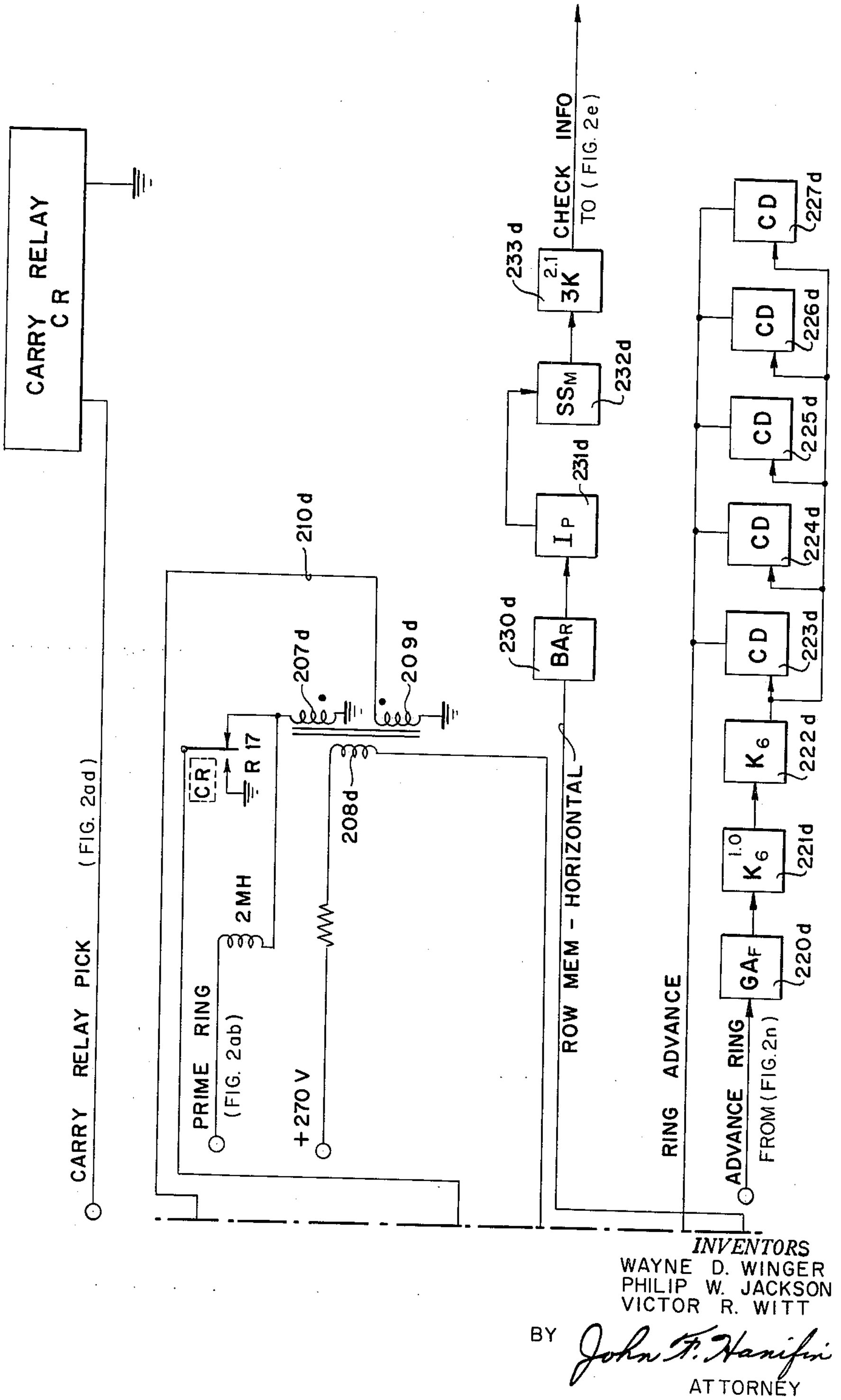

Figs. 2*x* and 2*y*, taken together, with Fig. 2*y* arranged to the right of Fig. 2*y*, comprise a schematic and block diagram of a Buffer Memory and Row Memory.

Figure 2Z:
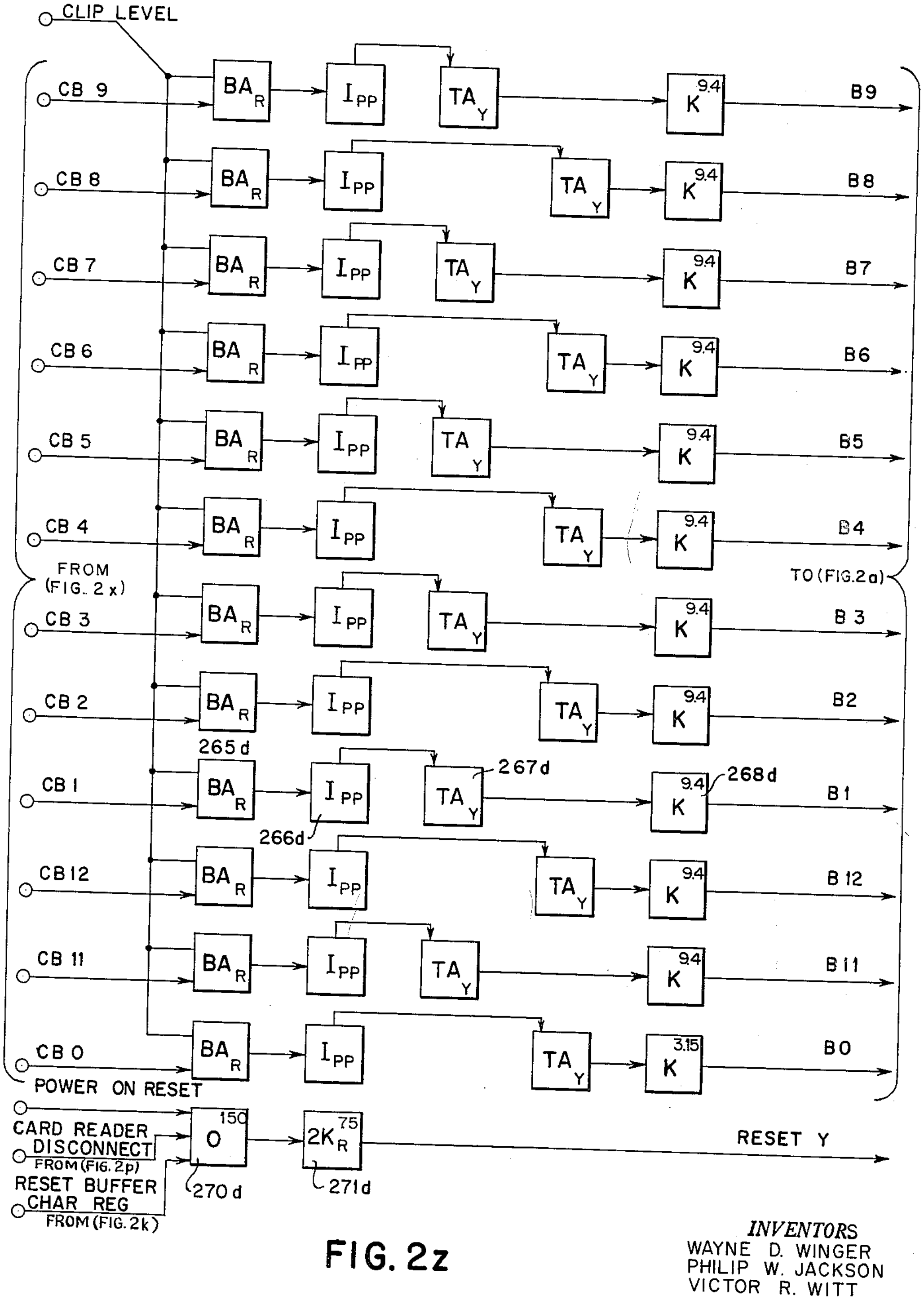
Figure 2A:
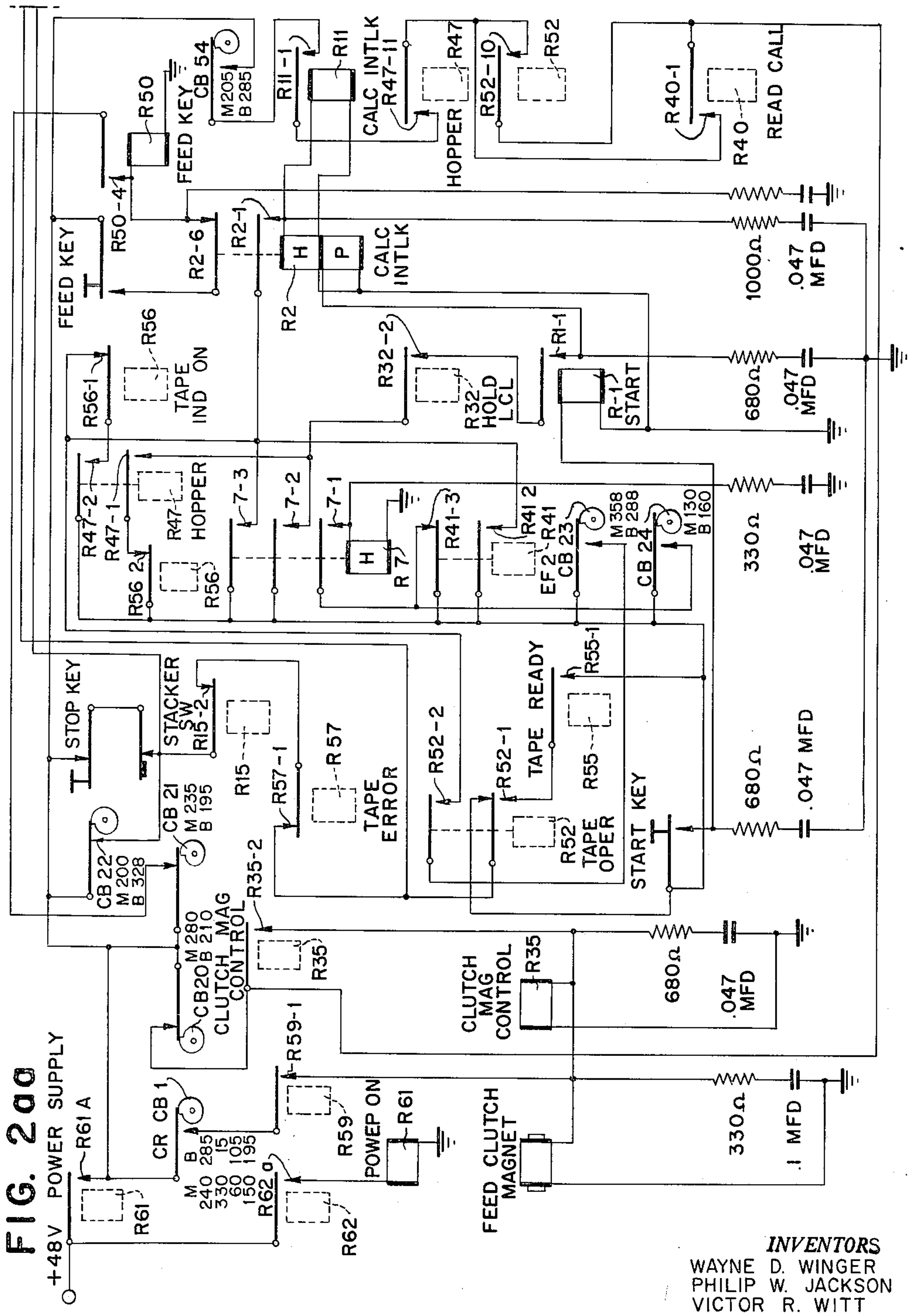
Figure 2A:
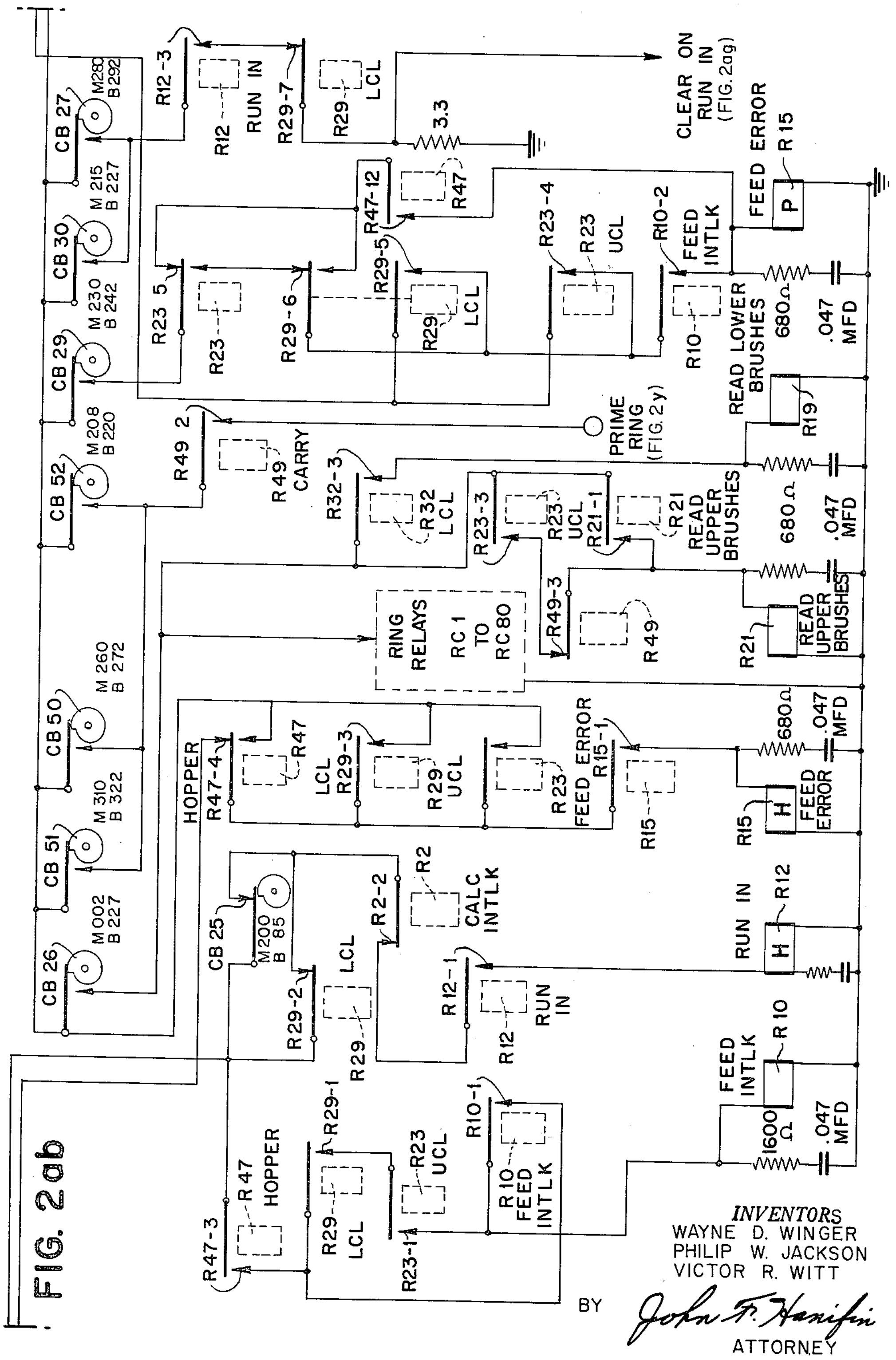
Figure 2A:
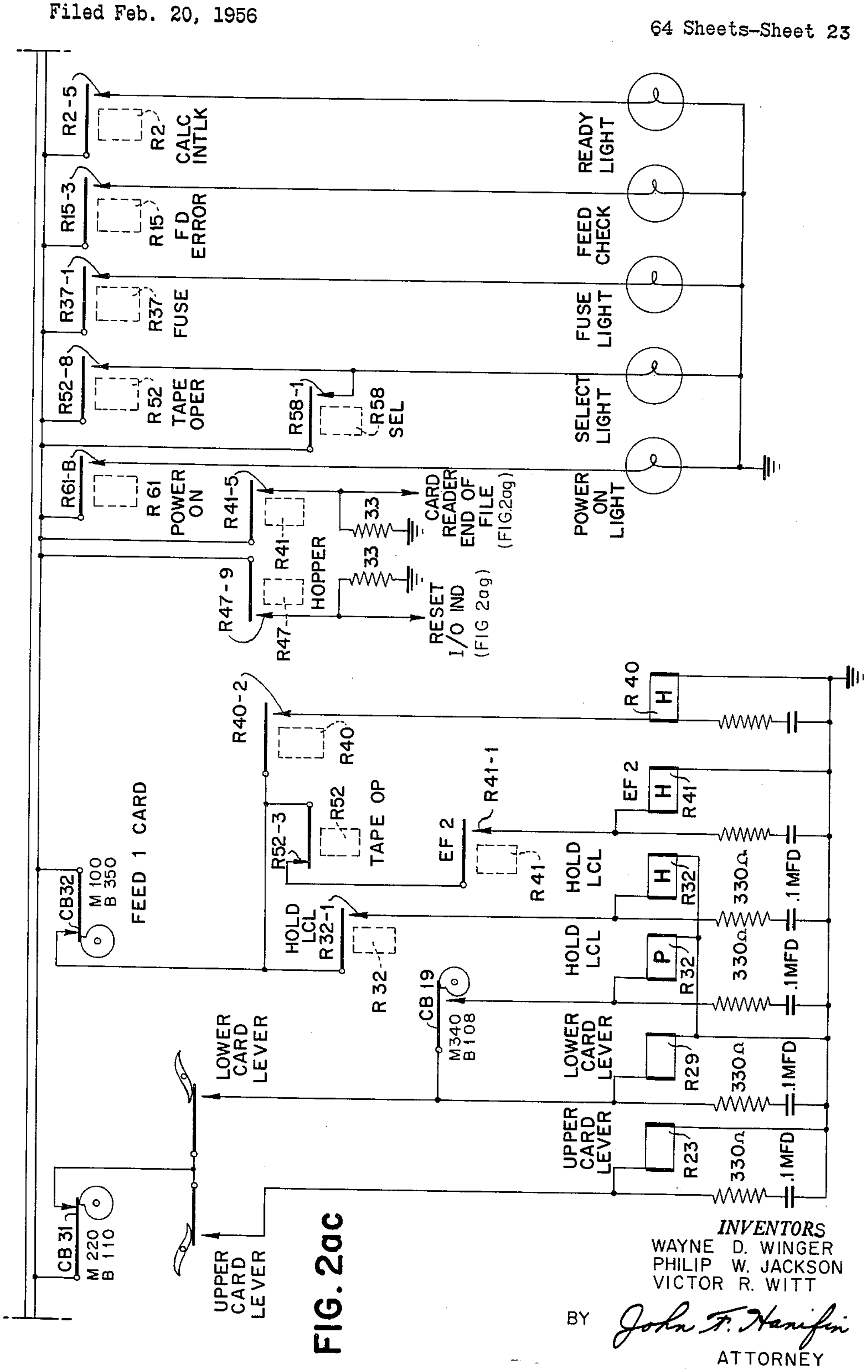
Figure 2A:
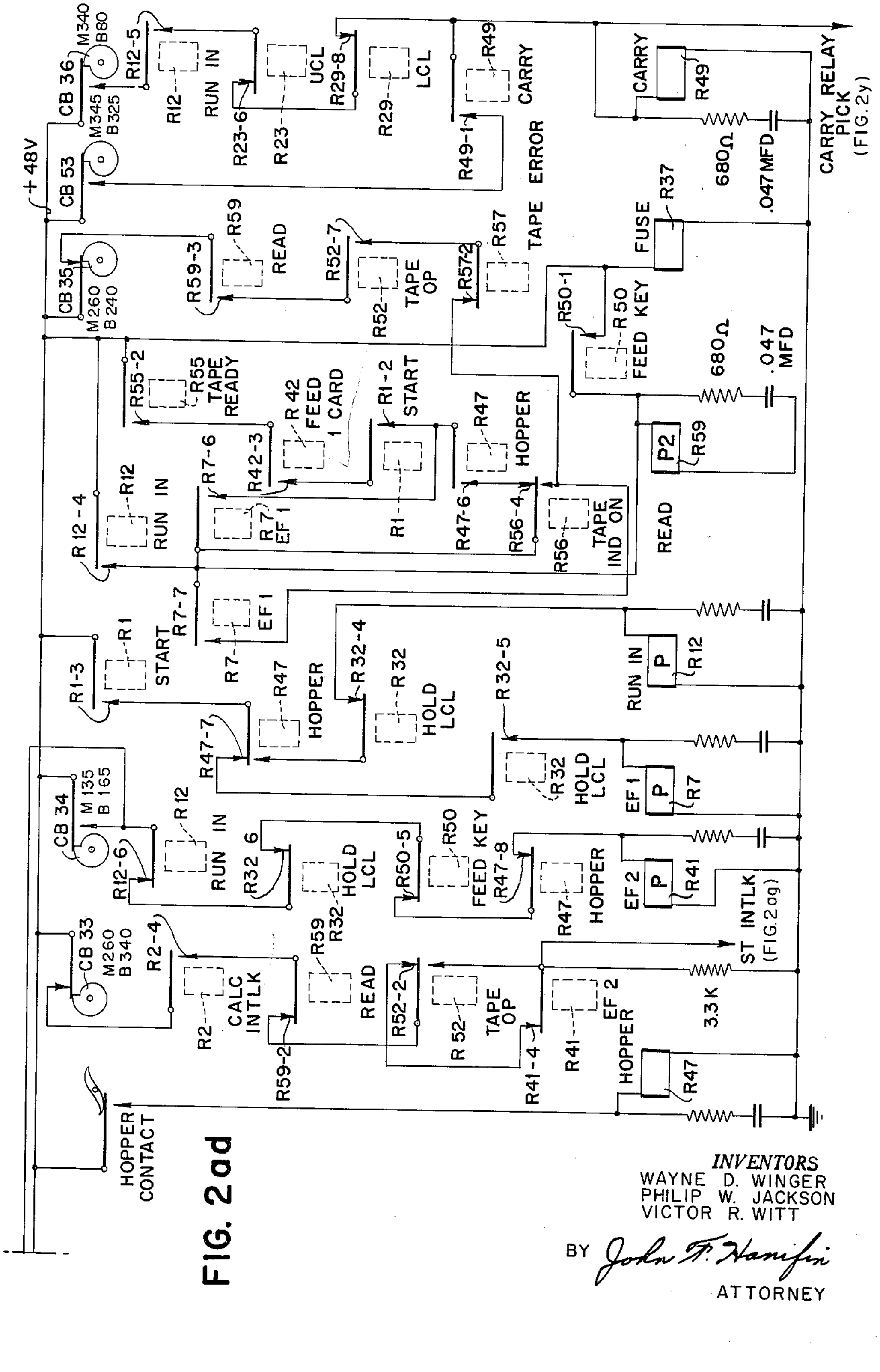
Figure 2A:
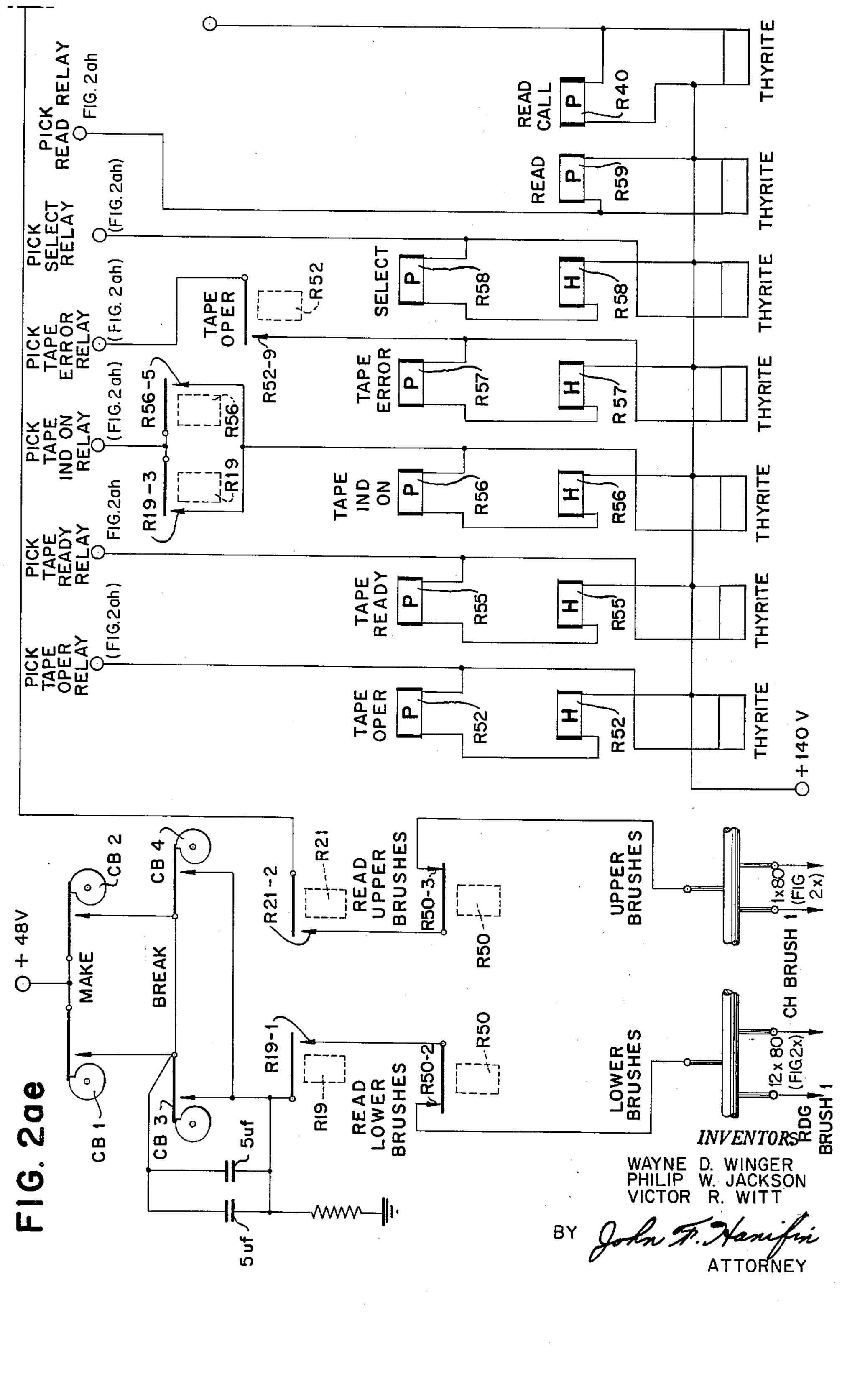
Figure 2A:
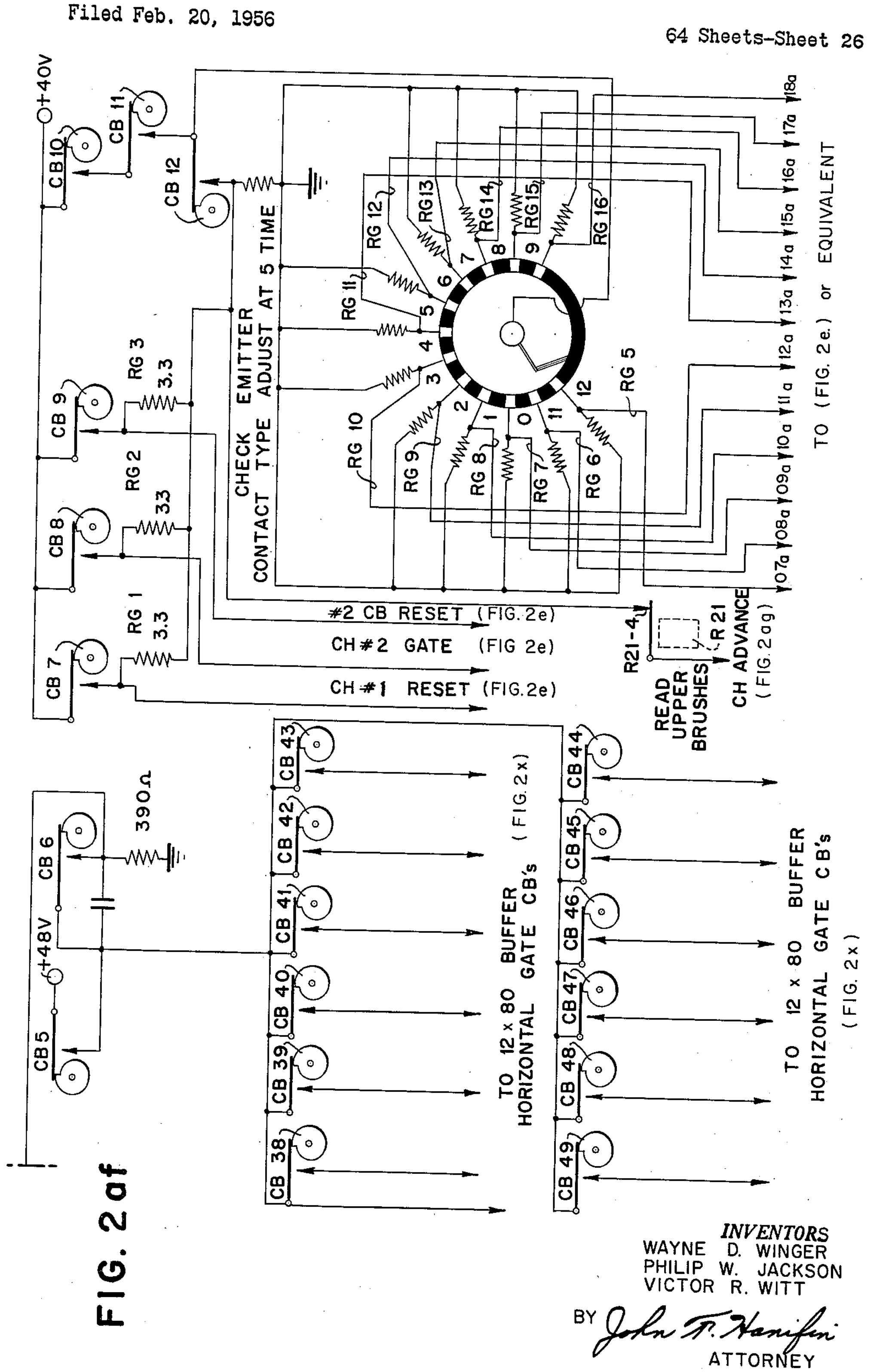
Figure 2A:
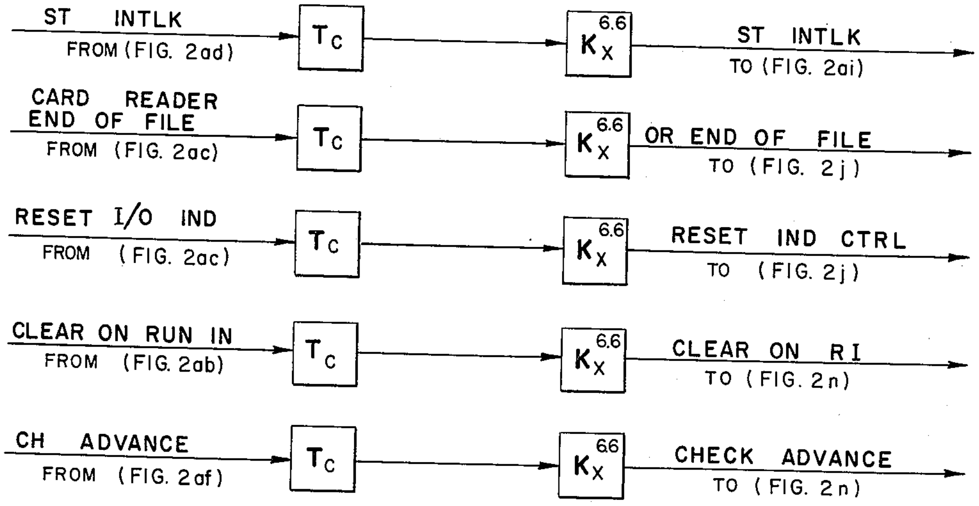
Figure 2A:
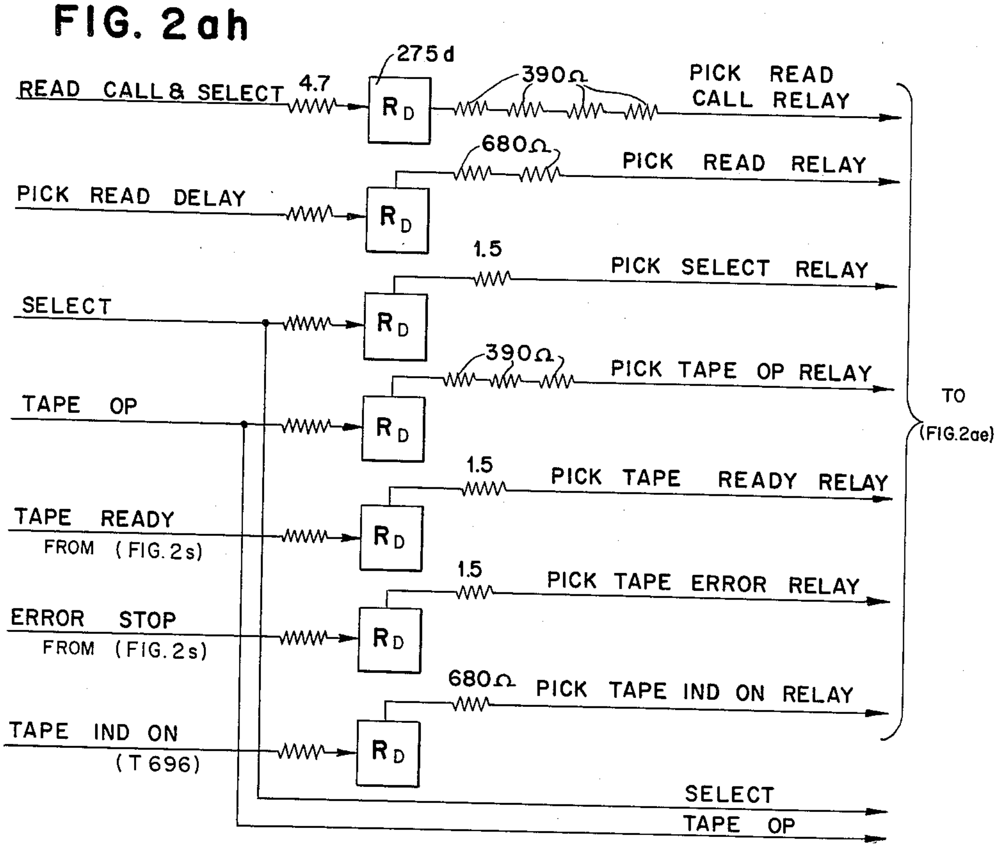
Figure 2A:
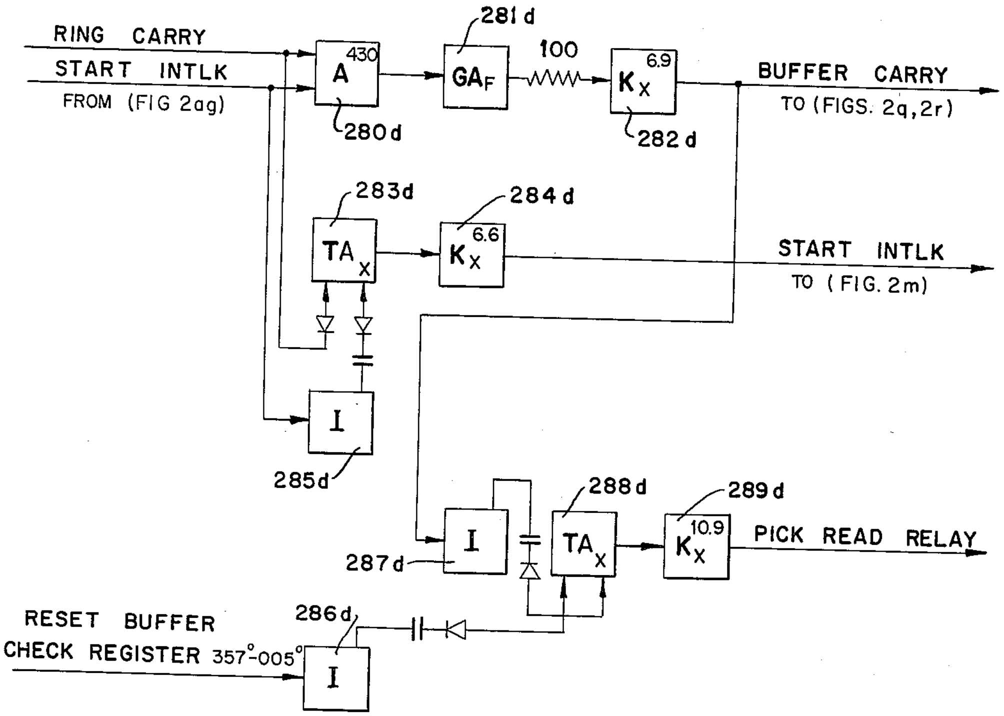
Figure 2A:
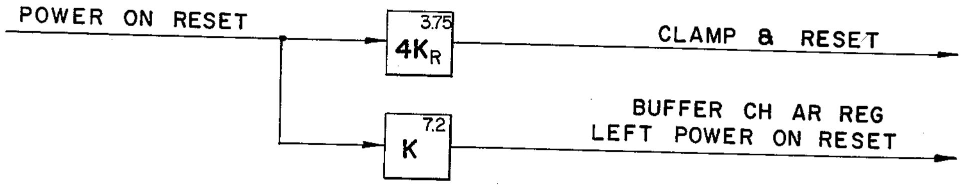

Fig. 2*z* is a block diagram of a Buffer Character Register.

Figs. 2*aa*, 2*ab*, 2*ac* and 2*ad*, taken together, with Fig. 2*ab* arranged to the right of Fig. 2*aa*, Fig. 2*ac* arranged to the right of Fig. 2*ab* and Fig. 2*ad* arranged to the right of Fig. 2*ac*, comprise a diagram of a portion of the Cam and Relay circuits for contrilling operation of the Card Reader.

Figs. 2*ae* and 2*af*, taken together, with Fig. 2*af*, arranged to the right of Fig. 2*ae*, comprise a diagram of another portion of the Cam and Relay circuits for controlling operation of the Card Reader.

Figs. 2*ag*, 2*ah*, 2*ai* and 2*aj* comprise block diagrams of electronic drivers for various control circuits.

Figures 3A, 3B:
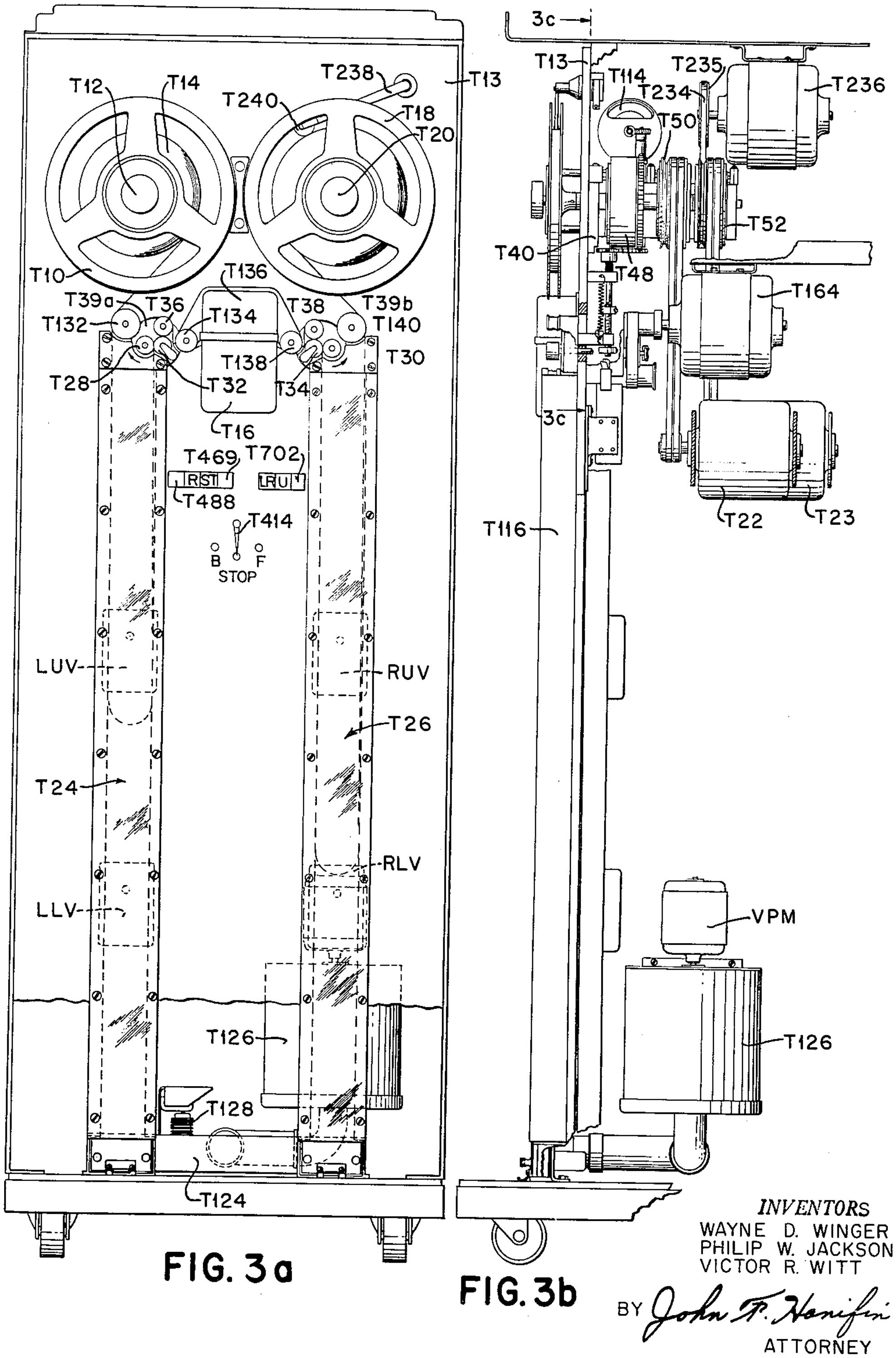

Fig. 3*a* is a front elevational view of the tape feeding machine.

Fig. 3*b* is a side elevational view of the tape feeding machine.

Figure 3C:
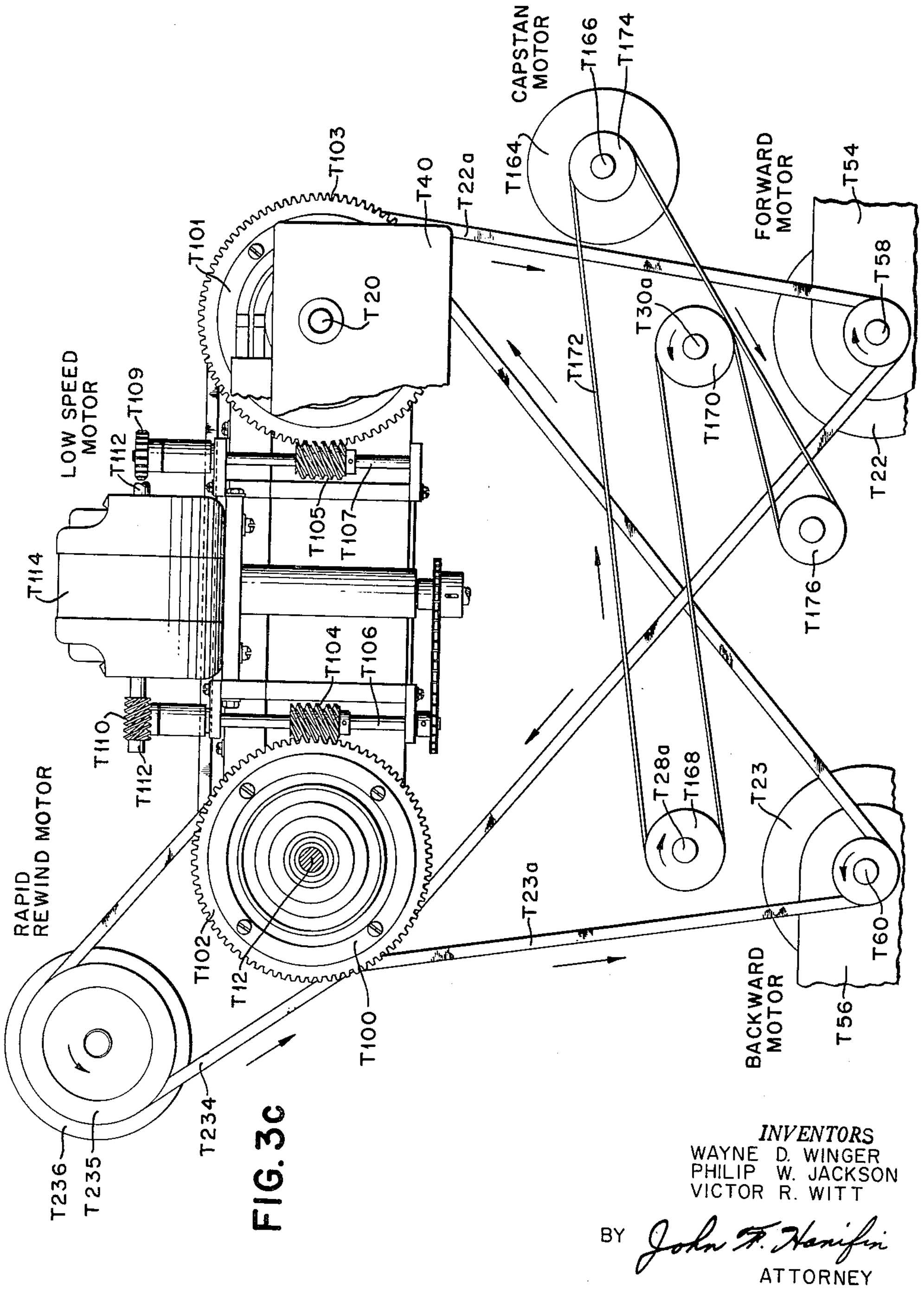
Figures 3D, 3E:
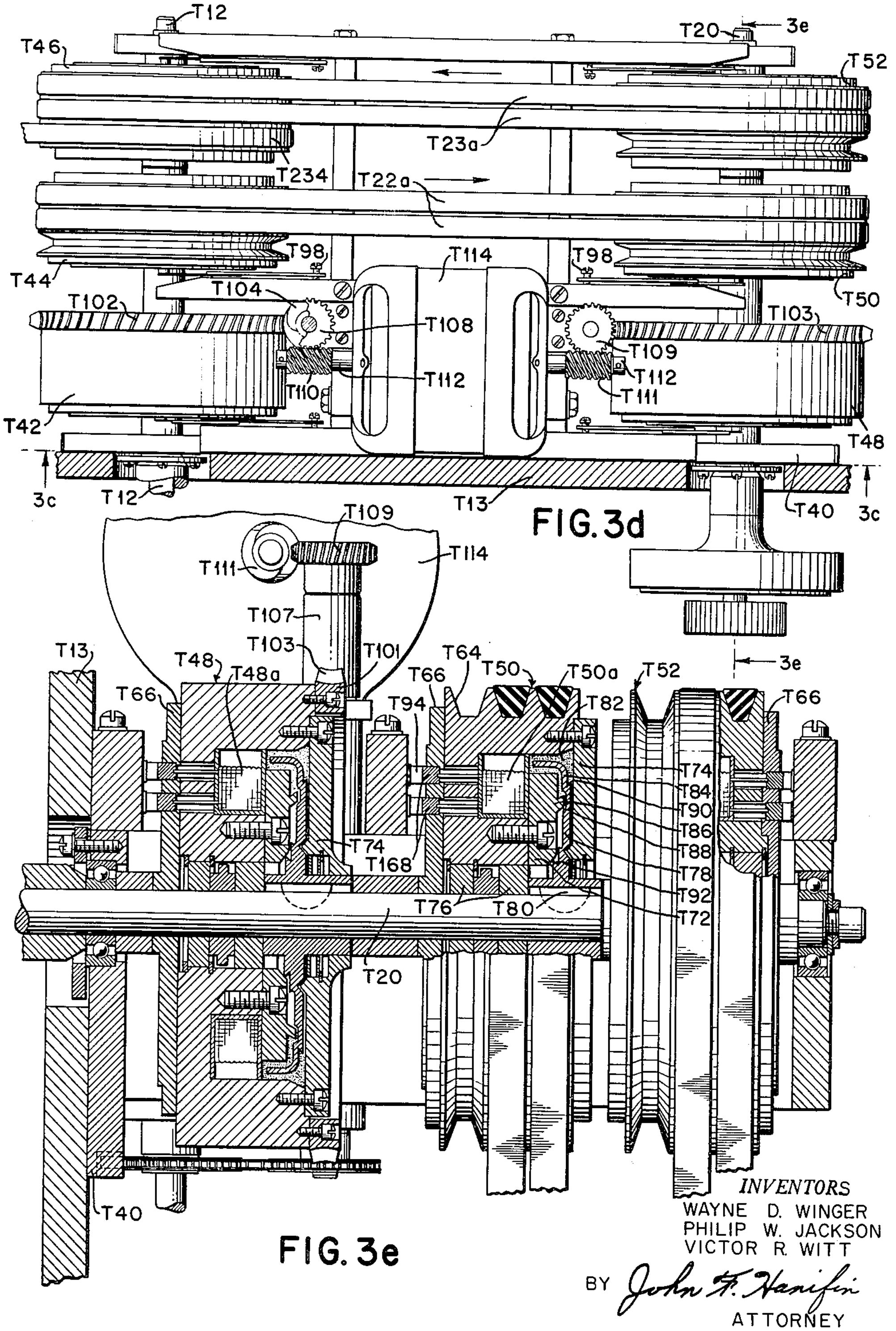

Fig. 3*c* is a view on line 3—3 of Figs. 3*b* and 3*d* illustrating the tape feeding machine and certain adjuncts thereto.

Fig. 3*d* is a plan view of the tape reel drive mechanism comprising electromagnetic clutches and brakes.

Fig. 3*e* is a view on line 5—5 of Fig. 3*d* showing parts in cross section and other parts in full line.

Figures 3F, 3G, 3H, 3I:
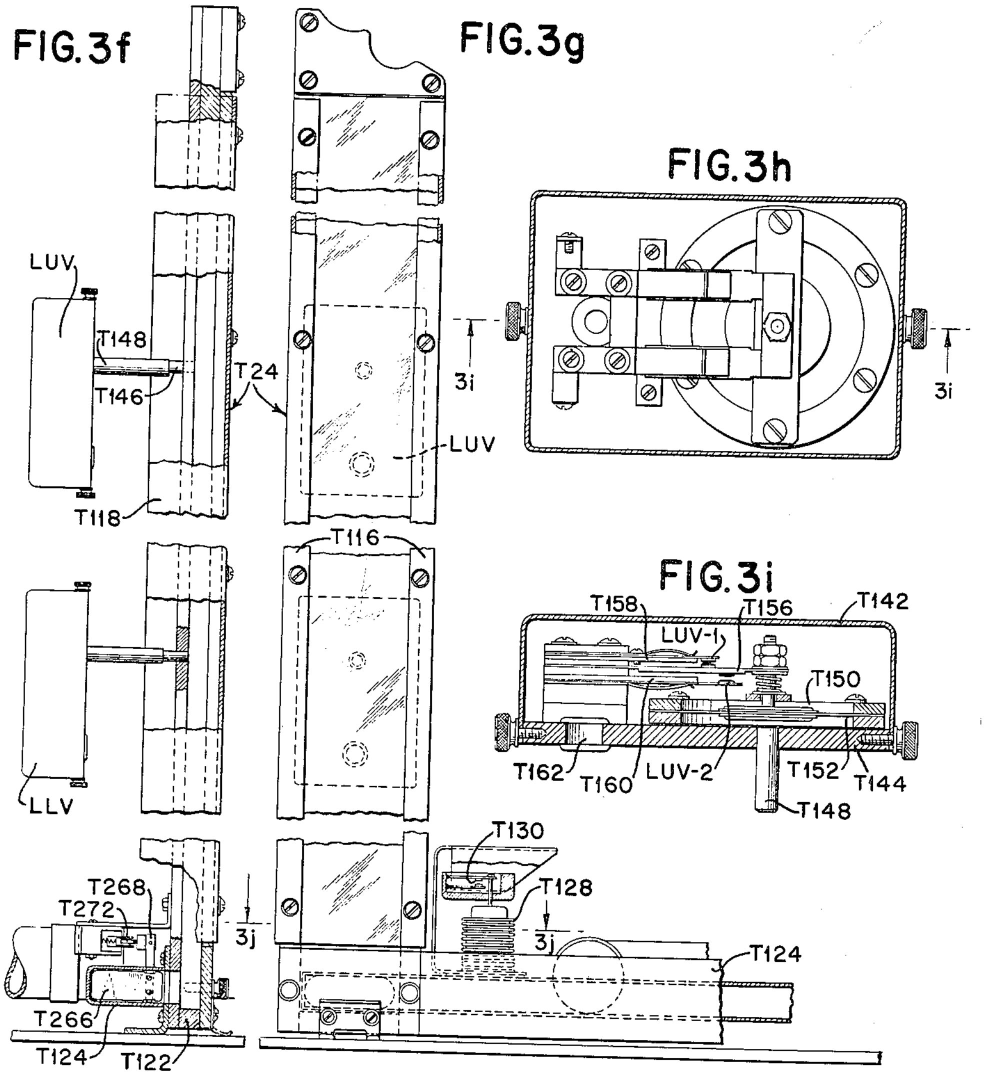

Fig. 3*f* is a side elevational view of a vacuum column providing for tape loop control.

Fig. 3*g* is a front elevational view of the vacuum column of Fig. 3*f*.

Fig. 3*h* is a plan view of a vacuum operated switch used in connection with the vacuum columns of Figs. 3*f* and 3*g*.

Fig. 3*i* is a cross sectional view on line 9—9 of Fig. 3*f*.

Figure 3J:
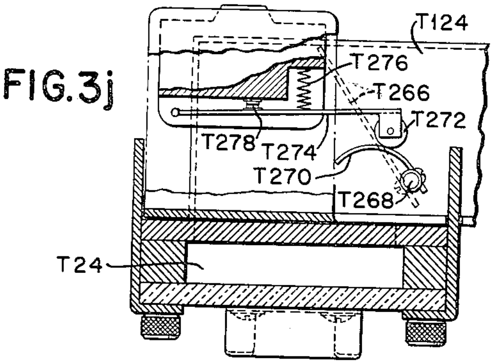

Fig. 3*j* is a plan view of a flapper valve within the header and used in connection with the vacuum columns of Figs. 3*f* and 3*g*, wherein the flapper valve is shown in its closed position.

Figure 3K:
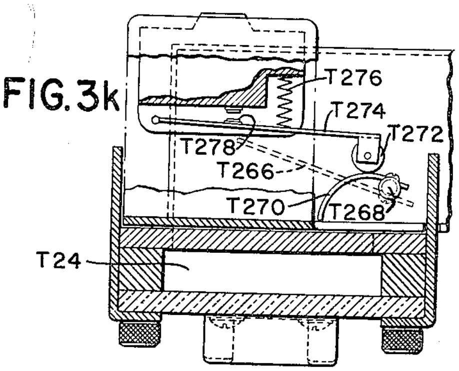

Fig. 3*k* is a view similar to that of Fig. 3*j* wherein the flapper valve is shown in its open position.

Figure 3M:
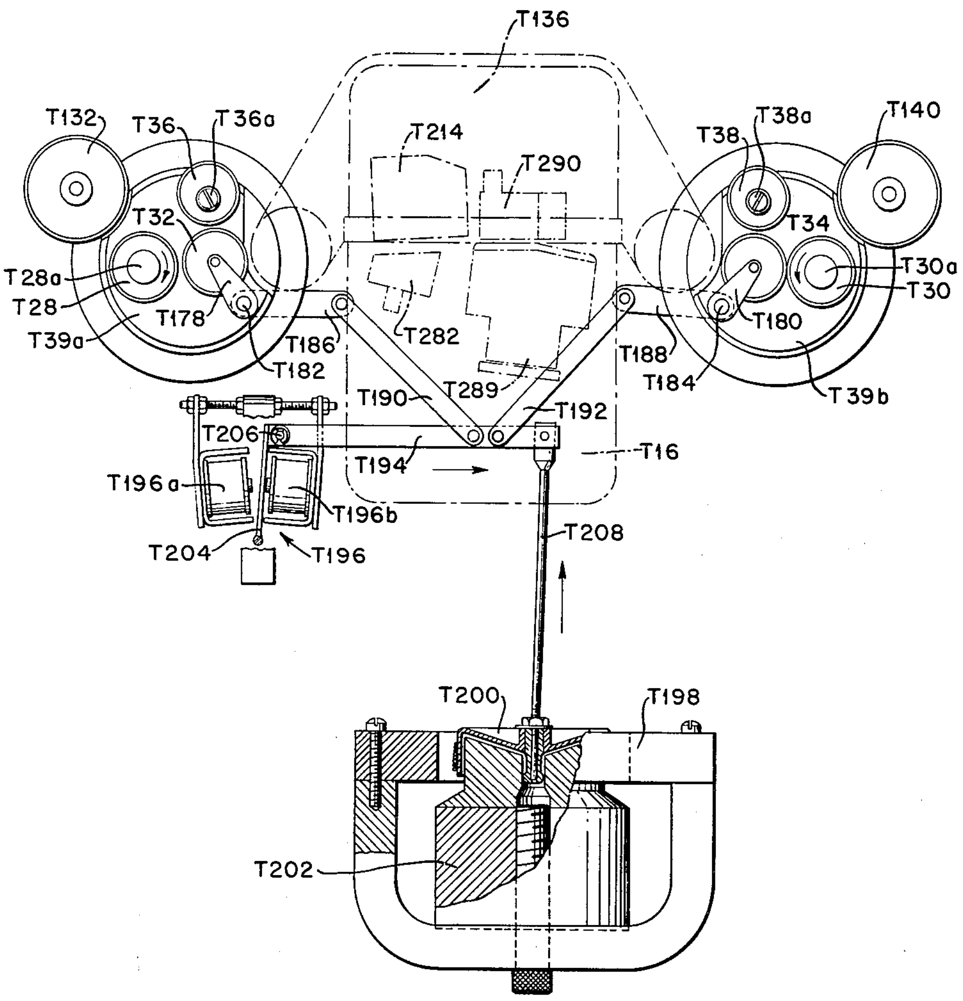

Fig. 3*m* illustrates the tape DRIVE mechanism and the means for biasing the mechanism into tape DRIVING position, the view showing the parts biased into position for DRIVING the tape in a FORWARD direction.

Figure 3N:
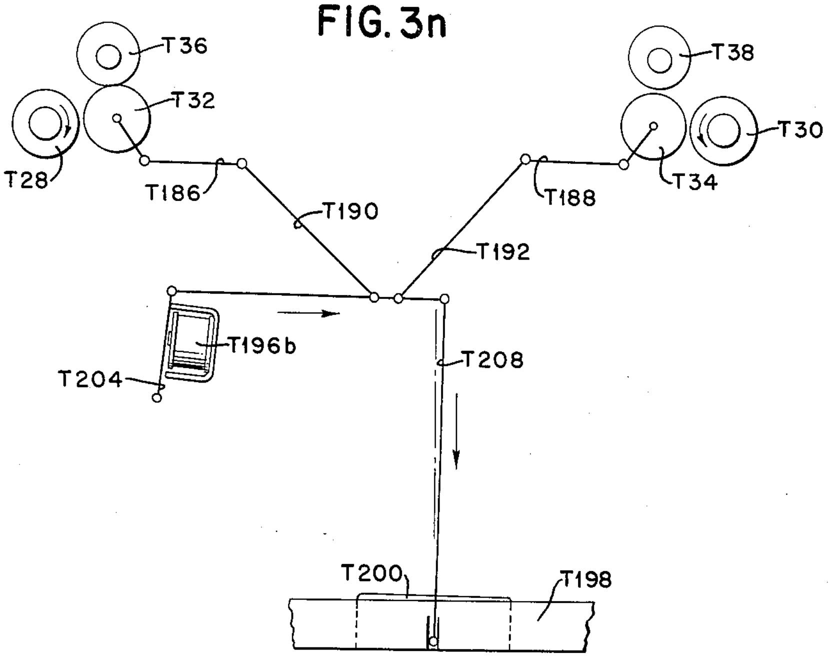

Fig. 3*n* is a diagrammatic view of the mechanism shown in Fig. 3*m* with the parts thereof biased into position to STOP tape movement following feed of tape in a FORWARD direction.

Figure 3O:
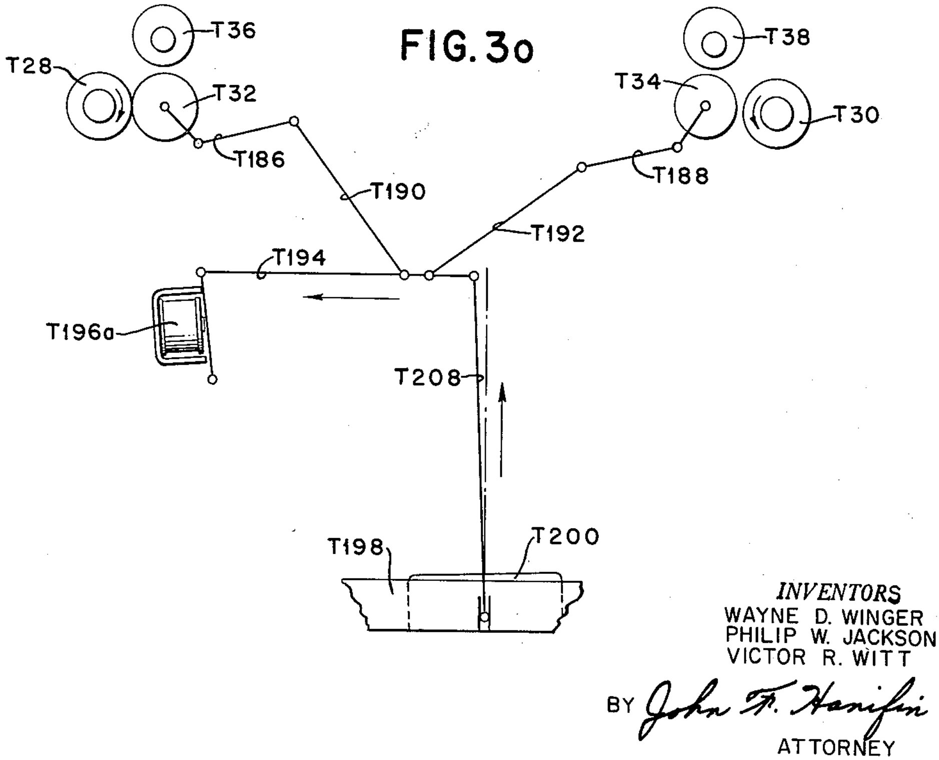

Fig. 3*o* is a diagrammatic view such as that in Fig. 3*n* and shows the mechanism biased into position to effect a BACKWARD feed of the tape.

Figure 3P:
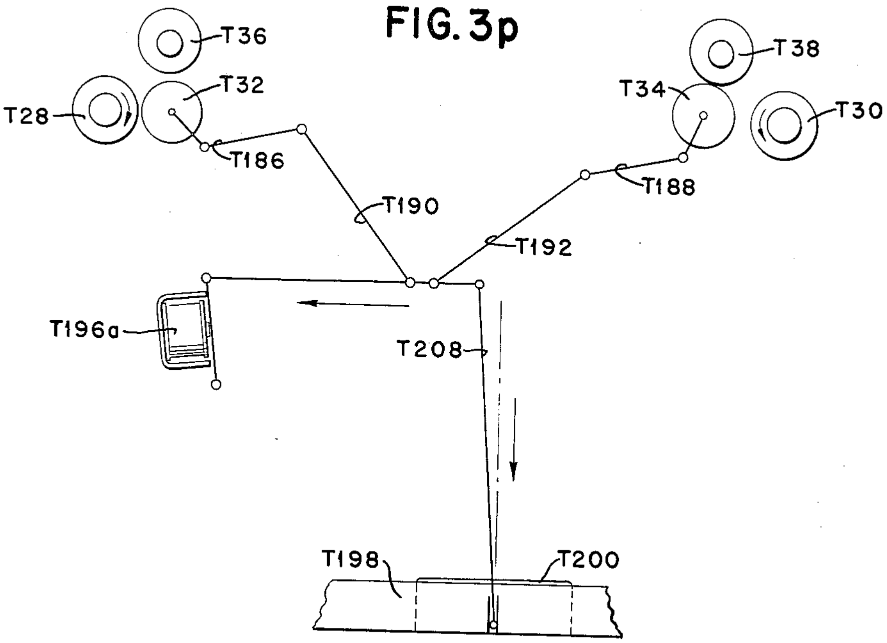

Fig. 3*p* is a diagrammatic view such as those in Figs. 3*n* and 3*o* with the parts biased into position to STOP tape feed following the BACKWARD feed of the tape.

Figure 3Q:
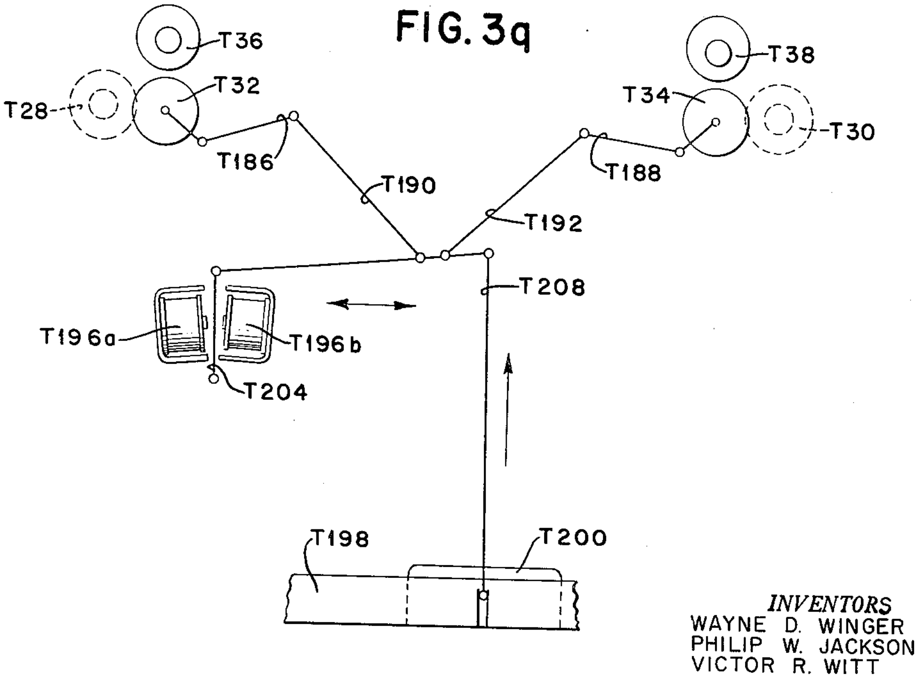

Fig. 3*q* is a diagrammatic view of the mechanism shown in Fig. 3*m* with the parts thereof biased into position away from both the DRIVE and STOP capstans as when in an UNLOADED position.

Figure 3R:
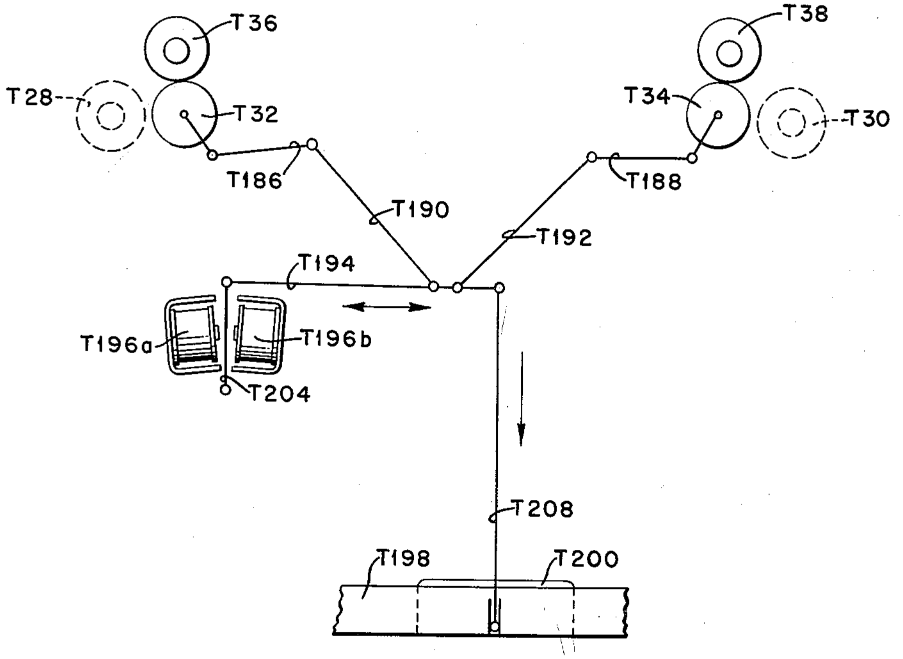

Fig. 3*r* is a diagrammatic view of the mechanism shown in Fig. 3*m* with the parts thereof biased into position against both STOP capstans to STOP tape movement during a LOAD OPERATION.

Figure 3S:
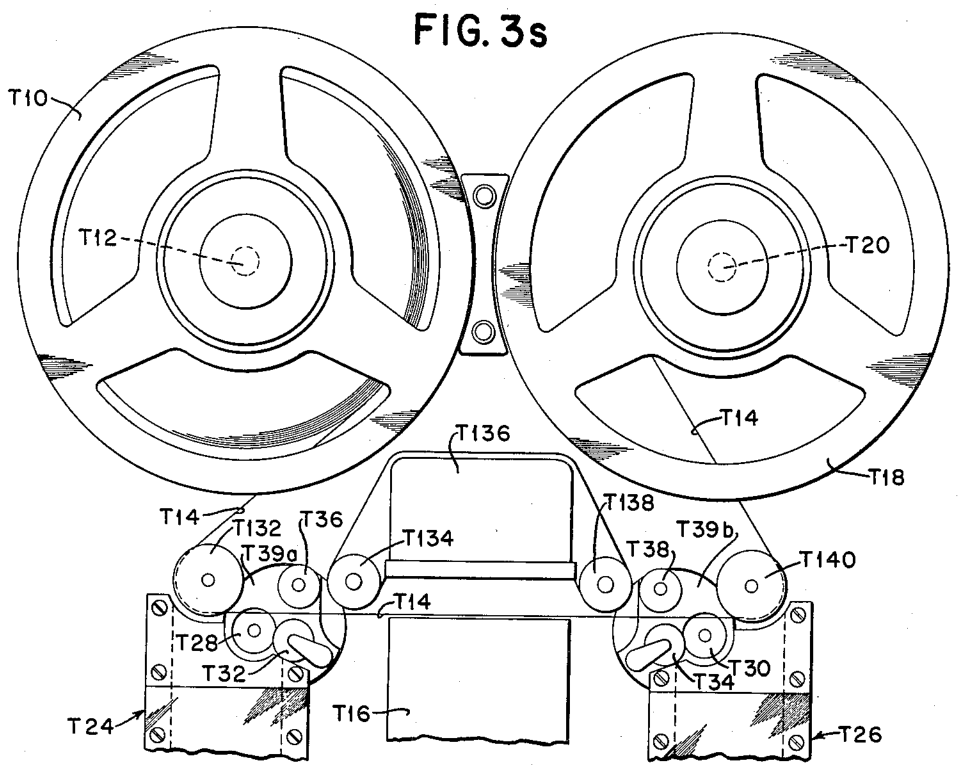

Fig. 3*s* is an enlarged view of part of Fig. 3*a* showing the relation of the tape to the columns, capstans, idlers and pulleys when the tape is in the UNLOADED position.

Figure 3T:
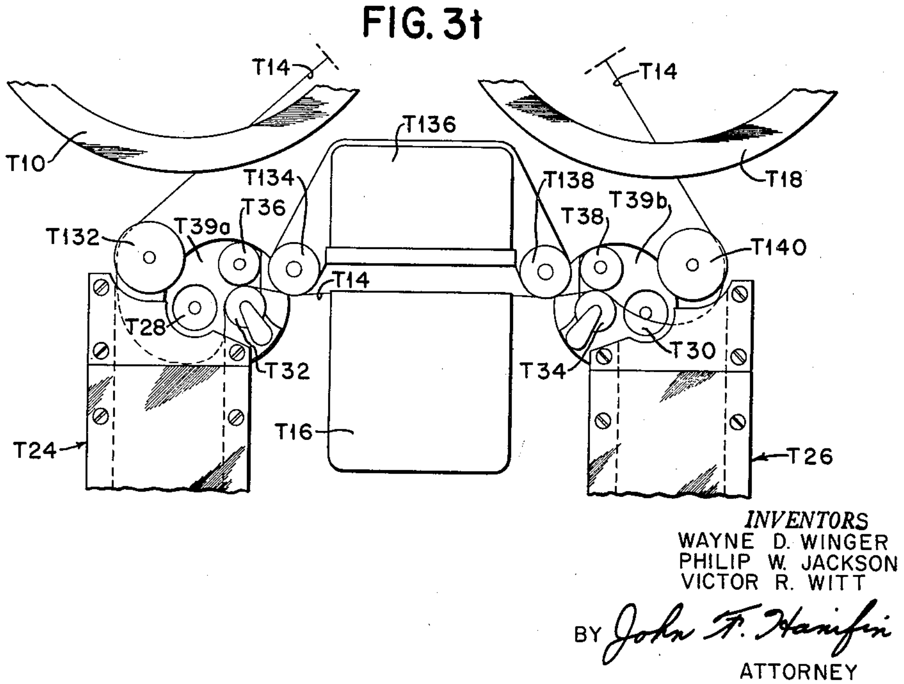

Fig. 3*t* is a view similar to that of Fig. 3*s* showing the relation of the tape to the idlers, capstans and pulleys when the tape has just entered a column during a LOAD operation.

Figures 3U, 3V, 3W:
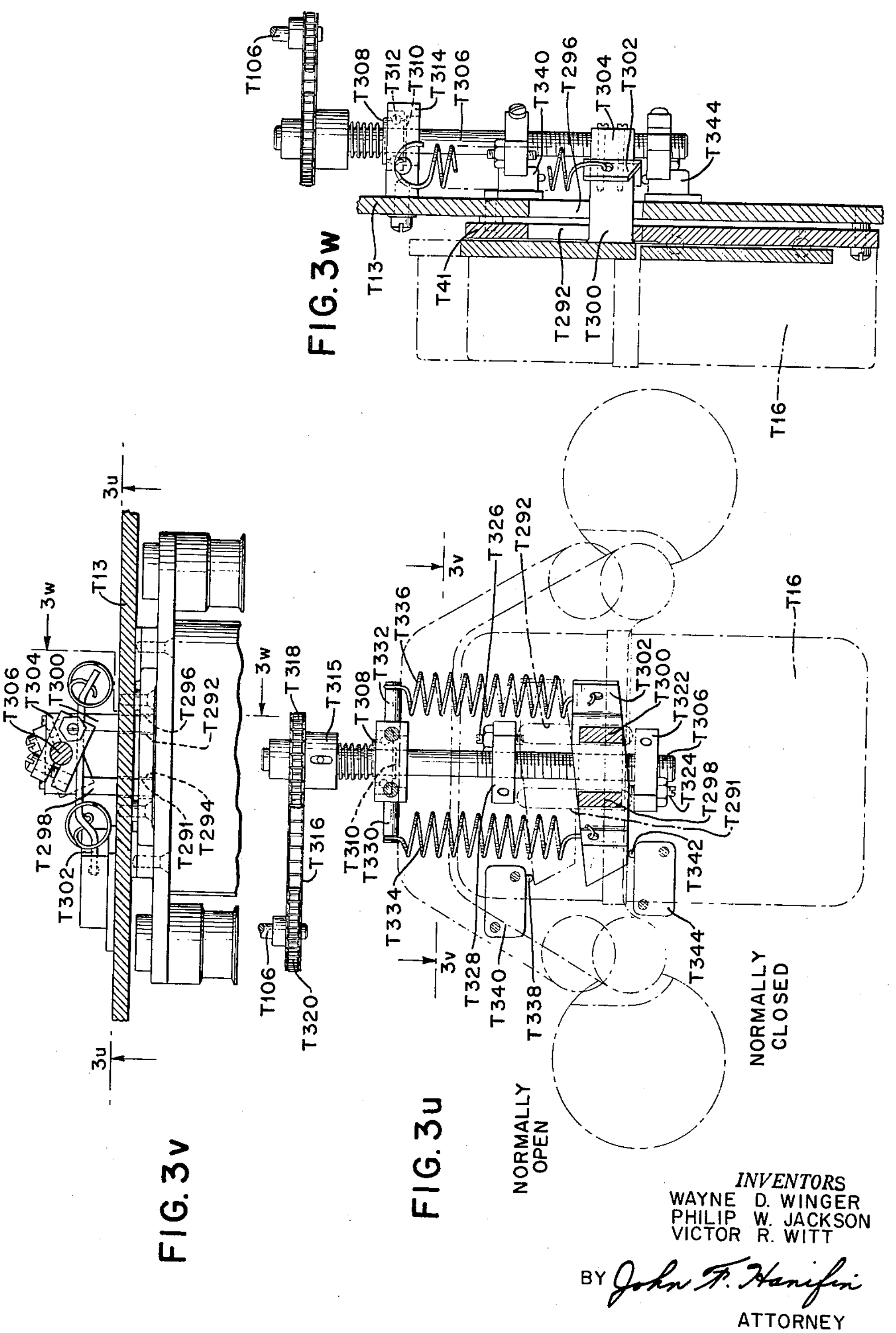

Fig. 3*u* is an elevational view taken on line 20—20 of Fig. 3*v* showing the mechanism for raising the head cover above the tape reading head whereby relative separation between the head in phantom and its cover in phantom is effected, with the cover shown in both its raised and lowered position.

Fig. 3*v* is a top view of the head cover raising mechanism on line 21—21 of Fig. 3*u*.

Fig. 3*w* is a view on line 22—22 of Fig. 3*v*.

Figures 3X, 3Y, 3Z:
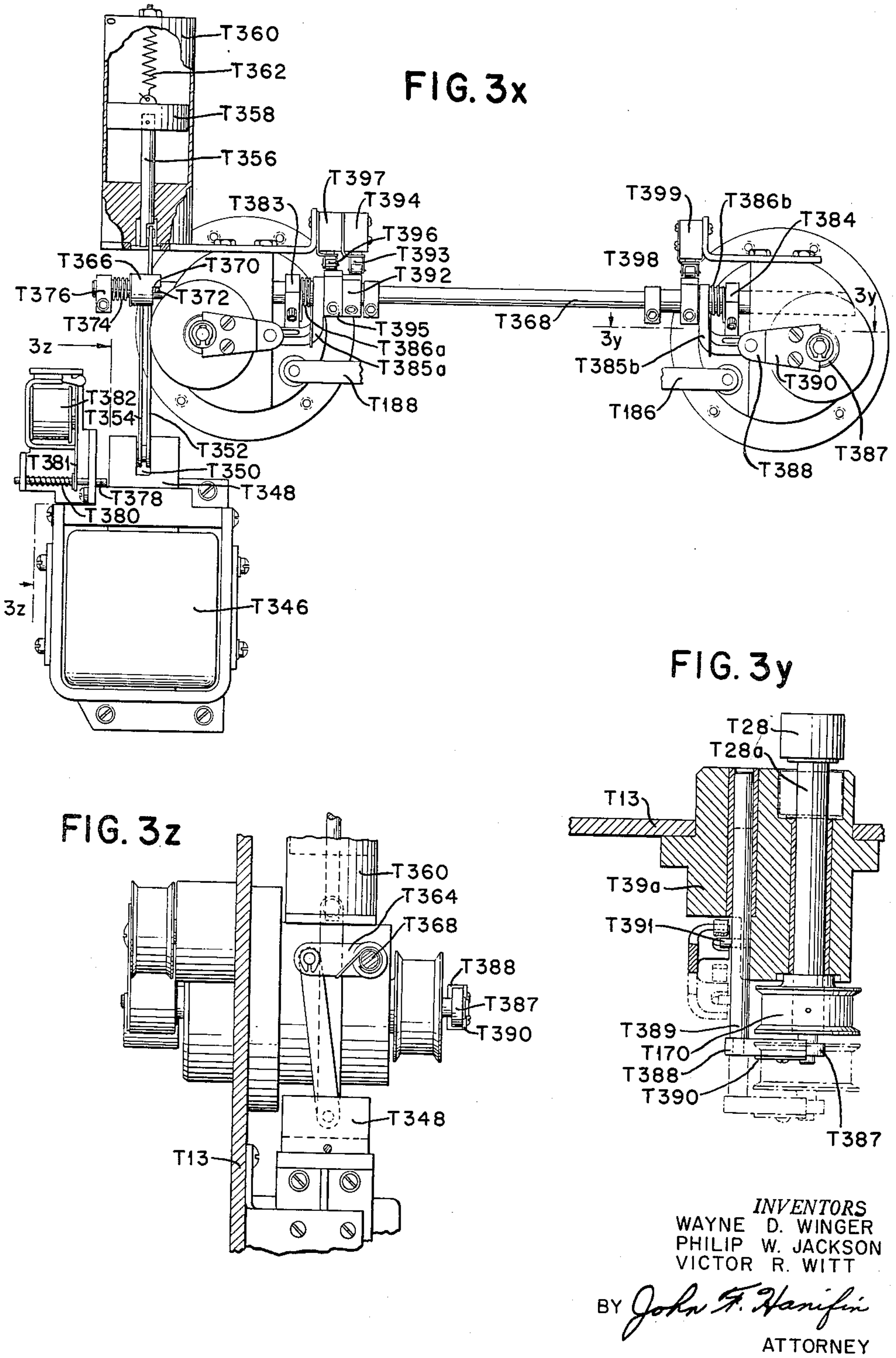
Figure 3A:
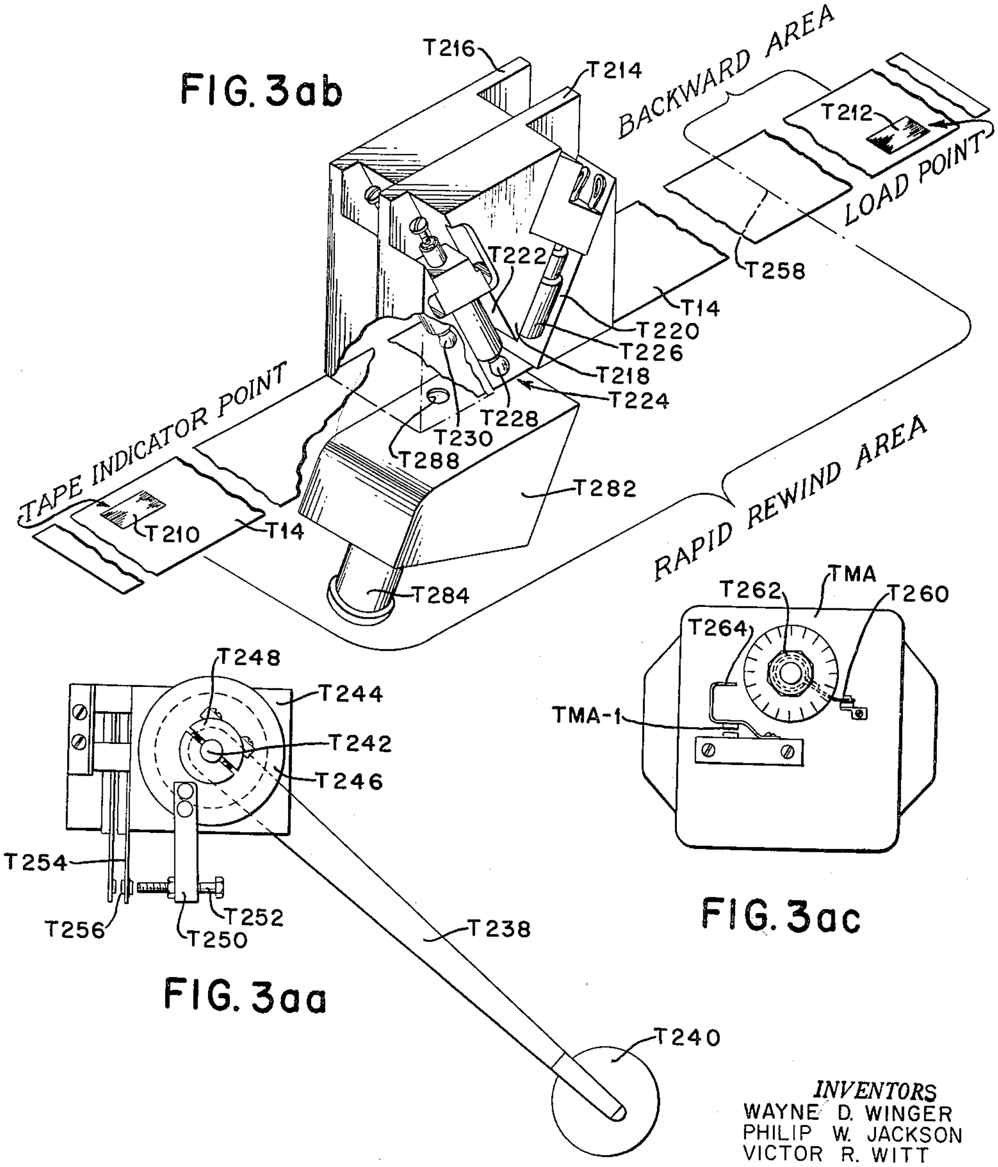
Figure 3A:
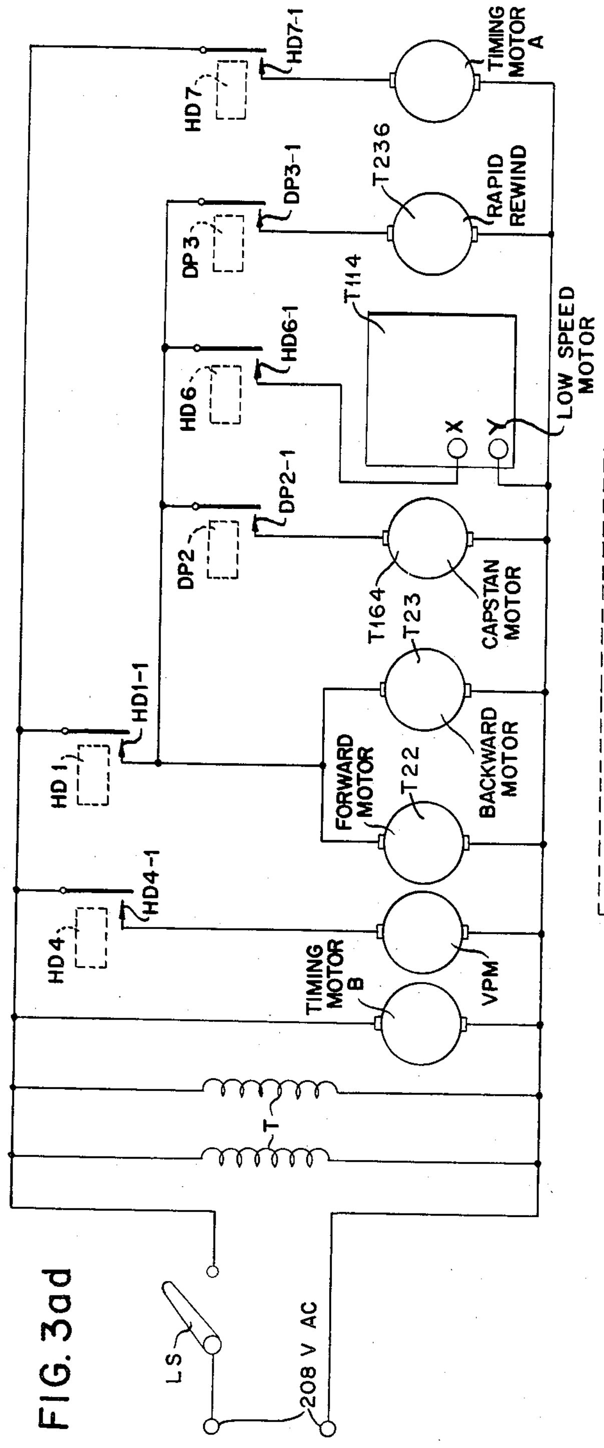
Figure 3A:
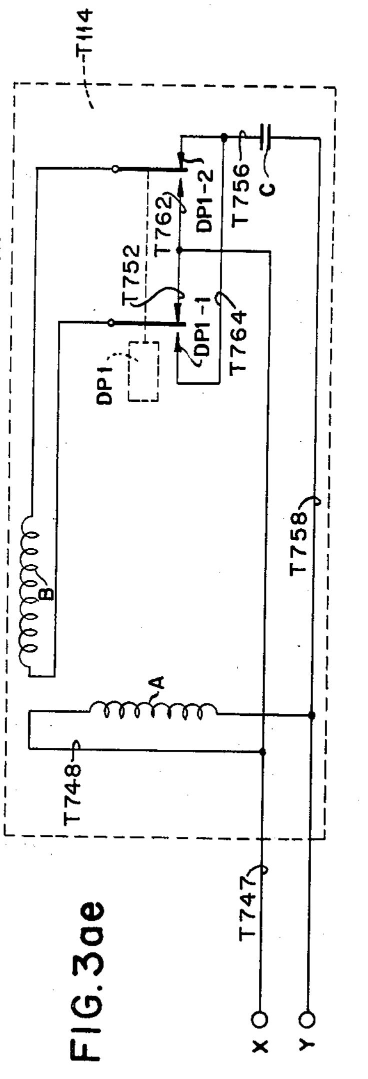
Figure 3A:
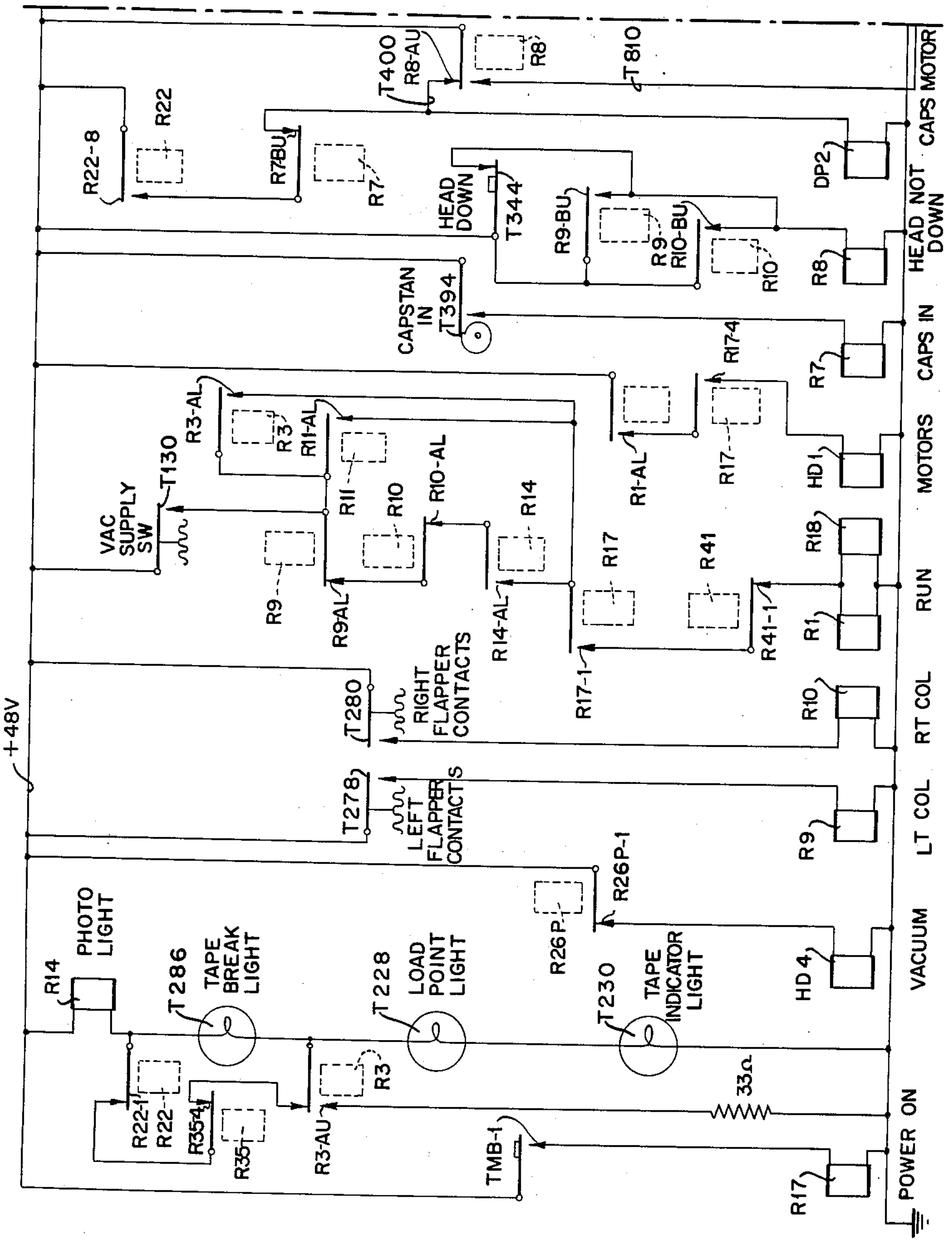
Figure 3A:
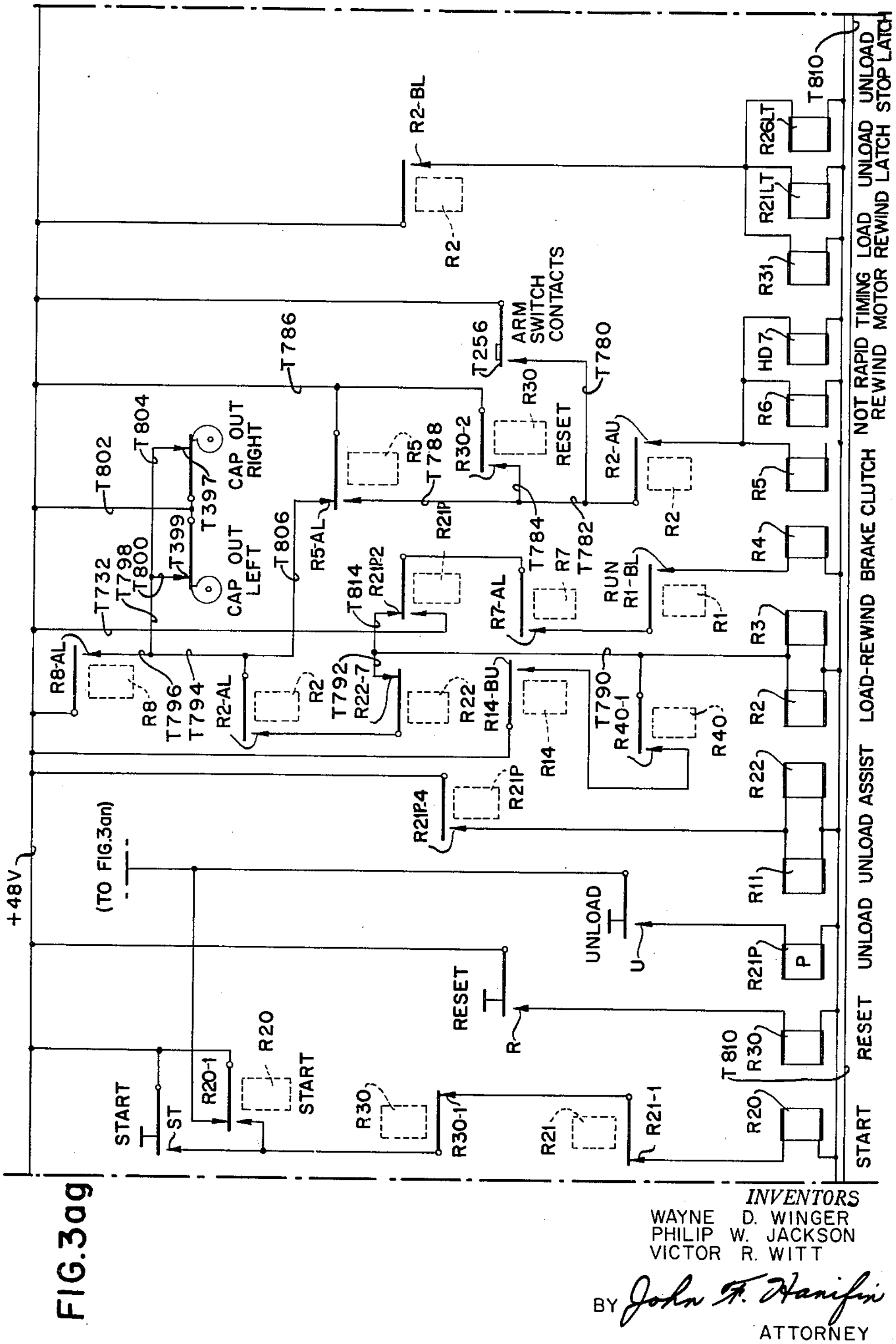
Figure 3A:
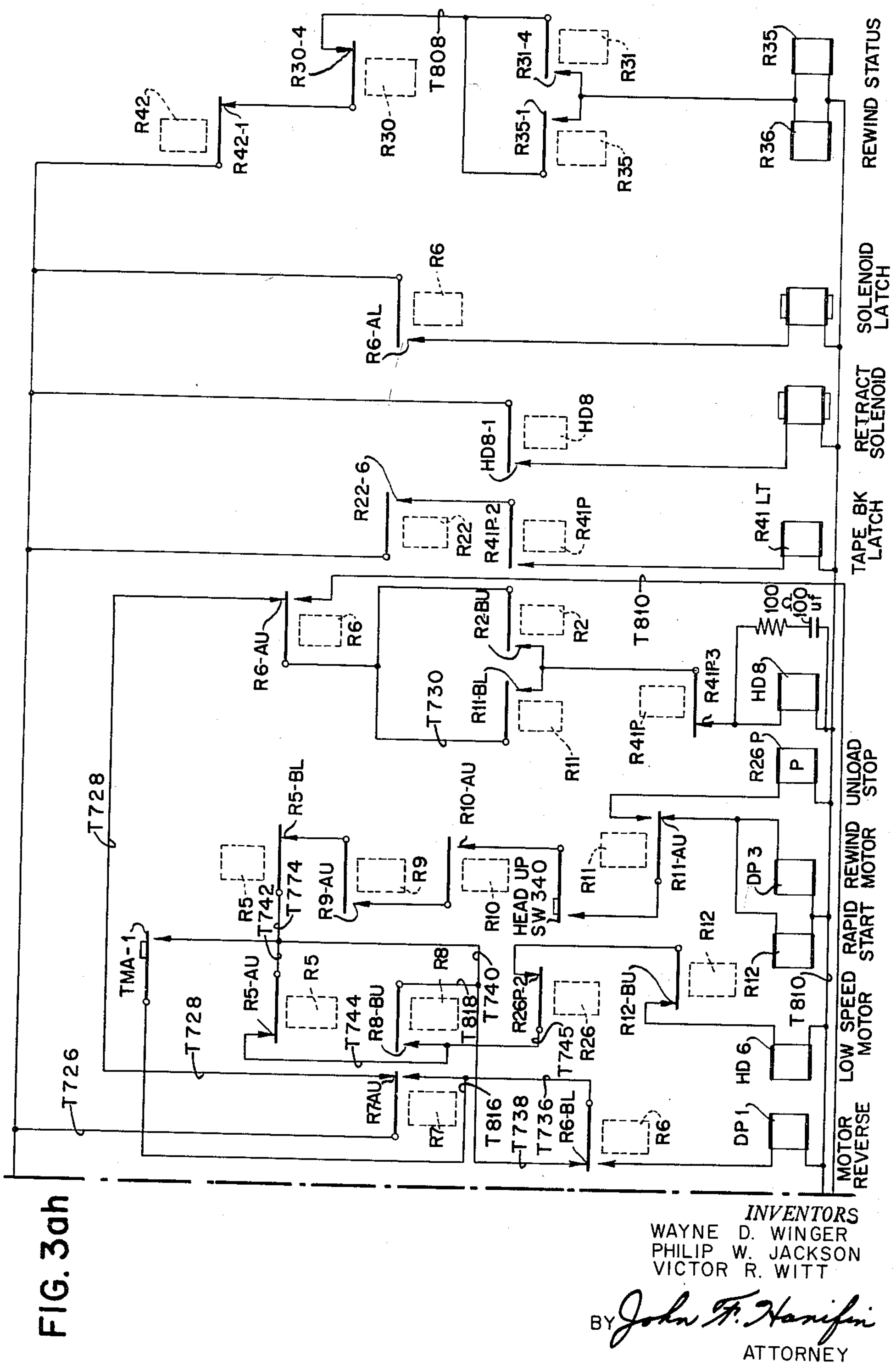
Figure 3A:
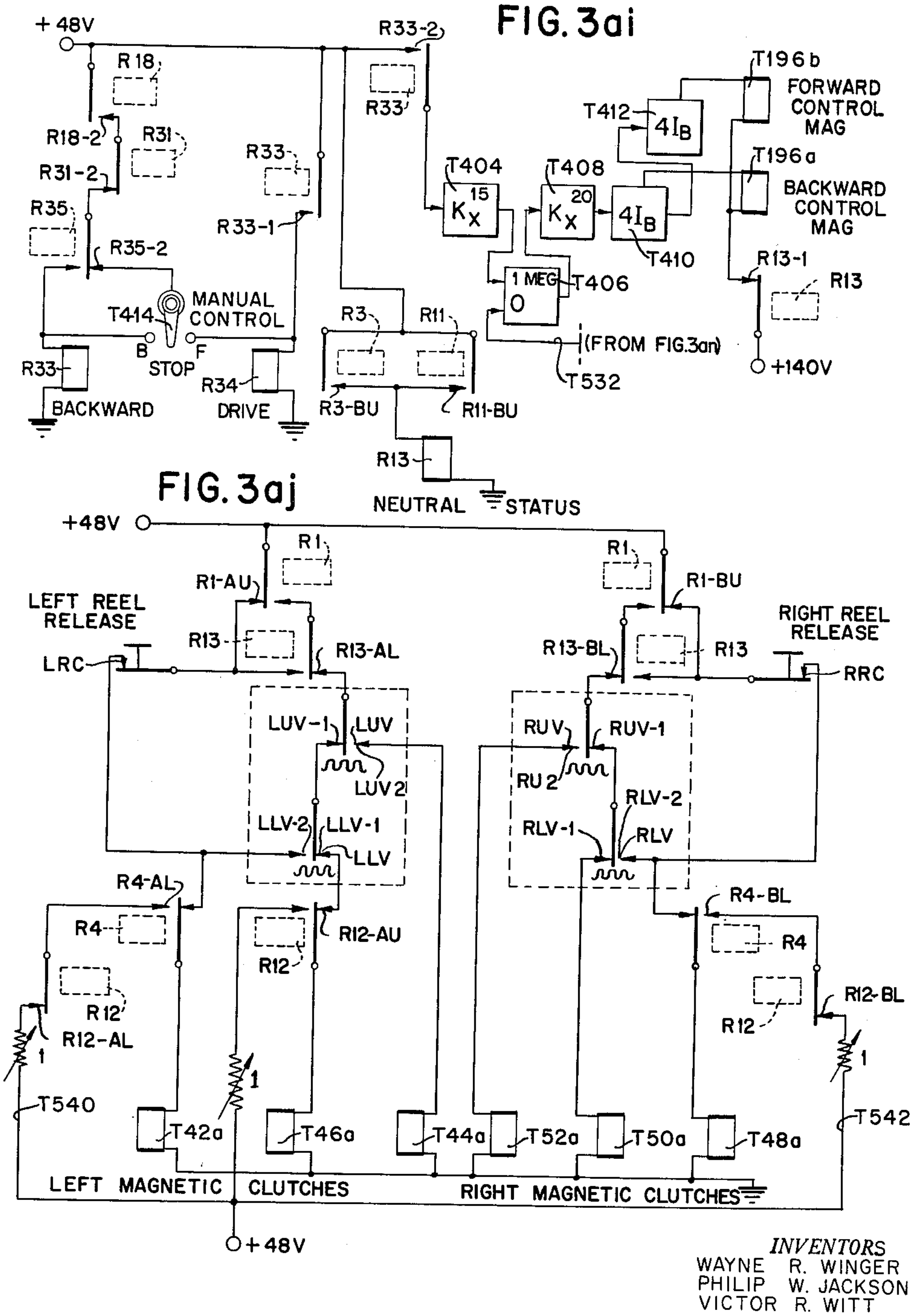
Figure 3A:
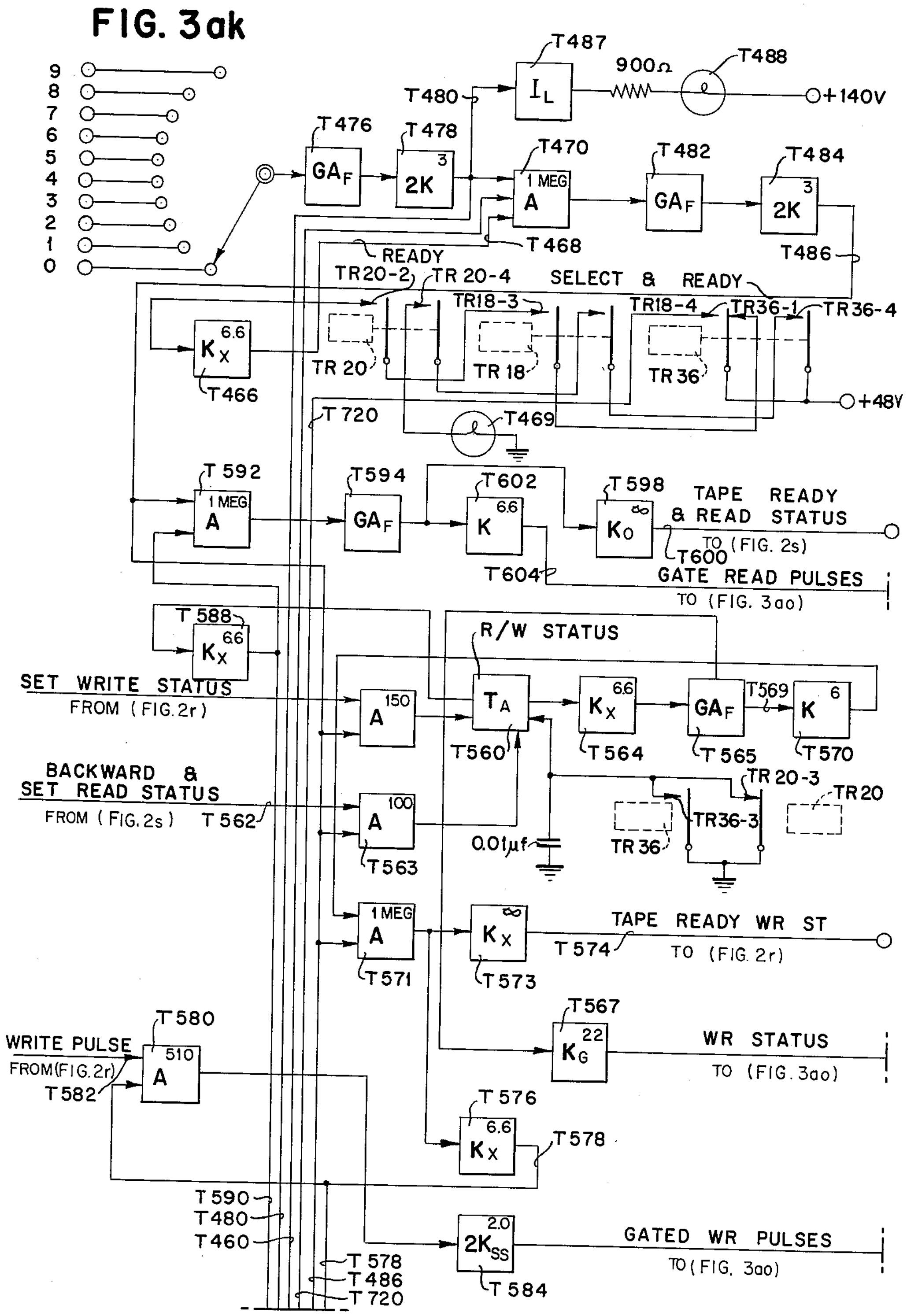
Figure 3A:
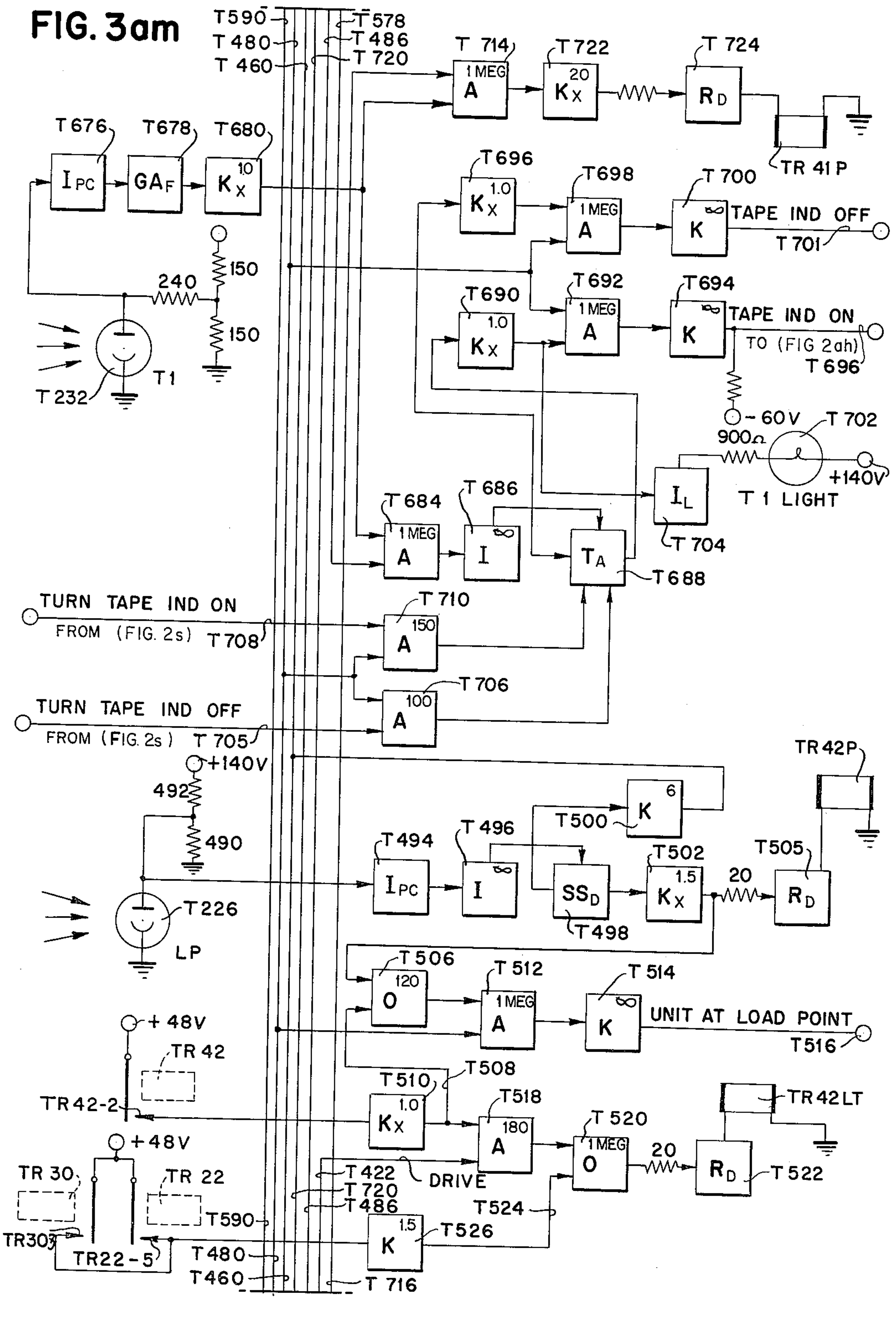
Figure 3A:
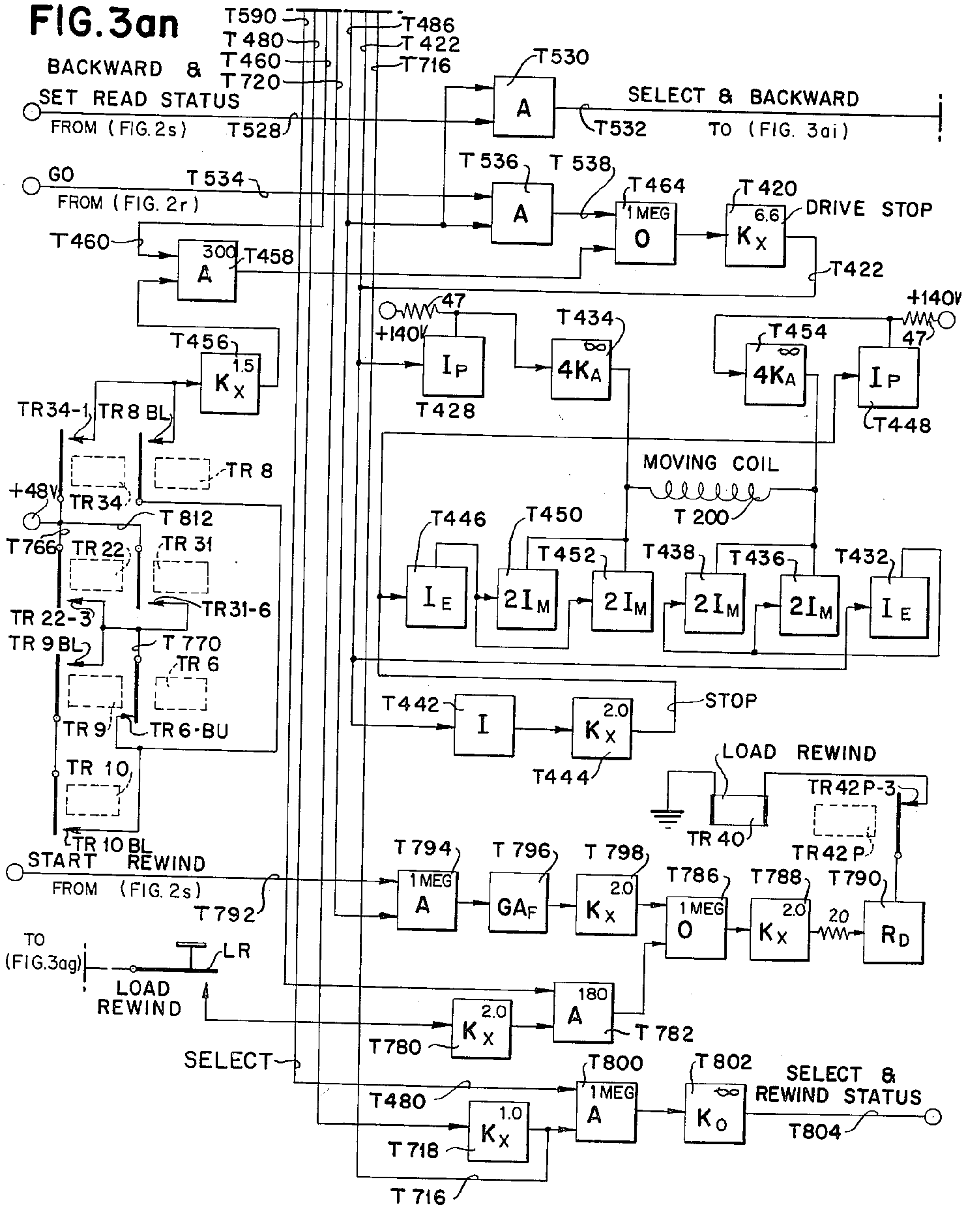
Figure 3A:
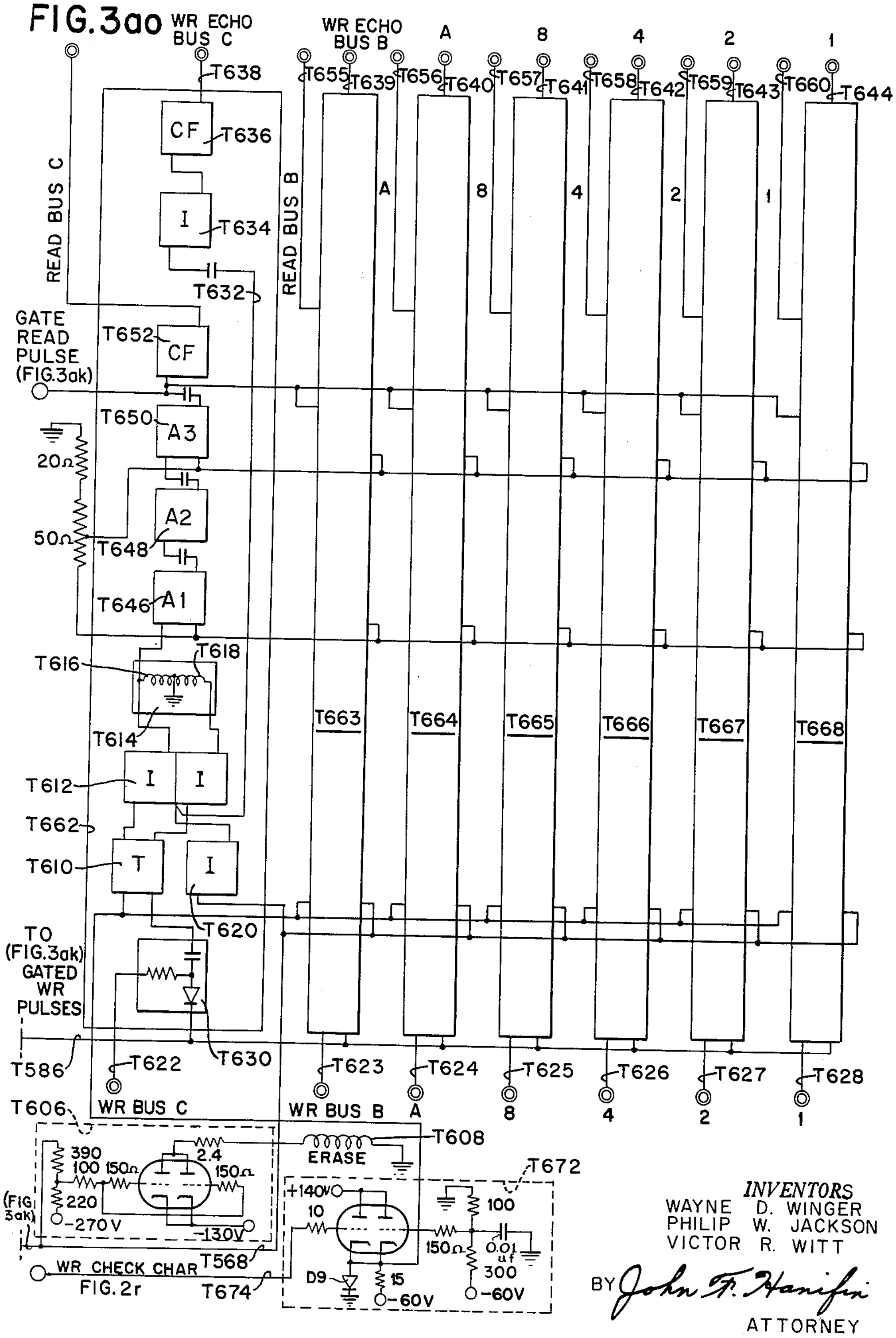
Figure 3A:
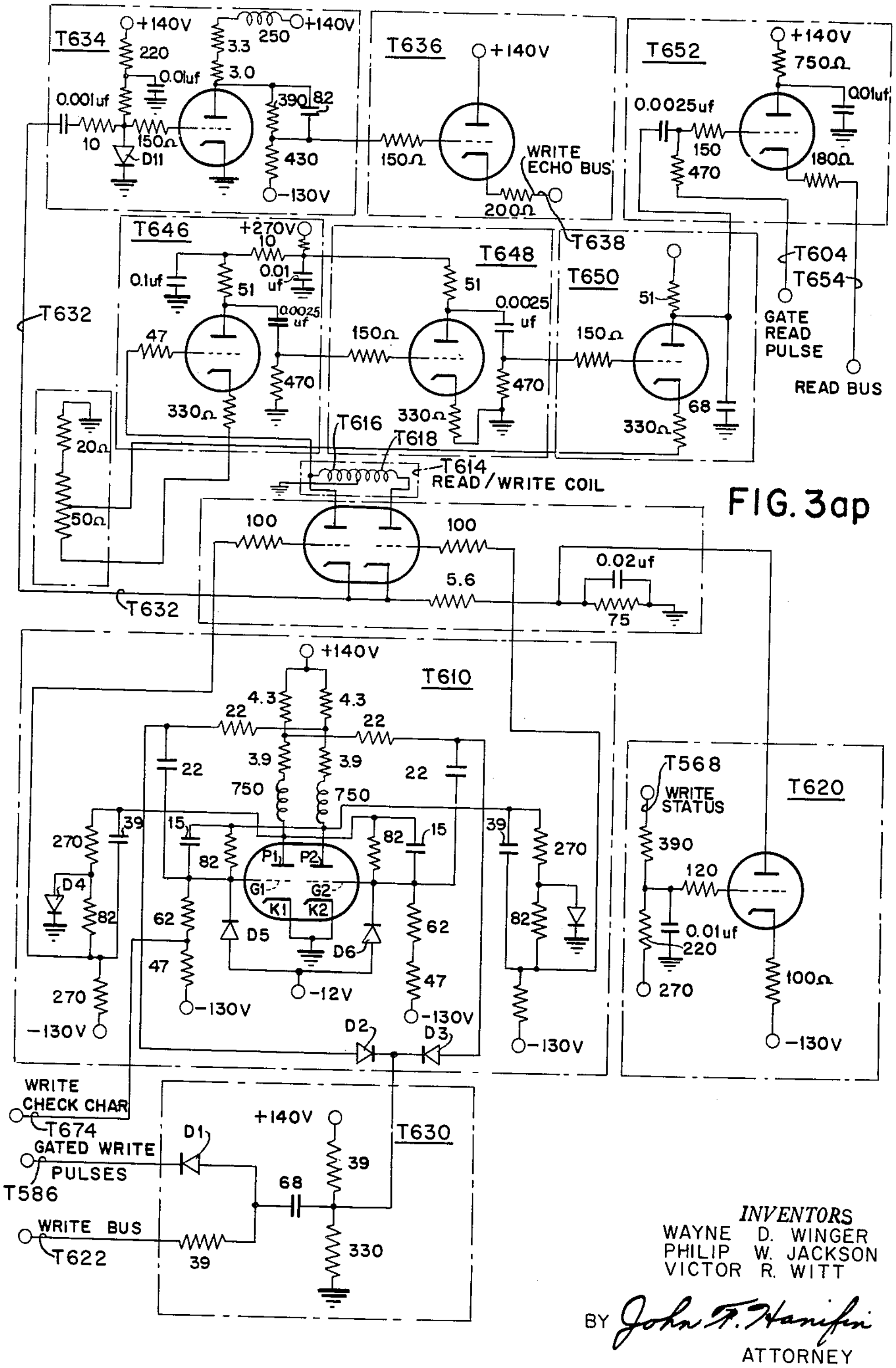
Figure 3A:
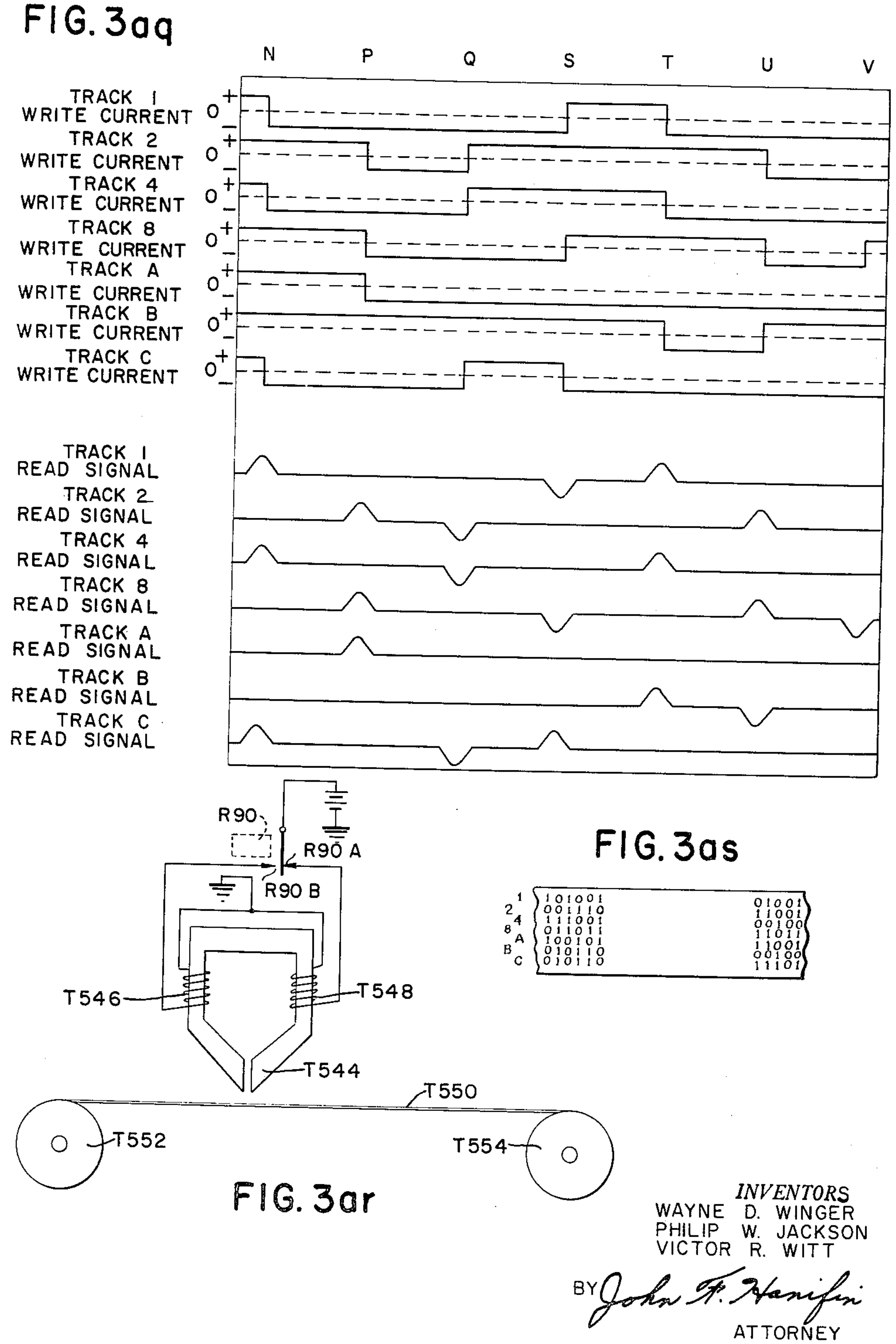
Figure 3A:
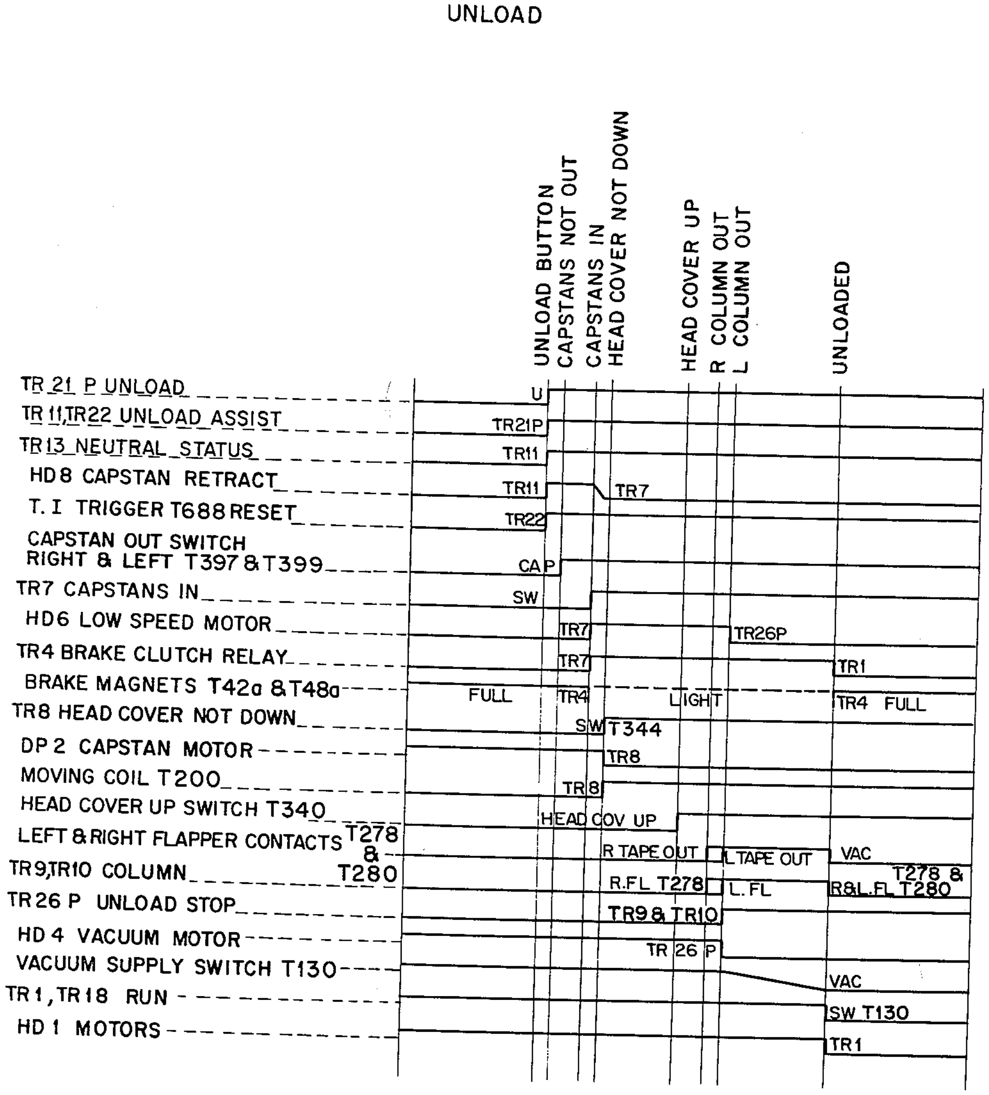
Figure 3A:
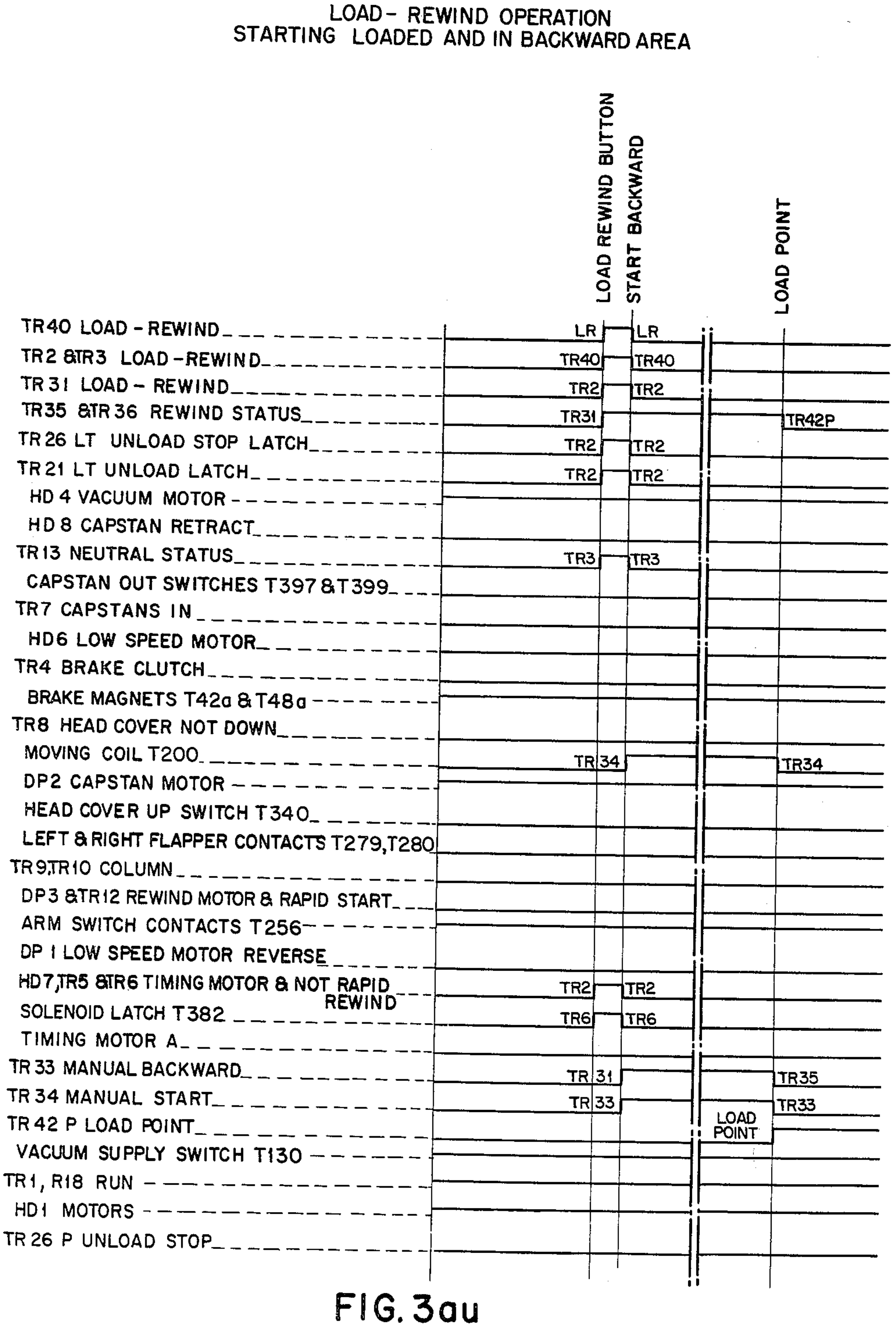
Figure 3A:
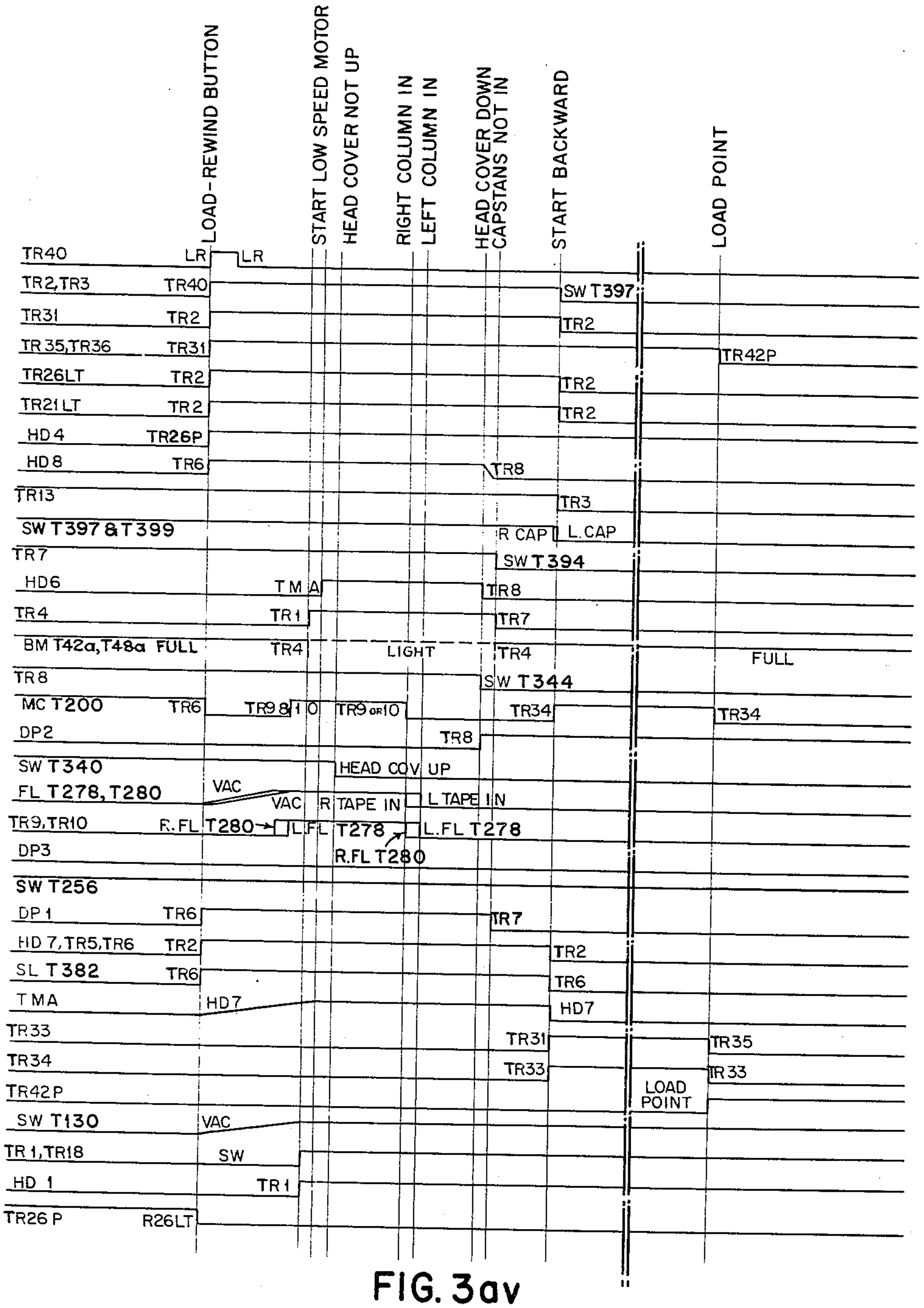
Figure 3A:
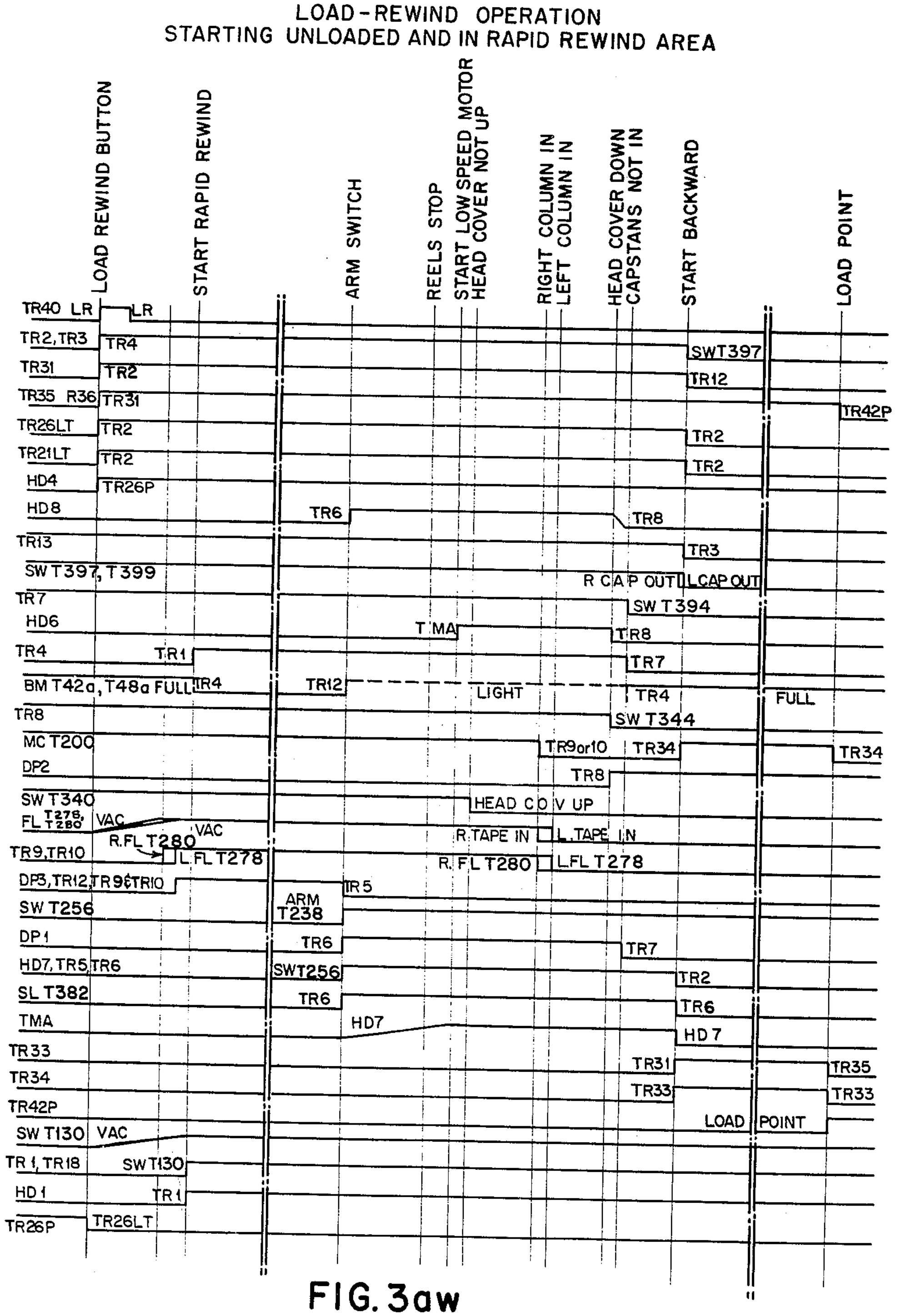
Figure 3A:
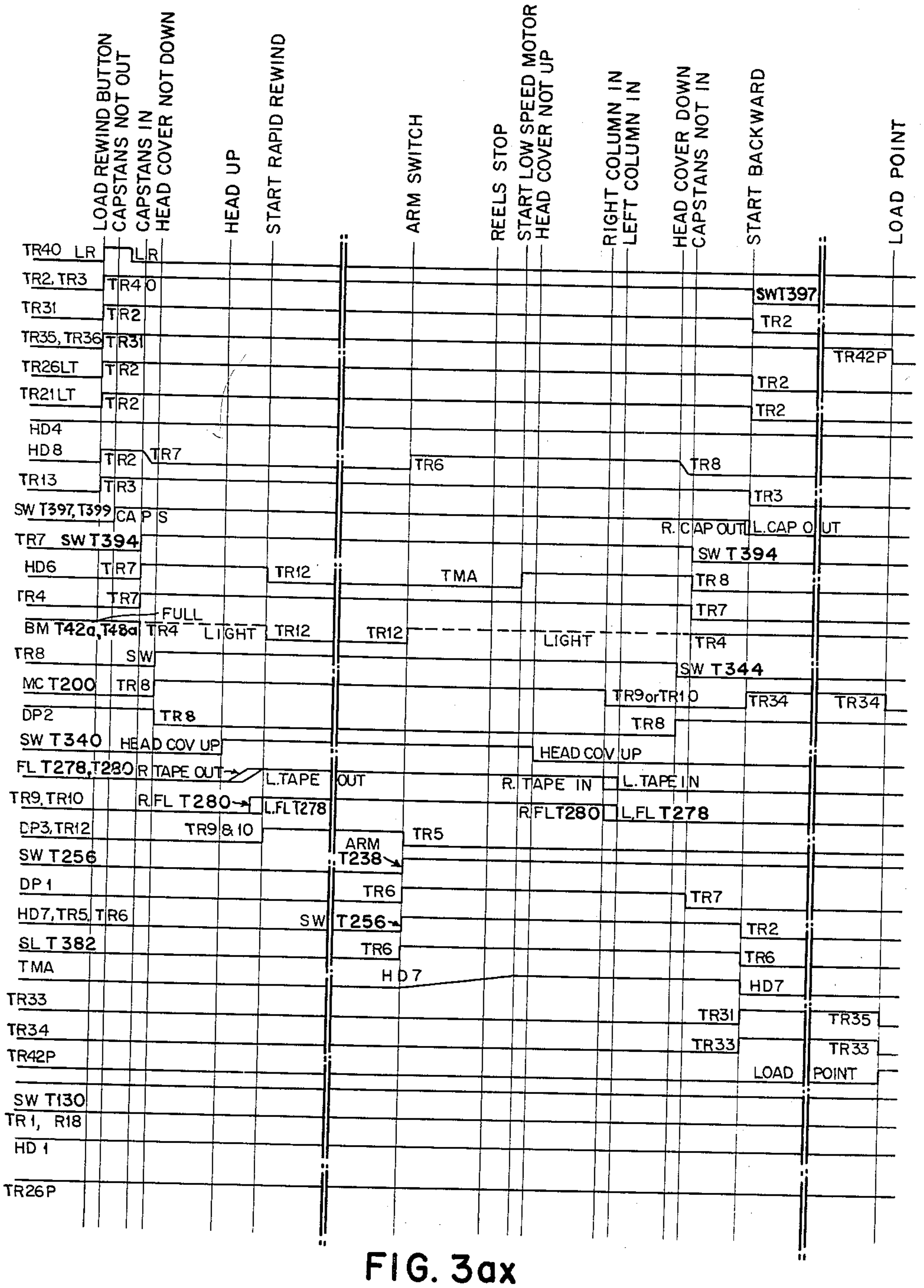

Fig. 3*x* is a rear elevational view of a mechanism for retracting the DRIVE capstans during LOAD, UNLOAD, and RAPID REWIND operations.

Fig. 3*y* is a sectional view on line 24—24 of Fig. 3*x*.

Fig. 3*z* is a side elevational view on line 25—25 of Fig. 3*x*.

Fig. 3*aa* is a rear elevational view of an arm switch uesd in RAPID REWIND operations and also as a means for distinguishing between the tape RAPID REWIND area and the tape BACKWARD area.

Fig. 3*ab* is a view showing the position of the lights and the photocells in the tape head, and a diagrammatic view of the tape (with portions not shown) indicating the LOAD POINT and TAPE INDICATOR POINT aluminum strip, and the tape RAPID REWIND and BACKWARD areas.

Fig. 3*ac* is a front elevational view of a timing motor used in the RAPID REWIND operation.

Fig. 3*ad* is a diagram of the motor control and power supply circuit.

Fig. 3*ae* is a diagrammatic view of a double pole switch for use in conjunction with the LOW SPEED motor.

Figs. 3*af*, 3*ag*, and 3*ah* arranged end to end in a horizontal sequence from left to right in that order, comprise a diagram of the electrical relay circuits for controlling the LOAD, UNLOAD, and RAPID REWIND of the tape.

Fig. 3*ai* is a diagram of the electrical control circuits, for biasing the tape feed mechanism for FORWARD-BACKWARD operations.

Fig. 3*aj* is a diagram of the electrical control circuit by which rotations of the tape reels are controlled.

Figs. 3*ak*, 3*am* and 3*an* arranged vertically are block diagrams of the electrical control circuits including circuits for biasing the tape feed mechanism for DRIVE-STOP operations.

Fig. 3*ao* is a block diagram of the READ/WRITE and the ERASE circuits.

Fig. 3*ap* is a wiring diagram of the READ/WRITE circuit of Fig. 3*ao*.

Fig. 3*aq* is a plot and diagram illustrating recording, representative of a non-return to zero method of recording.

Fig. 3*ar* represents a schematic circuit for a non-return to zero recording.

Fig. 3*as* is a diagram of a sample magnetic tape showing schematically positions of the various characters.

Fig. 3*at* is a timing diagram of the action of relays and other controls during an UNLOAD operation.

Fig. 3*au* is a timing diagram of the action of necessary relays and other controls during a LOAD-REWIND operation, starting with the tape in a LOADED condition and in the RAPID REWIND AREA.

Fig. 3*av* is a timing diagram of the relays and other controls of Fig. 3*au* during a LOAD-REWIND operation, starting with the tape in an UNLOADED condition and in the RAPID REWIND area.

Fig. 3*aw* is a timing diagram of the relays and other controls of Fig. 3*av* during a LOAD-REWIND operation, starting with the tape in an UNLOADED condition and in the BACKWARD area.

Fig. 3*ax* is a timing diagram of the relays and other controls of Fig. 3*au* during a LOAD-REWIND operation, starting with the tape in a LOADED condition and in the BACKWARD area.

Figure 4A:
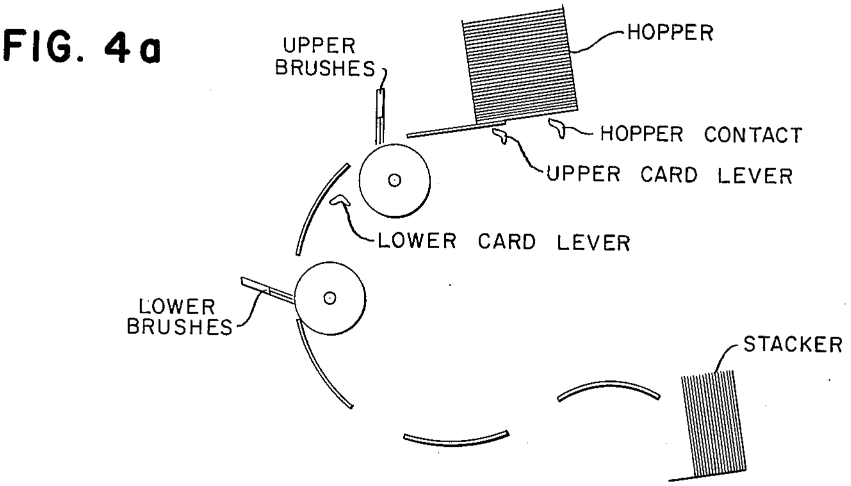

Fig. 4*a* is a schematic diagram of a Card Reader system.

Figs. 4*b*, 4*c*, 4*d*, 4*e*, 4*f*, 4*g* and 4*h* are detailed circuit diagrams and the respective block representations of cathode followers employed in the invention.

Figure 4B:
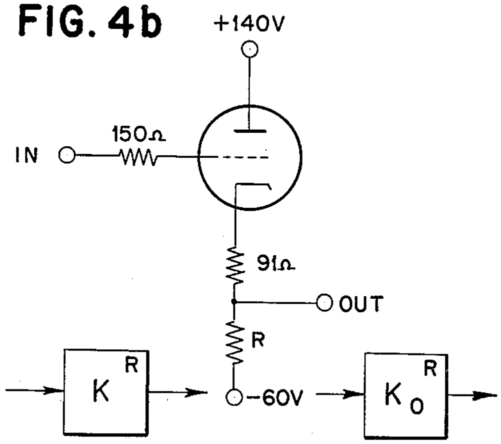
Figure 4D:
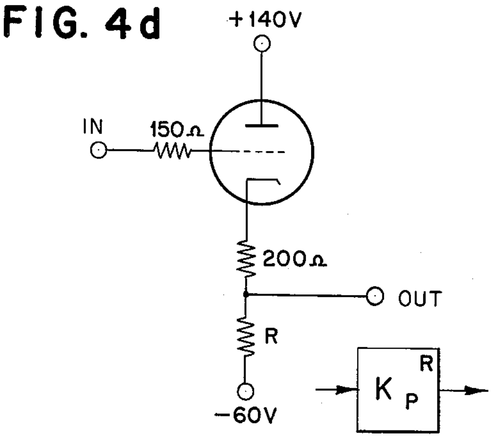
Figure 4C:
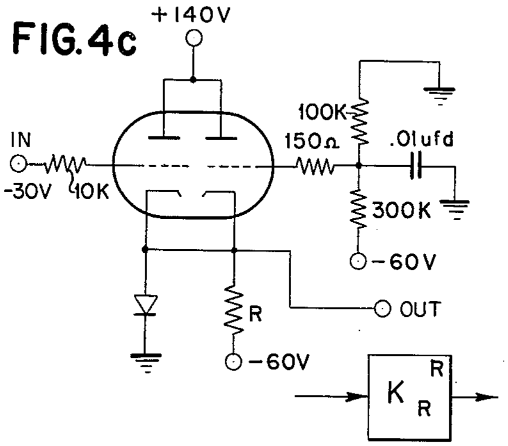
Figure 4E:
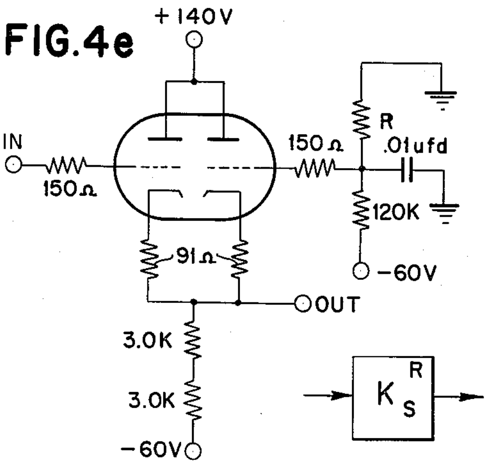
Figure 4F:
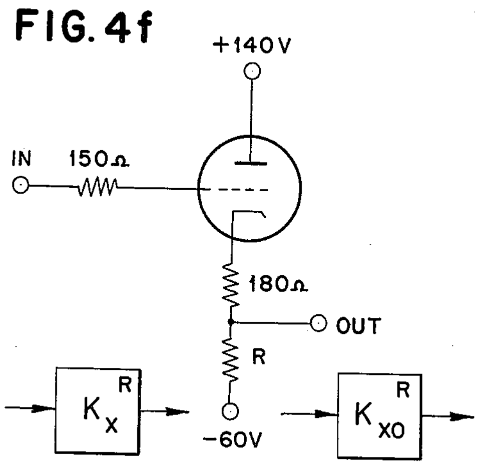
Figure 4G:
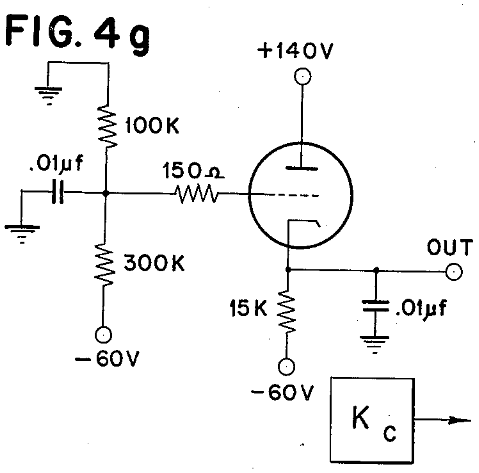
Figure 4H:
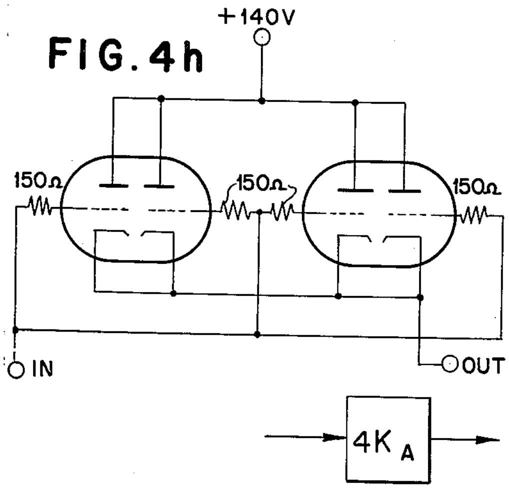
Figure 4I:
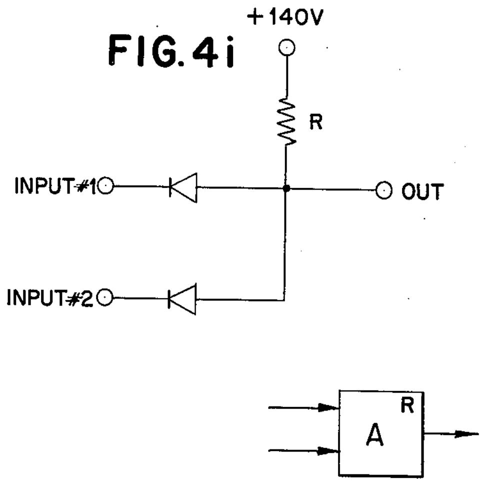

Fig. 4*i* is a detailed circuit diagram and corresponding block representation of an AND circuit employed in the invention.

Figure 4J:
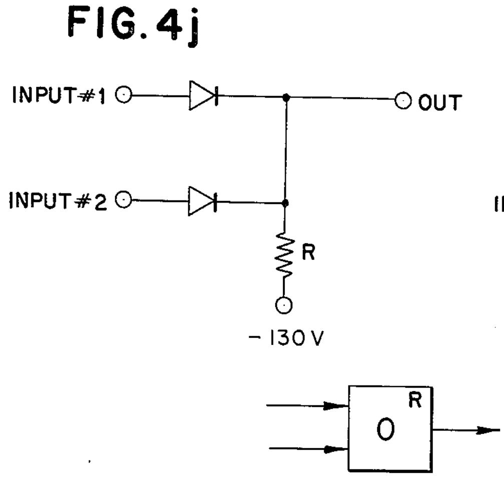

Fig. 4*j* is a detailed circuit diagram and corresponding block representation of an OR circuit employed in the invention.

Figure 4K:
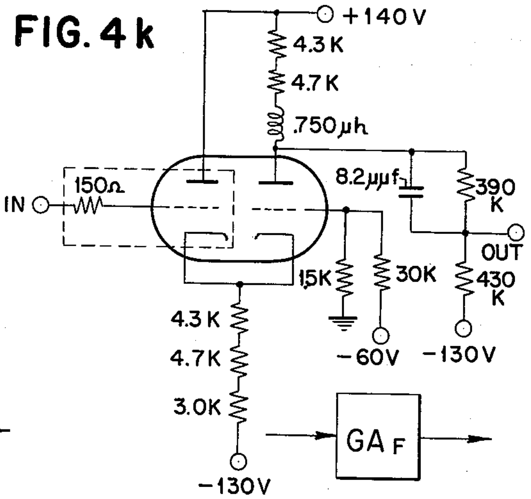

Fig. 4*k* is a detailed circuit diagram and the corresponding block representation of a grounded grid amplifier employed in the invention.

Figures 4M, 4N:
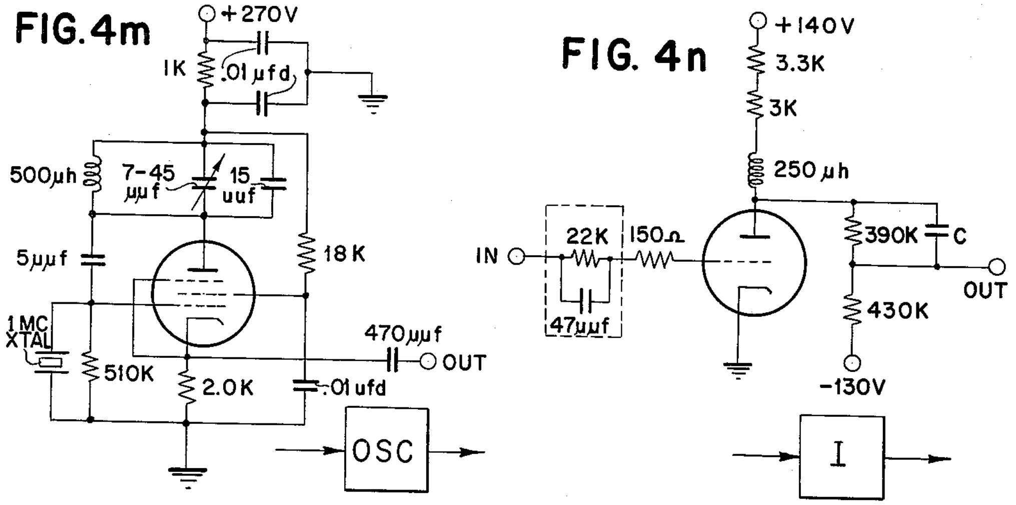
Figure 4P:
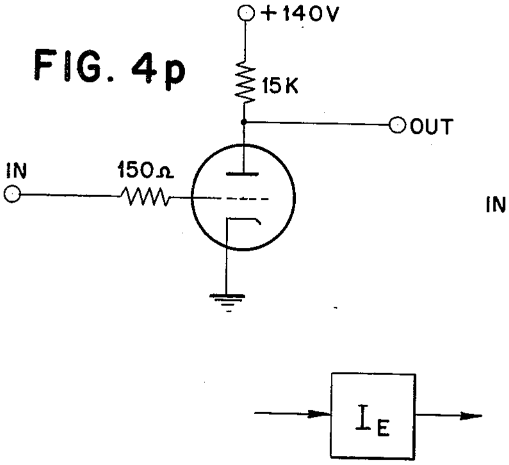
Figure 4Q:
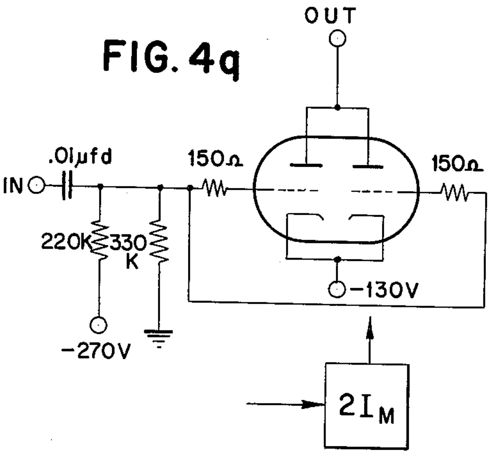
Figures 4R, 4S:
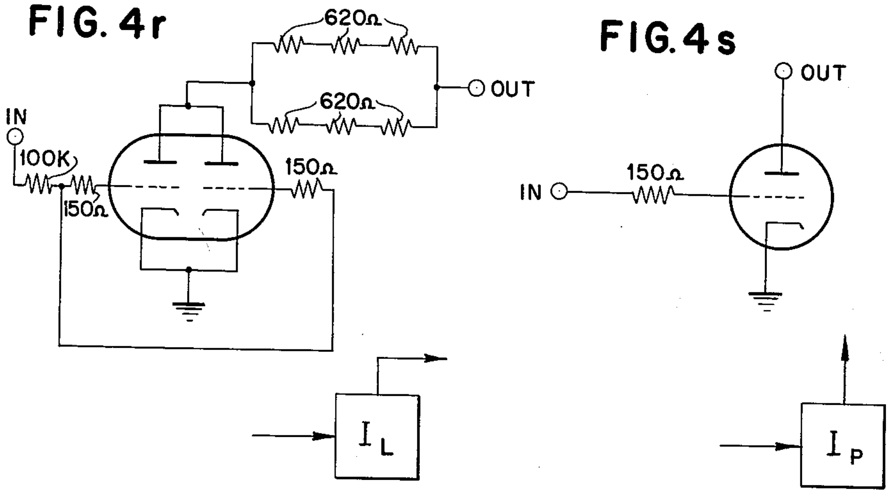
Figures 4T, 4U, 4V, 4W, 4X, 4Y:
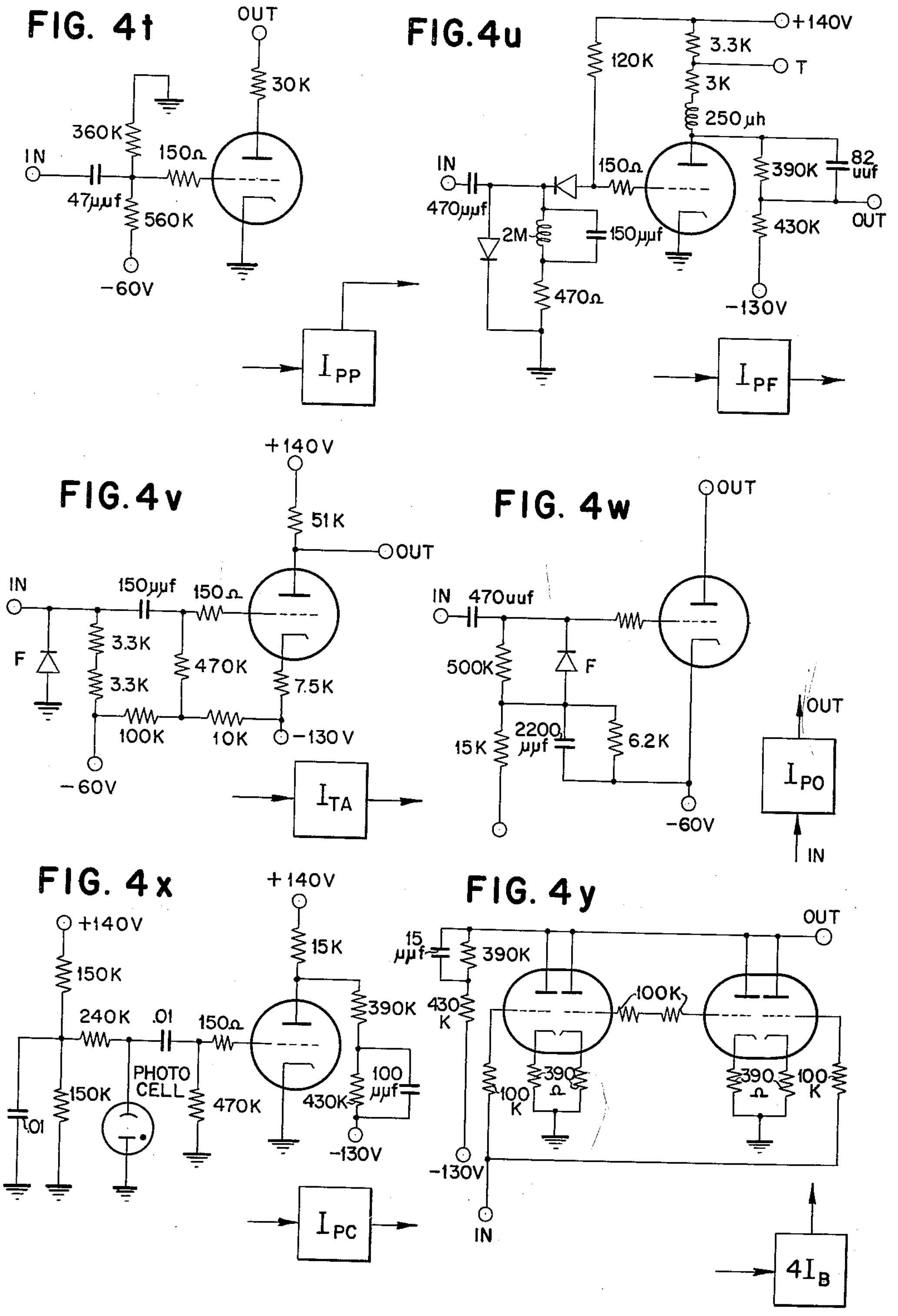

Fig. 4*m* is a detailed circuit diagram and the corresponding block representation of an oscillator employed in the invention.

Figs. 4*n*, 4*p*, 4*q*, 4*r*, 4*s*, 4*t*, 4*u*, 4*v*, 4*w*, 4*x* and 4*y* are detailed circuit diagrams and corresponding block representations of inverters employed in the invention.

Figure 4Z:
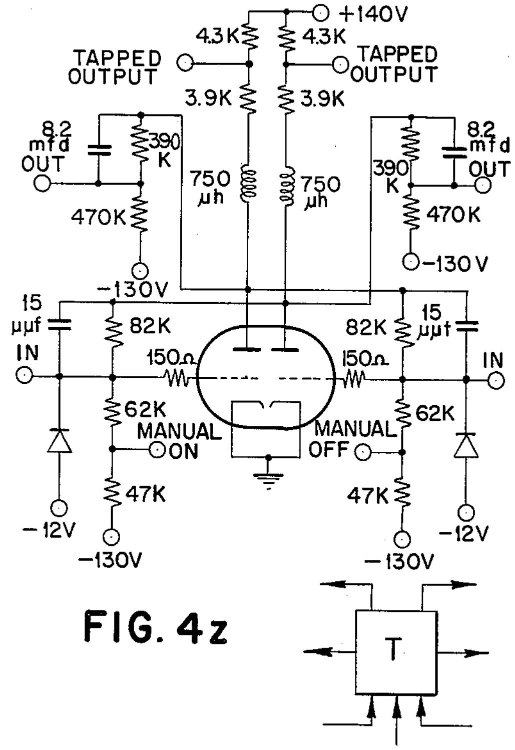
Figure 4A:
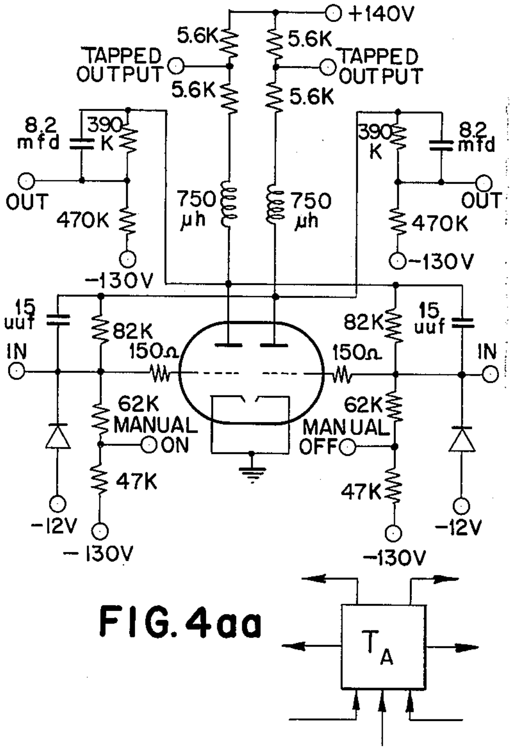
Figure 4A:
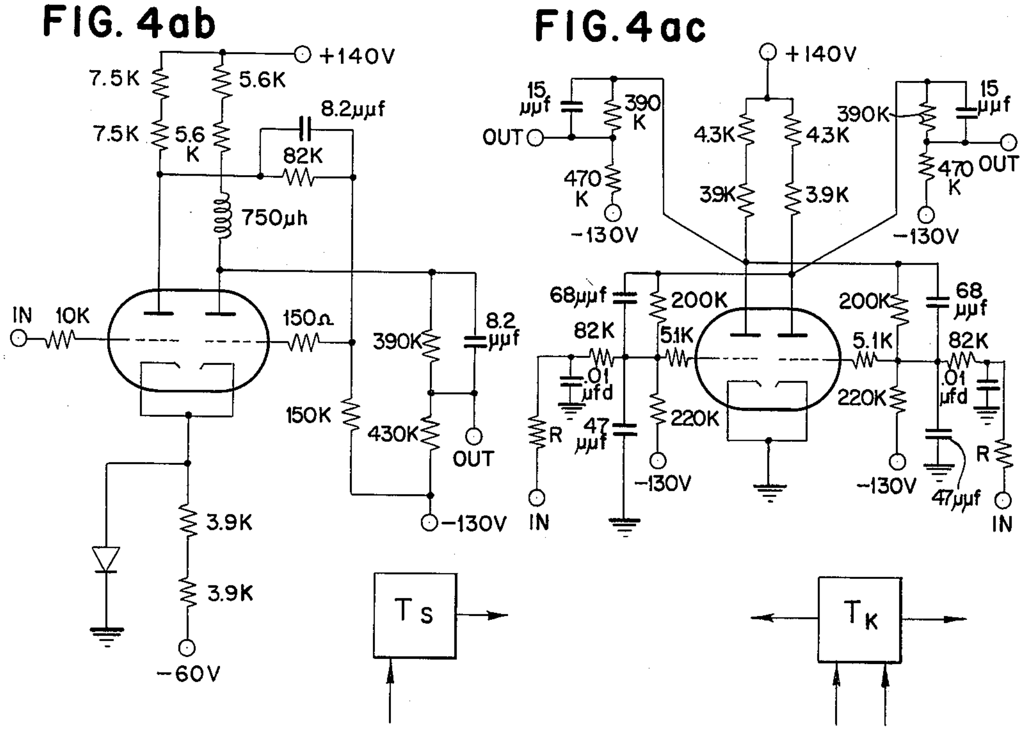
Figure 4A:
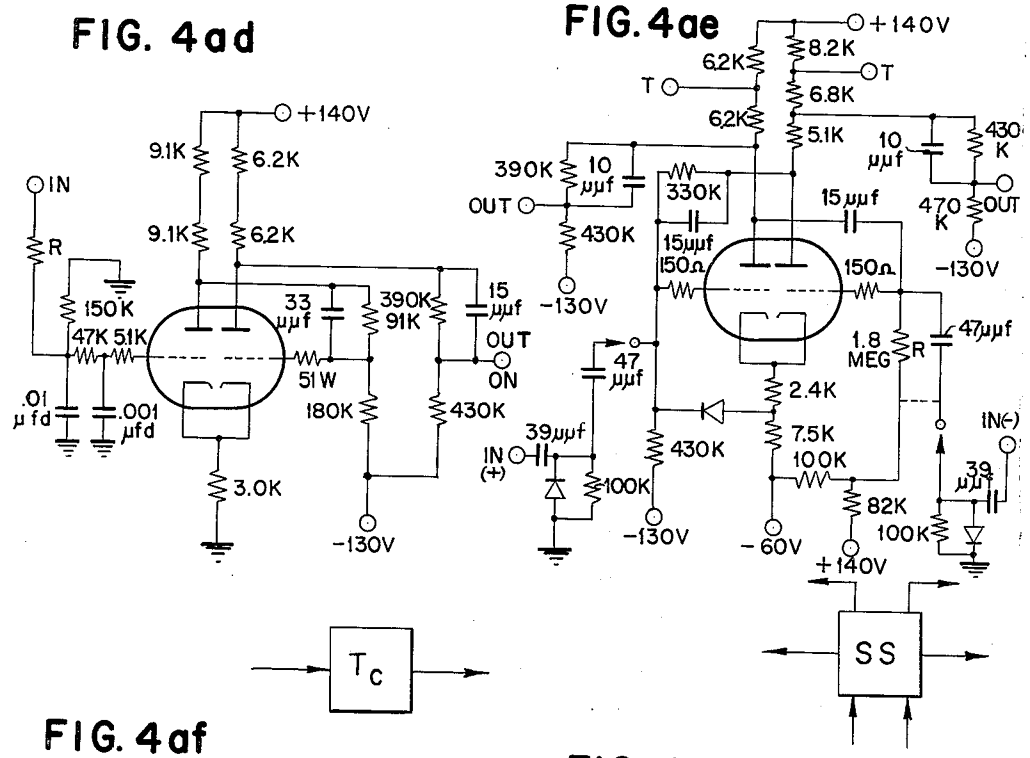
Figure 4A:
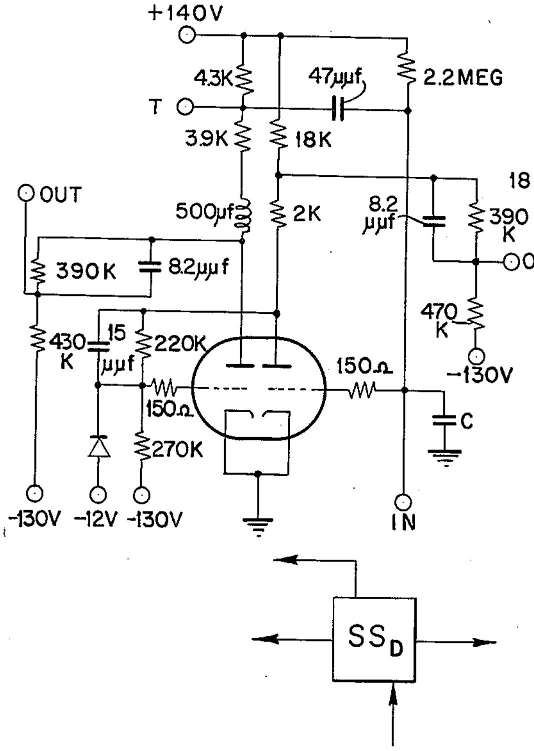
Figure 4A:
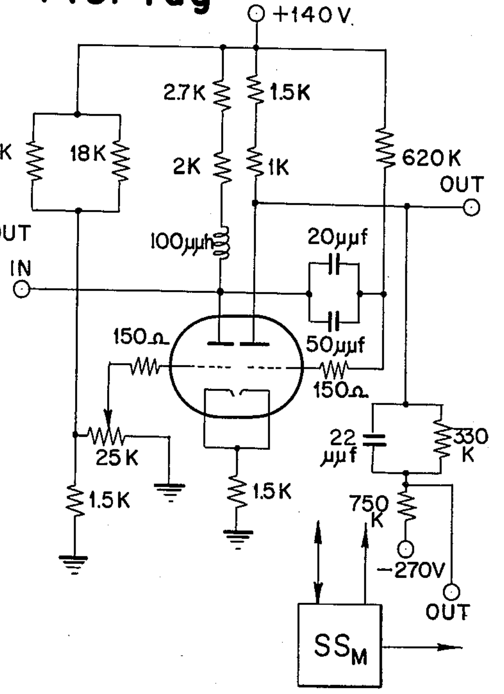
Figure 4A:
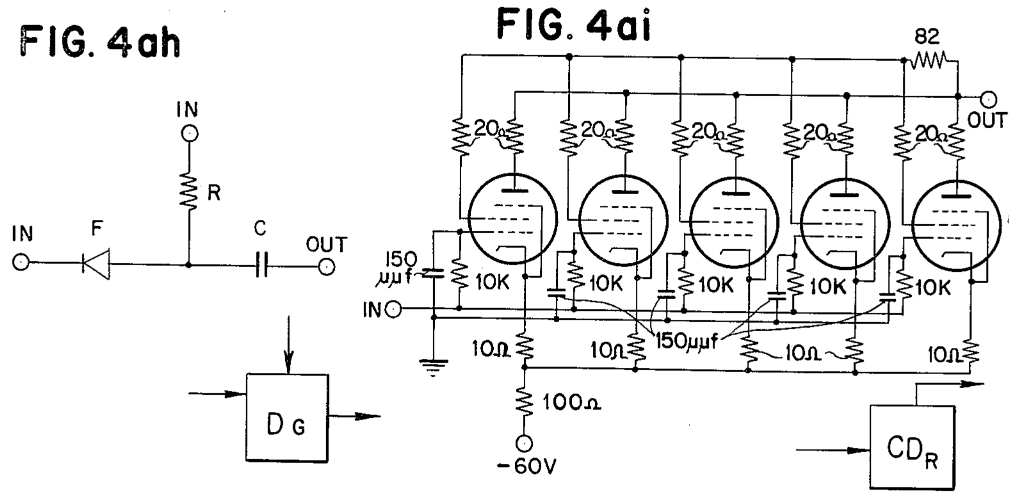
Figure 4A:
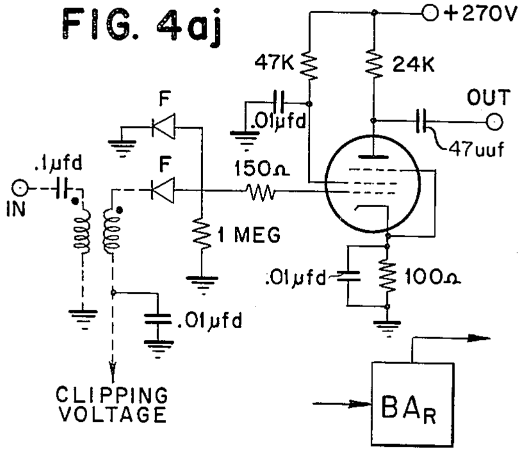
Figure 4A:
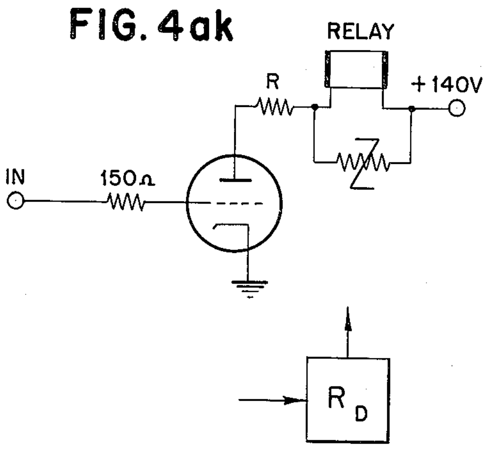
Figure 4A:
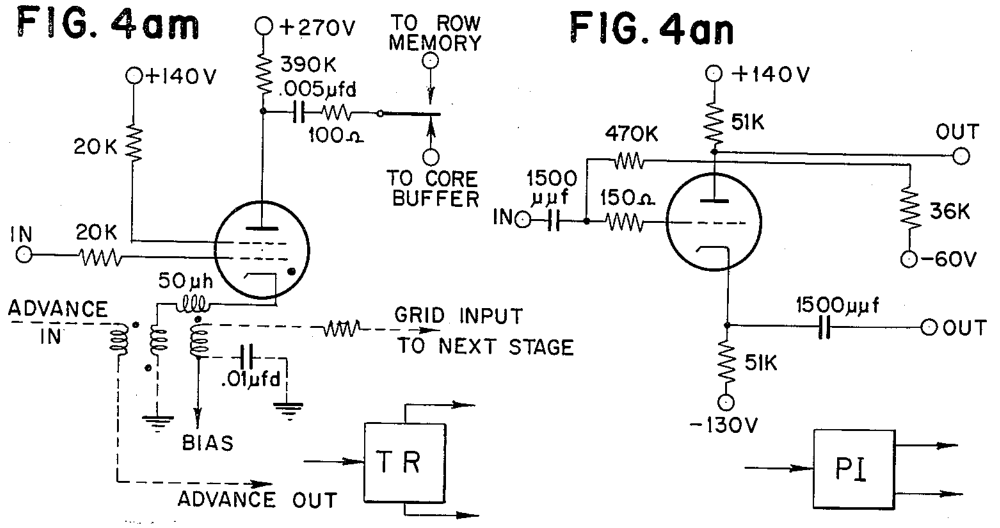

Figs. 4*z*, 4*aa*, 4*ab*, 4*ac* and 4*ad* are detailed circuit diagrams and the respective block representations of trigger circuits used in the invention.

Figs. 4*ae*, 4*af* and 4*ag* are detailed circuit diagrams and the respective block representations of single shot multivibrators employed in the invention.

Fig. 4*ah* is a detailed circuit diagram and corresponding block representation of a diode gate employed in the invention.

Fig. 4*ai* is a detailed circuit diagram and corresponding block representation of a driver circuit employed in the invention.

Fig. 4*aj* is a detailed circuit diagram and corresponding block representation of an amplifier employed in the invention.

Fig. 4*ak* is a detailed circuit diagram and corresponding block representation of a relay driver employed in the invention.

Fig. 4*am* is a detailed circuit diagram and corresponding block representation of a thyratron tube circuit employed in the invention.

Fig. 4*an* is a detailed circuit diagram and corresponding block representation of an amplifier employed in the invention.

Fig. 5*a* is a code chart of information used in the system.

*General organization*

Fig. 1*a* is an over-all diagram showing the combination of a Card Reader, its control circuits and a Magnetic Tape unit. As mentioned above, the Card Reader of this invention may comprise an input device to a calculator or it may be utilized for Card to Tape operation by being connected to a magnetic tape mechanism. In the description to follow, however, the Card Reader will be described principally as being connected to the magnetic tape circuits. This description may be rendered somewhat easier of understanding if, at this point, a general description is made of the components represented by various blocks in Fig. 1*a*.

If the Card Reader is connected to operate with the magnetic tape mechanism, the Tape Timing and Control circuits of Figs. 2*j* through 2*w* initiate signals to satisfy timing conditions in the Buffer Control circuits of Fig.

2ag. Timing is achieved by merging certain signals with output signals from the Clock, Figs. 2g, 2h and 2i, which then pass to the Buffer circuits of Figs. 2x, 2y and 2z. The Cam and Relay circuits in conjunction with the Tape Timing and Control circuits cause representations of data to be read from a card, and stored in the Buffer, and, subsequently read from the Buffer to the Translators of Figs. 2a, 2b and 2c, where data in the IBM punch card code is translated to a 1, 2, 4, 8, A and B coded notation. The output of the Translator passes via Information Drivers of Fig. 2b, to Tape Input circuits of Fig. 2t, and thus, cause information to be recorded on a magnetic tape. The outputs of the Translators also feed to Checking circuits of Figs. 2d, 2e and 2f where, if an error has occurred, an error signal is caused to be generated. The Buffer Control circuits, Figs. 2ag and 2ah, regulate the flow of information from the Buffer to the Translator and to the Checking circuits.

The card Reader is of the variety having two sets of card reading brushes, but the mechanical structure of the reader will not be described since a mechanism for feeding punched cards under one or more sets of card reading brushes is well known in the art. (See the Patent Re. 21,133 issued to C. D. Lake on June 27, 1937.)

However, a schematic representation of such a Card Reader is shown in Fig. 4a. Cards may be loaded into a hopper and as long as the hopper contains cards a hopper contact having points in control circuits described below is closed. As long as cards are being fed from the hopper to the first reading station an upper card lever is held energized. The upper brushes represent the sensing brushes at the first reading station and the lower brushes represent the sensing brushes at the second reading station. Between the upper and lower brushes is a lower card lever whose contacts are held in a closed condition as long as cards are present or are being fed in that part of the mechanism. The cards after being read are fed to a stacker. In the apparatus of this invention as the Card Reader is originally energized to operate, a first card passes through the upper brushes of the reader whereby the card is read row by row into a row memory, described below, to generate signals for the checking circuits. The first card then proceeds past the second set of reading brushes, while a second card is passed by the upper reading brushes. During this second card cycle, an effective card image of the first card, is read into the Buffer storage while certain signals are generated for checking purposes by the upper reading brushes reading the second card. The Tape Timing and Control circuits then cause a readout of the Buffer to take place, provided of course that a card image exists in the Buffer and the tape is ready to receive information. Information read out of the Buffer is gated through the Translator and via the Information drivers to the Tape Input circuits, and thus, to the tape write busses. Echo pulses are received back from the Tape circuits and are checked as described below for an even redundancy count by the Vertical Redundancy Check circuits of Figs. 2v and 2w. This process continues until eighty characters, or less if the record contains less than eighty, have been read from the Buffer and recorded on the Tape. After the last character is recorded, the Tape stops and another card cycle is entered whereby the second card having eighty characters or less, is read by the second set of read brushes to the Buffer while a third card is passed under the upper reading brushes. As the Buffer again becomes full, another readout of the Buffer takes place and the information is recorded on the Tape. This process continues until either the physical limit of the tape is reached or all cards in the Card Reader have been read.

The Checking circuits provided for checking the transfer of information from the Card to the Tape operates as follows: As the first card passes through the upper brushes, the "nines" row of the card is read first and the information is stored in a Row Memory. Between the nine and eight CB times of the Card cycle, the Row Memory is read out, bit by bit, with the output pulses being fed to a binary input trigger. This trigger effectively counts the number of holes appearing in the "nine" row of the Card and thus an ODD/EVEN count of the number of holes in the card is obtained for that particular row. The procedure is repeated for each row of the card, as read, so that at the time the entire card has been read twelve separate triggers, one for each row of the card, holds an ODD or EVEN count of the number of holes, punched in each of the twelve rows. The final status of this first set of twelve triggers is transferred to a second set of twelve triggers before the first card starts under the second set of reading brushes.

The Buffer is a twelve by eighty core matrix and as the card is read by the second set of brushes an entire card image is effectively stored in the Buffer and, at the same time, the second card, as mentioned above, is passing under the upper brushes. The ODD or EVEN count of the second card is taken at this time and it is set up in the first set of twelve triggers, mentioned above. The operation remains in this status until a signal occurs indicating that the tape is ready. At this time the contents of the Buffer are read out and recorded on tape. Each character (one column) in the Buffer is translated from the IBM code to a six bit code and further retranslated to an IBM code for transmission to the Checking circuits. In these Checking circuits an ODD/EVEN count is taken by a third set of twelve triggers, one trigger for each of the twelve rows. As readout of the Buffer is complete, a comparison is made of corresponding triggers of the second and third sets of twelve triggers. The status of corresponding triggers in these second and third sets of triggers should be identical. If the corresponding triggers are not in identical status, an error is signaled. At the time the eightieth character is read from the Buffer, a Buffer carry signal is generated, which initiates another card cycle. During this card cycle a succeeding third card is read by the first set of reading brushes and a card image of the second card is stored in the Buffer. At the time the third card is read by the first set or upper reading brushes an ODD/EVEN count of the holes in each row is made as described above.

Figs. 2a and 2b taken together, with Fig. 2b arranged at the right of Fig. 2a, illustrate the circuits used for converting from the twelve position IBM code to a six bit code having coded values of 1, 2, 4, 8, A and B. The inputs to Fig. 2a on lines B9, B8, B7 etc. are the outputs of a Buffer Character Register, described below, which is utilized as information is read from a column of the Buffer storage. The outputs of each row of the card image are the signals present on lines B9, B8, B7 etc. which signals lead to various OR circuits. The conversion takes place in the OR and AND circuits, as shown, so that each character read from the card image is converted from the IBM code to a suitable combination of signals in the six bit code. For example, a "3" being read out of the Buffer storage, causes a positive signal on the line B3. This positive signal passes via an OR circuit 201, an OR circuit 202, a cathode follower 203, an OR circuit 204, and a cathode follower 205 to a line E2, which is a "2" bit line. The signal on the line B3 also passes via an OR circuit 206, an OR circuit 207, and a cathode follower 208 to a line E1 which is the "1" bit line. A combination of positive signals on the "1" and "2" bit lines represent a "3" in the 1, 2, 4, 8, A and B code. These characters as read from the Buffer are converted and are represented by signals on lines E1, E2, E4, E8, EA and EB. A signal on the line E1 is passed via a grounded grid amplifier 209 and a cathode follower 210 to a line F1. A signal on the line F1 is passed via an inverter 211 and a cathode follower 212 to the line $\overline{F1}$. Thus, line F1 is positive if a binary 1 is contained in the "1" bit of the six bit code, while the line $\overline{F1}$ is positive if a binary 0 is present. A positive signal on the line F1 passes through the cathode follower 213 to condition one input of an AND circuit 216. The second input of the AND circuit 216 is conditioned if the Card Reader is selected to be operated with the Calculator at which time line SELECT is positive, or, if the Card Reader is to be operated with a Tape, the line TAPE OP is positive. The signals on lines TAPE OP and SELECT feed via an OR circuit 214 and a cathode follower 215 to the line TAPE OP OR SELECT. Upon coincidence of two positive inputs, a positive output of the AND circuit 216 passes via a cathode follower 217, a grounded grid amplifier 218 and a cathode follower 219 to a line G1. Similar circuits, as shown in Fig. 2*b*, are used for the 2, 4, 8, A and B bits of the six bit code. Through operation of circuits, described below, a redundancy or "C" bit is generated to be injected in the character representation for the purpose of providing an even number of binary 1's in the bits representing a character. This "C" bit signal conditions one input of the AND circuit 220 whose other input is conditioned by a positive signal on the line TAPE OP OR SELECT. The output of the AND circuit 220 passes via a cathode follower 221, a grounded grid amplifier 222 and a cathode follower 223 to the line GC.

Fig. 2*c* illustrates the redundancy bit injector. For the purpose of explanation, assume that the character received in the 1, 2, 4, 8, A and B code, is such that the "1" and "8" bit positions contain binary 1's and thus lines F1 and F8 are positive. Under this assumed condition, since there are already an even number of binary 1's the redundancy bit requires a binary 0. Input signals received on the lines F1, $F\bar{1}$, F2, $F\bar{2}$, etc. pass via cathode followers 229 through 240 to several AND circuits. Under the assumed conditions, there are binary 1's in the "1" and "8" bit positions and binary 0's in all other bits. Thus, the AND circuit 241 has three positive inputs as the output of the cathode follower 229 represents a binary 1 in the "1" bit, the output of cathode follower 232, when positive, represents a binary zero in the "2" bit and the output of cathode follower 234 represents a binary 0 in the "4" bit. When all three inputs of the AND circuit 241 are positive its output is positive and passes via an OR circuit 249, a cathode follower 251 and an OR circuit 254 to condition one input of an AND circuit 257. The output of cathode follower 251 also conditions one input of an AND circuit 253. Under the assumed conditions, the three inputs of the AND circuit 245 are conditioned positive as the binary 1 in the "8" bit position, causes a positive output from the cathode follower 235, the binary zero in the "A" bit position causes a positive output from the cathode follower 238 and a binary 0 in the "B" bit position causes a positive output from the cathode follower 240. The output of the AND circuit 245 goes positive, when all three inputs are positive, and passes via an OR circuit 250, a cathode follower 252 and an OR circuit 254 to the second input of the AND circuit 257. The output of the cathode follower 252 also conditions the second input of the AND circuit 253. The AND circuit 253 being conditioned by two positive inputs, under the assumed condition, emits a positive output which is inverted by an inverter 255 and passes via a cathode follower 256 to prevent passage of any signal via an AND circuit 257. Thus, under the assumed condition, the output of the AND circuit 257 is negative, which output is passed via a grounded grid amplifier 258 and a cathode follower 259 to line "C" bit. As the latter line is negative, it represents a binary 0, and this binary 0 signal is transmitted to the "C" bit position of Fig. 2*b* (AND circuit 220) explained above. Other coded permutations of signals in the "6" bit code may be traced in a similar manner to determine whether or not a positive binary representing signal should be injected in the "C" bit position.

Referring to Fig. 2*d*, signals on lines F1, F2, F4, F8, FA and FB and lines $F\bar{1}$, $F\bar{2}$, $F\bar{4}$, $F\bar{8}$, $F\bar{A}$, and $F\bar{B}$ are fed to suitable switching circuits to convert the signals from the six bit code back to an IBM code for the purpose of checking. For example, assume that positive signals or binary 1's are contained in the "1" and "2" bit positions of the 1, 2, 4, 8, A and B code. Thus, line F1 and F2 are positive and condition both inputs of the AND circuit 260. Thus, the output of the AND circuit 260 is positive and this positive output is fed to an AND circuit 261. The second input of the latter AND circuit is positive provided a binary 0 is contained in the "4" bit position, which is the case under the assumed conditions, and thus line $F\bar{4}$ is positive. The output of the AND circuit 261 passes via a cathode follower 262 to drive the line H (3) positive, the latter line representing a "3" in the IBM code. Examination of the remaining circuitry shown in Fig. 2*d*, will show for the conditions stipulated, that all other outputs will be negative, and it can also be seen that for other permutations of signals in the 1, 2, 4, 8, A and B code that proper outputs of the IBM code will be positive.

Refer to Fig. 2*e* which shows circuits for checking a row of information read by the Card Reader. Assume that the circuits shown are those for checking the "nines" row of the card, it being understood that duplicate circuits are used for checking each row of the card. As the machine enters the first card cycle, a positive signal is emitted from the Cam and Relay circuits, described below, on the line CH R 1 RESET, which signal passes via a pulse shaper 271 and cathode follower 272 to line BUFFER & 1ST CH R RESET. The positive signal on the latter line is effective from 7° to 15° of the Card cycle. At the trailing edge of the signal, or approximately 15° of the Card cycle, the trigger 276 is reset OFF. At approximately 19° of the Card cycle (for the nine row circuits) a positive signal occurs on a line TIME CHECK EMITTER which passes via a pulse shaper 265 and a cathode follower 266 to condition one input of an AND circuit 275. This input to the AND circuit 275 is approximately a 4 millisecond pulse. Shortly thereafter, at approximately 20° time of the Card cycle, signals are developed for stepping the Row Memory (described below) so that a pulse occurs on the line CHECK INFO for each binary 1 transmitted from Row Memory. These positive signals are passed via the AND circuit 275 to a binary input of the trigger 276 so that upon completion of readout of eighty bits, the trigger 276 is OFF if an even number of binary 1's or positive pulses have been transmitted, or is ON for an odd number of binary 1's. Thus, trigger 276 is set ON or OFF to represent an odd or even count of the binary 1's in the nines row of the card, and as other rows are read by the Card Reader corresponding triggers are set ON or OFF to represent the odd or even number of holes or binary 1's in the other card rows.

After all rows have been read, the machine proceeds to a second Card cycle during which information is read by a second set of READ brushes into the Core Buffer, while a second card is read row by row into the row memory circuits and again trigger 276 and corresponding triggers for other rows, are set ON or OFF to indicate the ODD/EVEN count of each row of this second card. It is necessary then that the ODD/EVEN indication of the rows of the first card be transferred from the trigger 276 and corresponding triggers to another storage facility so that trigger 276 and corresponding triggers will be available for an ODD/EVEN count of the second card. Thus, at the end of any particular Card cycle, a signal on the line 2CB RESET passes via pulse shaper 267 and cathode follower 268 to the line RESET 2nd CHR R which signal is positive from 352° of one Card cycle to 0° of the following Card cycle. This latter signal is effective to reset trigger 279 OFF. From 0° to 8° of the second cycle a signal on the line CH R 2 GATE passes via pulse shaper 269 and cathode follower 270 to line CH R XFER which conditions one input of the AND circuit 278. The other input to the AND circuit 278 is conditioned if trigger 276 is ON by a positive signal passing via cathode follower 277. Otherwise, if the trigger 276 is OFF, the second input of the AND circuit 278 is not conditioned. Thus, if the trigger 276 is OFF, there is no passage of the CH R XFER signal through the AND curcuit 278 and trigger 279 remains OFF. However, if trigger 276 is ON the signal on the line CH R XFER is passed via the AND circuit 278 to turn ON the trigger 279. The trigger 279, when ON, emits a positive signal via the cathode follower 281, and, when OFF, emits a positive signal via the cathode follower 280. The trigger 279 being set ON or OFF as the case may be, remains in that condition until another Card cycle occurs. However, as explained below, succeeding Card cycle does not occur until after the Core Buffer has been read out, and while the Core Buffer is being read out, a trigger 283 will be set to an ON or OFF condition to indicate an ODD/EVEN bit count of the re-translated data representing the nines row of the card. It will be recalled that one of the translators translates from a 1, 2, 4, 8, A and B bit code, to the IBM code. At 15° of each card cycle, a signal on the line BUFFER & 1st CH R RESET goes negative, as explained above, and this signal is also effective to reset trigger 283 OFF. Then, as the Core Buffer is read out, the signals occur on the line CHECK XLATOR OUTPUT (Under the assumed conditions this line corresponds to the re-translated nines row) which is positive at various read out times to represent the occurrence of a binary 1. Thus, positive pulses corresponding in number to the number of binary 1's contained in the re-translated nines row are provided. This stepping out of the Core Buffer occurs at a twenty microsecond rate, that is, a positive signal occurs on the line CHECK XLATOR OUTPUT for twenty microseconds duration for each binary 1 read from the Core Buffer, which binary 1 is translated to a "6" bit code and re-translated to an IBM code representation. During each twenty microsecond period a signal occurs on the line SAMPLE CODER, which passes via a cathode follower 273 to the AND circuit 274. This SAMPLE CODER signal is gated through the AND circuit 274 if a binary 1 is present and is represented by a positive signal on the line CHECK XLATOR OUTPUT. Positive outputs from AND circuit 274 feed via a grounded grid amplifier 282 to a binary input of trigger 283. Trigger 283 then, shifts ON or OFF as each binary 1 occurs, and, depending upon the number of positive pulses occurring in the re-translated card row representation, the trigger 283, at the completion of Core Buffer read out is either ON or OFF. The status of trigger 283 is then compared with the status of trigger 279. The trigger 283 emits a positive output via the cathode follower 285 when ON, and when OFF, emits a positive output via the cathode follower 284.

The outputs and status of the triggers 279 and 283 are compared by AND circuits 286 and 287. Since both triggers are either ON or OFF, the output of the AND circuits 286 and 287 are negative, otherwise if the conditions of the triggers are opposite, that is one is ON and the other is OFF, the outputs of the AND circuits 286 and 287 are positive. The outputs of the AND circuits 286 and 287 are represented on line A OUTPUT and B OUTPUT respectively.

It should be noted that corresponding A and B output signals occur for each card row and it should also be noted that the signals occurring on the line TIME CHECK EMITTER are specific to the particular Card Row with which the circuits are associated.

Refer now to Fig. 2*f* which shows the Card Reader Error Trigger and the circuits associated therewith. As the last character of a card Image is read out of the Core Buffer and translated, a signal occurs on line BUFFER CARRY which is effective to reset the Read Check trigger 294. At this time if the Check Triggers 279 and 283 of Fig. 2*e* or corresponding triggers for other rows of the card have unlike status, the positive A output and B output signals will be emitted. For example, line 9A (A OUTPUT) is positive as explained above if the nines row triggers do not have the same status. This signal on line 9A feeds via a cathode follower 290 and line 292 to condition one input of an AND circuit 293. Likewise, the line 9B will also be positive at that time and pass via the cathode follower 291 to line 292. Thus, the AND circuit 293 is conditioned after the complete card image has been read if an error has occurred. As explained below, a Card Reader Disconnect signal is emitted due to the generation of the Buffer Carry signal as the read out of the buffer is completed. As the positive signal occurs on the line CARD READER DISCONNECT, it passes via the conditioned AND circuit 293 to turn ON the Read Check trigger 294. It should be noted that this Read Check trigger 294, is not turned ON unless an error has occurred. This Read Check trigger 294 being ON emits a positive output via cathode follower 295 to condition one input of an AND circuit 296. The second input of AND circuit 296 is conditioned by a signal on line TAPE OP OR SELECT. The output of AND circuit 296 passes via a cathode follower 297 and drives line SET RD/WR ERROR positive. A signal on the latter line may be utilized in the Tape Timing and Control circuits, described below, to stop the tape feed. This stopping of tape takes place as a Disconnect signal occurs at the end of a record. Thus, it is seen if an erroneous record is recorded on the tape, an error indication is given.

Refer now to a composite of Figs. 2*g*, 2*h* and 2*i* with Fig. 2*h* arranged to the right of Fig. 2*g* and Fig. 2*i* is arranged to the right of Fig. 2*h*. Figs. 2*g*, 2*h* and 2*i* comprise the Clock circuits. The source of driving pulses for the clock is an oscillator 201*a* whose output passes via a cathode follower 202*a* to one input of an AND circuit 203*a*. The second input of the AND circuit 203*a* is normally conditioned so that the oscillator output signals are passed via a cathode follower 204*a*, an inverter 205*a* to a binary input of a trigger 208*a*. The output of the trigger 208*a*, which has a frequency of one half the frequency of the oscillator, passes via a cathode follower 209*a* and a cathode follower 210*a* to a line CLOCK DIODE GATE DRIVER. The Clock is an eight stage trigger ring comprised of triggers 216*a* through 223*a* inclusive. The ring is stepped by application of signals on the line CLOCK DIODE GATE DRIVER, which are applied to various diode gates, for example, diode gates 212*a* and 213*a*.

During a reset operation a signal on the line MACHINE RESET trips a single shot multivibrator 206*a* whose output goes negative and via a cathode follower 207*a* removes conditioning from the AND circuit 203*a*. This conditioning potential is removed from the AND circuit 203*a* for approximately ten milliseconds. At the same time, an output of the single shot multivibrator 206*a* passes via a cathode follower 211*a* to a line CLOCK RESET (W). A signal on the latter line is effective to reset all triggers of the Clock; the trigger 216*a* being reset to an ON condition and triggers 217*a* through 223*a* being reset OFF. This reset is indicated by a character W in the lower left-hand corner of the block representing trigger 216*a*, and in the lower right-hand corner of the blocks representing triggers 217*a* through 223*a*. Assuming that trigger 216*a* is in an ON condition, it emits a positive output via cathode follower 214*a* to a line 1 ON which conditions the diode gate 212*a*. Then, as the next signal occurs on the line CLOCK DIODE GATE DRIVER, it is passed through the conditioned diode gate 212*a* to turn OFF the trigger 216*a* and also to turn ON the trigger 217*a*. Trigger 217*a* being ON, emits a positive output via cathode follower 215*a* to line 2 ON which conditions the diode gate 213*a*. The next negative signal on the line CLOCK DIODE GATE DRIVER is then passed via the conditioned diode gate 213*a* to turn OFF the trigger 217*a* and turn ON the trigger 218*a*. The operation will continue through the entire eight stages of the ring as the eighth stage trigger 233*a* is turned OFF, the signal which feeds to the left grid of that trigger is also fed to the right grid of trigger 216*a* to turn the latter ON. Thus, the ON condition is stepped stage by stage through a closed ring.

Various outputs of the trigger ring are indicated by signals on the lines 1 ON, 2 ON, 3 ON, etc., to 8 ON. The eight stage trigger 223*a* as it goes ON and OFF emits signals via the line 8 ON to a binary input of trigger 224*a*. Thus, trigger 224A is ON during one cycle of operation of the ring and OFF for the succeeding cycle. Trigger 224*a*, when OFF, emits a positive signal via a cathode follower 225*a* to line CYCLE TWO and, when ON, a positive signal via cathode follower 226*a* to cathode follower 229*a*. The output of the trigger 224*a* when ON, passes via cathode followers 226*a* and 229*a* to line CYCLE ONE. The signals developed by the trigger ring are gated to output lines depending upon whether trigger 224*a* is in a Cycle One or Cycle Two condition by various AND circuits, shown in Fig. 2*i*. For example, a positive signal on the line CYCLE ONE conditions one input of an AND circuit 230*a*. The second input to the AND circuit 230*a* is via line 1 ON. The output of the AND circuit 230*a* is positive upon the coincidence of two positive inputs and passes via a grounded grid amplifier 231*a* and a cathode follower 232*a* to line ON 1. Thus, the latter line is positive when one stage trigger 216*a* is ON and the ring is in Cycle One. Circuits are also utilized to develop signals on lines ON 2, ON 3, etc. An AND circuit 233*a* is conditioned by a positive signal on line CYCLE TWO and by a signal on the line 2 ON. Upon coincidence of two positive inputs, the output of the AND circuit 233*a* passes via a grounded grid amplifier 234*a* and a cathode follower 235*a* to line ON 10. It should be noted that the two stage of the ring when going through the second cycle is effectively the eighth plus two or tenth stage. The signal on the line ON 10 feeds to one input of an OR circuit 238*a*, whose second input is via line 6 ON, a grounded grid amplifier 236*a* and a cathode follower 237*a*. Thus, every time the six stage trigger 221*a* goes ON, one input of the OR circuit 238*a* is positive, while the second input of the OR circuit 238*a* is positive as the line ON 10 is positive. The output of the OR circuit 238*a* passes via a cathode follower 239*a* to line ON 6—10—14. A signal on the latter line is positive when the six stage is ON, that is, during both cycles of the trigger ring which is equivalent to a six and a fourteen stage, is also positive during the Cycle Two operation when the second stage of the ring is ON or the equivalent of stage ten. The outputs on the lines ON 1, ON 2 etc., are utilized in certain control circuits described below.

Refer now to the circuits of Fig. 2*j* which include an Indicator Control Trigger 242*a*. The trigger 242*a* is set to an OFF condition as a positive signal occurs on line RESET IND CONTROL and passes via the inverter 241*a*. As explained below, the positive signal on the latter line occurs when additional cards are loaded into the hopper of the Card Reader. The trigger 242*a* may be turned ON by a positive signal on line CR END OF FILE passing via an inverter 240*a*. A signal on the line CR END OF FILE goes positive when the card hopper goes empty which is an indication that an END OF FILE has been reached. The trigger 242*a*, when OFF, emits a positive signal via a cathode follower 243*a* to line IND CTRL OFF and, when ON, emits a positive signal by way of a cathode follower 244*a* to line IND CTRL ON.

Refer now to Fig. 2*k* which shows a Read Condition Trigger 263*a* and related circuits. If the Card Reader is connected for a Card to Tape operation, a positive signal occurs on a line TAPE WR COND approximately twenty milliseconds after the tape feed, explained below, has been started. This positive signal passes via a cathode follower 260*a* to condition one input of an AND circuit 261*a*. The AND circuit 261*a*, being conditioned, passes a positive signal on the line ON 1 via an inverter 262*a* to turn ON the Read Condition trigger 263*a*. Therefore, when the Card Reader is operated in a Card to Tape operation, the Read Condition trigger is turned ON at "1" time of the Clock cycle. The Read Condition trigger 263*a* is reset OFF by a signal on the line RESET RD COND. The Read Condition trigger 263*a* when ON, emits a positive signal via a cathode follower 264*a* to a line READ COND which in the circuit as shown, conditions one input of both AND circuits 265*a* and 266*a*. As the AND circuit 265*a* is conditioned, a positive signal on the line ON 5 passes via a cathode follower 267*a* to the line SAMPLE CODER. As explained above, a positive signal on the line SAMPLE CODER is utilized in the Checking circuit (Fig. 2*e*) for sampling whether a binary 1 or binary 0 is being emitted as part of a re-translated output of the Core Buffer. The AND circuit 266*a*, when conditioned, passes a positive signal from the line ON 1 via an OR circuit 269*a* and a cathode follower 270*a* to a line RESET BUFFER CHAR REG, which signal, is effective, as explained below, to reset a twelve stage trigger register (Buffer Character Register) which receives signals from the Core Buffer.

Refer now to Fig. 2*m* which shows a Ready trigger 277*a* and related circuits. Whenever a Card Reader is ready to be READ, that is, the Core Buffer is loaded and is ready to be READ out (at high speeds), a positive signal occurs on the line START INTLK which conditions one input of an AND circuit 275*a*. The conditioned AND circuit 275*a* passes a positive signal on the line ON 7 via an inverter 276*a* to turn ON the trigger 277*a*. The trigger 277*a*, when ON, emits a positive signal via a cathode follower 278*a* to the line READY. The Ready trigger 277*a* remains ON until the Core Buffer, as described below, has been read out. After the Core Buffer is read out, it will be necessary to read another card and thus the line READ COND goes negative and is effective to turn OFF the trigger 277*a*. The line READ COND actually goes negative as the last character is read from the Core Buffer.

Refer now to Fig. 2*n* showing circuits for developing Advance Ring signals which are utilized to advance a ring for controlling out of the Core Buffer. As the Card Reader is energized and the first card is being READ into the Core Buffer, a signal occurs on the line CLEAR ON R 1 which passes via an OR circuit 289*a* to condition one input of an AND circuit 293*a*. Unless an End of File is reached, which means no cards in the hopper of the Card Reader, the line IND CTRL OFF is positive to condition the second input of the AND circuit 293*a*. At this time, a positive signal occurring on the line ON 2 passes via an OR circuit 291*a*, a cathode follower 292*a*, the conditioned AND circuit 293*a*, a grounded grid amplifier 249*a* and a cathode follower 295*a* to the line ADVANCE RING. Thus, while the first card is being run into the Card Reader, but before it is actually READ, signals are emitted on the line ADVANCE RING which are effective, as explained below, to cause a read out of the Core Buffer. This read out is to insure that the Core Buffer is empty before receiving information from the first card.

When the Card Reader is connected with a Tape Unit in a Card to Tape operation a signal on the line READ COND passes via the OR circuit 289*a* to condition one input of the AND circuit 293a. Under these latter conditions, the positive signals on the line ON 2 are gated through, as described above, to the line ADVANCE RING. The latter signals occur every sixty-four microseconds and are used to READ out the information from the Core Buffer. Further, there is a signal occurring on the line CHECK ADVANCE, half after each CB time, that is, halfway betwen each time that successive rows of the card are READ. The signals on the line CHECK ADVANCE passes via an inverter 285a to turn ON a trigger 287a. Trigger 287a, going ON, emits a positive output via a cathode follower 288a to the OR circuit 289a and thereby conditions one input of the AND circuit 293a and also to the AND circuit 290a. The AND circuit 290a, while conditioned, gates signals on the line ON 6—10—14 to the OR circuit 291a. Under these latter conditions, the output of the OR circuit 291a has a positive signal at 2, 6, 10 and 14 Clock times. These signals are gated, as described above, through the AND circuit 293a to the line ADVANCE RING. Thus, at half after each CB time, Advance Ring signals occur 2, 6, 10 and 14 times of each Clock cycle. During this half after CB time, it is the Row Memory as explained below, which is connected to a Thyratron ring and which is read out so that an ODD/EVEN count of the binary 1's in each row of the card may be obtained. The trigger 287a is reset OFF as a signal on the line RING CARRY passes via an inverter 286a. This Carry signal occurs after the thyratron ring has been advanced through all its stages.

Refer now to Fig. 2p which shows a Disconnect trigger 201b and related circuitry. As readout of a Card Image from the Core Buffer is completed, that is when the eightieth character is READ, the line RESET RD COND goes negative to turn ON the trigger 201b. Trigger 201b, going ON, emits a positive signal via a cathode follower 202b to condition one input of an AND circuit 203b. The Clock, described above, continues to cycle and as the ON condition reaches the four stage, a positive signal on the line ON 4 is effective to reset the disconnect trigger 201b OFF, but not before the positive signal on the line ON 4 has passed via the conditioned AND circuit 203b. The output of AND circuit 203b passes via a grounded grid amplifier 204b and a cathode follower 205b to line DISCONNECT OFF. The signal on the latter line is effective to reset the Carry trigger, described below, and is effective to reset the Buffer Character Register (Fig. 2z) and to set an error indicating trigger 294 (Fig. 2f) if an error has occurred.

Refer now to Fig. 2q which shows circuitry for developing a signal for resetting the Read Condition trigger (Fig. 2k). As the Card Image is READ from the Core Buffer a Buffer Carry signal is developed as the last character or eightieth column is READ. This Buffer Carry signal on line BUFFER CARRY passes via an inverter 210b to turn on a Carry trigger 211b. The Carry trigger 211b, going ON, emits a positive output via the cathode follower 212b, and an OR circuit 213b to condition one input of an AND circuit 214b. The AND circuit 214b also conditioned positive when there is a coincidence of three positive inputs to the AND circuit 217b via lines TAPE OP, READ COND and IND CTRL ON indicating that the Card Reader is in Tape Operation, the READ condition trigger is ON and the Indicator Control Trigger is ON. The output of the AND circuit 217b passes via a cathode follower 218b and the OR circuit 213b to condition the AND circuit 214b. The AND circuit 214b, while conditioned, passes a positive signal occurring on the line ON 6 via an inverter 215b and a cathode follower 216b to the line RESET RD COND. The positive signal on line ON 6 occurs every sixty-four microseconds. The negative going signal on the line RESET RD COND is effective to reset the READ condition trigger and is also effective to develop a Disconnect signal, as described above, (see Fig. 2p) as the trigger 201b is turned ON. As the trigger 201b is turned OFF, a positive signal occurs on line DISCONNECT OFF, which signal is effective to turn OFF the trigger 211b (Fig. 2q).

Referring to Fig. 2r and Fig. 2s, with Fig. 2s arranged below Fig. 2r, certain Tape Timing and Control circuits are shown. Referring in particular to the upper portion of Fig. 2r, the Write Check character circuits are shown. As the eightieth or last character is READ from the Core Buffer and recorded on Tape, a Buffer Carry signal occurs on line BUFFER CARRY. This signal passes via an OR circuit 231b, an inverter 232b and a cathode follower 233b to the line RESET WR COND. The signal on the latter line is effective, as explained below, to reset the WRITE condition trigger to an OFF condition so that, after another record is READ from a Card into the Core Buffer, and the tape is again started, certain delays will occur. These delays are necessary so that the tape which has stopped may get to speed before any recording starts. The signal on the line RESET WR COND also trips a single shot multivibrator 234b which emits a 310 microsecond pulse via a cathode follower 235b to a line TAPE STOP. The signal on the latter line is effective to cause the tape feed, described below, to stop. A signal on the line TAPE STOP is also passed via a grounded grid amplifier 236b, a cathode follower 237b, an inverter 238b and a cathode follower 239b to the line WRITE CHECK CHAR. A signal on the latter line is effective, as explained below, to reset all WRITE triggers (Fig. 3ao) and is thereby effective to record a "check character" on the tape. If an END OF FILE is reached in the Card Reader but without generating a Buffer Carry signal, that is if the last record contains less than eighty characters, it is necessary to generate these signals but without the benefit of the Buffer Carry signal. If an END OF FILE has been reached, the line IND CTRL ON goes positive, as described above, and thereby conditions one input of an AND circuit 230b. The second input to the AND circuit 230b is a signal from line SET WRITE PULSE, which signal is developed at approximately four time of the Clock cycle. This signal passes via the AND circuit 230b to the OR circuit 231b and via other circuits as described, to develop signals on line TAPE STOP, line WRITE CHECK CHAR, and line RESET WR COND.

The Tape Write Control circuits are also shown on Fig. 2r. The line WRITE COND goes positive, as explained below, after the tape unit having been started, is allowed enough time to get up to speed. The positive signal on the line WRITE COND conditions one input of an AND circuit 240b. The conditioned AND circuit 240b passes a positive signal on line ON 7 via an inverter 241b to turn ON the Tape Write Condition trigger 242b. The Tape Write Condition trigger 242b, while ON, emits a positive signal via a cathode follower 243b to line TAPE WR COND. As the latter line goes positive, (see Fig. 2k) the Read Condition trigger is turned ON so that Advance pulses are fed to the Thyratron ring controlling read out of the Core Buffer and thereby record information on Tape. The Tape Write Condition trigger 242b remains ON until line WRITE COND is driven negative, as explained below, due to a Buffer Carry Signal.

In Fig. 2r, the line READ COND goes positive at approximately one time of the Clock cycle since it is an ON 1 time Clock cycle that is gated to turn ON the read Condition trigger 263a (see Fig. 2k). The signal on the line READ COND passes via a cathode follower 244b to line READ CONDITION to condition one input of an AND circuit 245b. At two time of the Clock cycle, as explained below, information is stepped or READ out of the Core Buffer. Allowing sufficient time for bus lines to charge to appropriate potentials, the WRITE busses are properly charged at approximately three time of the Clock cycle. Thus, at three time of the Clock cycle, a positive signal on line ON 3 passes via an AND circuit 245b and a cathode follower 246b to line SET WRITE PULSE, which signal is effective when an END OF FILE is reached to record a "check character." This "check character" is recorded, as explained below, following a Tape Mark which is entered at the End of File. Whenever a signal occurs on the line SET WRITE PULSE, it is passed via an inverter 247b to turn ON a WRITE trigger 248b. The WRITE trigger 248b, going ON, is of no moment, but as it is reset OFF by a negative going signal on the line ON 4, it emits a negative going signal via a cathode follower 249b to the line WRITE PULSE. It is this latter negative going signal on line WRITE PULSE, which effectively samples the signals on the Tape Write busses, as explained below, to shift or not shift, as required, the condition of the Tape Write triggers, also explained below.

The circuits of Fig. 2r also include a Tape Start trigger 270b. Before there is any recording by the Tape unit, the tape must be at or beyond a load point. The significance of the term load point as applied to a tape is described below. Thus, a positive signal on the line UNIT AT LOAD POINT, which originates from the Tape circuits (see Fig. 3am) described below, conditions one input of an AND circuit 267b and also passes via an OR circuit 273b and a cathode follower 274b to a line SET WRITE STATUS. The signal on the latter line is effective, as described below, to turn on a WRITE STATUS trigger in the tape circuits. While the WRITE STATUS trigger of the Tape circuits is ON, a push button is operated to signify that the Tape is ready for operation and causes a positive signal to develop on line TAPE RDY WR ST. The latter signal conditions a second input of the AND circuit 267b. While both inputs to the AND circuits 267b are positive, its positive output passes via a pulse shaper 268b to trip a single shot multivibrator 269b. The single shot multivbrator 269b emits a 40 millisecond signal which is effective at its leading edge to turn ON the tape Start trigger 270b. At the end of the 40 millisecond period, the output of the single shot multibrator 269b is effective to turn OFF the Tape Start trigger 270b. While the Tape Start trigger 270b is ON, it emits a positive signal via a cathode follower 271b to an AND circuit 272b. The second input to the AND circuit 272b is via line TAPE RDY WR ST, and when the AND circuit 272b is conditioned by a coincidence of two positive inputs, its output passes through an OR circuit 275b, a grounded grid amplifier 276b and a cathode follower 277b to line GO. A positive signal on the latter line is effective to cause the Tape, as described below, to feed forward for a period of forty milliseconds, that is, to advance the tape a certain distance past a load point. When the Tape Start trigger 270b goes ON, it causes a positive signal to pass via the cathode follower 271b, the OR circuit 273b, and the cathode follower 274b, to the line SET WRITE STATUS which is effective, as described below, to turn ON the WRITE STATUS trigger in the Tape circuits. When the Card Reader is operating with Tape, a positive signal on the line TAPE OP conditions one input of an AND circuit 261b. Then, as the Card Reader reads a card and the Core Buffer is ready to be read out, a positive signal occurs on the line READY which passes via an OR circuit 260b, the conditioned AND circuit 261b, a grounded grid amplifier 262b, a cathode follower 263b to trip a single shot multivibrator 264b. At that time, as the single shot multivibrator 264b is turned ON, it is effective to turn ON the Tape Start trigger 270b, and the tape feed starts. Ten millieseconds later, the single shot multivibrator 264b slides back to its quiescent state and the trailing edge of its output is effective to turn ON a WRITE CONDITION trigger 265b whose output goes positive and passes via a cathode follower 266b to line WRITE COND. As explained above, a positive signal on the line WRITE COND is effective to turn ON the TAPE WRITE CONDITION trigger, which in turn is effective to set the READ CONDITION trigger. When the Read Condition trigger is ON information is read out of the Core Buffer. As the eightieth character is READ from the Core Buffer and recorded on tape, the Buffer Carry signal is effective, as explained above, to develop a TAPE STOP signal. This signal on the line TAPE STOP is effective to turn OFF the trigger 270b. The Buffer Carry signal is also effective, as explained above, to cause a signal on line RESET WR COND to reset the WRITE CONDITION trigger 265b. As the latter trigger is reset, the line WRITE COND goes negative. Since the WRITE CONDITION trigger 265b is reset OFF, as another card is READ and the core Buffer again is loaded, a ten millisecond delay is provided by the single shot multivbrator 264b before the line WRITE COND goes positive. This ten millisecond delay allows the Tape sufficient time to get up to speed on being restarted before any recording takes place. It should be noted at this point, that a positive signal on line GO R also passes via the OR circuit 275b, the grounded grid amplifier 276b and the cathode follower 277b to drive line GO positive. As explained below, a positive signal occurs on line GO R during back spacing operations.

Before proceeding with the explanation of the circuits in Fig. 2s, certain circuits shown in Fig. 2u should be discussed. In Fig. 2u, a TAPE BACKSPACE BUTTON may be operated and it is effective to shift a trigger 230c from an OFF to an ON condition. Trigger 230c, going ON, emits a positive output via a cathode follower 231c to line START BACKYARD, and via cathode follower 232c to line BACKWARD & SET READ STATUS. A Tape Error Reset button is also provided to cause a grounding of line TAPE ERROR RESET when the Tape Error Reset button is operated.

Refer again to Fig. 2s, and recall that the signal on the line BACKWARD & SET READ STATUS goes positive as the TAPE BACKSPACE button is operated. The signal on the latter line is effective to switch the Tape feed circuits from a forward to a backward status and also to set the Read Status trigger, explained below (Fig. 3ak). As the TAPE BACKSPACE button is released, the line START BACKWARD goes negative and turns ON a trigger 290b. Trigger 290b, going ON emits a positive output via cathode follower 291b to the line BACKWARD & SET READ STATUS, and also via a cathode follower 292b to line GO R. Thus, the Tape feed circuits are set to a BACKWARD status during the period that the TAPE BACKSPACE button is operated, and as the button is released the line BACKWARD & SET READ STATUS is still held positive by the output of the cathode follower 291b, as the trigger 290b is turned ON. As the trigger 290b is turned ON, the positive signal on the line GO R is effective, as explained above, to cause a signal on the line GO and thereby cause feeding of tape. Thus, the Tape feed mechanism has had time to switch from a forward to a backward status during the time the TAPE BACKSPACE button is operated and feeding of tape actually starts when the button is released.

The TAPE READ BUS lines, for the "1," "2," "4," "8," "A," "B," and "C" bits are conditioned for operation, during Write as well as Read times. These Bus lines are commoned to feed via an inverter 280b, pulse inverter 281b, a cathode follower 282b to a grounded grid amplifier 283b. The signals are passed provided the grounded grid amplifier 283b is conditioned by a negative signal on the line TAPE RDY WR ST. The latter line is energized by circuits, described below, and will be negative during a Backward operation since no writing on the TAPE takes place in a backward direction. The output of the grounded grid amplifier 283b trips a single shot multivibrator 284b which emits a 30 microsecond signal via a cathode follower 286b and an inverter 287b, to trip a single shot multivibrator 288b. The multivibrator 288b has a period of 650 microseconds and this multivibrator does not slide back to its quiescent state until the beginning of the record has been reached (with the tape going in a backward direction) and no signals occur on the TAPE READ BUS lines. In other words, as soon as the pulses fail to occur on the TAPE READ BUS lines when the tape is moving backward, it is an indication that the tape has reached a position intermediate of two of the records which are recorded on the tape. Since no recording takes place between records, with the exception of a "check character," explained below, the single shot multivibrator 288b is continually tripped as signals occur on the TAPE READ BUS lines until this blank area is reached. As the single shot multivibrator 288b slips back to its quiescent state, its output trips a single shot multivibrator 289b which emits a 2.9 millisecond signal to turn OFF trigger 290b. This 2.9 millisecond pulse allows the tape time to feed backward to a point which is the proper and necessary distance forward of the first character of the record. Trigger 290b, going OFF, removes conditioning from line GO R and therefore the Tape is stopped.

Certain signals required for control purposes when the Tape unit is being used with a calculator are not necessary during a Card to Tape operation. Thus, during a Card to Tape operation, certain lines are tied to a set potential by a connector, for example lines TURN TAPE IND ON, TURN TAPE IND OFF, and START REWIND are all held at approximately minus thirty volts or a non-active status. A similar voltage divider network is also shown to clamp line TAPE OP at approximately plus ten volts when the Card Reader is used in Card to Tape operation.

When the Tape unit is connected to a Card Reader for a Card to Tape operation, output signals from the Tape circuits indicate that the tape unit is ready for a WRITE or a READ status via lines TAPE RDY WR ST or TAPE READY READ STATUS, both feeding via an OR circuit 201c to condition one input of an AND circuit 202c. The second input to the AND circuit 202c is via line IND CTRL OFF, which as explained above is positive if an END OF FILE has not been reached. The output of the AND circuit 202c upon coincidence of two positive inputs passes via cathode follower 203c to drive line TAPE READY positive and thereby indicates that the tape unit is ready whether for a WRITE operation or a READ operation (the latter occuring during a Backward status operation).

Tape error circuits are also shown in Fig. 2s. The line SET READ WRITE ERROR is positive when an error has been detected by circuits checking the ODD or EVEN count of holes in each row of the cards, as explained above. The line TAPE ERROR which feeds via an inverter 204c to the trigger 205c, goes positive when a Vertical Redundancy error, explained below, has occurred and is effective to turn ON the trigger 205c. Trigger 205c, going ON, emits a positive signal via a cathode follower 206c, to the OR circuit 207c. If the Card Reader is being operated with Tape, the signal on line TAPE OP conditions one input of an AND circuit 208c and as a positive signal is emitted by the OR circuit 207c, it passes via the conditioned AND circuit 208c and a cathode follower 209c to line ERROR STOP. A signal on the latter line is effective to pick up a relay, as described below, to prevent recording of the next card record on the tape.

Refer now to Fig. 2t which shows output lines of the first Translator, which lines have reference characters G1, G2, G4 etc. for "1," "2," "4," "8," "A," "B" and "C" bits. The signals occurring on the latter lines are fed by circuits, as shown, to the TAPE WRITE BUS lines, one each for the "1," "2," "4," "8," "A," "B" and "C" bits. As long as the Indicator Control is OFF, the line INC CTRL OFF conditions one input each of AND circuit 215c and 218c. The latter AND circuits, while conditioned, pass signals representing the "A" and "C" bits through cathode followers 219c and 216c and to lines A and C respectively of the TAPE WRITE busses. The "B" bit signal passes via a cathode follower 217c to TAPE WRITE BUS B. The signals representing "1," "2," "4," and "8" bits pass via OR circuits 226c, 224c, 222c, and 220c, and via cathode followers 227c, 225c, 223c, and 221c to the TAPE WRITE BUS lines 1, 2, 4, and 8 respectively. At the time that an END OF FILE is reached and the Indicator Control trigger is turned ON, it is necessary to record a Tape Mark. Thus, as the line IND CTRL ON goes positive, signals are applied to the OR circuits 220c through 226c to cause positive signals on the 1, 2, 4, and 8 TAPE WRITE busses. These positive signals cause binary 1's to be recorded in the "1," "2," "4," and "8" bit positions. At the same time, the line IND CTRL OFF goes negative so that neither AND circuit 215c or 218c is conditioned. While the latter AND circuits are not conditioned, binary 0's are thereby recorded in the "A" and "C" bit positions. At this time there is character output representations from the Core Buffer so that a binary 0 is contained in the "B" bit position. Thus, binary 0's are effectively recorded in the "A," "B," and "C" bit positions, while binary ones are recorded in the "1," "2," "4," and "8" bit positions; this particular permutation being the code for a Tape Mark (see Fig. 5a).

Referring now to composites of Figs. 2v, and 2w, with Fig. 2w arranged to the right of Fig. 2v. As signals are recorded upon the TAPE, as explained below, TAPE Write Echo pulses occur, and these signals are received via TAPE Write Echo lines; one line for each bit of the code. Each of these signals is inverted and passed via a cathode follower to provide a positive signal indicating the presence or absence of a binary 1 in each particular bit. For example the signal on line T644 representing the "1" bit is passed via an inverter 240c and a cathode follower 241c to the line $\overline{1}$, which line is positive when the "1" bit contains a binary 0. Holding of the "C" bit is not inverted. Signals on the Tape Write Echo lines representing the "1," "2," "4," "8," "A," and 'B" bits all feed to an OR circuit 242c, whose output is inverted by an inverter 243c and passes via a cathode follower 244c to a line NO ECHO. Thus, unless at least one of the bits contains a binary 1, the line NO ECHO is positive. Conversely, if any one of the inputs via the Tape Write Echo lines contains a binary 1, line NO ECHO is negative. Signals signifying holdings of binary 1's or binary 0's, as the case may be, for the "1," "2," and "4" bits are fed in various combinations to AND circuits 246c through 249c so that if a single binary 1 only is contained in the three particular bits or if binary 1's are contained in all three bits, the output of one or more of these AND circuits is positive and passes via an OR circuit 250c and a cathode follower 251c to a line 252c. In other words, the signal on line 252c is positive if an ODD number of binary 1's are contained in the "1," "2" and "4" bit positions. In a similar manner, signals representative of the "8," "A" and "B" bits are fed to AND circuits 253c through 256c, whose outputs feed via an OR circuit 257c and a cathode follower 258c to line 259c. It follows that line 259c is positive if an ODD number of binary 1's are contained in the "8," "A" and "B" bit positions. Remaining circuitry in Fig. 2w is utilized to fully determine whether an ODD or an EVEN number of binary 1's contained in the character being recorded on the TAPE.

Assume for purpose of explanation that both lines 252c and 259c are positive, indicating an ODD number of binary 1's in the "1," "2" and "4" bit positions and an ODD number of binary 1's in the "8," "A" and "B" bit positions, respectively. This means that an even number of binary 1's is present in the entire six bits. Since both lines 252c and 259c are positive, and both feed an OR circuit 260c, the output of the OR circuit 260c drives line 261c positive. Line 261c being positive, conditions one input of an AND circuit 265c and also feeds via an OR circuit 264c to condition one input of an AND circuit 274c. The second input of the AND circuit 265c is via a line T638 representing the holding of the "C" bit. If an even number of binary 1's are contained in the six bits as mentioned above, this second input to the AND circuit 265c should be negative, since each character contains an even number of binary 1's the "C" bit should contain a binary 0. Thus, the output of the AND circuit 265c should be negative and feed via a cathode follower 267c to line 268c. It would appear then, that line 268c is negative. However, under the assumed conditions both lines 252c and 259c are positive and thereby condition both inputs of an AND circuit 262c, whose positive output passes via line 263c and cathode follower 266c to drive line 268c positive. In this instance, cathode followers 266c and 267c function as an OR circuit. A positive signal on the line 268c passes via an inverter 269c and a cathode follower 270c to line 273c. The cathode follower 270c and the cathode follower 272c, in combination, provide an OR circuit. The alternate circuit to line 273c is via an AND circuit 271c. As explained above, under the assumed conditions, line 263c is positive and therefore it conditions one input of the AND circuit 271c. If the "C" bit contains a binary 0, which it should for a correct code, the second input to the AND circuit 271c via line T638 is negative. The negative output of the AND circuit 271c feeds via cathode follower 272c to line 273c. Therefore, if a correct code exists, no signal is developed to drive line 273c positive. Since line 273c is negative, the second input to the AND circuit 274c is negative and the AND circuit is not fully conditioned. Therefore, the negative output of the AND circuit 274c passes via a grounded grid amplifier 275c and a cathode follower 276c to line NO ECHO. The cathode followers 244c (Fig. 2*v*) and 276c (Fig. 2*w*) act as an OR circuit and therefore the line NO ECHO is negative only if no echo pulses (no binary 1's) have occurred or if an ODD number of binary 1's is contained in the character as recorded. A signal on the line NO ECHO, when positive, is indicative of an error and conditions one input of an AND circuit 277c. A second input to the AND circuit 277c via line TAPE OP is positive when the Card Reader is operating with the Tape. The third input is via line READ CONDITION which is positive when the READ CONDITION trigger, as explained above, is ON. The fourth input signal to the AND circuit 277c is via line TAPE CHECK SAMPLE. The signal on the latter line is developed as a signal on the line ON 5 passes via a cathode follower 279c and an inverter 280c to turn ON a trigger 281c. Due to inherent circuit delays, trigger 281c is actually turned ON half way between the five time and six time of the Clock cycle. A positive signal on the line ON 6 is effective to turn OFF the trigger 281c. The trigger 281c, while ON, emits a positive signal via a cathode follower 281c to the line TAPE CHECK SAMPLE. Thus, as each character is read out of the Core Buffer and recorded on the TAPE, echo pulses are checked for an ODD or EVEN redundancy count. Whenver there is an ODD count the output of the AND circuit 277c goes positive and via a cathode follower 278c drives line TAPE ERROR positive, thereby signalling an ERROR. The signal on line TAPE ERROR develops an ERROR STOP signal (Fig. 2*s*) which is effective to turn ON an Error Stop relay, explained below. The signal on the line TAPE ERROR also goes positive in the event that no echo pulses are received, as explained above, which signifies that no binary 1's are contained in the character.

Refer now to Fig. 2*x* and 2*y*, with Fig. 2*y* arranged to the right of Fig. 2*x*. The composite of Fig. 2*x* and 2*y* shows the Core Buffer, Row Memory, and related circuits. The Core Buffer is comprised of a twelve by eighty matrix of cores and is READ into, row by row, from the cards, that is, eighty Card Reader brushes simultaneously sense for punched holes in the card row by row and emit signals representing sensed holes to the Core Buffer. While reading into the Cores, a current, which for purpose of discussion has an arbitrary magnetic value of H0, is applied to each Core in the column of cores as a corresponding brush of the eighty brushes senses a punched hole. Each core in the row of cores, corresponding to the row of the card being sensed, receives an additional H0 component of current from cam controlled circuits. This Core Buffer is the type generally shown and described in the application of Werner Buchholz et al., Serial No. 443,234, filed July 14, 1954, entitled Magnetic Core Buffer Storage and Conversion. In accordance with the teaching of this application two current components comprising a total of 2H0 may shift a core's magnetic status from a so-called OFF condition to an ON condition. Thus, a Card Image is effectively read into the Core Buffer. Cam circuits, described below, providing signals on lines 9CB, 8CB, 7CB etc. provide an H0 of current for an entire row of cores, the signals to each row of cores being synchronized with the card feed.

After the core has been read into, it may be read out of by the operation of a thyratron controlled ring which causes a readout of the Core Buffer one column at a time. Circuits are also provided for advancing the thyratron ring in certain timed increments.

A Row Memory, comprising a one by eighty matrix of cores, is represented in the lower portion of Fig. 2*x*, and is read into while a card is passed under the first set of reading brushes. This Row Memory is also read into by a coincidence of currents, as in the case of the Core Buffer. One H0 component of current is furnished the entire row once for each CB time and the second H0 component is derived from brushes sensing punched holes.

The thyratron ring, in the center portion of Fig. 2*x* is utilized at "half after" CB time for reading out each bit of information in Row Memory and thus in combination with circuits of Figs. 2*d* through 2*f* explained above, provides an ODD/EVEN count of the punched holes in each row of the card, the count being made when the reading brushes are situated between card rows. More specifically, in Fig. 2*x*, there is shown the Core Buffer and Row Memory for columns 1, 2, 3, 79 and 80, it being understood that columns 4 through 78 are identical. As explained above, by coincidence of signals causing two H0 increments of current to flow on lines linked through a particular core, the status of that core is changed from an OFF to an ON status. For example, if current of H0 is caused to flow via reading brush 1, on line C1, coincident with the current of H0 on line 9CB, a core 201d is shifted to an ON condition. Read out of the Core is accomplished by passing a current of approximately 5H0 from a thyratron 202d via line T1, which is connected to line C1 while relay RC1 is in a normal position, as shown. The 5H0 increment of current passes through all cores of the column containing core 201d, and thereby causes a readout of the entire column. The thyratron ring, comprised of thyratrons 202d through 206d, has an ON status stepped from stage to stage (the total of eighty positions) and the Core Buffer is read out column by column and those cores, which had been altered to an ON status during read in, are shifted from ON to OFF status as read out occurs. This read out causes a positive signal for such each core shifted from an ON to OFF status, to appear on the output lines such as 9CB, 8CB etc. which are the same lines utilized to furnish one of the H0 current components during read in.

Each stage of the thyratron ring is comprised of a thyratron tube and a magnetic core having three windings thereon. The ring is primed when the home position core, shown in Fig. 2*y*, having coils 207d, 208d and 209d is set to an ON status. Then as the home position core is pulsed, the home position core shifts from an ON to an OFF condition and a positive signal is emitted via line 210*d* to the grid of the thyratron 202*d* firing the latter. As the thyratron 202*d* fires, it causes a current 5H0 to pass via the conductor T1 and, depending upon the condition of relay RC1, causes either a read out of the first column of the Core Buffer or the first column of Row Memory. At the same time, current through the thyratron 202*d* passes through a coil 211*d* which shifts this first stage core, comprised of coils 211*d*, 212*d* and 213*d*, to an ON condition. This stepping of an ON condition from one core to the next is accomplished by a signal on the line RING ADVANCE. The signal on the latter line is caused by a signal on the line ADVANCE RING passing via a grounded grid amplifier 220*d*, cathode follower 221*d* and 222*d* to Current Drivers 223*d* through 227*d*, the latter being connected in parallel. The common output on line RING ADVANCE goes negative each time there is a pulse on the line ADVANCE RING. Current on the line RING ADVANCE passes through each advance coil winding, such as windings 212*d* and 208*d*, all of which are connected in series. A signal on the line RING ADVANCE attempts to turn all ring cores OFF but one stage that is shifted from an ON to an OFF status, and the core of that stage emits a signal to fire the thyratron of the succeeding stage. The ring is stepped through eighty stages and cathode of the thyratron 206*d*, that is, the eightieth stage, is connected to winding 207*d* of the home position core. Thus the latter core is in an ON condition after the eightieth column has been read. This home stage, comprised of windings 207*d*, 208*d*, and 209*d* and a ring core, is also primed, when cards are being read into the Card Reader, by a cam developed PRIME RING signal causing current to flow through the coil 207*d* of the home stage.

The output of the thyratron ring is shifted by relays RC1 through RC80 to either lines C1 through C80 or CX1 through CX80, respectively. Thus, the same ring is utilized for reading out of the Core Buffer and also for reading out of the Row Memory as required. During the first card cycle of Card Reader operation (that is during a loading sequence), a carry relay CR (Fig. 2*y*) is energized, but, during this first card cycle no card actually passes under either the upper or lower READ brushes. The first card merely approaches the upper READ station during this first card cycle. At 190° of the first card cycle the home stage core having windings 207*d*, 208*d* and 209*d* is primed to an ON status as a signal occurs on the line PRIME RING and passes through a 2 millihenry coil to the coil 207*d*. The ON condition is then stepped, by signals occurring on the line RING ADVANCE, through the entire eighty stages. The output of the thyratron 206*d* is connected to ground through the points of relay CR rather than to the winding 207*d* so that the ON condition is not reset into the home stage. During this time, the relays RC1 through RC80 are energized and, therefore, the output of each thyratron is connected via lines CX1 through CX80 to Row Memory. The effect of this cycling of the thyratron ring, is to clear Row Memory and also to effectively clear the thyratron ring, if any of the stages had been ON. At 227° of the Card Cycle the relays RC1 through RC80 are deenergized, so that the output lines T1 through T80 of the thyratron ring are connected via line C1 through C80, respectively, to the Core Buffer. The home position is again set ON by a signal on line PRIME RING and the ON condition is stepped through the entire eighty positions, thereby clearing the Core Buffer and, also, again clearing the thyratron ring.

At 310° of the Card Cycle, a signal is again effective via line PRIME RING to turn ON the home position core and as the Card Cycle reaches 330°, the Card Reader should stop or if operation is continued the first card is passed under the brushes of the upper read station. As the first card passes under the upper read station, information is read row by row into Row Memory. During this second card cycle, the reading brushes at the lower read station and disabled. At "half after" each CB time, Row Memory, which is read into each CB time, is read out of under control of the thyratron ring. As the Row Memory is read out, bit by bit, signals occur on the line ROW MEM-HORIZ, and pass via an amplifier 230*d* and an inverter 231*d* to trip a single shot multivibrator 232*d*. The single shot multivibrator 232*d* emits a six microsecond signal via a cathode follower 233*d* to the line CHECK INFO. Signals on the latter line are gated to the check circuits Figs. 2*d* through 2*f*, explained above.

Normally, as the thyratron ring is stepped to its eightieth stage, the home position is set ON by current flow through the winding 207*d*. At this time the carry relay CR is deenergized. At the same time, the output of the thyratron 206*d* is effective to trip a single shot multivibrator 240*d*, which emits a six microsecond positive signal via a cathode follower 241*d* and drives line RING CARRY positive. This signal on the line RING CARRY is effective to cause the Card Reader to proceed into another Card cycle and is also effective to block emission of ADVANCE RING pulses which step the ring. Thus, it is seen that after the first two Card cycles, information is read into both the Core Buffer and into the Row Memory during each Card cycle. The information is read into Row Memory, by way of the upper reading station, as the check brushes CH BRUSH 1 through CH BRUSH 80 sense holes in the card and developed signals on the lines CX1 through CX80, respectively. At the same time, a signal on the line RM CB causes current H0 to flow on line ROW MEM-HORIZ. Those cores of Row Memory, which receive a coincidence of two H0 increments of current, are shifted from an OFF to an ON condition. At the same time, the lower reading brushes 1 through 80 are effective to pulse lines C1 through C80 provided holes are sensed in the card by the lower reading brushes. At the various card CB times, an H0 increment of current is caused to flow on lines 9CB, 8CB, 7CB, 6CB, etc. by CAM circuits, described below, and upon coincidence of two H0 increments of current, the cores of the Core Buffer are shifted from an OFF to an ON condition. At "half after" CB time, Row Memory must be read out so that information on the next card row may be stored during the succeeding CB time. Therefore, the ON condition in the thyratron ring is stepped through eighty stages and signals are developed on line CHECK INFO; each signal corresponding to a binary 1 or punched hole in a particular row of the card last read by the upper reading brushes. As explained above, signals on the line CHECK INFO are counted by a trigger (see Fig. 2*e*), a separate trigger being provided for each row of the card. Thus, the ODD/EVEN count of the number of binary 1's in a particular card row is taken. The Core Buffer is read out after the entire card image has been stored and the various output signals are developed on the lines 9CB, 8CB, 7CB, etc.; each signal corresponding to a binary 1 or punched hole in the particular column being read. The Core Buffer is read out, column by column, through the action of the thyratron ring driving a current increment of approximately 5H0 through the entire twelve cores comprising a column.

Fig. 2*z* shows a Buffer Character Register. This register is comprised of twelve triggers, one for each row of the card. The triggers are reset OFF by a negative signal on line POWER ON RESET, line CARD READER DISCONNECT or line RESET BUFFER CHAR REG passing via an OR circuit 270*d* and a cathode follower 271*d* to a line RESET Y. A signal on the line RESET Y, being negative, is effective to reset each trigger of the twelve triggers to an OFF condition, as indicated by the Y in the lower right-hand corner of the block representing each trigger.

As a column of the Card Image is read from the Core

Buffer, as explained above, a signal or signals representative of binary 1's or punched holes occur on lines CB0, CB11, CB12, CB1 through CB9. The signal on each line passes via identical circuits so the explanation of one circuit will suffice for the others. For example, a positive signal on the line CB1 which is representative of a binary 1 or a punched hole in the 1 row of the card, passes via a buffer amplifier 265*d* and an inverter 266*d* to pull trigger 267*d* to an ON condition. Trigger 267*d*, when ON, emits a positive signal via a cathode follower 268*d* to a line B1. If a particular column of the Card Image being read, contained a binary 0 in the 1 row, then the trigger 267*d* would remain OFF and emit a signal via the cathode follower 268*d* to hold the line B1 negative. The triggers are reset OFF by a signal on line RESET BUFFER CHAR REG before each column is read out.

The following will serve as a description of the Card Reader relay circuits, more specifically the Cam and Relay circuits which are illustrated in Figs. 2*aa* through 2*af*, respectively. Figs. 2*aa* through 2*ad* are arranged as a composite with Fig. 2*ab* to the right of Fig. 2*aa*, Fig. 2*ac* to the right of Fig. 2*ab* and Fig. 2*ad* to the right of Fig. 2*ac*. Figs. 2*ae* and 2*af* should be arranged as a composite with Fig. 2*af* arranged to the right of Fig. 2*ae*. These cam and relay circuits function to properly synchronize the motion of the card feed with the timing requirements necessary to check information and store information on the Card Reader Core Buffer described above. The following will deal with the conditions which are encountered when cards are passed through the card feed and data is stored in the core buffer.

When power is initially turned ON a relay coil R62 (not shown) is energized. The relay R62 being energized, closes contacts R62*a* and the Power On relay R61 is energized (see Fig. 2*aa*). Points R61*b* closing in Fig. 2*ac*, energizing a POWER ON light. If the feed hopper contains cards, and all stop interlocks are reset, pressing a START KEY, Fig. 2*aa*, initiates passage of the first three cards in the Card Reader system. The information contained in the first card will be transmitted row by row to the one by eighty core matrix Row Memory. The Row Memory is read out between sensing of successive rows, to a trigger which counts the number of binary 1's or punched holes in the row and provides an ODD/EVEN count when the entire row has been read. As the Card passes beneath the second set or lower read brushes, information is read and is stored in the twelve by eighty Core Buffer, as previously described. As the information contained in the first card is stored in the Core Buffer, the information in the second card is read row by row into the one by eighty Row Memory and an ODD/EVEN count for each row is again stored in the proper triggers, as described above. The third card eventually passes from the hopper to a position in front of the upper reading brushes. At this time, the information contained in the third card is not read as the card feed is stopped.

The mechanical motion of the card feed which accompanies the above result can be described as follows: The START KEY, Fig. 2*aa*, when operated, will energize a START relay R1. If the STOP KEY, also in Fig. 2*aa*, is not operated, if the STACKER switch is closed, if no feed error exists (detected by energizing a relay R15), and if no tape error is present (detected by energizing a relay R57), a circuit is made through the Tape operation relay points R52—1 normal, or through the Tape operation relay points R52—1 transferred, and an energized Tape ready relay point R55—1, through the START KEY and through relay R1 to ground.

Point R1-3 completes a circuit to the pick coil of the Run In relay R12 (Fig. 2*ad*) from 48 volts potential line through relay point R47—7 transferred, and through relay point R32—4 to the pickup coil of the Run In relay R12. The hold coil circuit of relay R12 (Fig. 2*ab*) is complete through its own relay points R12—1, through points R2—2 and R29—2 and the circuit from point R57—1 of Fig. 2*aa* back to the 48 volt supply. The READ relay R59 (Fig. 2*ae*) during TAPE operation is energized by an electronic signal on the line PICK READ RELAY. The READ relay R59 pick coil P2, in Fig. 2*ad*, is kept energized through points R12—4. In Fig. 2*aa*, relay points R59—1 complete a circuit to the FEED CLUTCH magnet, which will cause the feed clutch to be engaged and initiate a feed cycle. Thus, the READ relay, when energized, holds the feed clutch magnet energized through points R59—1 and also causes the Clutch Magnet Control relay R35 to be energized. The overlapping in the timing of Cam CR CB1 and CB20 of Fig. 2*aa* is such that the FEED CLUTCH magnet remains energized and cards are fed as long as relay R59 is energized since relay points R35—2 remain closed as long as the clutch magnet control relay R35 is energized and thus maintains the FEED CLUTCH magnet energized when the cam CR CB1 has opened the alternate circuit to the FEED CLUTCH magnet.

If there is no feed error, the first card will feed past the upper Card lever which will energize the Upper Card Lever relay R23 (Fig. 2*ac*). This completes the sequence of events for the first cycle. Since, at this time the circuit to the FEED CLUTCH magnet (Fig. 2*aa*) is still complete through points R59—1, the Card Reader will take another Card cycle since the circuitry, just described, is still active. The same sequence of events occurred with the addition of the following, that is, the first card continues through the feed and travels under the upper read brushes which are conditioned as follows: It should be noted that the carry relay R49 (Fig. 2*ad*) is picked via points R12—5 in the transferred or energized position and points R23—6 and R29—8 in a normal or deenergized position; the relay points R12—5 being energized when the Run In relay R12 is energized. The carry relay R49 is held energized through its own point R49—1 until 325° of the first machine cycle and now is deenergized so that R49—3 is normal. As cards are now present in a position before the upper read brushes, the Upper Card Lever relay R23 is energized. Thus a circuit to the coil of the Read Upper brushes relay R21 (Fig. 2*ab*) is complete through points R49—3 and R23—3 which relay R21 is held energized through its own point R21—1 and cam CB26 from 2° to 227° of the second cycle. Thus, if the FEED KEY (Fig. 2*aa*) has not been depressed energizing the feed key relay R50, a circuit via points R21—2 and R50—3 (Fig. 2*ae*) to the upper read brushes is completed to the common brush twelve times during each Card cycle through the action of the cams CB5 and CB6 (Fig. 2*af*). In addition to controlling the timing of the READ brushes, cam CB26, of Fig. 2*ab*, also switches the RING relays RC1 through RC80 so that the thyratron ring, described above, is switched from the twelve by eighty Core Buffer to the one by eighty Row Memory. The priming of the thyratron ring in the home position is accomplished through relay point R49—2 (Fig. 2*ab*), but only during the first run in Card cycle, effective to energize the line PRIME RING. Each time the read brush circuit is complete at the first or upper reading station, the information contained in each row of the card is temporarily stored in the one by eighty Row Memory, the circuitry of which is described above.

At the completion of the second card cycle an indication of the ODD/EVEN count of the punched holes in each card row is temporarily stored in the check triggers as represented in Fig. 2*e*. This will complete the sequence of events for the second card cycle. At this time there is no change in status of the circuitry to the FEED CLUTCH magnet so a third card cycle is initiated.

The lower card lever contact of Fig. 2*ac*, is closed at approximately 205° of the second cycle. Thus, the lower card lever relay R29 is energized and the hold card lever relay R32 is energized via cam CB19 at 340° of the third cycle and is held energized through its own point R32—1, and CB32 (all of Fig. 2*ac*). Thus, via points R32—3, the read lower brushes relay R19 is energized at the same time that the read upper brushes relay R21 (Fig. 2*ab*) is energized during the third card cycle via the circuitry of the cam CB26 shown in Fig. 2*ab*. The role of points R19—1 in conjunction with points R50—2 as shown in Fig. 2*ae*, is to enable the information contained in the first card to be stored in the twelve by eighty Core Buffer, described above, as the lower reading brushes (Fig. 2*ae*) are thus energized. At the end of the third cycle the first two cards have passed under the lower and upper reading brushes, have been interpreted as indicated and the third card has entered the feed system.

At this time the following chain of events have occurred. Point 32—2 (Fig. 2*aa*) completes the circuit to the Calculator Interlock relay R2 provided the Start Key is still depressed through the circuit shown in Fig. 2*aa*, since relays R32 and R47 are energized and relay R56 is not energized. The circuit to the pick coil of relay R2 is completed through the same circuit which energized START relay R1, previously described, and also relay points R56—2, R47—1, R32—2 and R1—1.

The Calculator Interlock relay R2 holds through its own point R2—1 the Tape Indicator ON relay point R56—1, when in a normal condition, through the Hopper relay point R47—2 and back to the Start Key circuitry.

In Fig. 2*ab*, point R29—2, now transferred, has opened the circuit to the hold coil of the Run In relay R12, but the relay remains energized until 85° of the third card cycle through the cam CB25. When point R2—2 of the Calculator Interlock relay transfers, it opens the circuit to the hold coil of relay R12. Since at this time point R32—4 (Fig. 2*ad*) of the Hold Lower Card Lever relay was transferred, the pick coil of the Run In relay R12 was deenergized. Thus, any further depression of the START button would not, through the circuits described (see relay point R1—3 of Fig. 2*ad*), energize the Run In relay R12 and thus the Read relay R59 and cause any additional feed cycles beyond the first three cycles.

At this time the following events have occurred. The Card Reader has been transferred to control certain Interlock circuits in conjunction with the Tape control circuits; the ready light of Fig. 2*ac* has been illuminated through relay point R2—5; the first card has been transported under the lower reading brushes which were activated when relay R19 was energized as mentioned previously; the information contained in the card has been stored in the Buffer core matrix; the ODD/EVEN count of the holes in each row of the first card has been temporarily stored in the proper triggers (Fig. 2*e*), and are transferred via circuits to the second group of storage triggers, as described above. The second card has been transported under the upper reading brushes and the ODD/EVEN count of the holes contained in each row of this second card are temporarily stored in triggers (see Fig. 2*e*). The third card has entered the feed and is located just in front of the upper reading brush station. This condition will remain static until the Tape frame is ready which either activates a feed cycle or Card Reader is removed from this control by depression of the Stop Key.

If during normal operation the Core Buffer is empty, a condition exists to cause feeding of cards as described. The cards feed from the hopper one at a time, and pass under the upper reading brushes so that an ODD/EVEN count of the punched holes in each row of the card is made. The card next passes under the lower reading brushes and information contained in the card is stored in the 12 x 80 matrix. At this time the ODD/EVEN count of the punched holes in each row of the card is transferred from one set of triggers to a second group of triggers, so that the first group of triggers is made available to count punched holes in a succeeding card. Information in an IBM code contained in the Buffer matrix will be decoded to a seven bit code recorded on tape and retranslated to the IBM code to provide a check of the ODD/EVEN count of punched holes in each row and, at the same time, a redundancy check is made of each character as it is recorded on tape. The necessary relay Interlock control circuits to effect these operations will now be described. The Feed Error relay R15, Fig. 2*ab*, will be energized whenever the cards pass through the feed system improperly, i.e., a card lever is open when it should be closed or vice versa. This is accomplished through relay points R23—5, R29—6, R29—5, R23—4 and R10—2, all located in Fig. 2*ab*. A typical Feed Error will be explained. Assume that the card jams in the feed system between the upper and lower read brushes. On the succeeding cycle the upper card lever relay R23 will be energized and the circuit to the Feed Error relay will thus be complete at 135° of the feed cycle through CB34 of Fig. 2*ad*, relay point R23—4 in a transferred condition (Fig. 2*ab*) and relay point R10—2 in a transferred condition. The Feed Error relay will remain energized for this condition through the Hopper relay contact point R47—4 and point R15—1 of the Feed Error relay. Point R15—2 of the Feed Error relay will disable the circuit to the Start Key and the Calculator Interlock relay R2 of Fig. 2*aa*. This condition will persist until cards are removed from the feed and the Stop Key is depressed which will then open the hold circuit of the Feed Error relay F15 of Fig. 2*ab*.

The Feed Interlock relay R10, energized via the circuit shown in Fig. 2*ab*, is a suppress interlock circuit which will maintain the Feed Error relay R15 inactive while initially filling the feed system. Point R10—2 will prevent a relay R15 from being energized until the lower card lever relay R29 has been energized. The relay R10 holds up through its own point R10—1. When the points of cam CB29 make to partially complete the circuit to the Feed Error relay R15, the Upper Card Lever relay points R23—5 should be transferred and isolate the circuits to the Feed Error relay via the Hopper contact relay point R47—12. The Hopper contact relay point R47—12 is connected in the circuit at this point to prevent continual running of the card feed if a card sticks in the feed throat during the first card feed cycle. The relay points R29—5 and R23—4 are connected parallel to each other and in series with the Feed Interlock relay point R10—2 in Fig. 2*ab* as a feed check sample to make certain that a card is not stuck in such position that it keeps the upper card lever relay or the lower card lever relay continually energized. Hence, at various times in the card feed cycle, the Feed Error circuits are sampled to insure that cards are feeding sequentially through the feed system.

In general, during the continuous operation of the Card Reader under the control of the Interlock circuits, described elsewhere, or under control of a Calculator, the FEED CLUTCH magnet will be held via the following circuits shown in Fig. 2*aa*; through cam CB54, point R11—1 of the Calculator Interlock Relay, through point 47—11, point R40—1 (if the Read Call relay R40 is energized by a Calculator), or via relay point 52—10 during a Tape operation, to the Clutch Magnet Control circuits, described above. This circuit is designed to prevent undue clutch wear since it will allow the Feed Clutch Magnet to be kept energized during the time that cam contact CB20 is open, providing Card Reader is to take another feed cycle subsequent to the one in which it is currently engaged.

The Read relay R59, shown in Fig. 2*ae*, is energized from a signal which is emitted from the electronic circuits (Fig. 2*ah*). If the mechanical protective Interlocks previously described have not been activated, the activation of the relay R59 will cause the Card Reader to feed cards and the process will continue as long as the cards remain in the hopper. The conditions for running out the feed are as follows. When the last card leaves the hopper, the feed system will automatically stop and remove the Card Reader from control of the Interlock circuits, as described. Point R47—2, of the Hopper relay, opens the circuit to the hold coil of the Calculator Interlock relay R2 and R11, both of Fig. 2*aa*. The deenergization of relay R2 temporarily disables the Start Interlock circuit of Fig. 2*ad*, consisting of the following points in series. R2—4, R59—2 (in normal position), R52—2 (in transfer condition). The operator then has an option of loading additional cards into the hopper or running out the last three cards which are still present in the feed system. If the operator elects to run the cards out, the Start Key must be depressed energizing the Start relay R1. Since the hopper is empty, the circuit to the relay 7 of Fig. 2*ad*, will be complete through the relay points R1—3, R47—7 (in normal condition) and R32—5 (in a transfer position). The hold circuit for the relay R7, shown in Fig. 2*aa*, consits of points R7—1, R41—3 (normal), R55—1 (transferred), R52—1 (transferred), R57—1 (normal), R15—2 (normal), the Stacker Switch and the Stop Key to the 48 volt Power Supply. When the End of File 1 relay R7 is energized, point R7—2 of Fig. 2*aa*, bypasses the now open point R47—1 of the hopper relay and thus permits energization of the Calculator Interlock relay R2. Point R7—3 bypasses relay point R47—2 and therefore enables the hold circuit of the Calculator Interlock relay R2 and the second Calculator Interlock relay R11 to remain energized. Since the Card Reader is again under control of the cam and relay circuits, a Feed cycle can now be initiated with the hopper empty. When the Lower Card Lever contact of Fig. 2*ac* opens, information punched in the last card has been stored in the Core Buffer and it will no longer be possible to pick the Hold Lower Card relay R32. The End of File 1, relay R7, will remain energized until the last record is read out of the Core Buffer and another feed cycle is initiated. Relay R7 is deenergized by opening of cam contact CB24 at 160° of the cycle as the parallel circuit thereto includes contact point R41—3 which open as relay R41 is energized. The relay R41 is energized as the Hold Lower Card Lever points R32—6 close as the Hold Lower Card Lever opens and deenergizes relay R32. Thus, the last record out of the Core Buffer, an additional Card cycle occurred and all End of File Interlocks are deenergized. Further, as relay points R41—5, Fig. 2*ac*, closed, an End of File signal is emitted to cause a Tape Mark to be recorded on the Tape after the last record. However, the second End of File relay R41, as shown in Fig. 2*ad*, is picked up through point R47—8, R50—5 and R32—6. This maintains the Calculator Interlock relay hold circuit energized through points R41—2 in order to withdraw the last card from the feed system during one final Card cycle. If the operator has chosen to load more cards in the hopper and after doing so, the depression of the Start Key would have energized the Calculator Interlock relay via the circuit containing point R47—1, described above, and the "status quo" would be maintained until the feed hopper again was depleted of cards.

Several other Interlock circuits are worthy of note and shall be described herein. A signal is developed on line CARRY RELAY PICK, shown in Fig. 2*ad*, is transmitted to the Carry relay shown in Fig. 2*y*, and serves to prevent the RING CARRY signal from priming the first position of the ring when the cards are initially loaded into the feed system. This signal is developed by the cam contacts CB36, relay points R12—5, which relay is energized during run in operation, and R23—6 (in normal condition) until such time as the upper card lever relay is energized. The Feed Key relay R50 shown in Fig. 2*aa* will be energized when the Feed Key is depressed provided the Calculator Interlock relay has not been energized to open the normally closed points R2—6. The relay point R50—1, shown in Fig. 2*ad*, on being closed, will energize the Read Relay R59 which will in turn energize the Feed Clutch Magnet through the circuit and in the manner previously described. An indefinite number of Feed cycles can thus be obtained to empty the hopper or to pass cards through the hopper without requiring the feed to be under control of the Interlock circuits, as described.

Several indicator lights are shown in Fig. 2*ac*. The function of the Ready Light has been discussed above. All other lights and their actuating circuits are as follows. The POWER ON relay is energized whenever POWER ON relay R61 is energized and point R61B closes; the Select light is energized when either point R58—1 of the Select relay or R52—8 of the Tape Operation relay is closed. The Feed Check Light is energized whenever point R15—3 of the Feed Error relay is closed and the Fuse Light will be energized whenever point 37—1 of the Fuse relay is closed. A relay R37 will be picked as the result of a blown fuse through circuits not shown. In Fig. 2*ae*, five special relays are shown. Tape OP relay R52, Tape Ready relay R55, Tape Indicator ON relay R56, Tape Error relay R57, and the Select relay R58. These relays are energized by signals emanating from electronic circuits described elsewhere. These relays are used primarily to serve as synchronizing medium between the Card Reader and Tape frame when the Card to Tape operation is in process.

During the initial cycle of Run In, Advance Ring pulses are gated by signal on the line CLEAR ON RUN IN (see Fig. 2*n*), so that the Core Buffer and Row Memory are cleared. Cams CB30 and CB27 (Fig. 2*ab*) via the Run In relay point R12—3 and the normally closed Lower Card Lever relay point R29—7, are effective to cause line CLEAR ON RUN IN to be positive from 215° to 227° and from 280° to 292° of the Card cycle. After the initial cycle point R29—7 opens. Cams CB50, CB51 and CB52 (all of Fig. 2*ab*), through relay point R94—2, are utilized to provide a signal on line PRIME RING which sets the home position of the thyratron ring to an ON condition, as explained above. This priming of the ring is accomplished once before each Clear ON Run In signal and once before the initial Read Out.

Point R19—3, shown in Fig. 2*ae*, synchronizes a pick circuit on the Tape Indicator ON relay R56 to insure that a record is not lost if the Tape Indicator relay is conditioned as the Tape is stopping, after the Ring Carry relay R56 is held through its own point R56—5 for a Tape Indicator ON condition. This may occur as the Tape reaches its physical end. Point R21—4 of the Read Upper Brushes relay as shown in Fig. 2*af*, isolates the signal CHECK ADVANCE from circuitry beyond this figure during Run In card cycles and for an End of File condition.

Point R41—5 of Fig. 2*ac*, in a closed condition is used to supply the signal on the line CR END OF FILE. This signal is used to record a Tape Mark on the Tape when an End of File occurs.

Point R47—9 relay, when relay R47 is energized will reset the I/O Indicator Control circuits described above. The pulse generated on Line CHR #2 GATE by the cam CB8, Fig. 2*af*, is utilized to condition certain AND circuits for example AND circuit 278 shown in Fig. 2*e* which will allow the transfer of the bit count status between the temporary storage triggers. The Feed Key and the Feed Key relay R50 enable the operator to engage the Feed Clutch at any time the Calculator Interlock relay is not energized. No restriction is placed on the number of cards in the hopper or feed system for this type of operation. The Feed Key relay R50 is held through its own point R50—4 and through the cam CB21 of Fig. 2*aa*, which times the drop out of relay R50.

Referring to Fig. 2*ae*, point 52—9 when transferred will condition the circuit to the Tape Error relay R57 so that the latter may be energized if a Tape Error occurs during the Card to Tape operation.

Cam circuits and Breaker Contacts, shown in Fig. 2*af*, are to provide the proper time pulses to the 12 x 80 Core Buffer. These timed pulses enter the Core Buffer circuitry shown in Fig. 2*x*. The cam CB10 and CB11 and the Check Emitter Contact Points, also shown in Fig. 2*af*, are designed to provide impulses at half-after times of each Circuit Breaker or CB time in order that the ODD/EVEN count contained in the 1 x 80 Row Memory can be stored in temporary storage triggers (Fig. 2*e*). The cams CB7, CB8 and CB9, of Fig. 2*af*, provide properly timed impulses for resetting temporary storage triggers (Fig. 2*e*) mentioned above and for conditioning AND circuits for Transmittal of the status of those triggers to the more permanent triggers also of Fig. 2*e*. In Fig. 2*ag*, signals emitted by the cam and relay circuits, described above, on lines ST INTLK, CARD READER END OF FILE, RESET I/O IND, CLEAR ON RUN IN and CH ADVANCE are passed via pulse shapers and cathode followers to develop signals on lines START INTLK, C R END OF FILE, RESET IND CTRL, CLEAR ON RI and CHECK ADVANCE, respectively. The Start Interlock is an indication that the Core Buffer is full and thus the Card Reader system is waiting to emit information. In other words, it means the Card Image has been read into the Core Buffer and the information is ready for readout. The Card Reader End of File signal occurs as the card hopper goes empty provided no additional cards are loaded into the hopper and provided further that the cards remaining in the Card Reader are run out after the start button is depressed to initiate the run out. In this case, the End of File occurs after the last card has been read out. The Reset Indicator Control signal indicates that the cards are present in the hopper of the Card Reader. The Clear ON Run In signal occurs before the first card is read for the purpose of clearing the register and also for clearing the Core Buffer and Row Memory so that new information may be received. The Check Advance signal is one which occurs half after each CB time, as explained above, for the purpose of stepping Row Memory in order that an ODD/EVEN count of the binary 1 bit of information in each row of the Card may be obtained.

Refer now to Fig. 2*ah* which shows Relay Driver circuits. The input signals to these circuits energize the Relay Driver circuits, which are effective to cause certain relays in the cam and relay circuits to be energized. For example, a positive signal on the line READ CALL & SELECT energizes relay driver **275*d*** to cause a signal on the line PICK READ CALL RELAY, which is effective to pick up a relay and prevent dropping out of and subsequent picking up of a clutch whenever two successive Card cycles are to be performed, thus saving wear and tear on the clutch. A signal on the line PICK READ RELAY is effective to energize the Read relay and to initiate another Card cycle which causes another Card image to be stored in the Core Buffer. A positive signal on line SELECT is effective to energize a Select relay, and this has utility when the Card Reader is used as an Input Unit to the main Calculator. A positive signal on the line TAPE OP is effective during Card to Tape operation to energize the Tape operation relay. A positive signal on the line TAPE READY indicates that the Tape frame is ready, i.e., the Tape is at the load point, etc., as explained below and is effective to energize the Tape Ready relay. A positive signal on line ERROR STOP is effective to energize a Tape Error relay, the error being for example, an error detected from the echo pulses received when recording on the Tape. A positive signal on the line TAPE IND ON energizes the Tape Indicator ON relay and is an indication that the Tape has reached its physical end. This prevents further operation of the Card Reader for the purpose of recording on Tape.

Refer to Fig. 2*ai*, where signals on the lines START INTLK and RING CARRY feed to an AND circuit **280*d*. The signal on line START INTLK is positive, as explained above, when the Core Buffer contains a card image and is ready to be read out. Then as information is read out of the Core Buffer and End Carry signal occurs from the thyratron ring. The line RING CARRY then goes positive. It should be noted that the signal on the line RING CARRY goes positive 13 times for each Card cycle, 12 being the End Carriers from the Row Memory portion of the operation wherein a count is made of the binary 1's in each row of the card and the 13th End Carry when the last column of the Card Image is read out of the Core Buffer. Thus, the signal on line RING CARRY occurring when the signal on line START INTLK is positive passes through the AND circuit 280*d*, a grounded grid amplifier 281*d* and a cathode follower 282*d* to line BUFFER CARRY. This latter signal is restricted to the Carry Output which occurs when the Card Image is read out of the Core Buffer. A positive signal on the line BUFFER CARRY passes via an inverter 287*d* to turn ON a trigger 288*d*. Trigger 288*d*, going ON, emits a positive output via a cathode follower 289*d* to line PICK READ RELAY, which signal is effective to energize the Read relay and thus call for another Card cycle. Due to energizing the Read relay another Card cycle is entered and another Card Image is read into the Core Buffer. The second Card cycle is entered for certain at about 330° of the previous Card cycle. Therefore as 357° of a Card cycle is reached, it is assured that the second Card cycle is in progress. At that time a signal occurs on the line RESET BUFFER CHECK REGISTER and is passed via an inverter 286*d* to turn OFF the trigger 288*d***. The Read Relay has, at this time, accomplished its purpose of calling for another Card cycle through circuits, described above.

The positive signal on line START INTLK also passes via an inverter **285*d* to turn ON a trigger 283*d*. The trigger 283*d* going ON, emits a positive signal via cathode follower 284*d* to drive line START INTLK positive. The positive signal on the latter line indicates that the Start Interlock is ON and the Core Buffer is ready to be read out. As the Core Buffer is read out, a signal on line RING CARRY goes positive as the last character is read out of the Core Buffer. As mentioned above, this RING CARRY is End Carry following the Start Interlock signal. The fall or trailing edge of the signal on line RING CARRY is effective to turn OFF trigger 283*d***, which remains OFF until such time that the Core Buffer again becomes loaded and the Start Interlock signal goes positive. As stated above, and as described below the information read from cards and stored in the Core Buffer is eventually read out of the Core Buffer and recorded on the Tape.

A general understanding of the Tape Unit and its function may be attained by reference to Figs. 3*a* and 3*b* of the drawings. A pair of tape reels adapted to hold a coil of record tape are intermittently driven to provide a pair of tape loops upon which the mechanism for feeding the tape through the tape sensing head may fall as the tape is fed in either of two directions. A tape reel T10 which we shall designate as a file reel is mounted on a drive spindle T12. It may be assumed that the reel T10 has thereon a coil of tape T14 on which data has been recorded and from which the tape is to be fed through a tape reading and recording head unit T16. In its FORWARD feed direction, the tape will pass through the tape reading head unit T16 and will be coiled on a second reel T18 which may be designated herein as a machine reel. The machine reel T18 is mounted on a drive spindle T20. The file reel drive spindle T12 and the machine reel drive spindle T20 are selectively rotated in either direction by a pair of motors T22 and T23. Motor T22 is known as the FORWARD motor, while motor T23 is the BACKWARD motor. The motors T22 and T23 normally impart constant drive to a pair of electromagnetic clutch mechanisms mounted on each of the drive spindles T12 and T20. An electromagnetic brake is mounted on each of the drive spindles to provide, among other things, that the spindles T12 and T20 may be locked against rotation. The nature of the electromagnetic clutches and the electromagnetic brake will be developed in greater detail at a later point herein.

Upon selective clutching of the electromagnetic clutch mechanisms in drive relation to the drive spindles T12 and T20, these spindles and consequently the tape reels attached thereto may be caused to reel or unreel tape from the coil thereon.

Since the machine is designed for high speed feed of tape through the tape head unit T16 and very rapid accelerations (i.e. STARTING and STOPPING) it is important that the tape be provided with little load or mass thereon, and to this end the driving mechanism for the reels T10 and T18 provides a pair of tape loops disposed in a pair of tape control vacuum columns T24 and T26. Each of the columns T24 and T26 has therein means responsive to the position of the respective tape loops for maintaining a relatively stable position of these loops within the columns. The loop sensitive means within the vacuum columns T24 and T26 control the reel drive mechanism in such manner that the loops, so to speak, are self-compensating. The tape reel drive mechanism for each reel operates independently of the other, and both reels are driven independently of feed tape through the tape head unit T16.

Tape from the loop supply in the vacuum columns T24 and T26 is driven through the tape head unit T16 by means of a pair of normally constantly rotating tape DRIVE capstans. In Fig. 3*a* a tape DRIVE capstan T28 may be deemed to be constantly rotated in a clockwise direction, and may consequently be designated as the BACKWARD DRIVE capstan. A similar constantly rotating capstan T30 may be deemed to be constantly driven in a counterclockwise direction and may, therefore, be designated as the FORWARD DRIVE capstan. In connection with the DRIVE capstans T28 and T30, there are provided a pair of tape moving idler pulleys T32 and T34. The pulley T32 is adapted to move a tape trained thereabout into DRIVING contact with the BACKWARD DRIVE capstan T28, while the tape moving pulley T34 is adapted to move a tape trained thereabout into DRIVING contact with the FORWARD DRIVE capstan T30. As will be pointed out more fully as the description hereof proceeds, the tape moving idler pulleys T32 and T34 are mounted on a common linkage system which is so designed as to impart the proper related movement to the pulleys for selectively DRIVING a tape either in a FORWARD or a BACKWARD direction through the tape head unit T16.

A non-rotary STOP capstan is also associated with each of the tape moving idler pulleys, so that these pulleys may be moved into contact with their related STOP capstans to hold the tape stationary. Thus the idler pulley T32 has associated therewith a STOP capstan T36 which we shall designate herein as the FORWARD STOP capstan, and the tape moving idler pulley T34 has associated therewith a STOP capstan T38 which we shall designate as the BACKWARD STOP capstan.

To make alignment easier, DRIVE capstan T28, idler pulley T32 and STOP capstan T36 are all mounted on one cyclinder T39*a* which in turn is mounted in the main plate T13. For the same reason DRIVE capstan T30, idler pulley T34 and STOP capstan T38 are all mounted on a cylinder T39*b* in the main plate T13.

*Clutches and brakes*

The mechanism for driving the tape reels T10 and T18 may now be referred to in connection with Figs. 3*c*, 3*d* and 3*e* of the drawings. The spindles T12 and T20 are mounted for rotation in a frame member T40 which in turn is mounted on the back of the main plate T13. The spindle T12 has mounted thereon an electromagnetic file reel brake T42 (Fig. 3*d*), an electromagnetic unreeling clutch T44 and an electromagnetic reeling clutch T46.

The machine reel spindle T20 has mounted thereon an electromagnetic machine reel brake T48 (Figs. 3*b* and 3*d*), an electromagnetic reeling clutch T50 and an electromagnetic unreeling clutch T52.

The drive rings of the clutch elements T44—T52 are adapted for continuous rotation under the influence of the drive motors T22 and T23.

By reference to Fig. 3*c* of the drawings it will be seen that the FORWARD and BACKWARD DRIVE motors T22 and T23 are mounted on supporting structures T54 and T56 respectively, in such position that the motor shafts T58 and T60 respectively extend forwardly into substantially vertical alignment with their related magnetic clutch structures.

By reference to Fig. 3*d* of the drawings it will be seen that the first pair of clutches T44 and T50 are in substantial, transverse alignment on their respective shafts and that the second pair of clutches T46 and T52 are also in substantial, transverse alignment on their respective shafts. The clutches T44 and T50 are driven in a clockwise direction by the motor T22 through a drive belt T22*a* while the clutches T46 and T52 are driven in a counterclockwise direction by the motor T23 through a drive belt T23*a*, the motor shaft T58 having a normal counterclockwise rotation and the motor shaft T60 having a normal clockwise rotation.

Noting Fig. 3*a* of the drawings, it may be seen that the file reel T10 is disposed for reeling tape thereon when driven in a counterclockwise direction, while the machine reel T18 is disposed for tape winding upon clockwise rotation. In light of this arrangement, the clutch T46 operates as a reeling clutch for the file reel T10 while the clutch T52 operates as an unreeling clutch for the machine reel T18. By the same token the clutch T44 operates as an unreeling clutch for the file reel T10, while the clutch T50 operates as a reeling clutch for the machine reel T18.

The file reel brake T42 and the machine reel brake T48 perform dual functions. They act as brakes to lock their respective shafts against rotation and also act to feed tape slowly during LOAD-REWIND and UNLOAD operations as will be described hereinafter.

Fig. 3*e* of the drawings illustrates the specific nature of the brake and clutch units. These units are of identical structure, and a description of the clutch T50 will therefore suffice as a description of all. A driving member T64, including the ring or shell T50, is mounted on the shaft T20 for free rotation thereon. The driving member includes an end plate T66 in which is mounted a pair of commutator rings T68 which provide a current path for an electromagnetic coil T50*a* mounted within an annular recess in the driven member T64 and held therein by an annular plate T72. The opposite face of the structure has fixed thereto a closure plate T74. Suitable hub rings T76 support the driving member for rotation on the shaft T20.

A driven member T78 is spaced from and disposed between the annular plate T72 and the closure plate T74. The driven member T78 is keyed to the shaft T20 by means of a suitable keying structure T80.

It will be apparent now that when the driving member T64 and the driven member T78 are caused to rotate the unison, drive will be imparted to the shaft T20. Such drive coupling is achieved through the use of iron powder disposed between the driving member T64 and the driven member T78. The circumference of the annular plate T72 is such that its periphery is spaced from the inner wall of the recess formed in the driving member T64. This in effect forms an annular channel adapted to receive an inturned flange T84 of the driven member T78. The inturned flange T84 is so positioned as to provide a substantially equal space on opposite faces thereof in reference to the oppositely disposed walls of the annular channel. Iron powder in a sufficient amount to substantially fill the remaining space of the channel will serve to "freeze" the iron powder and thereby clutch the inturned flange T84 of the driven member T78 to the driving member T64 of the clutch structure whenever the coil T50*a* is energized.

Centrifugal force acting on the iron powder ordinarily maintains the powder in the channel adjacent the inturned end T84 of the driven member T78. However, in order to avoid possibility of the loss of the powder into the bearing structure of that assembly, the annular plate T72 is provided with an annular rib T86—T88 which extends into an annular groove T88—T84 on the inner face of the driven members T78. The annular rib T86—T88 is outwardly slanted to provide a trough for powder that may find its way inwardly along the clutch structure. A similar rib and trough is forced on the outer face of the driven member T78 for preventing passage of powder inwardly along the outer face of the driven member. Any residual particles of powder will be caught in a groove T92 that is formed in the inner face of the driven member near the axial portion thereof.

The commutator rings T68 are in contact with a brush T94 carried on the end of a resilient contact strip T96 which is connected into the control circuit by means of terminal screws T98 (Fig. 3*d*).

The clutches at the rear end of the spindles T12 and T20 are of the same construction as that described hereinabove, and their mounting on their respective shafts is the same except that they are reversed so that the end plate T66 is oppositely disposed to present the commutator rings in a more accessible position. It now follows that the energization of the coils T44*a*—T52*a* (corresponding to clutches T44—T52) will result in the corresponding FORWARD or BACKWARD drive of the respective spindles T12 and T20.

The brake assemblies T42 and T48 are also constructed substantially like the clutch assembly just described, and the manner of mounting these on their respective shafts is also the same with the exception that ring gears T100 and T101 carrying gear teeth T102 and T103 respectively are affixed around the closure plates T74 to the brake assemblies T42 and T48 respectively. The gear teeth T102 and T103 mesh with worm gears T104 and T105 respectively (Fig. 3*c*) fixed to shafts T106 and T107 respectively. Fixed to the top end of shafts T106 and T107 are gears T108 and T109 respectively with worm gears T110 and T111 respectively on a shaft T112 of a LOW SPEED motor T114. The rotation of LOW SPEED motor T114 will cause the rotation of worm gears T110 and T111 which will effect the rotation of worm gears T104 and T105 respectively which in turn will slowly rotate gear plates T100 and T101 respectively. Since the gears T110 and T111 rotate in the same direction because they are on the same shaft T112, gears T110 and T111 with which they mesh will always be rotated in the same direction. Thus if gears T104 and T105 on the shafts T106 and T107 respectively are rotating clockwise, gear plates T100 and T101 will rotate counterclockwise and clockwise respectively. Then energizing the coils T42*a* and T48*a* of the brakes T42 and T48 respectively will cause the shafts T12 and T20 respectively, and therefore the reels T10 and T18 to rotate in the direction of the gear plates T100 and T101. Reversing the direction of rotation of LOW SPEED motor T114 will cause reels T10 and T18 to rotate clockwise and counterclockwise respectively. This low speed rotation of the reels is used for feeding tape into and out of the columns during the automatic LOAD-REWIND and UNLOAD operations of the tape feed machine, as will be more fully described hereinafter.

It is apparent that a worm gear may act as a brake where an attempt is made to rotate the gear with which the worm gear is in mesh. Thus, if the LOW SPEED motor T114 is unenergized, worm gear T104 is stationary and it acts to prevent ring gears T100 and T101 from rotating. Therefore, when the coil in the brake assembly associated therewith is energized, the clutch is engaged and the spindles T12 and T20 are held against rotation. As will be seen at a later point herein, the control circuit is such that drive through either of the clutches on a drive spindle will take place only upon deenergization of the associated brake assembly coil, and that ordinarily the coil in the brake assembly will be energized to hold its associated spindle against rotation when the clutch coils are deenergized.

*Control column*

It has been mentioned heretofore that the position of the tape loops in control vacuum columns T24 and T26 is utilized to control the rotary movement of the tape reels. Herein, by way of example, there has been illustrated a vacuum switch control system for achieving this objective. The control columns T24 and T26 are of the same construction, and the specific nature thereof may best be seen in Figs. 3*f* and 3*g* of the drawings. In these figures of the drawings is illustrated the control column T24 shown at the left in Fig. 3*a*. However, since the column T26 is of the same construction, a description of Figs. 3*f* and 3*g* will serve as a description of both control vacuum columns. The column herein illustrated comprises a pair of side walls T116, a back panel T118, a transparent face panel T120 and a bottom wall T122, all joined together in airtight contact.

At the base of the columns T24 and T26 is a header T124 with which the columns communicate. The header T124 is connected with a vacuum pump T126 (Fig. 3*a*) adapted to be driven by a suitable motor VPM. The foregoing provides a structure by means of which the control columns T24 and T26 may be evacuated when the upper ends thereof are closed against the atmosphere. To detect the presence of a vacuum, a bellows T128 (Figs. 3*a* and 3*g*) is provided which is adapted to collapse when a vacuum is present in the columns allowing the contacts of a vacuum supply switch T120 to close.

As the tape comes from the file reel T10, it passes over a guide idler T132, down into the control column T24, up around the idler pulley T32, across and under an idler T134 which is mounted on a cover T136 of the head T16. The tape then passes between the READ/WRITE head unit T16 and the head cover T136, under an idler T138 on the cover T136, from which it passes over the idler pulley T34, down into the control column T26 and up over a guide idler T140, to machine reel T18. The idlers, pulleys and capstans have been arranged on the machine in the position shown in Fig. 3*a* so as to best perform automatic LOADING, UNLOADING and RAPID REWIND, as will be described hereinafter.

The side walls T116 of the vacuum columns T24 and T26 are of a width substantially equal to the width of the tape T14. When a tape loop is formed, therefore, in either of the vacuum columns T24 or T26, the oppositely disposed marginal edges of the loop will be in substantial contact with the back plate T120 of the respective vacuum columns. The back of the tape in the tape loop is spaced from the side walls of the vacuum columns through substantially the entire length of the loop but the bight of the loop is in substantial contact with the side walls. This disposition of the tape loop within the vacuum columns T24 and T26 is assured by the tape guide structure. The horizontal distance between the outer periphery of the guide idler T132 and the drive capstan T28 is somewhat less than the spacing of the inner faces of the column side walls T116. The same is true of the horizontal spacing of the guide idler T149 and the drive capstan T30 at the right of the structure.

The particular horizontal spacing of the guide idlers and their associated drive capstans determine the spacing of the tape bights at the entrance to the columns, and the back of the tape will be spaced slightly from the column side walls through the major portion of the tape loops, the loops, however, widening out at their lower ends to contact the side walls of the columns, thereby forming an air seal between the lower portion of the tape loop and the column walls.

Spaced along the length of each of the control columns T24 and T26 are two vacuum operated switches, the details of which are shown in Figs. 3*h* and 3*i*. In Fig. 3*a* of the drawings the vacuum switch RUV is the right upper vacuum switch, while the switch RLV is the right lower vacuum switch. In similar fashion the control column T24 has a left upper vacuum switch LUV and a left lower vacuum switch LLV.

The vacuum switches each have a normally closed contact point and a normally open contact point. The switches communicate with the interior of their respective control columns through an aperture in the back plate T118 thereof. By reference to Fig. 3*i* it will be seen that the switch structure is encased in a shell T142 which fits tightly against a base plate T144, the base plate being held behind the back panel T118 of the control column so that a cylindrical aperture T146 of the back panel registers with a cylindrical passage T148 in the base T144 of the switch structure. Within a cavity formed between the base plate T144 of the switch structure and an overlying cover T150 is a pressure responsive diaphragm T152 to which a contact operating shaft T154 is attached, this connection between the diaphragm and the shaft T154 being airtight. Adjustably secured to the opposite end of the contact operating shaft T154 is a spring contact finger T156 having contact points thereof adapted to contact corresponding points on fixed contact fingers T158 and T160. Outward deflection of the diaphragm T152 under the influence of atmospheric pressure when its associated control column is evacuated will cause the points on the contact fingers T158 and T160 to transfer.

For the sake of uniformity herein it may be assumed that the contact carried on the finger T158 is a normally closed contact while the contact on the finger T160 is a normally open contact. Furthermore, the contact on the arm T158 in Fig. 3*i* may be designated as the LUV–1 contact, whereas the contact on the arm T160 may be designated as the LUV–2 contact. A similar system of numbering will be applied to the other vacuum switches when the circuit description is rendered in connection with Fig. 3*aj* of the drawings.

Under the foregoing conditions, any time that the diaphragm T152 is subjected to vacuum within the vacuum columns, atmospheric pressure on the opposite side of the diaphragm will cause transfer of the switch points, i.e. the points LUV–1 of Fig. 3*i*, for example, will open, while the points LUV–2 will close.

Electrical connections with the switch blades are made through a connecting bushing T162 at one end of the base plate T144.

During normal operation of the machine, the tape loops in columns T24 and T26 will be disposed between switches RUV—RLV and LUV—LLV of the respective column pairs. Under these conditions the switches LUV and RUV are subject to atmospheric pressure only, whereas switches LLV and RLV are influenced by vacuum in the columns T24 and T26, the tape loops constituting a column air seal above the switches LLV and RLV.

The device is designed so that the tape loops in the control columns T24 and T26 are maintained between the respective upper and lower vacuum switches. To this end the vacuum switch LUV is in the control circuit of the magnetic coil T44*a* in the unreeling clutch T44, while the vacuum switch LLV is in the control circuit for the magnetic coil T46*a* of the reeling clutch T46. In like manner the vacuum switch RUV is in the control circuit of the unreeling clutch T52, while the vacuum switch RLV is in the control circuit for the reeling clutch T50.

Should either tape loop drop below its lower vacuum switch, such switch will be subject to atmospheric pressure on both sides of its diaphragm T152, causing the contact points thereof to transfer. Consequently, under such conditions the switch LLV will call into action the file reel reeling clutch T46 and the switch RLV will call into operation the machine reel reeling clutch T50.

Such tape loops will be taken up by the reeling action of the respective reels, or either thereof, until the bight of the loop is above the lower control column switch, whereupon the switch will again transfer its contact points under influence of vacuum within the column.

In like fashion the upper vacuum switches LUV and RUV which are subjected to atmospheric pressure on both sides during normal operation of the machine will transfer their contact points when the bight of the tape loop rises above these switches. Under these conditions the upper switches will be subject to the vacuums within their respective control columns. The low pressure on the inner side of the diaphragm T152 will thereupon permit atmospheric pressure on the opposite side to transfer the contact points of the upper switch structure. Upon such transfer the switch LUV will serve to energize the coil T44*a* in the unreeling clutch T44, and the switch RUV will call into action the unreeling clutch T52 whereby the file reel T10 and machine reel T18 respectively, or either one of them, will be rotated to unreel tape therefrom and thereby lengthen the loop in the control columns T24 and T26 respectively until the bight thereof once more drops below the upper switches LUV and RUV.

From the foregoing it will be seen that the operation of the tape reels T10 and T18 is in effect a self-compensating operation whereby the tape loops in the control columns T24 and T26 are maintained in an optimum position. Furthermore, it is apparent that the controls for the reels T10 and T18 are independent one from the other.

The second contact point of each vacuum switch is used to provide a circuit for their respective brake coils. When the control circuit is described, it will appear that a circuit is established through closed points of switches LUV and LLV to energize the coil T42*a* of the file reel brake T42 and that a circuit is provided through closed points of switches RUV and RLV to energize the coil 48*a* in the machine reel brake T48. It is intended that the brake coils be energized whenever the reeling and unreeling clutches are deenergized.

*Tape drive*

The mechanism for driving the tape through the tape head T16 in a FORWARD direction is shown in Fig. 3*m* of the drawings, Figs. 3*n* through 3*r* diagrammatically illustrating the other DRIVE and STOP positions. The DRIVE capstan T30 is constantly driven by means of a capstan motor T164 (Fig. 3*c*) whose shaft T166 rotates in a clockwise direction. The DRIVE capstans T28 and T30 are journaled for rotation in the main plate T13 of the machine, and the shafts T28*a* and T30*a* extend to the rear of the main plate T13 where they have affixed thereto belt pulleys T168 and T170 respectively. A drive belt T172 is trained about the pulley T170, a motor shaft pulley T174 and an idler pulley T176, so that upon clockwise rotation of the motor shaft T166 the capstan shaft T28*a* will be constantly rotated in a clockwise direction while the capstan shaft T30*a* will be constantly rotated in a counterclockwise direction.

By reference to Fig. 3*m* of the drawings it will be seen that the tape moving idler pulleys T32 and T34 are mounted for rotation at the free end of levers T178 and T180 respectively. The inner ends of the levers T178 and T180 are fixed to pivot shafts T182 and T184 respectively. The pivot shafts T182 and T184 are journaled for rocking movement in the main plate T13, and each of these shafts has attached thereto a short link T186 and T188 respectively. The inner, free ends of the links T186 and T188 have pivoted thereto levers T190 and T192 respectively which have their opposite ends pivoted to a common operating lever T194.

With the foregoing structure the tape moving idler pulleys T32 and T34 may be selectively engaged with their related DRIVE capstan and with their STOP capstan. Thus the tape moving idler pulley T32 may be brought into contact with the BACKWARD DRIVE capstan T28 or with the FORWARD STOP capstan T36. The tape moving idler pulley T34 may be selectively engaged with the FORWARD DRIVE capstan T30 or with the BACKWARD STOP capstan T38. The STOP capstans T36 and T38 are eccentrically mounted in the main plate T13 by means of screws T36*a* and T38*a* about which the capstans may be adjusted to vary their braking effect.

In order to impart controlled movement to the tape moving idler pulleys T32 and T34, there has been provided herein a FORWARD-BACKWARD actuator T196 comprising a pair of aligned, high speed relay magnets BACKWARD MAGNET T196*a* and FORWARD MAGNET T196*b*, and a DRIVE-STOP actuator T198 which consists of a DRIVE-STOP moving coil T200 in a field of high flux density caused by a permanent magnet T202. The BACKWARD and FORWARD MAGNETS T196*a* and T196*b* are mounted on a supporting yoke in axial relation to each other and with the provision of a space between the magnets to accommodate a pivoted armature T204 to the free end of which the operating lever T194 is attached by means of a pivot stud T206.

The DRIVE-STOP moving coil T200 has affixed thereto a rod T208 which is connected to the free end of operating lever T194.

When the DRIVE-STOP actuator T198 is energized to repel the DRIVE-STOP moving coil T200 thereof, an upward thrust will be delivered to the rod T208. This will move the linkage to force the tape moving idler pulleys T32 and T34 downwardly and outwardly. When the FORWARD magnet T196*b* is energized, the armature T204 will be attracted thereto and the operating lever T194 will be biased to the right (as in Fig. 3*m*) so that the tape moving idler pulley T34 is engaged with the FORWARD DRIVE capstan T30. This will cause the tape T14 to be driven downwardly into the control column T26.

The foregoing described one of four stable positions into which the tape moving idler pulleys may be biased during normal FORWARD and BACKWARD operations. The three other positions are illustrated in Figs. 3*n*, 3*o* and 3*p* of the drawings.

Fig. 3*n* shows the position of the tape moving idler pulleys for STOPPING tape feed following FORWARD feed of the tape. At this point it may be appropriate to mention that the tape is always pulled through the tape head unit T16 and is stopped by braking the tape at a position behind the tape head unit T16. This will insure sufficient tape tension at the tape head unit T16 at all times.

Reverting to Fig. 3*n* of the drawings, it will be seen that the tape T14 is STOPPED by engaging the tape between the FORWARD STOP capstan T36 and the tape moving idler pulley T32. To achieve this function, the BACKWARD magnet T196*b* must remain energized, but the flow of current through the DRIVE-STOP moving coil T200 is reversed whereby the coil T200 is attracted to the permanent magnet T202. This results in a downward pull on the rod T208. Such pull on the linkage system will tend to raise both tape moving idler pulleys T32 and T34, but since the tape moving idler pulley T32 in the FORWARD DRIVE position was higher than the pulley T34, the idler pulley T32 engages the FORWARD STOP capstan T36 to brake tape movement. Engagement between the tape moving idler pulley T32 and its FORWARD STOP capstan T36 results from the upward bias given to the tape moving idler pulley T32 under the influence of the FORWARD magnet T196*b*.

In Fig. 3*o* of the drawings, the tape T14 is moving in a BACKWARD direction. To bias the tape moving idler pulley T32 into contact with the BACKWARD DRIVE capstan T28, it is necessary to energize the DRIVE-STOP moving coil T200 to cause an upward movement of the rod T208 which moves the linkage so as to force the pulleys T32 and T34 upwardly and inwardly. When the BACKWARD magnet T196*a* is now energized, the armature T204 will be attracted thereto and the operating lever will be biased to the left. Such movement will serve to project the tape moving idler pulley T32 into engagement with the BACKWARD DRIVE capstan T28, whereby the tape T14 is DRIVEN in a BACKWARD direction, i.e., from the machine reel T18 to the file reel T10.

The BACKWARD STOP position of the tape drive mechanism is shown in Fig. 3*p* of the drawings, wherein the tape moving idler pulley T34 is bought into engagement with the BACKWARD STOP capstan T38. To achieve this engagement, the BACKWARD magnet T196*a* must remain energized but the current in the DRIVE-STOP moving coil T200 is reversed, whereby the coil is pulled downwardly so that the rod T208 exerts a downward pull on the operating lever T194 with a consequent upward bias on the tape moving idler pulley T34 into contact with the BACKWARD STOP capstan T38.

Two other stable positions into which the tape moving idler pulleys may be biased are illustrated in Figs. 3*q* and 3*r* which apply to conditions which arise only during LOAD and UNLOAD operations in a manner to be described hereinafter.

Fig. 3*q* shows the tape moving idlers in the UNLOADED condition, away from both the DRIVE and STOP capstans, in a position to permit easier threading. To achieve this position, the circuit containing both the BACKWARD and FORWARD magnets T196*a* and T196*b* must be opened to deenergize both magnets so that armature T204 will be midway between magnets T196*a* and T196*b*. When the DRIVE-STOP moving coil T200 is energized to cause an upward movement of the rod T208, the linkage will move to force the tape moving idlers downwardly and outwardly. In Fig. 3*q*, the DRIVE capstans T28 and T30 are shown dotted to indicate that they have been retracted into the frame and are thus out of the way of the idler pulleys T32 and T34 respectively.

In Fig. 3*r* of the drawings, both the idler pulleys T32 and T34 are shown during a LOAD operation, against the STOP capstans T36 and T38 respectively. To achieve this dual engagement, the BACKWARD and FORWARD magnets T196*a* and T196*b* must remain unenergized but the current in the DRIVE-STOP moving coil T200 is reversed, whereby the coil is pulled downwardly so that the rod T208 exerts a downward pull on the lever T194 with a consequent upward bias on the tape moving idler pulleys T32 and T34 into contact with the BACKWARD STOP capstans T36 and T38 respectively. In this position, the force exerted by each idler pulley T32 and T34 against the STOP capstans is just a fraction (approximately one sixth) of the force exerted by each idler pulley during the normal FORWARD and BACKWARD operations, for a reason to be described hereinafter.

*Semi-automatic threading*

The mechanism and circuits just described indicate means for moving tape at normal speed in a FOR- WARD and BACKWARD direction without explaining how the tape is threaded into the machine.

To thread the tape drive unit, it is only necessary to place the file reel T10 (Fig. 3*s*) on the spindle T12 and manually wind the end of the tape T14 down around the idler T132 straight across around idler T140 up where it is connected to the machine reel T20, as shown in Fig. 3*s*. Comparing Fig. 3*s* wherein the tape T14 is shown in its UNLOADED position, with Fig. 3*a* wherein the tape T14 is shown in its LOADED position, it can be observed that in order to remove the obstacles to easy threading, the drive capstans T28 and T30 must be retracted into the frame T13, the head cover T136 and the head idlers T134 and T138 must be raised, and the idler pulleys T32 and T34 must be lowered.

To insure that the tape T14 is not completely unwound from the reel when the tape is being driven, the tape is provided with an aluminum strip fastened close to each end (see Fig. 3*ab*) which is sensed to indicate the start point and end point of the tape. The start point is hereafter to be referred to as the LOAD POINT and the end point as the TAPE INDICATOR POINT. A TAPE INDICATOR POINT aluminum strip T210 (Fig. 3*ab*) is placed far enough away from one end of the tape so that the tape will not unwind from the file reel T10 during a FORWARD operation and a LOAD POINT aluminum strip T212 is located from the other end of the tape so that the tape will not unwind during a BACKWARD operation. The LOAD POINT aluminum strip T212 and the TAPE INDICATOR POINT aluminum strip T210 are sensed, in a manner to be described hereinafter, by photocells in the head cover T136.

In LOADING the machine, the machine reel is manually rotated clockwise until the LOAD POINT aluminum strip T212 has moved past the tape head T16.

To start the machine at its LOAD POINT it is now only required that a LOAD-REWIND button LR on the front panel (Fig. 3*a*) be actuated and the LOW SPEED motor T114 will slowly rotate the file reel T10 clockwise and the machine reel T20 counterclockwise, thereby feeding tape T14 into each of the columns. The head cover is also lowered and then the drive capstans T28 and T30 are moved forward from their retracted position. An indication is then automatically given by the machine which feeds the tape BACKWARD until the LOAD POINT T212 is reached, at which time the machine stops in its LOADED position and signals that it is READY for normal FORWARD operation.

*Photosensing of load and tape indicator points*

A photosensitive device T214 (Fig 3*m* and Fig. 3*ab*) is located within the head cover T136 (Fig. 3*m*) so as to enable it to detect the LOAD POINT aluminum strip T212 (Fig. 3*ab*), while the TAPE INDICATOR POINT aluminum strip T210 is detected by a similar photosensitive device T216. Device T214 comprises a block T218 with two diagonal grooves T220 and T222 cut so as to meet at an opening T224 at the bottom of the block T218. A LOAD POINT photocell T226 in groove T220 receives light reflected off the surface of the tape T14 through the opening T224 from a LOAD POINT light bulb T228 in groove T222. Device T216 includes similar mechanisms but used for detecting the TAPE INDICATOR POINT, comprising a light bulb T230 and a photocell T232 (not shown in Fig. 3*ab*).

The LOAD POINT and TAPE INDICATOR POINT photocells T226 and T232 respectively are photocell devices of the well-known type, wherein a change in light intensity on the photocell changes the electrical conductivity thereof. The tape used in the machine is made of cellulose acetate which is a poor reflector of light in the range of the spectrum in which the photocell is sensitive. The photocells used may be considered variable resistance devices because when the light shining on a photocell is reflected off the tape, the photocell has a high resistance, but when the light shines directly into the photocell or is reflected off the aluminum strips, the photocell resistance is low. When an aluminum strip passes under the photocells, the amount of light received by the photocell reflected off the aluminum strip will increase enough to operate circuits to be described hereinafter.

The sensing of the LOAD POINT aluminum strip T212 will operate circuits to be described, which STOP the tape. The TAPE INDICATOR POINT aluminum strip T212 could also operate on circuits to STOP the tape, but since circuits will be described which enable the tape feed machine to be part of the CARD READER, the TAPE INDICATOR POINT aluminum strip T210 is shown in the drawings as operating a circuit.

*Rapid rewind*

Another novel feature of the tape feed machine is the ability to REWIND tape at a speed much greater than that of the normal BACKWARD operation. In order to perform this RAPID REWIND operation, the tape must be brought to the UNLOAD position shown in Fig. 3*s*. This is necessary because since during a RAPID REWIND operation, constant speed past the magnetic head T16 is not required, the tape can be pulled out of the columns and removed from the capstans and idlers to provide the least possible amount of interference and friction.

From Figs. 3*b*, 3*c*, and 3*d*, it may be seen that the reeling clutch T46 is operatively connected through a drive belt T234 to a pulley T235 of a RAPID REWIND motor T236 which is selectively rotatable in a counterclockwise direction (Fig. 3*c*). When the tape is in the UNLOAD position of Fig. 3*s*, the FORWARD and BACKWARD motors T22 and T23 are not running. If a RAPID REWIND operation is desired, the RAPID REWIND motor T236 is energized and reeling clutch T46 is lightly energized as will be more fully described hereinafter. The energization of reeling clutch T46 causes the counterclockwise rotation of file reel T10 to effect a REWINDING of the tape. Since the sudden starting of the RAPID REWIND motor T236 will snap the tape, a light energization of reeling clutch T46 is effected, to allow clutch T46 to slip until the tape comes up to the speed of the RAPID REWIND motor T236.

During a RAPID REWIND operation the tape is moving so fast that if an attempt is made to STOP it by use of the LOAD POINT aluminum strip T212, the tape will snap. Means have been provided which indicate when the LOAD POINT is approaching, and which act to shut off the RAPID REWIND motor T236 and apply a light brake to bring the tape to a gradual STOP. The machine then goes automatically into a normal BACKWARD operation until the LOAD POINT aluminum strip T212 is sensed at which time the tape will STOP at the LOAD POINT, READY for normal FORWARD operation. This indicating means includes an arm T238 (shown in Fig. 3*a* and also a rear view is shown in Fig. 3*aa*) carrying a roller T240 which rides on the tape T14 wound around the machine reel T18. The arm T238 is fastened to a pin T242 pivoted in the main plate T13. The pin T242 extends through the main plate T13 through a support member T244 (Fig. 3*aa*) and through a disc T246 having a hub T248 which is fastened to the pin T242. Fastened to the disc T246 is a lever arm T250 which extends from it so that the flat end of an adjusting screw T252 can cooperate with a contact arm T254 of the arm contacts T256.

When the tape is at the LOAD POINT, arm contacts T256 are closed. As the tape is wound around machine reel T18, the roller T240 will be raised, rocking arm T238 clockwise (counterclockwise in rear view Fig. 3*aa*) until arm contacts T256 open. The point at which the arm contacts T256 transfer, is known as the TRANSFER POINT T258, and is indicated in Fig. 3*ab*, as the dividing line between a RAPID REWIND AREA and a BACKWARD AREA. When the arm contacts T256 are closed, the tape T14 is said to be in the BACKWARD AREA, which indicates that if the LOAD-REWIND button LR were pressed, the tape would return to LOAD POINT by going directly into a normal BACKWARD OPERATION. When the arm contacts T256 are open, the tape T14 is said to be in the RAPID REWIND AREA, which indicates if the tape T14 is in that area at the time of a LOAD-REWIND operation, the tape would return to LOAD POINT by first going into RAPID REWIND.

Since it takes a certain fixed time to UNLOAD the tape, bring the RAPID REWIND motor T236 up to speed, stop the motor T236, and then LOAD the tape again, there is a point where the amount of tape necessary to be rewound can be rewound faster by a normal BACKWARD operation than by a RAPID REWIND operation. This is the ideal point for the TRANSFER POINT. It may be necessary, however, to consider the fact that the TRANSFER POINT is also the point at which the RAPID REWIND motor T236 is shut off and the light brake applied. Thus the TRANSFER POINT T258 must also be far enough away from the LOAD POINT to insure that when the RAPID REWIND motor T236 is deenergized at its maximum speed, there is enough time left so that the tape STOPS before getting to LOAD POINT. It is to be noted here, that during a RAPID REWIND operation, the LOAD POINT and TAPE INDICATOR POINT lights T228 and T230 respectively, are disabled in a manner to be presently described.

To insure that the RAPID REWIND motor T236 has come to a stop before the tape is LOADED in preparation for the normal BACKWARD operation, a reset timer TMA (Fig. 3*ac*), which is a commercial type adjustable type reset timer, is energized by the closing of arm contacts T256 (Fig. 3*aa*) by circuits to be described later. The reset timer TMA, when energized, begins to rotate an arm T260 counterclockwise against the urging of a spring T262. Arm T260 continues to rotate, as long as it is energized, until it enters into engagement with a member T264 which carries one of the contacts of reset timer contacts TMA–1 thereby closing said contacts TMA–1 to start the LOW SPEED motor T114 in a manner to be presently described. Contacts TMA–1 are held in the closed position until reset timer TMA is deenergized, at which time, arm T260 returns to its original position (shown in Fig. 3*ac*) under the influence of spring T262.

*Feeding tape into and out of columns*

As previously described in UNLOADING and LOADING, it is necessary to be able to respectively take tape out of, and feed tape into, the vacuum columns T24 and T26. To feed tape into the vacuum columns from the UNLOAD position shown in Fig. 3*s*, means have been described for rotating the gear plates T100 and T101 (Figs. 3*c* and 3*d*) clockwise and counterclockwise respectively by energizing the LOW SPEED motor T114. Energizing the brakes T42 and T48 then causes the reels T10 and T18 to rotate clockwise and counterclockwise respectively as previously described. As the reels rotate, they slowly fed tape, and a flow of air from the columns aided somewhat by gravity urges the tape down towards the columns, causing a loop to be formed over each column. Since the amount of tape on each reel is rarely the same, the amount of tape fed by the reel with the most tape will be greater. As an example, Fig. 3*s* shows a condition where there is more tape on reel T10 than on reel T18. Fig. 3*t* then represents the same condition as Fig. 3*s*, i.e. that there is more tape wound around reel T10 than reel T18. Since more tape is around reel T10, one revolution of the reels will cause more tape to be fed by reel T10 than reel T18. Thus, the tape under reel T10 in Fig. 3*s*, will enter the column T24 before the tape under reel T18 enters column T26. Fig. 3*t* illustrates the point at which the tape has entered column T24 stopping the flow of air in column T24. Even though the flow of air stops, there is a vacuum created in the column T24 which exerts a greater downward force on the tape and tends to pull all the tape from one column into the other. However, at the same time that the tape enters the column T24, a flapper valve (to be presently described) is actuated, operating a circuit for placing the pulleys T32 and T34 into the previously described STOP position of Fig. 3*r* to prevent the tape from being pulled away from column T26. The LOW SPEED motor T114 continues to feed tape into both columns, and when the tape enters column T26, the flow of air in that column is stopped. When the head cover T136 comes down, the LOW SPEED motor T114 stops, the drive capstans T28 and T30 come out, and then the tape goes into normal BACKWARD, looking for LOAD POINT, all in a manner to be described hereinafter.

As previously mentioned, flapper valves are provided to operate a circuit for preventing all the tape from entering one column. These flapper valves also act to indicate when the tape has entered a column, to indicate a break in the tape during normal operation and to provide for a limited flow of air for pulling the tape into the columns during a LOADING operation.

In Figs. 3*f* and 3*j*, a flapper T266 is shown fixed to a shaft T268 rotatably mounted within the header T124. The shaft T268 extends above the header T124 (Fig. 3*f*) where a curved member T270 is affixed thereto. Curved member T270 cooperates with a roller T272 affixed to a contact arm T274 which is biased by a spring T276 so that roller T272 is held against curved member T270. On the arm T274 is one contact of left flapper contacts T278. When the tape is out of the columns T24 and the vacuum pump motor VPM is energized, column flapper T266 is pulled into position shown in Fig. 3*j* by the suction of the vacuum pump, with its free end against the rear of the header T124. In this position, the curved member T270 bears against the roller T272 of arm T278 closing the left flapper contacts T278 to indicate the existence of a vacuum and no tape in the column. In Fig. 3*f* it can be observed that there is a slight clearance between the top and bottom edges of the flapper T266 and the inside top and bottom surfaces of header T124. This permits the limited flow of air previously described as being utilized for pulling the tape into the column during LOADING.

When the tape enters a column, the flow of air through the column is shut off creating a vacuum in the column, equalizing the pressure on both surfaces of the flapper T266. The force of the spring T276 against the arm T274 is now greater than that created by the vacuum pump motor VPM against the flapper T266, causing the arm T274 to be rotated counterclockwise. The roller T272 on the arm T274 therefore urges the curved member T270 counterclockiwse rotating it to a position shown in Fig. 3*k* allowing the left flapper contacts T278 to open. Since the flapper T266 is on the same shaft T268 as the curved member T270, it too is rotated, counterclockwise to the position shown in Fig. 3*k*.

Another flapper is located under the right column T26 having associated right flapper contacts T-280 (not physically shown in the drawings) which act to indicate tape in the right column T26.

*Tape break*

It can be understood at this point, that if the tape should break while it is being fed in a normal FORWARD or BACKWARD operation, the tape will come out of the columns, which will cause the flapper to operate to close the flapper contacts T278 and T280. It will be shown hereinafter that the flapper contacts are in circuit which is broken by the opening of the flapper contacts, to STOP the feeding of tape and prevent tape from unreeling onto the floor.

During a RAPID REWIND operation, the tape is out of the columns and some other method must be used to detect a tape break. In Fig. 3*ab*, a block T282 carrying a lamp holder T284 is shown under the photocells in the tape cover. A tape break light T286 (shown schematically in Fig. 3*af*) is located within the lamp holder T284 so that its light rays are directed through an opening T288 (Fig. 3*ab*) onto the TAPE INDICATOR POINT photocell T232, when the head cover T136 is in its raised position. If the tape breaks, the tape break light T286 will shine directly into TAPE INDICATOR POINT photocell T232 to energize a TAPE BREAK relay circuit which will STOP the feeding of the tape.

*Raising the head cover*

The tape head T16 contains a READ/WRITE magnetic head unit T289 (Fig. 3*m*) comprising seven parallel READ/WRITE magnetic heads which READ from and WRITE on the tape, in a manner to be presently described. The tape break light T286 is also contained within the tape head unit T16. The tape head unit T16 has a head cover T136 which is movable in a vertical path in the main plate T13 of the machine and which is under control of the LOW SPEED motor T114. The head cover T136 supports an ERASE head T290 (to be presently described) and the photosensing blocks T214 and T216.

Immediately to the rear of the tape head T16 and slightly thereabove are two apertures T291 and T292 (see particularly Figs. 3*u* to 3*w*) through the face panel T13, axially aligned with two apertures T294 and T296, respectively, through the frame member A41, said apertures providing passage for two rearwardly projecting extensions T298 and T300 respectively from the head cover T136. The extensions T298 and T300 are fixed to a bracket T302 and an internally threaded block T304. The head cover T136 can thus be raised and lowered by moving the block T304 up and down. An externally threaded shaft T306 cooperates with the internal threads of block T304. The shaft T306 is rotatable, but is restrained axially by snap rings H308 and T310 which fix the shaft T306 in relation to the inner race of a ball bearing T312. The outer race of the ball bearing T312 rests on a shoulder of a housing T314, and the outer diameter of the outer race is staked to the housing T314 which in turn is fastened to the main plate T13. Since the housing T314 and bearing T312 are thus fixed, rotation of the shaft T306 will effect the raising and lowering of the block T304, and therefore the head cover T136 and the bracket T302.

Rotation of the shaft T306 is accomplished through a slip clutch T315 by a chain T316 which engages the teeth of a sprocket T318 on the shaft T306. The chain T316 also engages the teeth of a sprocket T320 on the shaft T106 (see Fig. 3*c*) which has been previously described as being rotatable by the LOW SPEED motor T114. Thus, energization of the LOW SPEED motor T114 will cause shaft T106 to rotate, and via chain T316, will rotate shaft T306. A clockwise rotation of shaft T306 will raise, and a counterclockwise rotation of shaft T306 will lower the bracket T302 and head cover T136.

It is important to return the head cover T136 to the same relative position with respect to the READ/WRITE head unit T16 each time the head cover T136 is lowered. A bottom stop arm T322 is fixed to rotate with shaft T306. A stud T324 at one end of arm T322 is adjustably set so that said stud will contact the lower left rear surface of bracket T302 to stop the lowering of head cover T136 after a counterclockwise rotation of shaft T306. A stud T326 at one end of a top stop arm T328 is also fixed to rotate with shaft T306 so that stud T326 will contact the upper right rear surface of bracket T302 to stop the raising of head cover T136 after a clockwise rotation of shaft T306.

To give added accuracy to the positioning of the head cover T136, two studs T330 and T332 are fixed to the housing T314. Fastened to the studs T330 and T332 respectively, are the top ends of tension springs T334 and T336, the other ends of which are connected to the bracket T302. The bracket T302 and therefore the head cover T136 are thus urged upwardly so as to always ride directly in contact with the lower surface of the threads of the shaft T306.

To indicate the position of the head cover T136, a pair of switches are provided for operating electrical circuits to be described hereinafter. When the head cover T136 and the bracket T302 are raised, the upper left surface of the bracket T302 (Fig. 3*u*) engages a projection T338 to effect a closing of the contacts of a normally open HEAD COVER UP switch T340. When the head cover T136 is lowered, the lower left surface of the bracket T302 engages a projection T342 to effect an opening of the contacts of a normally closed HEAD COVER DOWN switch T344.

*Retracting the drive capstans*

Figs. 3*w*, 3*x* and 3*y* of the drawings illustrate the structure of the capstan retracting mechanism. As will presently be described, to retract the drive capstans T28 and T30, a RETRACT SOLENOID T346 (Fig. 3*x*) must be energized. The RETRACT SOLENOID T346 is fixed to the main plate T13 and it has a plunger T348 which is adapted to be drawn into the RETRACT SOLENOID T346 when said SOLENOID is energized. Pivotally mounted within a slot T350 at the top of the plunger T348 are the ends of two links T352 and T354. The top end of link T352 is connected to piston rod T356 which is fastened to a piston T358 which in turn is mounted with the cylindrical unit T360. The piston T358 is urged upwardly by a spring T362 fastened to the top of the cylinder T360 and to the piston T358. The top end of link T354 is pivotally connected to one end of a short link T364, the other end of which is rigidly fixed to an overthrow coupling T366 loosely mounted on a shaft T368. A shoulder T370 on the coupling T366 is urged clockwise (Fig. 3*y*) against a pin T372 on the shaft T368 by a spring T374 fastened to the coupling T366. The spring T374 has its other end fastened to a clamp T376 which is fixed to shaft T368.

Energizing RETRACT SOLENOID T346 attracts the plunger T348 downwardly against the urging of spring T362 and the plunger T348 pulls link T354, rocking short lever T364 and coupling T366 counterclockwise. The action of the spring T374 causes the counterclockwise rotation of coupling T366 to effect a rotation of the clamp T376 and the shaft T368 to which the clamp T376 is fastened. It will presently be shown that a counterclockwise rocking of shaft T368 caused by the energization of RETRACT SOLENOID T346 effects a retracting of the drive capstans. The overthrow coupling T366 is provided so that even if the drive capstans T28 and T30 are in the retracted position, the plunger T348 can be pulled down still further to a position where a latch T378 biased to the right (Fig. 3*x*) by a spring T380 will latch the plunger T348 down. The latch T378 is fastened to the end of an armature arm T381 of a SOLENOID LATCH magnet T382. Energizing SOLENOID LATCH magnet T382 attracts armature arm T382 rocking it clockwise and moving latch T378 to the left. If RETRACT SOLENOID T346 is deenergized, the spring T362 in the cylinder T360 will pull on link T352 and cause the unlatched plunger T348 to move upwardly. The upward movement of plunger T348 causes link T354 to be elevated thereby rocking short link T364 and coupling T366 clockwise (Fig. 3*z*). The shoulder T370 of coupling T366 bears against pin T372 effecting a clockwise rotation of shaft T368 which as will be described presently, causes the return of the drive capstans T28 and T30 to their normally forward position.

Fastened to the shaft T368 are clamps T383 and T384 which bear against forked arms T385*a* and T385*b* respectively. Forked arms T385*a* and T385*b* are loosely mounted on shaft T368 and are held against clamps T383 and T384 respectively by springs T386*a* and T386*b* respectively. Movement of the forked arms T385*a* and T385*b* will move drive capstans T30 and T28 respectively IN and OUT, but a description will be given of the forked arm T386 and capstan T28, which will serve as a description of the means for retracting both capstans. As previously described, the drive capstan T28 (Fig. 3*x*), is fixed to the shaft T28*a* which is journaled for rotation in the cylinder T39*a* in the main plate T13 of the machine, and the shaft T28*a* extends through the rear cylinder T39*a* where its diameter is reduced. Affixed to the reduced diameter of shaft T28*a* is a ball bearing T387 which is partially enveloped by a forklike member T388 which is grooved at one end to accommodate the outer race of ball bearing T387. Member T388 is fixed at its other end to a shaft T389 which is slidably mounted in cylinder T39*a*. A plate member T390 is screwed to form members T388 and bears against the rear of ball bearing T387. The combination of the form and plate members T388 and T390 permits the shaft T28*a* to rotate but can effect a movement of the shaft T28 IN and OUT of the frame. Movement of the fork member T388 towards the rear of the machine will cause the ball bearing T387 to move rearwardly, thereby retracting capstan T28. In moving forward, the plate member T390 bears against ball bearing T387 to move the capstan T28 forward. The shaft T389 carries a pin T391 (Fig. 3*y*) which cooperated with the forked arm T385*b*. Energizing the RETRACT SOLENOID T346 effects a rotation of shaft T368 clockwise (Fig. 3*y*) which will cause the clamp T384 to act against forked arm T385*b* (Fig. 3*x*) which in turn is moved rearwardly (down in Fig. 3*x*). The forked arm T385*a* acts on pin T391 to move shaft T389 back, effecting a retracting of the capstan T28. At the same time, clamp T383 acts on forked arm T385*a* to retract capstan T30 in a similar manner.

A high dwell on a cam T392 fixed to shaft T368 will rotate to the position where it will bear against roller T393 of a CAPSTAN IN switch T394 to indicate that the capstans are IN.

The RETRACT SOLENOID T346 remains energized only for a short while, so that if the latch magnet T382 is energized, to release plunger T378, the shaft T368 will be rotated counterclockwise (as previously described), turning the clamps T383 and T384 away from the forked arms T385*a* and T385*b* respectively. The springs T386*a* and T386*b* tend to make the forked arms T385*a* and T385*b* respectively rotate with the clamps T383 and T384 respectively to rotate shaft T368 and return the capstans T28 and T30 respectively to their normal forward position. The springs T386*a* and T386*b* act as an overtravel device which insures that both capstans T28 and T30 are returned to their maximum OUT position where they are properly aligned for feeding tape, even though the plunger T348 has reached the limit of its upward travel.

Since the capstans T28 and T30 are not moved OUT by direct coupling, but rather depend on the action of the springs T386*a* and T386*b*, two separate switches are provided to indicate a CAPSTAN OUT condition. A high dwell on a cam T395 fixed to the forked arm T385*a* will rotate to the position where it will bear against roller T396 of a RIGHT CAPSTAN OUT switch T397, while a high dwell on a cam T398 affixed to forked arm T385*b* will operate a LEFT CAPSTAN OUT switch T399.

*General relay switch*

The tape feed machine is put into operation by closure of the line switch LS (Fig. 3*ad*) which supplies 208 volt A.C. transformers T (only diagrammatically indicated) from which are derived the +48 volt power supply and the high voltage power supply. Most of the relays, such as those shown in Figs. 3*af*, 3*ag*, and 3*ah* are connected across the +48 volt power supply line, while the high voltage supply provides the various plate voltages, bias voltages, etc. required by the several electronic units. To insure that the high voltages in the power supply are built up to their operating values, a reset timer TMB (not physically shown) is energized by the 208 volt A.C. This reset timer operates in a manner similar to that described for reset timer TMA (Fig. 3*ac*) to provide a delay long enough to allow the high voltages to build up. At the end of the time delay, contacts TMB–1 (Fig. 3*af*) close to complete a circuit from +48 volts, through contacts TMB–1 to energize a POWER ON relay TR17. The appearance of voltage on the +48 volt line also causes a photolight relay TR14 (Fig. 3*af*) to be energized through normally closed UNLOAD relay contacts TR22—1, normally closed REWIND STATUS relay contacts TR35—4 normally closed LOAD-REWIND relay contacts TR3–AU, the LOAD POINT light T228, and the TAPE INDICATOR light T230. The number or letters following the dash (—) after a relay designation (such as TR22—1, and TR3–AU) is a reference to one of the sets of contacts of the particular relay TR22 and TR3 respectively.

The TAPE BREAK light T286 is connected between the blade of the UNLOAD relay contacts TR22—1 and the blade of the LOAD-REWIND relay contacts TR3–AU. During an UNLOAD operation, UNLOAD relay contacts TR22—1 open to activate the TAPE BREAK light T286 by removing the short circuit from across the TAPE BREAK light T286. During a LOAD-REWIND operation, LOAD-REWIND relay contacts TR3–AU transfer, to activate the TAPE BREAK light T286 by removing the short circuit from across it. At the same time, the transfer of LOAD-REWIND relay contacts TR3–AU deactivates the LOAD POINT light T228 and TAPE INDICATOR light T230 by shunting the two lights with a 33 ohm resistor which is an effective short. The 33 ohm resistor is used instead of a no resistance circuit to keep just enough current going through the light to allow them to come on rapidly when the shunt is removed.

The appearance of +48 volts also causes a vacuum pump motor relay HD4 (Fig. 3*af*) to be picked up through normally closed contacts UNLOAD STOP relay contacts TR26P–1. With relay HD4 energized, its normally open contacts HD4—1 (Fig. 3*ad*) are closed, energizing the vacuum pump motor T126. When the vacuum pump motor T126 comes up to speed, the bellows T128 (Fig. 3*g*) collapse, closing vacuum supply switch contacts T130, as previously described. Assuming for the purpose of description, that the machine is being started with the tape already in the columns, thus forming an air seal between the upper and lower vacuum switches, the operation of the vacuum pump motor T126 will create a vacuum in the columns, and open the left flapper contacts T278 (Figs. 3*f* and 3*j*) and the right flapper contacts T280, as previously described. In Fig. 3*af*, it can be observed that the opening of left flapper contacts T278 prevents the energization of a LEFT COLUMN relay TR9 by opening a circuit from the +48 volts, via contacts T278, relay TR9, to ground. When right flapper contacts T280 open, RIGHT COLUMN relay TR10 is prevented from being energized.

A circuit is now completed to energize RUN relays TR1 and TR18 from the +48 volts, through the now closed vacuum supply switch T130, the normally closed LEFT COLUMN SWITCH contacts TR9–AL, normally closed RIGHT COLUMN SWITCH contacts TR10–AL, now closed photolight contacts TR14–AL, now closed POWER ON contacts TR17—1, normally closed tape break relay contacts TR41P–1, and RUN relays TR1 and TR18 in parallel, to ground.

When the RUN relay TR–1 is energized, its associated point TR1–AL closes, completing a circuit for energizing a relay HD1, from +48 volts via RUN relay contacts TR1–AL and MOTORS relay HD1. Energization of the MOTORS relay HD1 causes its HD1—1 contacts (Fig. 3*ad*) to close. It can be observed from Fig. 3*ad* that closure of MOTORS relay contacts HD1—1 closes a circuit to energize the FORWARD and BACKWARD motors T22 and T23 which rotate continuously during normal operation as previously described.

In the position assumed for the purpose of description, (i.e. with the tape in the columns), the drive capstans T28 and T30 are OUT and the head cover T136 is DOWN. Referring again to Fig. 3*af*, since the drive capstans are OUT, CAPSTAN IN switch T394 is open as previously described in regard to Fig. 3*x*, and a circuit is not completed to energize a CAPSTAN IN relay TR7 from +48 volts via switch T394 and relay TR7 to ground. Since the head cover T136 is DOWN, the HEAD NOT DOWN switch T344 opens as previously described, in regard to Fig. 3*u*. A HEAD NOT DOWN relay TR8 (Fig. 3*ag*) is in a circuit from the +48 volt line via the parallel combination of the HEAD NOT DOWN switch T344, the normally open LEFT COLUMN relay contacts TR9–BU and normally open RIGHT COLUMN relay contacts TR10–BU, in series with the HEAD NOT DOWN relay TR8, to ground. Since contacts TR9–BU, contacts TR10–BU and HEAD NOT DOWN switch T344 are open, the application of +48 volts will not energize the HEAD NOT DOWN relay TR8. The capstan motor relay DP2 (Fig. 3*af*) is thus energized by a circuit from +48 volts via normally closed HEAD NOT DOWN relay contacts TR8–AU (Fig. 3*af*), through lead T400, via relay DP2 to ground. HEAD NOT DOWN relay contacts 2R8–AU are closed because relay TR8 has remained unenergized. Energization of capstan motor relay DP2 closes the DP2—1 contacts in Fig. 3*ad* to complete a circuit for energizing capstan motor T164 from the upper line of the T208 volt A.C. line via the now closed MOTOR relay contacts HD1—1, the CAPSTAN MOTOR relay contacts DP2—1, and capstan motor T164, to the lower 208 volt A.C. line.

Thus, it has been shown that closing the line switch LS in Fig. 3*ad* with the tape in the columns, will start the vacuum pump motor T126, the FORWARD and BACKWARD motors T23 and T22, and the capstan motor T164.

*Forward and backward circuits*

As previously described in relation to Figs. 3*m* to 3*r*, energizing the FORWARD control magnet T196*a* and the BACKWARD control magnet T196*b* places the machine in a FORWARD and BACKWARD status, respectively, and if the circuit in which both magnets are in is opened, the machine is in a NEUTRAL status. The circuit for controlling the FORWARD control magnet T196*a* and BACKWARD control magnet T196*b* is shown in Fig. 3*ai*.

Closing of the BACKWARD relay contacts TR33—2, in a manner to be presently described, places the +48 volt supply on the grid of a cathode follower T404, the output of which goes positive and is transmitted to one input of an OR circuit T406. When any of the inputs of an OR circuit goes positive, the output also goes positive, and this positive voltage is applied to the input of a cathode follower T408, the output of which goes positive, causing the voltage on the grid of an inverter T410 to go up. With the grid of the inverter T410 up, the inverter conducts through the BACKWARD control magnet T196*b*, and the normally closed NEUTRAL STATUS relay contacts TR13—1. This will condition the tape moving idler pulley T32 for driving engagement with the BACKWARD drive capstan T28.

Opening BACKWARD relay contacts TR33—2 removes the +48 volt supply from the grid of cathode follower T404 causing, by way of OR circuit T406 and cathode follower T408, a negative shift on the grid of the inverter T410, which stops conducting. At the same time, the voltage at the tapped output terminal of inverter T410 goes up, and this positive voltage is applied to the grid of an inverter T412 which conducts through the FORWARD control magnet T196*a* and the normally closed NEUTRAL STATUS relay contacts TR13—1. This will condition the tape moving idler pulley T34 for driving engagement wtih the FORWARD drive capstan T30.

Since the normally closed NEUTRAL STATUS relay contacts TR13—1 are in a circuit which energizes both the FORWARD and BACKWARD control magnets T196*a* and T196*b*, both magnets can be deenergized, to put the machine in a NEUTRAL status as in Figs. 3*q* and 3*r* by opening NEUTRAL STATUS relay contacts TR13—1.

To accomplish this, a path is completed through relay TR–13 (Fig. 3*ai*) from the +48 volt supply through either LOAD-REWIND relay contacts TR3–BU or TR11–BU to ground. As will presently be described, LOAD REWIND relay TR3 is energized to close contacts TR3–BU only during a LOAD-REWIND operation, and UNLOAD relay TR11 is energized to close contacts TR11–BU only during an UNLOAD operation.

A three position manual switch T414 is shown in Fig. 3*ai*, which permits manual control of the FORWARD and BACKWARD operations. If it is desired to feed tape FORWARD from the file reel T10 to the machine reel T18, the manual switch T414 is pushed counterclockwise. If BACKWARD feed from the machine reel T18 to file reel T10 is required, the manual switch T414 is pushed clockwise, and the tape can be STOPPED by placing the switch T414 in its center position. Rotating the manual switch T414 counterclockwise energizes a DRIVE relay TR34 by completing a circuit from the +48 volts through the now closed RUN contacts TR18—2, the normally closed LOAD-REWIND relay contacts TR31—2, the normally closed side of REWIND STATUS relay contacts TR35—2, the closed manual switch T414, and DRIVE relay TR34 to ground. Contacts TR18—2 were closed when RUN relay TR18 was energized at the start of operation, as previously described. Energizing DRIVE relay TR34 has no effect on BACKWARD relay contacts TR33—2 so they remain open. With DRIVE relay TR34 energized and NEUTRAL STATUS relay TR13 unenergized the machine is placed in the FORWARD status. Actual tape feeding in the FORWARD direction is started by the closing of the FORWARD relay contacts TR34—1 (Fig. 3*ak*) in a manner to be presently described.

Manually rotating the manual switch T414 clockwise, energizes a BACKWARD relay TR33 (Fig. 3*ai*) by completing a circuit similar to that which energized TR34 through the now clockwise manual switch T414 and BACKWARD relay TR33, closes BACKWARD relay contacts TR33—2 which puts the machine in a BACKWARD status, as previously described, and also closes BACKWARD relay contacts TR33—1 to energize the DRIVE relay TR34 by completing a circuit from the +48 volts through contacts TR33—1 through the DRIVE relay TR34 to ground. Energizing DRIVE relay TR34 closes previously mentioned DRIVE relay contacts TR34—1 (Fig. 3*an*) to start actual tape feeding in a BACKWARD direction, as will presently be described.

*Drive-stop circuit*

As previously described, in relation to Figs. 3*m* to 3*r*, current passing through moving coil T200, in one direction, puts the machine in a DRIVE status, and current in the other direction, puts the machine in the STOP status. The circuit for controlling the reversals of current through the moving coil T200 is shown in Figs. 3*ak*, 3*am* and 3*an*. The voltage condition on the output terminal of a DRIVE-STOP cathode follower T420 (Fig. 3*an*) acts to select the direction of current through moving coil T200. The output terminal of DRIVE-STOP cathode follower T420 is connected via a DRIVE lead T422 to an inverter T428, and cathode follower T420 is also connected via DRIVE lead T422, to an inverter T438. When the voltage at the output of the cathode follower T420 is negative, the inverters T428 and T432 go non-conductive, swinging their outputs positive. This positive swing of inverter T428 renders a cathode follower T434 conductive, and the positive swing of inverter T432 renders inverters T436 and T438 conductive. A surge of current passes through the path formed by inverters T436 and T438 in parallel, moving coil T200, and cathode follower T434. This surge attracts the moving coil T200 toward the permanent magnet T202, thereby delivering a downward thrust to the rod T208 which projects the moving idler pulleys T32 and T34 into a STOP status. Inverter T436 has a condenser input which differentiates the positive input voltage so that eventually inverter T436 returns to its non-conductive state. A smaller amount of current then flows through the moving coil T200, but this smaller amount is sufficient to keep the moving coil T200 energized so that the machine remains in a STOP status. The initial surge through inverter T436 is used only to give a rapid starting action to the tape drive linkage.

The output terminal of DRIVE-STOP cathode follower T420 is also connected via DRIVE lead T422, to an inverter T442, the output of which is connected to a cathode follower T444. The output of the cathode follower T444 is connected to a circuit, similar to that described for placing the machine in the STOP status, except that since the voltage at the output of DRIVE-STOP cathode follower T420 is inverted by inverter T442, the voltage at the output of cathode follower T444 will cause current to pass through the moving coil T200 in a direction opposite to that for STOPPING the tape, and place the machine in a DRIVE status at a time when the voltage at the output of the DRIVE-STOP cathode follower T420 is positive. This rapid DRIVE action is obtained because cathode follower T444 controls inverters T446 and T448 to force a surge of current through inverters T450 and T452 in parallel, the moving coil T200, and a cathode follower T454. Thereafter, the discharge of the condenser in the input circuit of inverter T450 limits the current passing through the moving coil T200 in a manner similar to the operation of inverter T436.

The DRIVE-STOP cathode follower T420 may be controlled by the LOAD POINT photocell circuit, a relay contact network, and a signal on line GO from the control circuit of the CARD READER all as illustrated in Figs. 3*ak*, 3*am* and 3*an*.

The DRIVE relay contacts TR34—1 have been previously described as closed whenever the manual switch T414 in Fig. 3*ai* is in either the FORWARD or the BACKWARD position. In Fig. 3*an*, the closing of DRIVE relay contacts TR34—1 completes a circuit from +48 volts, through DRIVE relay contacts TR34—1 to the input of a cathode follower T456. The output terminal of cathode follower T456 thus goes positive, and this positive shift is applied to one input of an AND circuit T458, the second input of which is connected to a line NOT ARRIVING AT LOAD POINT T460 which is normally positive as will be more fully described hereinafter. The output terminal of AND circuit T458 thus shifts positive, and this positive potential is fed via a lead T462 to OR circuit T464, creating a positive shift at its output. The positive shift at the output of OR circuit T464 is fed to the input of the DRIVE-STOP cathode follower T420, shifting its output line DRIVE (T422) positive and causing the machine to go into the DRIVE status as hereinbefore described.

The operation of the DRIVE-STOP circuits by the other relay contacts of Fig. 3*an* will be described hereinafter in conjunction with the UNLOAD and LOAD-REWIND operations.

As previously mentioned the subject tape feeding machine may be an adjunct to a CARD READER. Figs. 3*ak*, 3*am* and 3*an* indicate circuitry utilized by the tape feeding unit so that it may be controlled from the control circuit of the CARD READER. Lines connected to terminal hubs on the left side of Figs. 3*ak*, 3*am* and 3*an* represent inputs to the tape feeding unit from the CARD READER, and lines connected to terminal hubs on the right side represent outputs developed or modified in the tape feeding machine, and for use by the CARD READER.

When the operator is ready to operate the tape feeding machine under control of the CARD READER, the START button ST (Figs. 3*a* and 3*ag*) is actuated, completing a circuit (Fig. 3*ag*) from the +48 volt line via the START button ST, the normally closed RESET relay contacts TR30—1, the normally closed UNLOAD relay contacts TR21—1, and the START relay TR20 to ground. The energization of START RELAY R20, effects the closing of START relay contacts TR20—1 to short out the START button ST and act as a holding circuit for START relay TR20. The closing of START relay contacts TR20—2 (Fig. 3*ak*) completes a circuit from +48 volts via the normally closed contacts of REWIND STATUS relay contacts TR36—1, the now closed RUN relay contacts TR18—3, the now closed START relay contacts TR20—2, to the input of a cathode follower T466. The +48 volt positive shift at the input of cathode follower T466 appears, at its output, as a positive shift which is applied to the line T468 as an indication that the tape drive unit is mechanically READY. The closing of START relay contacts TR20—4 (Fig. 3*ak*) completes a circuit for energizing a READY light T469 from +48 volts via the normally closed REWIND STATUS relay contacts TR36—4, the now closed RUN relay contacts TR18—4, the now closed START relay contacts TR20—4, the READY light T469 to ground. The READY light T469 is on the front panel of the tape feed unit (see Fig. 3*a*). The positive shift on the READY line T468 is applied to one input of an AND circuit T470. A second input of AND circuit T470 is connected to the NOT ARRIVING AT LOAD POINT line T460 which is positive except during the twenty milliseconds that the tape is arriving at LOAD POINT, the significance of which will be described hereinafter. The third input of AND circuit 470 is connected to a line SELECT which goes positive when the particular tape feed unit is SELECTED as will now be described. A SELECT switch T472 is provided for each unit and allows for the connection of ten tape feed machines to a DATA PROCESSING MACHINE control circuit but in the instant case only one tape unit is utilized. A manual switch arm T474 may be made to any ten contact points, each of which is connected to a different input terminal, numbered from 0 to 9. In Fig. 3*ak*, the switch arm T474 is set to a contact which is connected to SELECT SWITCH terminal 0. The DATA PROCESSING MACHINE may SELECT the subject tape feed machine by applying a positive voltage to SELECT SWITCH terminal 0. However, in Card to Tape operation all input terminals are set at +10 volts. This positive voltage is transmitted through grounded grid amplifier T476 and a cathode follower T478 to a SELECT line T480. The positive potential on the SELECT line T480 is applied to one input of the AND circuit T470. The coincidence of the positive signals on the three inputs of AND circuit T470 create a positive output, indicative of SELECT, READY AND NOT ARRIVING AT LOAD POINT. This positive signal is transmitted through grounded grid amplifier T482 and cathode follower T484 to a line T486 which is known as the SELECT AND READY line. The positive signal on SELECT lead T480 is also fed to an inverter T487, causing it to conduct through a 900 ohm resistor and a SELECT light T488 which can be observed on the front panel of the tape feed unit (see Fig. 3*a*).

*Load point circuits*

When the tape is REWINDING, it will STOP when the LOAD POINT aluminum strip T212 is sensed by the LOAD POINT photocell T226. LOAD POINT photocell T226 (Fig. 3*am*) which, as hereinbefore described, may be considered a variable resistance device, has its anode connected to a 240K ohm resistor T489, and its cathode connected to ground. Photocell T226 and resistor T489, in series, are connected in parallel with a 150K ohm resistor T490 and the parallel combination is connected via a 150K ohm resistor T492 to +140 volts. The arrival of the LOAD POINT aluminum strip T212 under photocell T226 will increase the light intensity and decrease the resistance of the photocell T226, as previously mentioned. A decreased resistance results in decreased positive voltage across the photocell T226, and this negative shift is applied from the anode of the photocell to the input of an inverter T494 producing a positive potential on its output terminal. This positive potential is fed to an inverter T496 where it is inverted and fed as a negative voltage to turn ON, by plate pullover, a single shot multivibrator T498 for twenty milliseconds. This twenty millisecond period is considered as the time that the tape is ARRIVING AT LOAD POINT. A twenty millisecond negative pulse is fed from the output terminal of the single shot multivibrator T498 through a cathode follower T500 to the line T460. This line has been referred to as the NOT ARRIVING AT LOAD POINT line T460, because it is only negative during the time that the tape is arriving at LOAD POINT.

A twenty millisecond positive pulse is fed from the output terminal of the single shot multivibrator T498 through a cathode follower T502 to a line T504 which is positive when the tape is arriving at LOAD POINT. The positive pulse is fed via a 20K ohm resistor to the input of an inverter T505 which is caused to conduct and energize LOAD POINT relay TR42P connected in its cathode circuit. LOAD POINT relay TR42P, by circuits to be described hereinafter, effects a STOPPING of the tape.

The twenty millisecond positive pulse on this ARRIVING AT LOAD POINT line T504 is also fed to an input of an OR circuit T506. The second input of OR circuit T506 is fed from a lead T508 at the output of a cathode follower T510, the input of which is connected via LOAD POINT relay contacts TR42P–2 to +48 volts. When LOAD POINT relay TR42P is energized by the tape arriving at LOAD POINT, contacts TR42P–2 close, to apply a positive potential through cathode follower T510 to the OR circuit T506. Since one input goes positive at the beginning of ARRIVING AT LOAD POINT, and the second input goes positive after the time it takes to energize the LOAD point relay TR42P and to close contacts TR42P–2, the output of OR circuit T506 is from the start of ARRIVING AT LOAD POINT to the time that LOAD POINT relay TR42P is deenergized. This positive output indicates the AT LOAD POINT condition and is fed to an input of an AND circuit T512. The second input of AND circuit T512 is connected to the SELECT line T480, and thus the output of AND circuit T512 which is fed through a cathode follower T514 is a UNIT AT LOAD POINT line T516 which may be fed to the control unit of a DATA PROCESSING MACHINE or CARD READER, for indicating a SELECT AND AT LOAD POINT condition.

The AT LOAD POINT line T508 is also connected to an input of an AND circuit T518. The second input of AND circuit T518 is connected to the DRIVE lead T422 which has been described as going positive when the tape is in the DRIVE status. Thus when the tape is AT LOAD POINT and in the DRIVE status, the output of AND circuit T518 will go positive, and this positive potential is fed through an OR circuit T520 to the input of an inverter T522 which starts to conduct and energizes LOAD POINT latch trip relay TR42LT. The energization of relay TR42LT releases the plunger of LOAD POINT relay TR42P, to allow it to return to its unenergized position, to permit it to be picked up when LOAD POINT is reached after a REWIND operation. It is also possible to energize LOAD POINT latch trip relay TR42LT by causing a lead T524 which is connected to the OR circuit T520 to go positive. Lead T524 is connected to output of cathode follower T526, the input of which is connected via the parallel connected RESET relay contacts TR30—3 and UNLOAD contacts TR22—5 to +48 volts. The closing of contacts TR30—3 or TR22—5 during a RESET or UNLOAD operation respectively, applies a positive potential via cathode follower T526 to lead T524, which effects the energization of LOAD POINT latch trip relay TR42LT.

*Control from data processing machine*

The FORWARD-BACKWARD circuits and the DRIVE-STOP circuits may be controlled from a control unit of a DATA PROCESSING MACHINE or from the Tape Timing and Control circuits described above. A BACKWARD AND SET READ STATUS lead (Fig. 3*an*) from the Tape Timing and Control circuits (Fig. 2*s*) is connected to one input of AND circuit T530, the other input of which is connected to the SELECT line T486. When both inputs go positive, the output at SELECT AND BACKWARD lead T532 goes positive. This lead is connected to one of the inputs of OR circuit T406 which, as previously described, puts the machine in a BACKWARD status when one of its inputs goes positive.

A GO lead T534 (Fig. 3*an*) from the CARD READER is connected to one input of AND circuit T536, the other input of which is also connected to the SELECT line T486. When both inputs go positive, the output at SELECT AND GO lead T538 goes positive. This lead is connected to one of the inputs of OR circuit T464, which, as previously described, DRIVES the tape when one of its inputs goes positive. Thus the tape can be fed in a FORWARD direction by the CARD READER by making the GO lead T534 positive and leaving the BACKWARD AND SET READ STATUS lead T528 negative. By making both the GO lead T534 and the BACKWARD AND SET READ STATUS lead positive, the tape will be fed BACKWARD.

*Vacuum switches circuit*

During the time that the tape T14 is actually being fed past the tape head unit T16, it is under the control of the vacuum switches LUV, LLV, RUV and RLV (Fig. 3*aj*). As explained heretofore, these switches are sensitive to the vacuum within the columns T24 and T26, and control the brake and clutch mechanism shown in Figs. 3*d*, and 3*e* of the drawings.

Whenever the tape reels T10 or T18 are at rest, they are under control of their respective brakes T42 and T48. These brake circuits are energized as soon as power appears on the +48 volt power line and even before the transfer of the contacts of the RUN relay TR1. The brake magnet T42*a* is energized from the +48 volt line through the untransferred TR1–AU point (Fig. 3*aj*), the normally closed left reel release contact LRC, the normally closed BRAKE CLUTCH relay contacts TR4–AL through the brake magnet **T42*a*** to ground. The brake magnet T48*a* is energized by a circuit from the +48 volt supply line, through the untransferred RUN relay TR1–BU point through the right reel release contacts RRC, the normally closed brake clutch relay contacts TR4–BL, the brake magnet 48*a* to ground.

When the RUN relay TR–1 is energized, it transfers its TR1–AU and TR1–BU points. Thereafter, the energizing circuit for the brake magnets T42*a* and T48*a* is through the respective vacuum switch structures. Let it be assumed that the tape loops now occupy a normal, relatively stable position between the vacuum switches LUV, and LLV in column T24 and RUV and RLV in column T26, and that a vacuum exists in the columns below the tape loops. Under these conditions the brake magnet T42*a* will be energized by current from the +48 volt supply line, through the now transferred RUN relay point TR1–AU through the normally closed clutch NEUTRAL STATUS relay contacts TR13–AL, through the normally closed point LUV–1 of the upper vacuum switch LUV, through the transferred point LLV–2 of the left lower vacuum switch LLV which is now subject to the vacuum within the column T24, through the left reel release contact LRC, the brake magnet T42*a* and ground.

Energization of the brake magnet T48*a* under these same conditions is effected from the +48 volt power line, through the transferred RUN relay contact TR1–BU through the normally closed clutch neutral status relay contacts TR13–BL, the normally closed RUV–1 contact of the right upper vacuum switch RUV, through the transferred point RLV–2 of the right lower vacuum switch RLV (the vacuum switch RLV now being subject to the rarified atmosphere in the vacuum column T26), through the normally closed right reel release contact RRC, the brake magnet T48*a* and ground.

Should the tape loop in the vacuum column T24 rise above the left upper vacuum switch LUV, that switch will be subjected to the rarified atmosphere in the vacuum column T24 with the result that its LUV–1 point will be opened and its LUV–2 point will be closed. The energizing circuit to the brake magnet T42*a* is broken when the LUV–1 point opens and the circuit to the unreeling clutch magnet T46*a* is closed. The magnet T46*a* will be energized from the power line, through the transferred TR1–AU point, and the now closed LUV–2 point of the left upper vacuum switch LUV will provide a circuit for the energization of the unreeling clutch magnet T46*a*.

When the tape loop in the vacuum column T24 drops below the left lower vacuum switch LLV, that switch will be subjected to atmospheric pressure on both sides thereof, with the result that its contact LLV–2 will open and its contact LLV–1 will close. The first effect of this operation is to break the circuit for the brake magnet T42*a* which is through the LLV–2 point of the switch. Thereafter, upon closure of the LLV–1 point of the left lower vacuum switch, a circuit provided for the reeling clutch magnet T44*a*, this circuit being from the positive side of the line through the transferred RUN relay TR1–AU point, the normally closed NEUTRAL STATUS relay contacts TR13–AL, the normally closed LUV–1 point of the left upper vacuum switch LUV, through the now closed normally closed point LLV–1 of the left lower vacuum switch LLV to the clutch magnet T44*a* and to ground.

The function of the vacuum switches RUV and RLV in the vacuum column T26 is precisely the same as that described in connection with the switches in the vacuum column T24. It is believed that the description thereof need not be labored in this specification since an understanding of the operation should be clear from the specific description given in connection with the vacuum switches in the vacuum column T24. It suffices to say that as the tape loops in the respective columns rise, the upper vacuum switches LUV and RUV will be subject to rarified atmosphere in the column which will cause atmospheric pressure to transfer the points thereof, whereby the unreeling clutch magnets T46*a* and T50*a* are energized to supply tape to the vacuum column. By the same token, when the tape loops drop below the lower vacuum switches LLV and RLV, these switches which have been subjected to vacuum within the respective columns T24 and T26, will transfer their points to establish an energizing circuit for the reeling clutch magnets T44*a* and T52*a*. At such times that the reeling or unreeling clutch magnets are deenergized, the circuit is such, as pointed out hereinbefore, that the brake magnets T42*a* and T48*a* are energized to lock the reels T10 and T18 respectively against rotation. It remains to be noted, however, that the reels T10 and T18 may be selectively released from the influence of their brakes by breaking their energizing circuits through the opening of the reel release contact LRC which is provided for the control of the brake magnets T42*a* or the right reel release contact RRC which is provided for the control of the brake magnet T48*a*.

When it is desired to remove either of the reels T10 or T18, related reel release contacts LRC and RRC are opened. The reel release contact LRC is in the circuit of the brake T42, while the reel release contact RRC is in the circuit of the brake T48. Consequently, opening of the contact LRC will deenergize the brake T42, while opening of the contact RRC will deenergize the brake T48. This will permit free manual turning of either of the reels so released.

During a LOAD-REWIND or an UNLOAD operation, it is necessary to disable the vacuum switches and thereby disable the clutch magnets so that the tape can be moved IN and OUT of the columns as desired. NEUTRAL STATUS relay TR13 has been previously described in relation to Fig. 3*ai*. NEUTRAL STATUS relay contacts TR13–AL and TR13–BL are transferred all during the LOAD-REWIND and UNLOAD operations. Under these conditions, the vacuum switches LUV and LLV are bypassed and brake magnet T42*a* is energized from the +48 volt supply through the transferred RUN relay contacts TR1–AU through the left reel release contact LRC, the normally closed brake clutch relay contacts TR4–AL, the brake magnet T42*a* to ground. The vacuum switches RUV and RLV are bypassed and brake magnet T48*a* is energized by a circuit from the +48 volt line, through the transferred TR1–BU point, through the right reel release contact RRC, the normally closed brake clutch relay contacts TR4–BL, the brake magnet T48*a* to ground.

As previously described, when TR13 is energized, the FORWARD-BACKWARD control is in its NEUTRAL position, and with the DRIVE-STOP circuit in the STOP position, the machine is in the position of Fig. 3*r*. This position is necessary during LOADING because otherwise increased suction caused by the transfer of the flapper valve in the column in which the first tape loop completely enters, would pull the tape out of the other column.

During the LOADING portion of the LOAD-REWIND operation, when the drive capstans are IN, a BRAKE CLUTCH relay TR4 will be energized as hereinafter described to transfer its BRAKE CLUTCH relay contacts TR4–AL and TR4–BL, and lightly energize brake magnets T42*a* and T48*a* respectively. Brake magnet T42*a* is energized by completing a path from a source of +48 volts via a lead T540, through a 1K ohm resistor, normally closed REWIND START relay contacts TR12–AL, the now transferred BRAKE CLUTCH relay contacts TR4–AL, and brake magnet T42*a* to ground. Brake magnet T48*a* is lightly energized by a circuit from the +48 volts through a lead T542, a 1K ohm resistor, normally closed REWIND START relay contacts TR12–BL, the now transferred BRAKE CLUTCH relay contacts TR4–BL, and brake magnet T48*a* to ground. This energization of the brakes is necessary during LOADING to allow the reels to be rotated in such a direction as to feed tape into the vacuum columns and still not be of such force as to tear and break tape if malfunction of equipment causes the tape to stop. The 1K ohm resistor is in the circuit so as to energize the brakes lightly and allow some slippage of the tape to prevent tearage when the idlers T32 and T34 come down.

Going into the RAPID REWIND portion of a LOAD-REWIND operation, the BRAKE CLUTCH relay contacts TR4–AL and TR4–BL will transfer as soon as the capstans are IN; and at the start of REWIND, a REWIND START relay TR12 must be energized, in a manner to be made clear later, to transfer its REWIND START relay contacts TR12–AU, TR13–AL, and TR12–BL. The transfer of normally closed contacts TR12–AL and TR12–BL which are in the circuits that apply the light brakes, open the breaking circuits. At the same time, the transfer of REWIND START relay contacts TR12–AU completes a circuit to lightly energize clutch magnet T44*a* from the +48 volt line through a lead T544, a 1K ohm resistor, the now transferred contacts TR12–AU, the clutch magnet T44*a* to ground. This light energization of the clutch magnet T44*a* is used to permit slippage of the clutch as the RAPID REWIND motor T236 comes up to speed, thus preventing tearage of the tape.

*Read/write circuits*

Since the function of the tape feed machine is to feed tape past the READ/WRITE head, an explanation of the READ/WRITE circuits and the method of recording will now be given.

Reference to Fig. 3*as* shows that the recording on the tape is of a multiple channel variety, more specifically seven channels of recording per width of tape. As indicated, there are seven bits of information corresponding respectively to the seven channels at each of the intervals on the tape. Seven bits across the tape comprise a character, a group of characters comprise a word, a group of words comprise a record, and each tape reel may contain many records.

Referring to Fig. 3*ar*, a U-shaped magnetic head T544 is shown for example, as being provided with a pair of windings T546 and T548. The head T544 may be of any conventional type, having an air gap in close proximity to the tape T550, which is moved past the READ/WRITE head, from the file reel T552 to the machine reel T554. The windings T546 and T548 are arranged to be connected in common to ground; the other connection to winding T546 being from point TR90B, while the other connection to winding T548 is point TR90A. The points TR90A and TR90B of a relay TR90, in combination with the battery B are used to simulate, for purposes of explanation only, the action of electronic circuits which are hereinafter described in detail.

Briefly, when the writing current flows through winding T546, a magnetic flux of one direction flows across the air gap of the head T544 but when the writing current flows through winding T548, a magnetic flux is generated across the air gap of the head T544 in the opposite direction. Current flows through the coil T546 to generate flux in one direction when the switch TR90 is closed to the point TR90B; a circuit being closed from the battery B through point TR90B and the coil T546 to ground. Flux is generated in the opposite direction when the switch TR90 is switched to point TR90A, as shown, a circuit then being closed from the battery B through the points TR90A and coil T548 to ground. While only one head T544 is shown in Fig. 3*ar*, it is understood that there are six other identical heads adjacent to one another in a direction perpendicular to the line of travel of the tape. These seven heads act independently of one another and it is the combination of the information stored upon the tape by these seven heads which, according to the code used, can represent certain characters. The seven heads are actually the READ/WRITE head unit T289 of Fig. 3*m*.

Referring to Fig. 3*aq*, particularly to the uppermost curves thereof, there is represented the writing pattern upon one section of tape for the tracks designated as 1, 2, 3, 4, 8, A, B and C. The writing is done, for example, at intervals N, P, Q, S, T, U and V. Let it be assumed that current flow through a coil for the head of track #1 is already in a direction causing a positive flux. At the interval N, it is desired to record a binary 1 on track 1. Circuits to be described below, cause a change to be produced in the direction of the flux so that the flux in the head of track 1 is now negative. After the reversal of magnetic flux occurs, the tape continues to be magnetized in the new direction, in this case negative, through the intervals of P and Q until another point arrives at which a binary 1 is to be stored. The fact that there was no flux change in track 1 at intervals P and Q, is an indication of the storage of binary 0's. At the interval S and T there are further reversals of flux in track 1 indicating binary 1's stored in both those intervals. After the reversal, at interval T, there is no flux change in track 1 for the intervals U and V, hence, it is an indication that binary 0's are stored at those points. Similar recordations are made by the write currents in track 2, 4, 8, A, B and C. Referring to the lower curve of Fig. 3*aq*, the corresponding READ signals obtained by passing the tape over the READ/WRITE head is shown. Through operation circuits, to be described below, positive signals are obtained at each flux reversal, regardless of the direction of flux change. It should be noted that track #1 thus produces positive signals at intervals N, S, and T, which correspond to recordings of binary 1's, while at the intervals P, Q, U and V, there is no pulse output, hence, binary 0's are read at those points.

The READ and WRITE circuits for the entire seven channels are shown in block diagram form in Fig. 3*ao*. The details for the "C" bit channel, which is representative of all channels are shown in Fig. 3*ap*.

Before describing the circuits of Figs. 3*ao* and 3*ap*, a description will be given of the READ/WRITE circuits of Fig. 3*ak*, which indicate what inputs to the tape feed machine are required from the control unit of the CARD READER to control the READ/WRITE circuits of Fig. 3*ao*. When it is desired to place the tape feed machine in a WRITE STATUS, a SET WRITE lead T556 from the CARD READER is shifted positive. The coincidence of the positive voltage on the SET WRITE STATUS lead T556 at one terminal of AND circuit T558 with a positive voltage on the SELECT AND READY lead T486 at the other terminal of AND circuit T558, provides a positive output which is fed to the left-hand input of a READ/WRITE STATUS trigger T560, turning it ON, as an indication of a WRITE status. When it is desired to place the tape feed unit in a READ status, a SET READ lead T562 from the CARD READER is shifted positive. The coincidence of the positive voltage on the BACKWARD AND SET READ STATUS lead T562 at one terminal of an AND circuit T563 with a positive voltage on the SELECT AND READY lead T486 at the other terminal of AND circuit T563, provides a positive output which is fed to the right-hand input of a READ/WRITE STATUS trigger T560, turning it OFF, as an indication of a READ STATUS.

When the READ/WRITE STATUS trigger T560 is in the WRITE status, its right-hand output terminal goes positive. This positive potential is transmitted via a cathode follower T564, a grounded grid amplifier T565, a lead T566, and a cathode follower T567 to a WRITE STATUS lead T568. This WRITE STATUS lead T568 is utilized by the READ/WRITE circuits of Fig. 3*ao* in a manner to be presently described. The positive output of grounded grid amplifier T565 is also transmitted via a lead T569, and a cathode follower T570 to one input of an AND circuit T571. The other input of AND circuit T571 is connected to the SELECT and READY lead T486 which is positive during SELECT AND READY. The output of AND circuit T571 then goes positive and is transmitted via a lead T572, and the cathode follower T573 to a TAPE RDY WR ST lead T574. TAPE RDY WR ST lead T574 is connected to the CARD READER (Fig. 2*r*) to inform it that the tape unit is ready to WRITE. The positive potential on the lead T572 which is also indicative of READY AND WRITE, is fed via a cathode follower T576 to a lead T578 which is utilized by the tape feed machine itself in a manner to be described. The lead T578 is connected to one input of an AND circuit T580, the other input of which is connected to a WRITE PULSE lead T582. WRITE PULSE lead T582 comes from the CARD READER (Fig. 2*r*) and is used for setting the exact time of WRITING. A positive potential on the two inputs of AND circuit T580 will cause a positive voltage to be transmitted from the output of AND circuit T580 via a cathode follower T584 to GATED WRITE PULSES lead T586. This GATE WRITE PULSES lead T586 is utilized by the READ/WRITE circuits of Fig. 3*ao*.

When the READ/WRITE status trigger T560 is in the READ STATUS, its left-hand output terminal goes positive. This positive potential is applied via a cathode follower T588 to a READ STATUS lead T590. READ STATUS lead T590 is applied to one input of an AND circuit T592, the other input of which is connected to the SELECT AND READY lead T486. When both inputs of AND circuit T592 go positive, its output goes positive and is applied via grounded grid amplifier T594, a lead T596 and a cathode follower T598 to a TAPE READY AND READ line T600. The TAPE READY AND READ line T600 may be connected to the CARD READER. The output of the grounded grid amplifier T594 is also connected via a cathode follower T602 to a GATE READ PULSES lead T604. This GATE READ PULSES lead T604 is utilized by the READ/WRITE circuits of Fig. 3*ao*.

As protection against the possibility of accidentally WRITING on the tape an input of the READ/WRITE STATUS trigger T560 is connected via the parallel connected normally closed START relay contacts TR20—3 and the normally open REWIND STATUS relay contacts TR36—3 to ground. This ground potential input to trigger T560 will keep the trigger T560 OFF and in its READ status. Thus, since START relay contacts TR20—3 are closed until the START button (to be described later) is actuated, the tape feed machine will be held in a READ status until the start of operation. REWIND STATUS relay contacts TR36—3 close during a REWIND operation to prevent accidentally WRITING on the tape during REWIND.

Now that it has been indicated how and when the WRITE STATUS lead T568, the GATED WRITE PULSES lead T586, and the GATE READ PULSES lead T604 go positive, a description will be given of the READ/WRITE and ERASE circuits of Fig. 3*ao*. Since the blocks of Fig. 3*ao* are special and are not used in other parts of the description the elements of the blocks are shown in Fig. 3*ap*, and a description of the latter will be given following the description of Fig. 3*ao*.

Assume, for example, that the tape feed machine is in a WRITE status. During every WRITE operation, all recording in all seven tracks, which may have been previously recorded on the tape, is ERASED. This ERASE operation is accomplished by the circuits shown at the bottom of Fig. 3*ap* which operate as follows. When the selected tape feed machine is in a WRITE status, the lead WRITE STATUS T568 (from Fig. 3*ak*) is positive. This positive signal passes through an inverter T606, the plate circuit of which contains the ERASE head T608, so that when the inverter T606 receives a positive input, it conducts, and current flows through the ERASE head T608. Therefore, when the selected tape feed machine goes into a WRITE status, current flows through each ERASE head to ERASE all seven tracks of the tape. The ERASE head which is in a more forwardly position than the READ/WRITE head, is energized at any time that the tape feed machine is in a WRITE status.

Inverter T606 comprises two triodes of a 5687 type tube, the grid G1 of which is connected via a 150 ohm resistor to a 100K ohm resistor and the grid G2 of which is connected to the junction of the 150 ohm and 100K ohm resistors. The other end of the 100K ohm resistor is connected via a 220K ohm resistor to a —270 volts and the junction of the 100K ohm resistor and the 220K ohm resistor is connected via a 390K ohm resistor to the WRITE STATUS lead 568.

While there are seven tracks of information, the circuitry for each track is identical, and the explanation of the "C" bit will apply to all other tracks. At the start of recording, assume all WRITE triggers, for example, trigger T610 (Fig. 3*ao*) of the "C" bit track is in a reset or OFF condition. The outputs of this trigger T610 feed to two inputs of the WRITE inverter T612 and cause one-half of the latter to conduct, and therefore, current to flow through the one-half of the WRITE coil T614, that is, through either section T616 or section T618, provided the WRITE STATUS inverter T620 is not conducting. The WRITE STATUS inverter T620 is conducting when the WRITE STATUS lead T568 is positive, meaning that the particular tape feed machine is in the WRITE STATUS. When the input to the WRITE STATUS inverter T620 is positive, such a potential is applied to the cathode, that neither half of the WRITE inverter T612 may conduct, regardless of the inputs from the trigger T610. However, when the line WRITE status inverter T620 allows control of the WRITE inverter T612 to be taken over by the WRITE trigger T610. When the trigger T610 is OFF, current flow is through the WRITE coil section T618 and when trigger T610 is ON, current flow is through the coil section T616.

If it is desired to WRITE under control of the CARD READER, WRITE signals from the CARD READER are fed to the seven WRITE busses T622 to T628 nclusive and then a pulse is fed to the GATED WRITE PULSES line T586. Under the assumed conditions, that is, the start of recording, the WRITE trigger T610 is OFF, and thus current flows through the coil section T618. Positive WRITE signals occurring on the "C" bit WRITE bus T622 are fed to the resistance input of a diode gate T630. This diode gate is of a type shown in Fig. 28 of the L. R. Harper patent application Serial No. 404,278 filed on December 12, 1953, wherein it is fully described. It need only be understood for the purposes of explanation that the operation of a diode gate is such that a negative pulse will occur at its condenser output only at the time when its resistance input is held initially positive and its diode input goes negative. With the WRITE signals on the resistance input, a negative pulse on the GATED WRITE PULSES line T586, is fed to the individual diode inputs and where a positive WRITE signal exists, a negative output pulse will be transmitted to flip the trigger T610. The signal on WRITE STATUS line T586, for each bit, in this case, the "C" bit, remains negative if a binary 0 is being recorded, but a positive pulse occurs if a binary 1 is being recorded. Assume that the tape is moving past the head and that current flow is through the coil section T618 as the WRITE bus "C" bit receives a positive signal. Now the positive signal GATED WRITE PULSES is added to the positive signal of the WRITE bus "C" bit and passes through the diode gate T630 to shift the WRITE trigger T610. As trigger T610 shifts, it acts via the WRITE inverter T612 so that current flow is shifted from the coil section T618 to the coil section T616 and thereby, a binary 1 is recorded in this particular channel, that is the "C" bit channel. Recordation of the binary 1 is indicated by a change in the direction of the flux.

At the time that the second character is being recorded, assume that the "C" bit is to be a binary 0. At this interval, since no pulse occurs on the "C" bit write bus T622, when the GATED WRITE PULSE occurs, the inverter switch T612 remains cut off and the trigger T610 remains in its existing condition, in this instance, the ON condition. Flow of current therefore continues through the coil section T616. At this time, there is no reversal of flux so that, in effect, a binary 0 is recorded.

For the purpose of checking in CARD READER using the tape feed machine, an output is fed from the inverter T612 via a lead T632, an inverter T634, and a cathode follower T636 to the WRITE ECHO BUS "C" line T638. There is one WRITE ECHO bus line for each of the seven channels and they are referred to as T638 to T644 inclusive.

During READ operations, the tape is fed past the READ/WRITE coil T614 (Fig. 3*ao*) and upon reaching a point where a binary 1 is recorded, the flux changes and a signal is thereby generated and fed through three stages of amplification, i.e., the amplifiers T646, T648, and T650. The output of the amplifier T650 is fed to a cathode follower T652, the output of which is a positive pulse each time a binary 1 is read. This cathode follower T652 has another input from the GATE READ PULSE line T604 shown in Fig. 3*ak*. It is necessary for both inputs to be positive in order for the positive signals to pass through the output of the cathode follower T652 to the "C" bit input bus line READ BUS "C" T654. There is one READ BUS lead for each of the seven channels indicated by reference numerals T654 to T660 inclusive. The "C" bit circuits just described, are included within a block T645 (Fig. 3*ao*). Identical circuitry represented by blocks T662 through T668 inclusive, are for the "B," "A,", "8," "4" "2" and "1" bits, respectively. WRITING on, or READING from the tape is relatively simultaneous in all seven channels.

Referring again to Fig. 3*ap*, in which are shown the details of the circuitries used in the representative "C" bit track, the typical values of the components indicated pertain to all other track circuits. However, it will be apparent to those skilled in the art that various other combinations and types may be employed. Wherever shown, in Fig. 3*ap*, unless indicated, the values of the various resistors, condensers, and inductances are in thousands of ohms, micromicrofarads, and microhenrys, respectively. As usual, the terms positive and negative, used in relationship to signals refer to relative values rather than values with respect to ground.

Referring to the diode gate T630 (Fig. 3*ap*) designated DG, this gate utilizes a diode D1, a 39K ohm resistor and a 68 micromicrofarad condenser commonly connected. The GATED WRITE PULSES LINE is connected to the cathode of the diode and the WRITE bus line is connected to the 39K ohm resistor. As previously indicated, this diode gate operates in a manner fully described in said L. R. Harper application to effect a negative output from the 68 micromicrofarad condenser if there is a positive WRITE signal on the WRITE bus T622 followed by a negative pulse on the GATED WRITE PULSES LINE T586. This 68 micromicrofarad condenser is connected to the junction of a 39K and a 330K ohm resistor. The other end of the 39K ohm resistor is connected to +140 volts and the other end of the 300K ohm resistor is connected to ground. The tapped output from the junction of the 39K and 330K ohm resistors passes to the trigger T610. Thus, when the tape unit is in the WRITE STATUS, positive signals occurring on the WRITE busses pass through the diode gate to the trigger T610. The WRITE trigger T610 comprises two cross-coupled triodes (which may be included in one envelope as in a 6211 type tube) in which the plate P1 is coupled by an 82K ohm resistor to the grid G2 and a plate P2 is likewise coupled to the grid G1 by an 82K ohm resistor. Each of these 82K ohm resistors is shunted by a 15 micromicrofarad condenser as shown. The grid G1 is connected via 110K ohm resistor and 47K ohm resistor to a power supply of −130 volts and the grid G2 is connected by an identical resistor to the same power supply. The cathodes K1 and K2 are connected to ground. Plate P1 is connected through a 750 microhenry inductance, a 3.9K ohm and a 4.3K ohm resistor to +140 volts, and plate P2 is similarly connected to +140 volts.

Grid G1 is connected via a 22 micromicrofarad condenser in series with a 22K ohm resistor to the junction of the 43K ohm resistor and the 3.9K ohm resistor in the P2 plate circuit. The junction of the 22 micromicrofarad condenser and the 22K ohm resistor is connected to the anode of a diode D2. Grid G1 is similarly connected to the P1 plate circuit and in a similar manner to the anode of a diode D3. The cthodes of diodes D2 and D3 are commonly connected to the diode gate T630. Plate P1 is connected via a 270K ohm resistor, an 82K ohm resistor and a 230K ohm resistor to −130 volts. A 39 micromicrofarad condenser is connected from plate P1 to the junction of the 82K ohm resistor and the 230K ohm resistor. The junction of the 270K ohm resistor and the 82K ohm resistor is connected to the anode of a diode D4, the cathode of which is connected to ground. The junction of the 82K ohm resistor and the 230K ohm resistor is connected to the left-hand triode of inverter T612. A circuit similar to that described for plate P1 is connected to plate P2 and the junction between the 82K ohm resistor and the 23K ohm resistor in this plate circuit is connected to the right-hand triode of inverter T612. Grid G1 is connected via a 110K ohm resistor and a 47K ohm resistor to −130 volts. The junction of the 110K ohm resistor and 47K ohm resistor is connected to a lead T670 which comes from the WRITE CHECK CHARACTER circuit, to be presently described. Grid G2 is connected via a 110K ohm and a 47K ohm resistor to −130 volts. Grid G1 is also connected to the cathode of a diode D5 the anode of which is connected to −12 volts.

A positive pulse on lead T670 will be applied to the grid G1 of WRITE trigger T610 to turn it OFF. This pulse comes from the output of cathode follower T672 (Fig. 3*ao*), the input of which is connected to a WRITE CHECK CHARACTER lead T674 which may be connected to the CARD READER (Fig. 2*r*). The WRITE CHECK CHARACTER line is fed a positive pulse by the CARD READER at the end of a record, for turning OFF the WRITE trigger T610. If the WRITE trigger T610 is already OFF, no 1 is WRITTEN, but if it is ON, a 1 is WRITTEN. This insures that each channel of each record has an even number of 1's, a fact which provides for further checking utility.

Cathode follower T672 comprises two triodes of a 5965 type tube, the plates of which are commonly connected to +140 volts. The cathodes are commonly connected to the anode of a diode D9, the cathode of which is connected to ground. The commonly connected cathodes are connected via a 15K ohm resistor to −60 volts and also to lead T670. The grid G2 is connected via a 150 ohm resistor and a 300K ohm resistor to −60 volts. The junction of the 150 ohm and 300K ohm resistors is connected via a 100K ohm resistor to ground and also via a 0.01 microfarad condenser to ground. The grid G1 is connected via a 10K ohm resistor to the WRITE CHECK CHARACTER lead T674. Returning to Fig. 3*ap*, a negative signal output from the diode gate T630 passes through a diode D2 or a diode D3 to the grid G1 or the grid G2 respectively, and causes the trigger to be shifted from one stable condition to the other so that for each negative output of diode gate T630, the trigger T610 is shifted from an ON to an OFF condition or from an OFF to an ON condition.

The WRITE inverter T612 is comprised of a dual triode which may be of the 5687 type tube with the grid G1 connected via 100K ohm resistor to the left-hand output of trigger T610, and the grid G2 is connected by identical circuitry to the right-hand output of the trigger T610.

The cathodes K1 and K2 are connected via a 5.6K ohm resistor to the plate of the WRITE STATUS INVERTER T620 and also via the same 5.6K ohm resistor through a 75K ohm resistor shunted by a 0.02 microfarad condenser to ground. The plate P1 of the WRITE inverter T612 is connected to the coil winding T616 to ground, while the plate P2 is connected through the coil winding T618 to ground. If the plate of the WRITE STATUS INVERTER T620 is positive, there will be no conduction in either side of the WRITE inverter T612, regardless of the condition of the trigger T620. The potentials of the cathodes K1 and K2 of the WRITE inverter is thus controlled by the WRITE STATUS INVERTER T612. This inverter has a cathode connected via a 100 ohm resistor to a source of —130 volts. Its grid is connected to the WRITE STATUS LINE T568 via a 120K ohm resistor in series with a 390K ohm resistor. The junction of the 390K ohm resistor and the 120K ohm resistor is connected through a 0.01 microfarad condenser to ground and also to a 220K ohm resistor to the —270 volt supply. If the WRITE STATUS LINE T568 is positive as it is when the particular tape unit is in a WRITE STATUS, the triode of the WRITE STATUS INVERTER T620 conducts and the plate goes relatively negative. This is the negative potential which conditions the WRITE INVERTER T612 for conduction. With its cathodes K1 and K2 at a relatively negative potential, if the trigger T610 is ON, the potential of its plate P2 is positive and therefore drives the grid G1 of the WRITE INVERTER T612 positive so that current then flows from ground through the coil T616 and the left half of the WRITE INVERTER T612 to the cathode of the WRITE STATUS INVERTER T620 and thus to the minus 130 volt source. As explained above, when current flows through the coil T616, it causes recording on the tape in one direction to saturation. If the condition of the trigger T610 is now reversed, its plate P2 goes negative and thus stops conduction through the left side of the WRITE INVERTER T612. However, the plate P1 of the trigger is now positive and causes conduction through the right half of the WRITE INVERTER T612. Current flow will then be from ground, through the coil section T618, the right half of the WRITE INVERTER T612, to the cathode of the WRITE STATUS INVERTER T620, to the —130 volt source. Thus, by shifting the condition of the trigger T610, the direction of magnetization of the tape is reversed, and, therefore in this instance, that of the "C" track is reversed.

For the purpose of checking in the CARD READER, an output is fed from the cathodes of the inverter T612 via a lead T632 to the input of an inverter T634. Lead T632 is connected via a 0.001 microfarad condenser, a 10K ohm resistor and a 150 ohm resistor to the grid of inverter T634 which may be one triode of a 6211 type tube. The junction of the 10K ohm resistor and the 150 ohm resistor is connected to the anode of a diode D11, the cathode of which is connected to ground. The same junction is also connected via a 430K ohm resistor and a 220K ohm resistor to +140 volts, the junction of these two resistors being connected via a 0.01 microfarad condenser to ground. The plate is connected via a 3K ohm resistor, a 3.3K ohm resistor and a 250 microhenry inductance to +140 volts. The plate is also connected via a 390K ohm resistor and a 430K ohm resistor to —130 volts, the 390K ohm resistor being shunted by an 8.2 micromicrofarad condenser. The junction of the 390K ohm resistor and 430K ohm resistor is connected to the cathode follower T636 and the output of the inverter T634 is fed from the junction via a 150 ohm resistor to the grid of cathode follower T636 which may be one triode of a 6211 type tube. The plate of cathode follower T636 is connected to +140 volts and the cathode is connected via a 200 ohm resistor to the WRITE ECHO BUS line T638 which is fed into the CARD READER (Fig. 2v) where a cathode resistor is provided.

During READ operations, after the tape passes the READ/WRITE coil T614 and changes of flux occur, potentials are generated in both halves T616 and T618 of this coil, but only the potential generated in coil T616 is utilized, and this potential is fed to the first stage of amplification, that is, to the amplifier T646 designated as A1. Amplifier T646 is one triode of a 12AY7 type tube, the grid of which is connected via a 47K ohm resistor to the READ/WRITE head T614. The plate of amplifier T646 is connected via a 51K ohm resistor, a 10K ohm resistor, and a 2K ohm resistor to a source of +270 volts. The junction of the 51K ohm resistor and 10K ohm resistor is connected via a 0.1 microfarad condenser to ground and the junction of the 10K and 2K ohm resistors is connected via a 0.01 microfarad condenser to ground. The cathode of amplifier T646 is connected through a 330 ohm resistor in series with a 50 ohm potentiometer and a 20 ohm resistor to ground. The output directly at the plate is fed through a 0.0025 microfarad condenser to a 150 ohm resistor, the other end of which is connected to the grid of a second stage of amplification A2, amplifier T648. The plate of amplifier T648 is connected via a 51K ohm resistor to the junction of the 10K ohm and 2K ohm resistors in the plate circuit of amplifier T646. The cathode is connected via a 330 ohm resistor to ground. The output directly at the plate is also fed through a 0.0025 microfarad condenser to a 150 ohm resistor, the other end of which is connected to the grid of the third stage of amplification, amplifier T650. This amplifier T650, designated A3 is one triode of a 6211 type tube, the plate of which is connected via a 27K ohm resistor to a +270 volt source. The plate is also connected via a 68 micromicrofarad condenser to ground, and the cathode is connected via a 330 ohm resistor to the tap on the 50 ohm potentiometer in the cathode circuit of amplifier T646. This connection is a well-known type of negative feedback which increases the stability of the circuit. The output from the plate of amplifier T650 may be fed through a 0.0025 microfarad condenser and a 150 ohm resistor to the grid of a cathode follower T652. The junction of the 0.025 microfarad condenser and the 150 ohm resistor is connected via a 470K ohm resistor to a GATE READ PULSE line T604 which may have one of two voltage levels developed in a manner previously described. When the GATE READ PULSE line T604 is positive, the negative and positive signals from amplifier T650 appear at the cathode of the cathode follower T652, but if the GATE READ PULSE line T604 is negative, the grid of amplifier T650 is held negative and neither the positive nor negative signals from amplifier T650 will appear at the cathode of the cathode follower T652. The plate of cathode follower T652 is connected via a 750 ohm resistor to +140 volts, and also via a 0.01 microfarad condenser to ground. The cathode of cathode follower T652 is connected via a 180 ohm resistor to READ BUS lead T654 from which the READ pulses can be fed into the CARD READER.

*Tape indicator circuits*

As previously described, when the TAPE INDICATOR strip T210 on the tape is reached, it will be sensed by a TAPE INDICATOR photocell T232, and signals will be developed which are transmitted to so inform the CARD READER. The CARD READER will finish the record it is WRITING on the tape, WRITE a special TAPE MARK CHARACTER, and then signal the tape feed machine to STOP feeding tape. Thereafter if the tape feed machine is being READ the reading of the TAPE MARK CHARACTER, which is at the end of each reel of tape, is utilized to stop the TAPE FEED.

The TAPE INDICATOR photocell T232 (Fig. 3*am*) is a variable resistance device with a resistor network similar to that associated with the LOAD POINT photocell T226. The arrival of the TAPE INDICATOR aluminum strip T210 will thus cause a negative shift to appear at the anode of photocell T232, and this negative shift is applied to the input of an inverter T676, producing a positive potential at its output terminal. This positive potential is fed via grounded grid amplifier T678, and cathode follower T680 to a TAPE INDICATOR lead T682. TAPE INDICATOR lead T682 is connected to an input of an AND circuit T684, the second input of which is connected to the READY AND WRITE STATUS lead T578. When the two input terminals of AND circuit T684 go positive, its output goes positive and this positive shift is fed to the input of an inverter T686, the output of which shifts negative. This negative shift is fed to TAPE INDICATOR trigger T688, turning the trigger ON by plate pullover. The right plate output terminal of TAPE INDICATOR trigger T688 is thus shifted positive and the positive shift is fed via a cathode follower T690 and a lead T691 to one input of an AND circuit T692, the other input of which is connected to the SELECT lead T480. The coincidence of the positive SELECT signal and the positive TAPE INDICATOR ON signal causes a positive shift at the output terminal of AND circuit T692 to be fed via a cathode follower T694 to a TAPE INDICATOR ON line T696 which is connected to the CARD READER (Fig. 2*ah*). In a similar manner, the negative shift at left plate output of TAPE INDICATOR trigger T688 is fed via a cathod follower T696 to an AND circuit T698 where it is combined with a signal on line SELECT. Since one of the input terminals of AND circuit T698 goes negative, its output will be negative and this negative shift will be fed via a cathode follower T700 to a TAPE INDICATOR OFF lead T701 which may be utilized if needed. The TAPE INDICATOR ON lead T694 in its positive state indicates to the CARD READER that the TAPE INDICATOR strip T210 has been reached. The fact that the TAPE INDICATOR trigger T688 is ON, can be observed on the front panel of the tape feed machine by lighting a TAPE INDICATOR light T702 (Figs. 3*a* and 3*am*). This light T702 is energized by the positive shift from the lefthand output of TAPE INDICATOR trigger T680 fed via cathode follower T690, lead T691, and a lead T703 to the grid of inverter T704 causing it to conduct through TAPE INDICATOR light T702. The CARD READER will now finish WRITING the record and then a positive signal on TURN TAPE INDICATOR OFF lead T705 (Fig. 3*am*) is fed to an AND circuit T706 where it is combined with the SELECT signal on lead T480 and the resultant positive signal at the output is fed to an input of the TAPE INDICATOR trigger T688, turning it OFF. Turning TAPE INDICATOR trigger T688 OFF, results in the TAPE INDICATOR OFF lead T701 going positive and the TAPE INDICATOR ON lead T696 going negative.

Provisions have been made for turning ON the TAPE INDICATOR trigger T688 from the CARD READER. A signal on TURN TAPE INDICATOR ON lead T708 is fed to an AND circuit T710, and combined with the SELECT signal on SELECT lead T480; the resultant positive signal at the output of AND circuit T710 being fed to the TAPE INDICATOR trigger T688, turning it ON.

To insure that the TAPE INDICATOR trigger T688 is reset OFF at the start of operations, its right grid input is connected via a normally closed POWER ON relay contacts R17—3 to ground and via a normally open UNLOAD relay contacts TR22—4 to ground. As previously described, when the line switch LS (Fig. 3*af*) is closed, the D.C. voltages go on and then after a delay POWER ON relay R17 is energized. Thus, when line switch TLS is closed, POWER ON relay contacts are closed when the D.C. voltages are applied to trigger T688, and the ground potential applied via closed contacts TR17—3 will insure that trigger T688 is started in the OFF condition. When POWER ON relay TR17 is energized, ground potential is removed, but this has no effect on trigger T688. When UNLOADING, UNLOAD relay contacts TR22—4 will close to reset the TAPE INDICATOR trigger T688 OFF by applying ground potential to the trigger T688.

*Tape break circuits*

As previously described, if the tape should break during a RAPID REWIND operation, the tape break light T286 will shine directly into the TAPE INDICATOR photocell T232 to operate a relay circuit and STOP the machine. Referring to Fig. 3*am*, when the TAPE INDICATOR photocell T232 senses the arrival of the TAPE INDICATOR strip T210, the TAPE INDICATOR lead goes positive. This positive potential is applied via a lead T714 to one input of an AND circuit where it is "anded" with a voltage from a RAPID REWIND STATUS lead T716 connected to the other input of the AND circuit T714. RAPID REWIND STATUS lead T716 comes from the output of a cathode follower T718 (Fig. 3*an*) the input of which is connected via a lead T720 (Figs. 3*an*, 3*am* and 3*ak*) and a normally open REWIND STATUS RELAY contact TR36—1 to +48 volts. The energization of the REWIND STATUS relay TR36 occurs during REWIND, and its contacts TR36—1 transfers to apply a positive potential via cathode follower T718 to AND circuit T714. When the two inputs of AND circuit T714 go positive its output goes positive and this positive shift is fed via a cathode follower T722 to the grid of an inverter T724, causing the inverter T724 to conduct and energize a TAPE BREAK relay TR51P in its plate circuit. The energizing of TAPE BREAK relay TR41P effects the opening of its normally closed TR41P—1 contacts (Fig. 3*af*) in the circuit of the RUN relays TR1 and TR18. RUN relay TR1 is deenergized, and its contacts TR1-AL in the circuit of MOTOR relay HD1, the HD1—1 contacts of which are shown in Fig. 39*ad*. When MOTOR relay contacts HD1—1 open all the motors including the FORWARD motor T22, the BACKWARD motor T23 and the RAPID REWIND motor T266 are deenergized. This will prevent tape from being unreeled onto the floor.

The TAPE BREAK relay TR41P is reset during an UNLOAD operation by a circuit which is provided for energizing a TAPE BREAK latch trip relay R41LT (Fig. 3*ah*) from +48 volts via UNLOAD ASSIST relay contacts TR22—6 (closed during an UNLOAD operation), now closed TAPE BREAK relay contacts TR41P—2 and relay TR41LT.

*Unload*

To perform an UNLOAD operation, it is only necessary to press an UNLOAD button to effect a retraction of the drive capstans T28 and T30, a withdrawal of the tape from the columns, and a raising of the head cover T136. In this UNLOADED position, it is very easy to manually remove the tape from the machine as previously described.

The UNLOAD circuits are shown in Figs. 3*af*, 3*ag* and 3*ah*, and the timing diagram of the UNLOAD operation is shown in Fig. 3*at*. Fig. 3*at* is a plot of the operations of relays and other controls plotted against time, with the lower position of each line representing the unenergized or inoperative condition, and the upper position representing the energized or operative position. The time represented in Fig. 3*at* is from the time of the manual operation of the UNLOAD button U until the time the machine is in the UNLOADED position. Each shift in each line is labeled by the relay or contacts which caused the shift.

When the UNLOAD button U (Fig. 3ag) is actuated, a circuit for energizing UNLOAD pick relay TR21P is completed from the ground through relay TR21P, the now closed UNLOAD button U, the normally closed contacts of START relay TR20—1, to +48 volts. The contacts of UNLOAD pick relay TR21P are transferred mechanically and latched in the transferred position so that removal of the operator's finger from the manual UNLOAD button U will remove the energization from UNLOAD relay TR21P, but its contacts will remain transferred. Normally open UNLOAD pick relay contacts TR21P–4 (Fig. 3ag) close to complete a circuit for energizing UNLOAD ASSIST relays TR11 and TR22, from +48 volts via the closed UNLOAD pick relay contacts TR21—4, the relays TR11 and TR22 in parallel to ground. Normally open UNLOAD ASSIST relay contacts TR11–AL (Fig. 3af) close to shunt the series connected relay contacts TR9–AL, TR10–AL and TR14–AL and provide a path for keeping RUN relays TR1 and TR18 energized even though one of the sets of contacts TR9–AL, TR10–AL or TR14–AL opens during UNLOAD, as will be made clear later.

Normally open UNLOAD ASSIST relay contacts TR11–BU (Fig. 3ai) close to energize NEUTRAL STATUS magnet TR13 which puts the machine in a NEUTRAL status so that the idler pulleys T32 and T34 can either be in the position of Fig. 3q or that of Fig. 3r, as previously described.

The closing of UNLOAD ASSIST relay contacts TR22—4 (Fig. 3am), completes a circuit from ground via its contacts TR22—4 to the input terminal "4" of the TAPE INDICATOR trigger T688, to reset it OFF.

The closing of UNLOAD ASSIST relay contacts TR22—5 (Fig. 3am) energizes LOAD POINT trip relay TR42–LT which acts to trip the latch and allow the contacts of LOAD POINT relay TR42P to return to their normal untransferred position.

The closing of the normally open UNLOAD ASSIST relay contacts TR11–BL (Fig. 3ah) completes a circuit for energizing the CAPSTAN RETRACT relays HD8, from the +48 volt line via a lead T726 (Fig. 3ah), the normally closed CAPSTAN-IN relay contacts TR7–AU, a lead T728, the normally closed NOT FAST REWIND relay contacts TR6–AU, a lead T730, the now closed UNLOAD ASSIST relay contacts TR11–BL, the normally closed TAPE BREAK relay contacts TR41P–3, through CAPSTAN RETRACT relay HD8 to ground. CAPSTAN RETRACT relay HD8 is paralleled with a series connected 100 ohms resistor and a 100 microfarad condenser which act as a delay network for delaying the drop out of voltage across relay HD8 for a purpose to be made clear later. The energization of relay HD8 closes CAPSTAN RETRACT relay contacts HD8—1 (Fig. 3ah) which completes a circuit for energizing RETRACT SOLENOID T346, from the +48 volt line via the closed contacts HD8—1 and the RETRACT SOLENOID T346 to ground. Energizing RETRACT SOLENOID T346 causes the retraction of the drive capstans T28 and T30 as previously described in relation to Figs. 3x to 3z.

As previously described in relation to Fig. 3x, when the drive capstans T28 and T30 start to retract, the high dwell on the cams T395 and T398 allow the contacts on the LEFT CAPSTAN-OUT switch T397 and the RIGHT CAPSTAN-OUT switch T399 to close. Fig. 3at indicates that CAPSTAN-OUT switches T397 and T399 close practically simultaneously because of the direct coupling described previously in relation to Fig. 3x.

When the drive capstans are fully retracted, the high dwell on cam T392 (Fig. 3x) closes the contacts on the single CAPSTANS-IN switch T394 which completes a circuit for energizing the CAPSTANS-IN relay TR7 (Fig. 3af) from the +48 volt line through the closed CAPSTANS-IN switch T394, the CAPSTANS-IN relay TR7 to ground. Energizing CAPSTANS-IN relay TR7 will initiate the stopping of the capstan motor T164, apply a light brake to the tape, and start low speed motor T114, by effecting the energization of LOW SPEED MOTOR relay HD6, BRAKE CLUTCH relay TR4, and the brake magnets T42a and T48a, all as indicated in Fig. 3at.

The closing of normally open CAPSTAN-IN relay contacts TR7–AL (Fig. 3ag) completes a circuit for energizing BRAKE CLUTCH relay TR4, from +48 volts, via a lead T732, the closed contacts of transferred UNLOAD relay TR21—2, a lead T734, the now closed CAPSTAN-IN relay contacts TR7–AL, the closed RUN relay contacts TR1–BL, BRAKE CLUTCH relay TR4 to ground. The energization of BRAKE CLUTCH relay TR4, results in the light energization of the brakes T42a and T48a as previously described in relation to Fig. 3aj. The transfer of CAPSTAN-IN relay contacts TR7–AU (Fig. 3an), opens the circuit which energized the CAPSTAN RETRACT relay HD8, said circuit previously described as closed by the closing of UNLOAD ASSIST relay contacts TR11–BL. The 100 ohm resistor and 100 microfarad condenser comprising the delay network across CAPSTAN RETRACT relay HD8, are used to delay the deenergization of relay HD8, until the retract solenoid T346 is latched. This delay is indicated on Fig. 3at. The transfer of CAPSTAN-IN relay contacts TR7–AU also completes a circuit for energizing the LOW SPEED MOTOR relay HD6, from +48 volts via lead T726, the now closed normally open CAPSTAN-IN relay contacts TR7–AU, a lead T735, a lead T736, the normally closed NOT RAPID REWIND relay contacts TR6–BL, a lead T738, a lead T740, a lead T742 in series with the normally closed NOT RAPID REWIND relay contacts TR5–AU, a lead T744, a lead T745, normally closed UNLOAD STOP relay contacts TR26P–2, normally closed RAPID START relay contacts TR12–BU, via the LOW SPEED MOTOR relay HD6 to ground. Energizing the LOW SPEED MOTOR relay HD6 closes a set of LOW SPEED MOTOR relay contacts HD6—1 (Fig. 3ad) to complete a circuit from the upper 208 volt A.C. line via MOTOR relay contacts HD1—1, LOW SPEED MOTOR relay contacts HD6—1 to an input "X" of a LOW SPEED motor unit T114, the input "Y" of which is connected to the lower 208 volt A.C. line. The windings, capacitor and relay contacts comprising the LOW SPEED motor unit T114 are shown in Fig. 3ae. The LOW SPEED motor is a capacitor start, capacitor run induction motor comprising a winding A, a winding B and a phase shifting capacitor C. Terminal "X" is connected via a lead T747, a lead T748, winding A, and a lead T760 to terminal "Y." Terminal "X" is also connected via lead T747, lead T752, the normally closed LOW SPEED MOTOR REVERSE relay contacts DP1—1, winding B, the normally LOW SPEED MOTOR REVERSE relay contacts DP1—2, lead T754, lead T756, capacitor C and lead T758 to terminal "Y."

With the LOW SPEED MOTOR REVERSE relay contacts DP1 in their unenergized position, the low speed motor T114 acts as a take-up motor, i.e. it UNLOADS tape by rotating in a direction so as to lift the head cover and take tape out of the columns. To reverse the direction of the motor in order to be able to LOAD tape by lowering the head cover and feeding tape into the columns, it is necessary to reverse the connections of the input leads to winding B. This is accomplished by energizing the LOW SPEED MOTOR REVERSE relay DP1, in a manner to be presently described, to transfer its contacts DP1—1 and DP1—2. A circuit is now completed from terminal "X" via lead T747, a lead T762, the now closed normally open DP1—2 contacts, winding B, the now closed normally open DP1—1 contacts, lead T764, lead T756, capacitor C, lead T758 to terminal "Y." The energization of LOW SPEED MOTOR REVERSE relay DP1 thus effects a 180° phase shift across winding B, which causes the capacitor run induction motor T114 to reverse its direction of rotation.

The LOW SPEED motor T114 will ordinarily rotate in the direction which lifts the head cover T136 and takes tape out of the columns unless the LOW SPEED MOTOR REVERSE relay DP1 (Fig. 3*an*) is energized. It will be described hereinafter that LOW SPEED MOTOR REVERSE relay DP1 can only be energized during a LOAD-REWIND operation; therefore during an UNLOAD operation the LOW SPEED MOTOR always acts as a take-up motor.

When the head cover T136 leaves its DOWN position, it allows the normally open HEAD COVER DOWN switch T344 to close as hereinbefore described in relation to Fig. 3*u*, and the HEAD COVER NOT DOWN relay TR8 is energized by a circuit completed from the +48 volt line through the now closed HEAD COVER DOWN switch T344 and the HEAD COVER NOT DOWN relay TR8 to ground. Energizing HEAD COVER NOT DOWN relay TR8 results in the STOPPING of the capstan motor T164 through the transfer of the HEAD COVER NOT DOWN relay contacts TR8–AU (Fig. 3*af*) which open the circuit from +48 volts via lead T746, the now open normally closed contacts of transferred HEAD COVER NOT DOWN relay TR8–AU, CAPSTAN MOTOR relay DP2 to ground. The other path for energizing CAPSTAN MOTOR relay DP2, from +48 volts via UNLOAD ASSIST relay contacts TR22—8, CAPSTAN-IN relay contacts TR7–BU, CAPSTAN MOTOR relay DP2 to ground, has been opened, when the capstans were retracted, by the opening of the normally closed CAPSTAN-IN relay contacts TR7–BU. Energizing HEAD COVER NOT DOWN relay TR8 also results in the placing of the moving coil T200 in the DRIVE status, which means that since the NEUTRAL STATUS relay TR13 has been previously energized to place the machine in the NEUTRAL status, the idler pulleys T32 and T34 will be in the position of Fig. 3*q*, to permit the tape to be removed easily. This is accomplished by the closing of the HEAD COVER NOT DOWN relay contacts TR8–BL (Fig. 3*an*) which completes a circuit from +48 volts via a lead T766, the now closed UNLOAD relay contacts TR22—3, a lead T768, a lead T770, normally closed NOT RAPID REWIND relay contacts TR6–BU, a lead T772, now closed HEAD COVER NOT DOWN relay contacts TR8–BL, to the input of cathode follower T456. The +48 volts on the grid of cathode follower T456 puts the moving coil T200 in the DRIVE status in a manner previously described.

The next event in sequence is the closing of the HEAD COVER UP switch T340 to indicate that the head cover T136 has reached its maximum UP position. Thereafter, the tape which is being raised begins to leave the columns. For the purpose of easy description, it will be assumed that the tape leaves the right column first, and when it does, the right flapper contacts T280 (Fig. 3*af*) are closed to complete a circuit for energizing a RIGHT COLUMN relay TR10 from the +48 volt supply, through the now closed right flapper contacts T280, RIGHT COLUMN relay TR10 to ground. Likewise, when the tape leaves the left column, a circuit for energizing a LEFT COLUMN relay TR9 is completed from the +48 volt supply, through the now closed left flapper contacts T278, LEFT COLUMN relay TR9 to ground. The normally closed LEFT COLUMN relay contacts TR9–AL (Fig. 3*af*) and the normally closed RIGHT COLUMN relay contacts TR10–AL open, but the TR1 and TR18 RUN RELAY circuit is not deenergized because contacts TR9–AL and TR10–AL are shunted by UNLOAD ASSIST relay contacts TR11–AL. With HEAD COVER UP switch T340 closed, and the RIGHT and LEFT COLUMN relays TR9 and TR10 energized, a path is completed for energizing the UNLOAD STOP relay TR26P (Fig. 3*ah*) from +48 volts via lead T726, the now closed normally open contacts of transferred CAPSTANS-IN relay TR7–AU, lead T736, the normally closed NOT RAPID REWIND relay contacts TR6–BL, lead T738, lead T740, a lead T774, the normally closed NOT RAPID REWIND relay contacts TR5–BL, in series with the now closed LEFT COLUMN relay contacts TR9–AU, the now closed RIGHT COLUMN relay contacts TR10–AU, the now closed HEAD COVER UP switch T340, the now closed normally open UNLOAD relay contacts TR11–AU, and UNLOAD STOP relay TR26P to ground. At the energizing of UNLOAD STOP relay TR26P–2 (Fig. 3*ah*), which were previously mentioned as being in the circuit for energizing LOW SPEED MOTOR relay HD6, open to deenergize relay HD6 and effect a stopping of the LOW SPEED motor T114. Contacts TR26P–1 (Fig. 3*af*) previously mentioned as being in the circuit for energizing VACUUM MOTOR relay HD4, open to deenergize relay HD4 and effect a stopping of the vacuum pump motor T126.

From Fig. 3*au*, it is seen that when the vacuum pump motor T126 is deenergized, the vacuum is not instantaneously dissipated. As soon as the vacuum is dissipated, the vacuum supply switch T130 (Fig. 3*af*) previously mentioned as being in the circuit for energizing RUN relays TR1 and TR18, opens to deenergize the RUN relays. RUN relay contacts TR18—3 (Fig. 3*af*) then open to disable the READY circuit.

RUN relay contacts TR1–AL (Fig. 3*af*) which are in the circuit of MOTORS relay HD1, open to deenergize MOTORS relay HD1, the HD1—1 (Fig. 3*ad*) contacts of which open to deenergize the FORWARD motor T22 and BACKWARD motor T23. RUN relay contacts TR1–BL (Fig. 3*ag*), in the circuit of BRAKE CLUTCH relay TR4, open to deenergize the BRAKE CLUTCH relay TR4 transferring the contacts TR4–AL and TR4–BL (Fig. 3*aj*) to their untransferred position. The transfer of the RUN relay contacts TR1–AU (Fig. 3*aj*) thus completes a circuit for fully energizing the BRAKE magnet T42*a* from the +48 volts via RUN relay contacts TR1–AU, the left reel release LRC, the normally closed contacts of now untransferred BRAKE CLUTCH relay TR4–AL, via BRAKE magnet T42*a* to ground. Likewise, the transfer of RUN relay contacts TR1–BU and BRAKE CLUTCH relay contacts TR4–BL complete a circuit transferring the BRAKE magnet T48*a* from a lightly energized condition to a fully energized condition.

The dissipation of the vacuum also causes the right and left flappers to return to the position where the flapper contacts T278 and T288 are open, and therefore deenergize respectively the LEFT COLUMN relay TR9 and RIGHT COLUMN relay TR10.

The tape is now in the UNLOADED position of Fig. 3*q* ready to be manually removed from the tape feed machine.

*Load-rewind*

It can be understood at this point, that at the start of a LOAD-REWIND operation, it is possible for the tape to be in four different situations requiring four different sequences of operation. The first LOAD-REWIND situation graphically represented in Fig. 3*au* is "TAPE IN THE LOADED POSITION AND IN THE BACKWARD AREA." In this situation, the LOAD-REWIND button LR is pressed in order to initiate a movement of the tape back to its LOAD POINT. The machine makes a determination that it is unfeasible to go into a RAPID REWIND operation and the tape is moved towards the LOAD POINT by going into a normal BACKWARD operation.

The second LOAD-REWIND situation, graphically represented in Fig. 3*av*, is "TAPE IN THE UNLOADED POSITION AND IN THE BACKWARD AREA." In this situation, the LOAD-REWIND button LR is pressed to effect a LOADING of the tape, and then to return the tape to its LOAD POINT. The machine makes a determination that it is unfeasible to go into RAPID REWIND and it first LOADS the tape into the machine, after which, tape moves toward the LOAD POINT by going into a normal BACKWARD operation.

The third LOAD-REWIND situation graphically represented in Fig. 3*aw* is "TAPE IN THE UNLOADED POSITION AND IN THE RAPID REWIND AREA." In this situation the machine makes a determination that it is feasible to go into RAPID REWIND. RAPID REWIND then starts immediately, and when it is over the tape is LOADED into the machine. The tape is then moved toward the LOAD POINT by going into normal BACKWARD.

The fourth LOAD-REWIND situation graphically represented in Fig. 3*ax* is "TAPE IN THE LOADED POSITION AND IN THE RAPID REWIND AREA." In this situation, after the machine makes a determination that it is feasible to go into RAPID REWIND, the tape is UNLOADED, RAPID REWIND is performed, the tape is then RELOADED, and then the tape is moved toward the LOAD POINT by going into normal BACKWARD.

The pressing of the LOAD-REWIND button LR (Fig. 3*an*) completes a circuit from +48 volts via the closed LOAD-REWIND button LR to the input of a cathode follower T780. The positive shift on the output of cathode follower T780 is fed to the input terminal "4" of an AND circuit T782, the input terminal "6" of which is connected to the READ STATUS LEAD T590. The LOAD-REWIND condition is "anded" with the READ STATUS condition to insure that the tape feed machine will not REWIND during the WRITE STATUS, or new information might accidentally be WRITTEN over old information already on the tape, thereby destroying it. When both inputs to AND circuit T782 are positive, the output shifts positive, and this positive shift is applied via an OR circuit T786 and a cathode follower T788 to the grid of an inverter T790. The positive voltage on its grid causes inverter T790 to conduct through the normally closed LOAD POINT relay contacts TR42P–3, and a LOAD-REWIND relay TR40, to thereby energize relay TR40. The energization of LOAD-REWIND relay R40 initiates the LOAD-REWIND operation as will be described.

To signal the DATA PROCESSING MACHINE or the CARD READER that the tape feeding machine has been SELECTED and is in a REWIND STATUS, an AND circuit T800 (Fig. 3*an*) has its input terminal "4" connected to the REWIND STATUS lead T716 and its input terminal "6" to the SELECT lead T480. When both inputs are positive, the output of AND circuit T800 goes positive, and this positive potential is fed via a cathode follower T802 to a SELECT AND REWIND STATUS lead T804.

*Loaded condition-backward area*

In the first LOAD-REWIND situation shown in Fig. 3*au* when the LOAD-REWIND relay TR40 is energized, its TR40—1 contacts (Fig. 3*ag*) close to complete a circuit from the +48 volt line through the now closed photo-light relay contacts TR14–BU, the now closed LOAD-REWIND relay contacts TR40—1, through the LOAD-REWIND ASSIST relays TR2 and TR3 in parallel, to ground. Energizing LOAD-REWIND ASSIST relay TR2 transfers its relay contacts, and the closing of LOAD-REWIND ASSIST relay contacts TR2–BL (Fig. 3*ag*) completes a circuit from the +48 volt line via the LOAD-REWIND ASSIST relay contacts TR2–BL and the parallel connected relays, UNLOAD latch trip relay TR21LT, UNLOAD STOP latch trip relay TR26LT, and LOAD-REWIND relay TR31 to ground. Since the operation is started in the LOADED condition, UNLOAD latch trip relay TR21LT and UNLOAD STOP latch trip relay TR26LT have no effect. The contacts which are closed by the energization of LOAD-REWIND relay TR31 will be presently described.

The energization of LOAD-REWIND ASSIST relay TR2 causes the closing of its contacts TR2–AU in the circuit of the three parallel relays, NOT RAPID REWIND relays TR5 and TR6, and TIMING MOTOR relay HD7. These three relays may be energized by one of two paths. One of the two paths is from ground via the three relays TR5, TR6 and HD7 in parallel, the now closed LOAD-REWIND ASSIST relay contacts TR2–AU, a lead T780, arm switch contacts T256, to +48 volts. The second path is via the LOAD-REWIND ASSIST relay contacts TR2–AU normally closed LEFT CAPSTAN OUT switch T399, and a lead T802 to +48 volts. A third path is via lead T794, lead T798, a lead T804, RIGHT CAPSTAN OUT switch T397, and lead T802 to +48 volts. A fourth path is from the LOAD REWIND ASSIST relay contacts R2–AL via a lead T806, the normally closed contacts of NOT RAPID REWIND relay contacts TR5–AL, and lead T786 to +48 volts. Under the assumed conditions of LOAD-REWIND situation one, i.e., tape LOADED and in the BACKWARD area, none of the four paths of the holding circuit are completed. The HEAD COVER NOT DOWN relay contacts TR8–AL are open because the head cover T136 is DOWN. The LEFT and RIGHT CAPSTANS OUT switches T397 and T399 of the second and third paths are open because the drive capstans T28 and T30 are OUT. The fourth path through the NOT RAPID REWIND relay contacts TR5–AL is open because the NOT RAPID REWIND relay TR5 is energized. Thus, since there is no holding circuit closed for LOAD-REWIND ASSIST relays TR2 and TR3, they are deenergized when the LOAD-REWIND button LR is released, and the LOAD-REWIND ASSIST relay contacts TR2–AU opens to deenergize the NOT RAPID REWIND relays TR5 and TR6, and the TIMING MOTOR relay HD7.

Referring to Fig. 3*ad*, it can be seen that the TIMING MOTOR relay contacts HD7–1 are in the circuit for energizing the timing motor A. When TIMING MOTOR relay HD7 was energized, at the time of the pressing of the LOAD-REWIND button LR, the timing motor A started to rotate. Whether or not the button LR is pressed long enough to close the TMA–1 contacts or not, will have no effect on the operation in this first LOAD-REWIND situation and when TIMING MOTOR relay HD7 is deenergized, the timing motor A will be denergized and automatically reset itself, as previously described.

Referring to Fig. 3*ah*, circuits are shown for energizing LOW SPEED MOTOR REVERSE relay DP1, the LOW SPEED MOTOR relay HD6, the RAPID START relay TR12 and a REWIND MOTOR relay DP3. The normally open contacts of the CAPSTAN IN contacts TR7–AU are in the circuit of all the four abovementioned relays, as has been previously described for the LOW SPEED MOTOR REVERSE relay DP1 and the LOW SPEED MOTOR relay HD6 in the description of the UNLOAD circuits, and as will presently be described for the RAPID START relay TR12 and the REWIND MOTOR relay DP3.

As previously described, the closing of LOAD-REWIND ASSIST relay contacts TR2–BL (Fig. 3*ag*) will energize LOAD-REWIND relay TR31. The closing of LOAD-REWIND relay contacts TR31—4 (Fig. 3*ah*) will effect the energization of REWIND STATUS relays TR35 and TR36 by completing a circuit from +48 volts via the normally closed LOAD POINT relay contacts TR42—1, the normally closed RESET relay contacts TR30—4, a lead T808, the now closed LOAD-REWIND relay contacts TR31—4, and the parallel connected REWIND STATUS relays TR35 and TR36, to ground. Energization of REWIND STATUS relay TR35, closes its relay contacts TR35—1 which are across the LOAD-REWIND relay contacts TR31—4 and act as a holding circuit. REWIND STATUS relay contacts TR35—2 (Fig. 3*ai*) transfer, said contacts TR35—2 being in a circuit for energizing the BACKWARD relay TR33 from +48 volts via the now closed RUN relay contacts TR18—2, the now open normally closed LOAD-REWIND relay contacts TR31—2, the now closed contacts of transferred REWIND STATUS relay TR35—2, through the BACKWARD relay TR33, to ground. When the LOAD-REWIND button is released REWIND-STATUS relay contacts TR35—2 will remain closed because of the holding circuit energizing REWIND STATUS relay TR35, and normally open LOAD-REWIND relay contacts TR31—2 will close to energize BACKWARD relay TR33. The energization of BACKWARD relay TR33 has previously been described, and it was shown that it causes a normal BACKWARD operation which continues until the LOAD POINT is reached, at which time, the tape is STOPPED by picking up the LOAD POINT relay TR42P, the contacts of which then open, to open the circuit energizing the REWIND STATUS relays TR34 and TR36. This causes transfer of the REWIND STATUS relay contacts TR35—2 to the normal position, and breaks the circuit energizing BACKWARD relay TR33, thereby STOPPING the tape at LOAD POINT.

*Unloaded condition—backward area*

The second LOAD-REWIND situation shown in Fig. 3*av*, differs from the first of Fig. 3*au*, only in that the operation is started with the tape in the UNLOADED condition. Fig. 3*av* illustrates the same relays and other controls as Fig. 3*au*, with the relay and control notations abbreviated to save space. Just as in the previous situation, the pressing of the LOAD-REWIND button LR causes the energization of LOAD-REWIND relay TR40. The TR40—1 contacts of which close to cause the energization of LOAD-REWIND ASSIST relays TR2 and TR3. The LOAD-REWIND ASSIST relay contacts TR2–BL (Fig. 3*ag*) then closes to energize the UNLOAD latch trip relay TR21LT, the UNLOAD STOP latch trip relay TR26LT, and the LOAD-REWIND relay TR31. Since the operation is started in the UNLOADED condition, the energization of the UNLOAD latch trip relay TR21LT trips the latch to reset UNLOAD relay TR21P, while the energization of the UNLOAD STOP latch trip relay TR26LT resets UNLOAD STOP relay TR26P. When UNLOAD relay TR21P is reset, its TR21P–4 contacts (Fig. 3*ag*) open to deenergize UNLOAD ASSIST relays TR11 and TR22. When UNLOAD relay TR26P is reset, its TR26P–1 contacts (Fig. 3*af*) close to effect the energization of the vacuum pump motor relay HD4 which starts building up a vacuum in the header.

In this second situation, the LOAD-REWIND ASSIST relays TR2 and TR3 will be held energized after the LOAD-REWIND button LR is released by the holding circuits previously mentioned. The first hold circuit path previously described through the normally open HEAD COVER NOT DOWN relay contacts TR8–AL will be closed because the head cover T130 is not DOWN. The second and third holding circuit paths through the normally closed LEFT and RIGHT CAPSTAN OUT switches T399 and T397 (abbreviated SWT399, T397 in Fig. 3*av*) are also closed because the drive capstans T28 and T30 are not OUT.

With the tape in the BACKWARD area, the arm switch contacts T256 (abbreviated SWT256 in Fig. 3*av*) will be closed and the NOT RAPID REWIND relays TR5 and TR6 and the TIMING MOTOR relay HD7 will be energized. Since the LOAD-REWIND ASSIST relay contacts TR2–AU will now remain closed after the LOAD-REWIND button LR is released, the relays TR5, TR6 and HD7 will remain energized.

The energization of NOT RAPID REWIND relay TR6 causes its TR6–AL contacts (Fig. 3*ah*) to close and energize the SOLENOID latch relay T382 (abbreviated SLT382 in Fig. 3*av*) which will permit the RETRACT SOLENOID T346 to unlatch and cause the drive capstans T28 and T30 to come OUT. However, even though the latch trips, the CAPSTAN RETRACT relay HD8 is energized, and so the net result is that the drive capstans remain IN. CAPSTAN RETRACT relay HD8 is energized by a circuit completed from +48 volts via the normally closed contacts of the HEAD COVER NOT DOWN relay TR8–AU (Fig. 3*af*), a lead T810, the now closed normally open NOT FAST REWIND contacts TR6–AU, lead T730, the now closed LOAD-REWIND relay contacts TR2–BU, the normally closed TAPE BREAK relay contacts TR41P–3 and CAPSTAN RETRACT relay HD8 to ground.

The moving coil T200 (abbreviated MCT200 in Fig. 3*av*) which is in the DRIVE position when the machine is UNLOADED, will now go into STOP because the path from +48 volts via lead T766 (Fig. 3*an*) UNLOAD ASSIST relay contacts TR22—3, lead T768, lead T770, NOT FAST REWIND relay contacts TR6–BU, lead T772, HEAD COVER NOT DOWN relay contacts TR8–BL to cathode follower T456, is opened by the opening of UNLOAD ASSIST relay contacts TR22—3 and the opening of NOT FAST REWIND relay contacts TR6–BU. Even the closing of the LOAD-REWIND relay contacts TR31—6, will not complete the path from +48 volts via a lead T812, LOAD-REWIND relay contacts TR31—6, lead T770 NOT FAST REWIND relay contacts TR6–BU, lead 772, and HEAD COVER NOT DOWN relay contacts TR8–BL, to cathode follower T456, because NOT FAST REWIND relay TR6 is energized, opening its normally closed TR6–BU contacts. NEUTRAL STATUS relay TR13 (Fig. 3*ai*) which is held energized in the UNLOADED condition by the closed UNLOAD ASSIST relay contacts TR11–BU, remains energized even though its contacts TR11–BU open. The circuit which energizes NEUTRAL STATUS relay TR13 is from +48 volts via the now closed LOAD-REWIND ASSIST relay contacts TR3–BU, the relay TR13 to ground. The machine is thus in the NEUTRAL-STOP position shown in Fig. 3*r*. The energization of NOT FAST REWIND relay TR6 causes its TR6–BL contacts to transfer and complete a path for energizing the LOW SPEED MOTOR REVERSE relay DP1 (Fig. 3*ah*) by a circuit from +48 volts via lead T726, the now closed normally open contacts of CAPSTAN-IN relay TR7–AU, lead T735, lead T736, the now closed normally open contacts of NOT FAST REWIND relay TR6–BL and LOW SPEED REVERSE relay DP1, to ground. With relay DP1 energized, the windings in the low speed motor T114 are connected for feeding tape into the columns but the motor is not yet energized.

The energizing of TIMING MOTOR relay HD7, causes its HD7—1 contacts (Fig. 3*ad*) to close, energizing the timing motor A (T.M.A. in Fig. 3*av*), by placing 208 volts A.C. across it. As previously described, the TIMING MOTOR A begins to rotate, and its contacts TMA–1 do not close for a predetermined fixed delay time. Since, as will be described, when the TIMING MOTOR A contacts TMA–1 close, the low speed motor T114 is started. From Fig. 3*av*, it can be seen that as the vacuum builds up the left and right flappers T278 and T280 (FL T278, T280 in Fig. 3*av*) start to close. For example, first the right flapper T280 is closed and then the left flapper T278, effecting the respective energization of RIGHT COLUMN relay TR9. The flappers T278 and T280 close to allow a small flow of air into the columns. The energizing of the RIGHT and LEFT COLUMNS relay TR10 and TR9, close their TR10–BL (Fig. 3*an*) and TR9–BL contacts respectively and complete a circuit for putting the moving coil T200 into a DRIVE status. This circuit is from +48 volts via lead T812, the now closed LOAD LOAD-REWIND relay contacts TR31–6, lead T768, the now closed LEFT COLUMN relay contacts TR9–BL, the now closed RIGHT COLUMN relay contacts TR10–BL, lead T772, the now closed HEAD COVER NOT DOWN relay contacts TR8–BL to cathode follower T456.

The building up of the vacuum also gradually moves the vacuum supply switch T130 (Fig. 3*af*) (abbreviated SWT130 in Fig. 3*av*) closed, to complete a circuit for energizing the RUN relays TR1 and TR18 from the +48 volts via the now closed vacuum supply switch T130, the now closed LOAD REWIND ASSIST relay contacts TR3–AL, the now closed POWER ON relay TR17—1, the normally closed TAPE BREAK relay TR41P–1, and the parallel connected RUN relays TR1 and TR18, to ground. The energization of RUN relay TR1 causes its TR1–AL contacts to close to energize the MOTORS relay HD1 (Fig. 3*af*) the HD1—1 (Fig. 3*ad*) contacts of which close to start the FORWARD motor T22 and the BACKWARD motor T23.

The energization of RUN relay TR1 also causes its TR1–BL contacts (Figs. 3*ag*) to close and complete the circuit for energizing the BRAKE CLUTCH relay TR4 from +48 volts via one of the four paths of the holding circuit for LOAD-REWIND ASSIST relays TR2 and TR3, via now closed LOAD-REWIND ASSIST contacts TR2–AL, normally closed UNLOAD ASSIST relay contacts TR22—7, lead T792, a lead T814, the normally closed UNLOAD relay contacts TR21P–2, lead T734, now closed CAPSTAN-IN relay contacts TR7–AL, now closed RUN relay contacts TR1–BL, and BRAKE CLUTCH relay TR4, to ground. The energization of BRAKE CLUTCH relay TR4 causes its contacts TR4–AL (Fig. 3*aj*) and TR4–BL to transfer, thus changing the fully energized brake clutch magnets T42*a* and T48*a* (abbreviated BMT42*a*, T48*a* in Fig. 3*av*) to a lightly energized condition.

A short time later, the timing motor TA contacts TMA—1 (Fig. 3*ad*) close to initiate the starting of the low speed motor T114, and because the LOW SPEED MOTOR REVERSE relay DP1 is energized a LOAD operation is started. This is accomplished by the energizing of the LOW SPEED MOTOR relay HD6 (Fig. 3*ah*), by a circuit from +48 volts via lead T726, the now closed normally open CAPSTAN-IN relay contacts TR7–AU, lead T735, a lead T816, the now closed timing motor TA contacts TMA–1, lead T740, a lead T818, the now closed HEAD COVER NOT DOWN relay contacts TR8–BU, lead T745, the normally closed UNLOAD STOP relay contacts TR26P–2, the normally closed RAPID START relay contacts TR12–BU and the LOW SPEED MOTOR relay HD6 to ground. When the low speed motor T114 starts, the head cover T136 starts to come DOWN and the HEAD COVER UP switch T340 (abbreviated SWT340 in Fig. 3*av*) is opened. When the tape enters the first column (right column T26, for example) flapper contacts T280 (abbreviated R.F.L. T280) open to deenergize RIGHT COLUMN relay TR10. When RIGHT COLUMN relay TR10 is deenergized, the moving coil T200 is placed in STOP by opening the TR10–BL contacts (Fig. 3*an*). When the tape enters the left column T24, left flapper contacts T278 open to deenergize LEFT COLUMN relay TR9.

When head cover T136 reaches its DOWN position, it opens the normally closed HEAD COVER DOWN switch T344, to deenergize the HEAD COVER NOT DOWN relay TR8. This will cause its HEAD COVER NOT DOWN relay contacts TR8–BU (Fig. 3*ah*) to open. Relay contacts TR8–BU have just been described as part of the circuit for energizing the LOW SPEED MOTOR relay HD6. Thus the low speed motor T114 is stopped.

The deenergization of HEAD COVER NOT DOWN relay TR8 also transfers its TR8–AU (Fig. 3*af*) contacts to start the rotation of the capstan motor T164, and then brings the drive capstans T28 and T30 OUT. The normally closed HEAD COVER NOT DOWN relay contacts TR8–AU (Fig. 3*af*) close to energize the CAPSTAN MOTOR relay DP2. The normally open relay contacts TR8–AU (which via lead T810 to Fig. 3*ah* is in the circuit for energizing CAPSTAN RETRACT relay HD8), open. The deenergization of CAPSTAN RETRACT relay HD8 will effect the deenergization of RETRACT SOLENOID T346, and since the solenoid latch magnet T382 is energized, the drive capstans T28 and T30 will be allowed to come OUT.

As the drive capstans start OUT, the CAPSTANS-IN switch T394 open to deenergize the CAPSTANS-IN relay TR7. The CAPSTANS-IN relay contacts TR7–AU (Fig. 3*ah*) in the circuit of the LOW SPEED MOTOR REVERSE relay DP1 open to return it to its unenergized state. The CAPSTANS-IN relay contacts TR7–AL (Fig. 3*ag*) in the circuit of BRAKE CLUTCH relay TR4 open to deenergize TR4 and transfer its TR4–AL (Fig. 3*ad*) and TR4–BL contacts, and change the brake magnets T42*a* and T48*a* from the lightly energized to the fully energized condition.

Because the drive capstans are not brought OUT by a positive action, the right capstan T30 (as an example) will come out first, to open CAPSTAN-OUT switch T399, followed very closely by left capstan T28, which open CAPSTAN-OUT switch T397.

As soon as the second CAPSTAN-OUT switch opens, the BACKWARD feed tape begins. This is accomplished by the fact that when the CAPSTAN-OUT switch T397 opens, it opens the last of the four holding circuit paths for energizing LOAD-REWIND relays TR2 and TR3. This starts a chain of actions which are exactly like that described for the first LOAD-REWIND situation of Fig. 3*au*, ending with the tape at the LOAD POINT. This can be seen by comparing Fig. 3*au* and Fig. 3*av* starting at the time labeled "START BACKWARD."

*Unloaded condition—rapid rewind area*

The third LOAD-REWIND situation shown in Fig. 3*aw*, differs from the second situation of Fig. 3*av*, only in the fact that the operation is started in the RAPID REWIND AREA, which means that the arm switch contacts T256 are open. Thus, just as for the second situation, the pressing of the LOAD-REWIND button LR leads to the energization of RAPID REWIND relay TR40, which in turn leads to the energization of RAPID REWIND ASSIST relays TR2 and TR3, which are held energized, even when the LOAD-REWIND button LR is released by the same holding circuits described for the second LOAD-REWIND situation. The UNLOAD relays are deenergized, and the vacuum pump motor is started. However, since the arm switch contacts T256 are not closed, the NOT RAPID REWIND relays TR5 and TR6, and the TIMING MOTOR relay HD7 are not energized. Therefore, the CAPSTAN RETRACT relay HD8, the solenoid latch magnet T382, and the LOW SPEED MOTOR REVERSE relay DP1 are not energized at this time and the moving coil T200 remains in the DRIVE status.

As the vacuum builds up, the flapper contacts T280 and T278 are closed to energize RIGHT COLUMN relay TR10 and LEFT COLUMN relay TR9 respectively, which effect a closing of their contacts TR10–AU (Fig. 3*ah*) and TR9–AU respectively. This completes a circuit for energizing the RAPID START relay TR12 (Fig. 3*ah*) and the REWIND MOTOR relay DP3, from +48 volts via lead T726, the now closed normally open CAPSTAN-IN relay contacts TR7–AU, lead T735, lead T736, the normally closed contacts of untransferred NOT RAPID REWIND relay contacts TR6–BL, lead T738, lead T740, lead T774, normally closed NOT FAST REWIND contacts TR5–BL, now closed LEFT COLUMN relay contacts TR9–AU, now closed RIGHT COLUMN relay contacts TR10–AU, now closed HEAD COVER UP switch T340, the normally closed UNLOAD ASSIST relay contacts TR11–AU, and parallel connected TR12 and DP3 to ground. The energizing of RAPID REWIND MOTOR relay DP3 closes its DP3—1 contacts, but as can be seen in Fig. 3*ad*, the RAPID REWIND motor T236 will not start until the MOTORS relay contacts HD1—1 contacts close. The energizing of REWIND START relay TR12 open its TR12–AL (Fig. 3*aj*) and TR12–BL contacts which open the circuit that lightly energized the brake magnets T42*a* and T48*a*. The energization of TR12 also causes the transfer of REWIND START relay contacts TR12–AU to lightly energize reeling clutch T46*a* to allow slippage of the clutch as previously mentioned. The vacuum supply switch T138 is closed by the vacuum to effect the energization of RUN relays TR1 and TR18. The RUN relay contacts TR1–BL (Fig. 3*ag*) close to complete a circuit for energizing BRAKE CLUTCH relay TR4 from +48 volts via lead T786, the normally closed contacts of NOT RAPID REWIND relay TR5–AL, lead T806, the now closed LOAD-REWIND relay contacts TR2–AL, normally closed UNLOAD ASSIST relay contacts TR22–7, lead T792, lead T814, the normally closed UNLOAD relay contacts TR21P–2, lead T734, now closed CAPSTAN-IN relay contacts TR7–AL, now closed RUN relay contacts TR1–BL, and BRAKE CLUTCH relay TR4, to ground. The energization of BRAKE CLUTCH relay TR4 causes its TR4–AL (Fig. 3*aj*) and TR4–BL contacts to close. This removes the brake magnets T42*a* and T48*a* from the fully energized circuit. However, since RAPID START relay contacts normally closed TR12–AL and normally closed TR12–BL are open, the lightly energized circuit is also open. Thus the brake magnets T42*a* and T48*a* are completely deenergized allowing the reels T10 and T18 to rotate freely.

The closing of the RUN relay contacts TR1–AL (Fig. 3*af*) completes the circuit for energizing the MOTORS relay HD1, and the closing of the HD1—1 contacts (Fig. 3*ad*) completes a circuit for energizing the RAPID REWIND motor T236 from the upper 208 volt A.C. line via the now closed MOTORS relay contacts HD1—1, the now closed RAPID REWIND MOTOR relay contacts DP3—1, and RAPID REWIND motor T236, to the lower 208 volt A.C. line. This starts the RAPID REWIND operation.

When the tape approaches the end of the reel, it will go into the BACKWARD area and the arm switch contacts T256 will close. This completes a circuit for energizing the NOT RAPID REWIND relays TR5 and TR6 (Fig. 3*ag*) and the TIMING MOTOR relay HD7, via the arm switch contacts T256 and the LOAD-REWIND ASSIST relay contacts TR2–AU. The energizing of NOT RAPID REWIND relay TR5 opens its normally closed TR5–BL contacts (Fig. 3*ah*) which opens the circuit for energizing the RAPID START relay TR12 and the RAPID REWIND MOTOR relay DP3. The deenergizing of RAPID REWIND MOTOR relay DP3 deenergizes the RAPID REWIND motor T236. The deenergizing of RAPID START relay TR12 causes its TR12–AU contacts to transfer and open the light energization circuit for the reeling clutch T46*a*. The RAPID START relay contacts TR12–AL and TR12–BL close, to apply a light energization to the brake magnets T42*a* and T48*a* respectively. This causes the reels to gradually slow down.

The energizing of NOT RAPID REWIND relay TR6 effects the energization of the CAPSTAN RETRACT relay HD8, the solenoid latch magnet T382, and the LOW SPEED MOTOR REVERSE relay DP–1, in a manner similar to that described for the second LOAD-REWIND situation of Fig. 3*av*.

The energization of TIMING MOTOR relay HD7, starts the timing motor TA, which provides a delay long enough to allow the reels to stop rotating before LOADING the tape. After the reels stop, timing motor TA contacts TMA–1 (Fig. 3*ah*) close to complete a circuit for energizing the LOW SPEED MOTOR relay HD6 in a manner similar to that described in the second LOAD-REWIND situation. This starts a chain of actions which are exactly like that described for the second LOAD-REWIND situation of Fig. 3*av*, ending with the tape at LOAD POINT. This can be observed by comparing Figs. 3*av* and 3*au* starting at the time labeled "START LOW SPEED MOTOR."

*Loaded condition—rapid rewind area*

In the fourth LOAD-REWIND situation of Fig. 3*ax*, the tape is in the LOADED condition and RAPID REWIND AREA. The tape must first be UNLOADED, and thereafter the operation will continue in a manner similar to that of the third situation of Fig. 3*au*.

The pressing of the LOAD-REWIND button LR leads to the energization of RAPID REWIND ASSIST relays TR2 and TR3. Since the arm switch contacts T256 are open in the RAPID REWIND area, the NOT RAPID REWIND relays TR5 and TR6, and the TIMING MOTOR relay HD7 are not energized. Since the NOT RAPID REWIND relay TR5 remains unenergized, its TR5–AL contacts (Fig. 3*ag*) remain untransferred. The normally closed contacts of TR5–AL are in the fourth holding circuit path for LOAD-REWIND ASSIST relays TR2 and TR3, and relays TR2 and TR3 are kept energized. The LOAD-REWIND ASSIST relay contacts TR3–BU (Fig 3*ai*) close to place the machine in NEUTRAL status by energizing the NEUTRAL STATUS relay TR13. The LOAD-REWIND ASSIST relay contact TR2–BL (Fig. 3*ag*) closes to energize the UNLOAD latch trip relay TR21–LT, the UNLOAD STOP latch trip relay TR26–LT, and the LOAD-REWIND relay TR31, the latter of which causes the energization of REWIND STATUS relays TR35 and TR36. The closing of LOAD-REWIND ASSIST relay contacts TR2–BU (Fig. 3*ah*) completes a circuit for energizing the CAPSTAN RETRACT relay HD8, from +48 volts via lead T726, the normally closed CAPSTAN-IN relay contacts TR 7–AU, lead T728, the normally closed NOT RAPID REWIND relay contacts TR 6–AU, lead T730, now closed LOAD-REWIND relay contacts TR2–BU, normally closed TAPE BREAK relay contacts TR41P–3 and CAPSTAN RETRACT relay HD8 to ground.

The energization of CAPSTAN RETRACT relay HD8 closes CAPSTAN RETRACT relay contacts HD8–1 (Fig 3*ah*) which completes a circuit for energizing retract solenoid T346, which in turn causes the retraction of the drive capstans T28 and T30. The CAPSTAN-OUT switches T397 and T399 close practically simultaneously because of the direct coupling previously described.

When the drive capstans are fully retracted, the CAPSTAN-IN switch T394 (Fig. 3*af*) closes to complete a circuit for energizing the CAPSTAN-IN relays TR7, which will initiate the stopping of the capstan motor T164, apply a light brake to the tape, and start the low speed motor T114, by effecting the energization of LOW SPEED MOTOR relay HD6, BRAKE CLUTCH relay TR4, and the brake magnets T42*a* and T48*a*, all as indicated in Fig. 3*ax*. The closing of normally open CAPSTAN-IN relay contacts TR7–AL (Fig. 3*ag*) completes a circuit for energizing BRAKE CLUTCH relay TR4, from +48 volts, via a lead T732, the closed contacts of transferred UNLOAD relay TR 21—2, a lead T734, the now closed CAPSTAN-IN relay contacts TR7–AL, the closed RUN relay contacts TR1-BL, BRAKE CLUTCH relay TR4 to ground. The energization of BRAKE CLUTCH relay TR4, results in the light energization of the brakes T42*a* and T48*a* as previously described in relation to Fig. 3*aj*. The transfer of CAPSTAN-IN relay contacts TR 7–AU (Fig. 3*an*) opens the circuit which energized the CAPSTAN RETRACT relay HD8, said circuit previously described as closed by the closing of LOAD-REWIND ASSIST relay contacts TR2–BU. The transfer of CAPSTAN-IN relay contacts TR7–AU also completes a circuit for energizing the LOW SPEED MOTOR relay HD6, from +48 volts via lead T726, the now closed normally open CAPSTAN-IN relay contacts TR7–AU, a lead T735, a lead T736, the normally closed NOT RAPID REWIND relay contacts TR 6–BL, a lead T738, a lead T740, a lead T742 in series with the normally closed NOT RAPID REWIND relay contacts TR5–AU, a lead T744, a lead T745, normally closed UNLOAD STOP relay contacts TR26P–2, normally closed RAPID START relay contacts TR12–BU, via the LOW SPEED MOTOR relay HD6, to ground. Energizing the LOW SPEED MOTOR relay HD6 closes a set of LOW SPEED MOTOR relay contacts HD6—1 (Fig. 3*ad*) to energize the low speed motor T114. Since the LOW SPEED MOTOR REVERSE relay contacts DP1 are in their unenergized position, the energization of the low speed motor T114 acts as a takeup motor, by rotating in a direction so as to lift the head cover and take tape out of the columns. When the head cover T136 leaves its DOWN position, it allows the normally open HEAD COVER DOWN switch T344 to close and energize the HEAD COVER NOT DOWN relay TR8 by a circuit from the +48 volts through the now closed HEAD COVER DOWN switch T344 and the HEAD COVER NOT DOWN relay TR8 to ground. Energizing HEAD COVER NOT DOWN relay TR8 results in the stopping of the capstan motor T164 through the transfer of the HEAD COVER NOT DOWN relay contacts TR8–AU (Fig. 3*af*) which open the circuit from +48 volts via lead T746. The now open normally closed contacts of transferred HEAD NOT DOWN relay TR8–AU, CAPSTAN MOTOR relay DP2 to ground. The other path for energizing CAPSTAN MOTOR relay DP2 from +48 volts via UNLOAD ASSIST RELAY contacts TR22—8, CAPSTAN IN relay contacts TR7–BU, CAPSTAN MOTOR relay DP2 to ground, has been opened, when the capstans were retracted by opening of the normally closed CAPSTAN-IN relay contacts TR7–BU. Energizing HEAD COVER NOT DOWN relay TR8, closes its TR8–BL contacts (Fig. 3*an*) to complete a circuit from +48 volts via lead T812, the now closed LOAD-REWIND relay contacts TR31—6, lead T770, normally closed NOT RAPID REWIND contacts TR6–BU, lead T772, now closed HEAD COVER NOT DOWN relay contacts TR8–BL, to the input of cathode follower T456. The +48 volts on the grid of cathode follower T456 puts the moving coil T200 in a DRIVE status.

The next event in sequence is the closing of the HEAD COVER UP switch T340 to indicate that the head cover T136 has reached its maximum UP position. Thereafter, the tape loops which are being raised begin to leave the columns. It will again be assumed that the tape leaves the right column first, and when it does, the right flapper contacts T280 (Fig. 3*af*) closes to energize RIGHT COLUMN relay TR10. Likewise when the tape leaves the left column, the now closed left flapper contacts T278 energize LEFT COLUMN relay TR9.

The energizing of relays TR9 and TR10 close their respective contacts TR9–AU and TR10–AU to energize the RAPID START relay TR12 and the REWIND MOTOR relay DP3, by the circuit described in the description of the third LOAD-REWIND situation. The energizing of RAPID START relay TR12 causes its normally closed TR12–BU contacts (Fig. 3*ah*) in the circuit for energizing LOW SPEED MOTOR relay HD6 to open effecting the deenergization of the low speed motor T114. Referring to Fig. 3*aj*, the energizing of RAPID START relay TR12 also causes the opening of its normally closed TR12–AL and TR12–BL contacts to open the circuit that lightly energizes the brake magnets T42*a* and T48*a*. Since the BRAKE CLUTCH relay TR4 is energized at this time (see Fig. 3*ax*) its TR4–AL (Fig. 3*aj*) and TR4–BL contacts are transferred and so both the circuits for lightly energizing and fully energizing the brake magnets T42*a* and T48*a* are opened, and the reels ride free.

The energizing of RAPID REWIND MOTOR relay DP3, causes its DP3—1 contacts (Fig. 3*ad*) to close and complete a circuit for energizing the RAPID REWIND motor T236, from the upper 208 volt A.C. line via now closed MOTOR relay contacts HD1—1, now closed RAPID-REWIND motor T236 to the lower 208 volt A.C. line. This starts the RAPID REWIND operation, and the operations which follow are exactly like that described for the third LOAD-REWIND situation of Fig. 3*aw*, ending with the tape at LOAD POINT. This can be observed by comparing Fig. 3*aw* and Fig. 3*ax* starting at the time labeled "START RAPID REWIND."

*Reset*

A multipurpose RESET relay TR30 (Fig. 3*ag*) has been provided which is energized by the pressing of the RESET button TR to complete a circuit from +48 volts via the RESET button TR and the RESET relay TR30 to ground. The first function of RESET relay TR30 is to deenergize the START relay TR20 and thereby open the READY circuits previously described. This is accomplished by the opening of the RESET relay contacts TR30—1 (Fig. 3*ag*), which open the circuit energizing START relay TR20. It can be remembered that the START relay contacts TR20—2 (Fig. 3*ak*) are in the READY circuits.

The second function of RESET relay TR30 is to STOP the tape when it is being moved FORWARD or BACKWARD by the DATA PROCESSING MACHINE, or BACKWARD during a LOAD-REWIND operation.

This is accomplished by the opening of the normally closed RESET relay contacts TR30—4 in the circuit for energizing REWIND STATUS relays TR35 and TR36. This will return the REWIND STATUS relay contacts TR35—2 (Fig. 3*ai*) to their untransferred position to thereby STOP the machine as previously described.

The third function of RESET relay TR30 is to give a false indication of the closing of the arm switch contacts T256. From Fig. 3*ag*, it can be observed that the RESET relay contacts TR30—2 are electrically connected across the arm switch contacts T256 and thus closing of contacts TR30—2 will give the same results as the closing of the arm switch contacts. If the tape is in the RAPID REWIND portion of a LOAD-REWIND operation, the pressing of the RESET button TR, will stop the RAPID REWIND motor T236, slow the reels up, and the machine will then continue the LOAD REWIND operation as though the tape were in the BACKWARD area. If the RESET button TR and the LOAD-REWIND button are pressed simultaneously, then even if the tape were in the RAPID REWIND area, it would perform as though it were in the BACKWARD area.

*Detailed circuits*

In the preceding drawings and explanation of them, various elements such as triggers, cathode followers, etc. have been referred to and have been represented by blocks. The details of each type of circuit, and the block representations therefor, are shown in Figs. 4*b* to 4*an* inclusive. Wherever shown, unless otherwise indicated in the drawings, the values of the various resistors, condensers, and inductances are in thousands of ohms, micromicrofarads and microhenrys, respectively. For example, a resistor labeled 200 indicates a 200K (200,000) ohm resistor; a condenser labeled 750 indicates a 750 microhenry inductance.

Referring to Figs. 4*b*, 4*c*, 4*d*, 4*e*, 4*f*, 4*g* and 4*h*, there are illustrated various types of cathode followers. The grid of a cathode follower representing types K and Ko is connected through a 150 ohm resistor to an input terminal. The plate is connected directly to a source of +140 volts, while the cathode is connected via a 91 ohm resistor and a resistor R, in series, to a −60 volt power supply. An output terminal is connected to the junction of the 91 ohm resistor and the resistor R. The resistor R may have any one of several values and in each particular instance wherever the particular cathode follower is used, the resistor value is shown in the upper right corner of the block representing the circuit. In block representation of Fig. 4*b*, the letter R occupies the position where the resistor value is normally indicated. The operation of the cathode followers of Fig. 4*b* as well as those of Figs. 4*c*, 4*d*, 4*e*, 4*f*, 4*g* and 4*h* is well understood to those skilled in the art and no further description is deemed necessary.

Fig. 4*i* illustrates the detailed diagram and corresponding block symbol of a diode AND circuit employed in the invention. Whenever the corresponding block appears in the control circuits of the invention, described above, contents of the block applies to the circuit illustrated in Fig. 4*i*, or one modified simply by the addition of as many input diodes as may be necessary for conditioning the circuit under question. The AND circuit requires a coincidence of two positive signals applied respectively to the two inputs. Such inputs are effective through the diodes as shown to produce a positive output, the plates of the diodes being connected together and joined by a resistor R to a source of +140 volts.

Referring to Fig. 4*j*, the detail diagram and corresponding block symbol of an OR circuit is illustrated. The diodes of this OR circuit are connected in such a manner that when a positive signal is applied, to either input, a positive output occurs. The cathodes of the diodes are connected by a resistor R to a potential of —130 volts.

In Fig. 4*k*, there is illustrated the circuit diagram and corresponding block symbol of a grounded grid amplifier. This circuit comprises a pair of triodes, the plate of the left triode being directly connected to a source of +140 volts, while its grid is connected through a 150 ohm resistor to an input terminal. The plate of the right triode is connected to a +140 volt source through 4.3K and 4.7K resistors and a .750 microhenry inductance in series. The plate of the right triode is also connected through an 8.2 micromicrofarad condenser and a 390K resistor, in parallel, to an output terminal. The output terminal is also connected via a 430K resistor to a —130 volt power supply, as shown. The grid of the right triode is connected to ground through a 15K resistor and through a 30K resistor to a —60 volt power supply. The cathodes of both triodes are connected together, as shown, and are connected to a —130 volt power supply through 4.3K, 4.7K and 3.0K resistors in series.

Referring to Fig. 4*m*, a detailed diagram and corresponding block symbol of an oscillator are illustrated. This oscillator comprises a pentode whose screen grid is connected to the cathode and to ground through a 2.0K resistor. The control grid is connected to ground through a 510K resistor, shunted by one megacycle crystal. The plate is connected to the control grid through a 5 micromicrofarad condenser, and, to a tank circuit comprising, in parallel, a 500 microhenry inductance, a 15 micromicrofarad condenser and a variable condenser, variable from 7 to 45 micromicrofarads. The far end of the tank circuit is connected to the suppressor grid through an 18K resistor and through a 1K resistor, shunted by two .01 microfarad condensers in series, to a +270 volt power supply. The junction between the series connected .01 microfarad condensers is grounded. The suppressor grid is grounded through a .01 microfarad condenser, and the output is taken directly from the cathode through a 470 micromicrofarad condenser.

Referring to Fig. 4*n*, a detailed circuit diagram and corresponding block symbol of an inverter are illustrated. resistor to a —130 volt power supply. The plate is The cathode of the inverter is connected directly to ground, the control grid is connected via a 150 ohm resistor in series with a parallel circuit comprising a 22K resistor parallel with the 47 micromicrofarad condenser to an input terminal. The plate is connected via a 390K resistor in parallel with the condenser "C" to an output terminal; the output terminal being connected by a 430K resistor to a —130 volt power supply. The plate is also connected by 250 microhenry inductance in series with 3K, and 3.3K resistors to a +140 volt power supply. Other types of inverters are shown in Figs. 4*p*, 4*q*, 4*r*, 4*s*, 4*t*, 4*u*, 4*v*, 4*w*, 4*x*, and 4*y*. The operation of all of these inverters is well understood to those skilled in the art so that no further description is deemed necessary.

Fig. 4*z* illustrates the circuit diagram and corresponding block symbol of a trigger. This trigger comprises a dual triode, the plate of the right-hand triode being connected to a +140 volt source by way of a 750 microhenry inductance in series with 3.9K and 4.3K resistors. The left plate of the dual triode is similarly connected to the +140 volt source. The right plate is also connected via a 15 micromicrofarad condenser in parallel with an 82K resistor to an input terminal. This input terminal is also connected by way of a 62K resistor in series with the 47K resistor to a —130 volt source. The left input terminal is connected by way of a 150 ohm resistor to the left grid and also by way of a diode to a —12 volt power supply. Identical circuits are connected to the left plate, the right grid and to the right input terminal. Each plate is connected to output terminals by separate circuits each including a 390K resistor in parallel with an 8.2 microfarad condenser. Both output terminals are connected by 470K ohm resistor to a —130 volt power supply. The cathodes are connected directly to ground. The flip flop operation of such electronic triggers is now well known and the other electronic triggers shown in Figs. 4*aa*, 4*ab*, 4*ac* and 4*ad* are all generally of the type described. As operation of all these triggers is well known to those skilled in the art, no further explanation is deemed necessary.

Figs. 4*ae*, 4*af* and 4*ag* illustrate circuit diagram and corresponding block symbols for various single shot multivibrator circuits. These circuits are used to generate gates or pulses of specified time duration and to provide specified time duration and to provide specified delays. The operation of these single shot multivibrator circuits are well known and well understood by those skilled in the art and no further explanation is deemed necessary.

Referring to Fig. 4*ah*, a diode gate circuit is shown. This diode gate circuit consists of a resistor R connected to one input and a diode connected to a second input. The diode and resistor are connected together and via a condenser "C" to an output terminal. Unless the positive signal is applied to the input terminal connected to the resistor R, the negative going signals fed via the second input terminal to the diode are without effect. However, if a positive input is applied to the resistor R, negative going signals applied to the diode cause output signals to occur.

In Fig. 4*ai* a current driver circuit is shown. This current driver consists of five parallel connected circuits each containing a pentode. The plate of each pentode is connected via a 20 ohm resistor to an output terminal, the output terminal also being connected via an 82 ohm resistor and separate 20 ohm resistors to the screen grid of each pentode. The control grids are each connected through a 10K resistor to the input terminal and via a 150 micromicrofarad condenser to ground. Each suppressor grid is connected to its associated cathode and via separate 10 ohm resistors and a separate 100 ohm resistor to a —60 volt power supply. A positive input signal causes all tubes to conduct and draw current from the output terminals, the plate power supply being applied on the far end of a load circuit connected to the output terminal.

In Fig. 4*aj* there is illustrated a circuit diagram and corresponding block symbol of a buffer amplifier. This circuit includes a pentode whose suppressor grid and cathode are connected together and through a 100 ohm resistor, in parallel with a .01 microfarad condenser, to ground. The control grid is connected via a 150 ohm resistor in a diode to ground, and via the same 150 ohm resistor and a one megohm resistor to ground. The junction of the 150 ohm resistor and the one megohm resistor is connected via a diode to one coil of a coupling transformer, the far end of the latter coil being connected via a .01 microfarad condenser to ground. The screen grid is connected to ground through a .01 microfarad condenser and via 47K resistor to a +270 volt power supply. The plate is connected via a 24K ohm resistor to the same +270 volt power supply and also via a 47 micromicrofarad condenser to an output terminal. This amplifier is utilized to amplify the output signals caused by the readout of the Core Buffer described above.

In Fig. *4ak* there is shown a circuit diagram and the corresponding block symbol for a relay driver. This circuit comprises a triode whose cathode is grounded and whose grid is connected via a 150 ohm resistor to an input terminal. The plate is connected to a relay circuit. Whenever this circuit is represented, the relay circuit is shown external to the block. A positive input signal causes current to flow through the triode and thereby energize the relay.

Fig. *4am* illustrates the circuit diagram and corresponding block symbol of a thyratron tube circuit. This circuit is utilized, as explained above, for stepping an ON condition from core to core in a ring and thereby control readout of either the Core Buffer or the Row Memory. The thyratron tube has its plate connected via a 390K resistor to a power supply of +270 volts and also via a .005 microfarad condenser and a 100 ohm resistor to a relay point. The relay point is always shown external to the block representing the circuit. One grid of the thyratron is connected via a 20K resistor to a +140 volt power supply, and a second grid is connected via a 20K resistor to an input terminal. The cathode is connected via a 15 microhenry inductance to one coil of three coils wound on an associated core. A positive input to the thyratron causes the tube to fire and current to flow through the winding of the core and is effective, as described above, to shift the core from an OFF to an ON condition.

Fig. *4an* illustrates a circuit diagram and corresponding block symbol for a special power inverter. The circuit contains a triode whose plate is connected directly to one output terminal via a 51K resistor to a +140 volt power supply. The cathode is connected via a 150 ohm resistor in series with a 470K resistor and 36K resistor to a −60 volt power supply and through the same 150 ohm resistor and 1500 micromicrofarad condenser to an input terminal. The cathode is connected via a 51K resistor to a −130 volt power supply and via a 1500 micromicrofarad condenser to a second output terminal.

There has thus been provided novel means for producing a complete check on the reading of data, the conversion of the data from a first to a different code and the recording of data. The various check circuits utilized singly and in combination with one another provide a highly reliable data transmission and conversion system capable of great speed of operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data processing system, the combination of a data storage device having data representations stored therein, reading means for reading said storage device to provide signals representing said data, means controlling said reading means to first read said storage device, first indicating means connected to said reading means to receive signals representing said data during the first reading, means responsive to said first indicating means to provide one indication on the reception of an odd number of signals and a second indication on the reception of an even number of signals, means to store the odd-even indications, said controlling means thereupon controlling said reading means to again read said storage device, second indicating means connected to said reading means to receive signals representing said data during the second reading, means responsive to said second indicating means to provide one indication on the reception of an odd number of signals and a second indication on the reception of an even number of signals, and means connected to compare the odd-even indications from said store means and said second indicating means and responsive to indicate an erroneous compare.

2. In a data processing system, the combination of a data storage device having data representations arranged in rows, reading means for reading said storage device to provide signals representing said data, means controlling said reading means to first read said storage device row by row, a first group of indicating means each corresponding to a row of said storage device, connected to receive signals representing said data as corresponding rows are read during the first reading, means responsive to said first group of indicating means to indicate the reception of an odd or even number of signals, means to store the odd-even indications, said controlling means thereupon controlling said reading means to again read said storage device, a second group of indicating means, each corresponding to a row of said storage means, connected to receive signals representing said data during the second reading, means responsive to said second group of indicating means to indicate the presence of an odd or even number of signals in corresponding rows, and means connected to compare the odd-even indications of corresponding ones of said store means and second indicating means and responsive to indicate an erroneous compare.

3. In a data processing system, the combination of a data storage device having data representations arranged in columns and rows, reading means for reading said storage device to provide signals representing said data, means controlling said reading means to first read said storage device row by row, a first group of indicating means each one of said group corresponding individually to a row of said storage device, connected to receive signals representing said data as corresponding rows are read during the first reading and each responsive to indicate the reception of an odd or even number of signals, means to store the odd-even indications, said controlling means thereupon controlling said reading means to again read said storage device, a memory device responsive to the reading means during the second reading for storing signals in storage positions corresponding in position to rows and columns of the data storage device, means for reading out, column by column, signals stored in said memory device, a second group of indicating means, each corresponding to a row of said storage device, connected to receive signals from corresponding rows as signals are read from said memory and each responsive to indicate the reception of an odd or even number of signals, and means connected to compare the odd-even indications of corresponding ones of said store means and second indicating means and responsive to indicate an erroneous compare.

4. In a data processing system, the combination of a data storage device having data representations arranged in columns and rows to represent data according to a first code, reading means for reading said storage device to provide signals representing said data, means controlling said reading means to read said storage device row by row, a first group of indicating means, each corresponding to a row of said storage device, connected to receive signals representing said data as corresponding rows are read and each responsive to indicate the reception of an odd or even number of signals, said controlling means upon completion of said first reading controlling said reading means to again read said storage device, a memory device responsive to the reading means during the second reading for storing signals in storage positions corresponding in positions to rows and columns of the data storage device, means reading out, column by column, signals stored in said memory device, a first code conversion device receiving signals read from said memory device and adapted to convert signals representing data in said first code to signals representing data in a second code, a second code conversion device connected to said first code conversion device to receive signals representing data in the second code and adapted to convert signals representing data in the second code to signals representing data in the first code whereby signals corresponding to signals read column by column from said memory device are provided, a second group of indicating means, each corresponding to a row of said storage device, connected to receive signals of corresponding row positions from said second code conversion device and each responsive to indicate the reception of an odd or even number of signals, and means connected to compare the indications of corresponding ones of said first and second indicating means and responsive to indicate an error if any of the compared indications are unlike.

5. The invention as set forth in claim 4, including a second data storage device and means responsive to said first code conversion device for storing data representations in the second data storage device.

6. In a data processing system, the combination of a data storage device having representations arranged in columns and rows to represent data according to a first code, reading means for reading said storage device to provide signals representing said data, means controlling said reading means to read said storage device row by row, a first group of indicating means, each corresponding to a row of said storage device, connected to receive signals representing said data as corresponding rows are read and each responsive to indicate the reception of an odd or even number of signals, said controlling means, upon completion of the first reading, controlling said reading means to again read said storage device, a memory device responsive to the reading means during the second reading for storing signals in storage positions corresponding in positions to rows and columns of the data storage device, means reading out, column by column, signals stored in said memory device, a first code conversion device connected to receive signals read from said memory device and adapted to convert signals representing data in the first code and emit signals representing data in a second code, analyzing means associated with said first code conversion device to emit a check signal when the number of signals emitted by the first code conversion device is odd, a second data storage device and means responsive to signals emitted by said code conversion device and said analyzing means for storing data in the second data storage device; a second code conversion device connected to receive signals in the second code from the first code conversion device, adapted to convert signals in the second code and to emit signals in the first code whereby signals corresponding to signals read column by column from said memory device are emitted by the second code conversion device, a second group of indicating means, each corresponding to a row of said storage device, connected to receive signals emitted in corresponding row positions from said second code conversion device and each responsive to indicate the reception of an odd or even number of signals, and means connected to compare the indications of corresponding ones of said first and second indicating means and responsive to indicate an error if any of the compared indications are unlike.

7. In a machine of the class described, a first storage medium having representations stored therein in columns and rows to represent data according to a first code, reading means for reading said storage device to provide signals representing said data, means controlling said reading means to read said storage device row by row, a first group of indicating means, each corresponding to a row of said storage device connected to receive signals representing said data as corresponding rows are read and each responsive to indicate the reception of an odd or even number of signals, said controlling means, upon completion of the first reading, controlling said reading means to again read said storage device, a memory device responsive to the reading means during the second reading for storing signals in storage positions corresponding in position to rows and columns of the data storage device, means reading out, column by column, signals stored in said memory device, a first code conversion device receiving signals read from said memory device, adapted to convert signals representing data in said first code and to emit signals representing data in a second code, analyzing means associated with said first code conversion device to emit a check signal when the number of signals emitted by the first code conversion device is odd, a second data storage device, means responsive to signals emitted by said code conversion device and said analyzing means for storing signals representing data in the second data storage device, means associated with said second data storage device emitting manifestations corresponding to signals recorded in said second data storage device, and checking means connected to receive the manifestations and adapted to provide an indication if the number of manifestations is odd; a second code conversion device connected to receive signals from said first code conversion device adapted to convert signals representing data in the second code and to emit signals in the first code whereby signals corresponding to signals read column by column from said memory device are provided, a second group of indicating means, each corresponding to a row of said storage device, connected to receive signals in corresponding row positions from said second code conversion device and each responsive to indicate the reception of an odd or even number of signals, and means connected to compare the indications of corresponding ones of said first and second indicating means and responsive to indicate an error if any of the compared indications are unlike.

8. In a machine of the class described, a first storage medium having data representations stored therein in columns and rows to represent data according to a first code, reading means for reading said storage device to provide signals representing said data, means controlling said reading means to first read said storage device row by row, a first group of indicating means, each corresponding to a row of said storage device connected to said reading means to receive signals representing said data as corresponding rows are read and each responsive to indicate the reception of an odd or even number of signals, said controlling means, upon completion of said first reading, controlling said reading means to again read said storage device, a memory device responsive to the reading means during the second reading for storing signals in storage positions corresponding in position to rows and columns of the data storage device, means reading out, column by column, signals stored in said memory device, a first code conversion device receiving signals read from said memory device and adapted to emit signals representing data in a second code upon receiving signals in said first code, analyzing means associated with said first code conversion device to emit a check signal when the number of signals emitted by the first code conversion device is odd, a moving magnetizable member, a writing means for each position of said second code, positioned in operative relation to said magnetizable member adapted to record flux continuously in first and second directions on the magnetizable member, means controlling said writing means to change the direction of said flux alternately between said first and second directions in response to signals, means connecting outputs of said code conversion device and said analyzing means to corresponding ones of said writing means whereby a change in the direction of flux occurs as signals are emitted in corresponding positions by said first code conversion device and said analyzing means, means effective subsequent to read out of signals from said memory device to reset each of said writing means to record flux in a first direction only whereby an even number of changes in direction of recorded flux in each flux pattern has occurred, means associated with said writing means emitting manifestations corresponding to signals recorded on the magnetizable member, and checking means connected to receive the manifestations and adapted to provide an indication if the number of manifestations is odd, a second code conversion device connected to receive signals from said first code conversion device adapted to convert signals representing data in the second code and to emit signals in the first code whereby signals corresponding to signals read column by column from said memory device are provided, a second group of indicating means, each corresponding to a row of said storage device, connected to receive signals in corresponding row positions from said second code conversion device and each responsive to indicate the reception of an odd or even number of signals, and means connected to compare the indications of corresponding ones of said first and second indicating means and responsive to indicate an error if any of the compared indications are unlike.

9. In combination, a moving magnetizable member, a plurality of recording heads positioned in operative relation to record in tracks on the magnetizable member, means individual to each of said recording heads, upon receiving signals, controlling the recording heads to record manifestations on said tracks, means emitting signals representing data according to a code, means connecting said emitting means to said controlling means whereby manifestations representing said data are recorded on the respective tracks of the magnetizable member by the recording heads, and means effective upon completion of recording of said data on said magnetizable member to operate the individual controlling means without receiving data signals from the signal emitting means to record manifestations to provide an even number of recorded manifestations on each track.

10. In combination, a moving magnetizable member, a plurality of recording heads positioned in operative relation to record tracks on the magnetizable member, each of said tracks corresponding individually to a different position of a first code, means individual to said tracks upon receiving representations controlling said recording heads to record manifestations on said tracks, a storage device storing data manifestations representing characters according to a second code, means reading manifestations stored in said storage device character by character, a code conversion device receiving manifestations read from said storage device and adapted to emit representations in said first code upon receiving manifestations in said second code, analyzing means associated with said code conversion means to emit a representation when the number of representations emitted by the code conversion device is odd, means connecting said code conversion means and said analyzing means to said controlling means whereby an even number of manifestations representing characters are simultaneously recorded on said tracks, and means effective upon completion of recording of said data on said magnetizable member to operate said individual controlling means to record manifestations to provide an even number of recorded manifestations on each track.

11. In combination, a moving magnetizable member, a plurality of recording heads positioned in operative relation to record flux in tracks on the magnetizable member, biconditional means settable to first and second conditions, individual to said recording heads, when in said first condition controlling the respective recording heads to record flux in a first direction and when in said second condition controlling the respective recording heads to record flux in a second direction, and adapted to shift from one of said conditions to the other of said conditions on the reception of a signal, means first setting said biconditional means to the first condition, a source of data representing signals, means transmitting signals from said source to said biconditional means whereby data representations are recorded as the recorded flux in said tracks is shifted from the first to the second direction and vice versa, and means effective, as the recording of said data is complete, to set each of said biconditional means to the first condition whereby an even number of changes in direction of recorded flux is provided on each track.

12. In combination, a moving magnetizable member, a plurality of recording heads positioned in operative relation to record flux in tracks on the magnetizable member, biconditional means settable to first and second conditions, individual to said recording heads, when in said first condition controlling the respective recording heads to record flux in a first direction and when in said second condition controlling the respective recording heads to record flux in a second direction, and adapted to shift from one of said conditions to the other of said conditions on the reception of a signal, means first setting said biconditional means to the first condition, a source of signals representing data according to an $m$ out of $n$ position code, wherein $m$ is an even number, means transmitting signals from said source to said biconditional means whereby data representations are recorded as the recorded flux in said tracks is shifted from the first to the second direction and vice versa, and means effective, as the recording of said data is complete, to set each of said biconditional means to the first condition whereby an even number of changes in direction of recorded flux is provided on each track; means associated with said recording heads emitting manifestations corresponding to representations recorded on the magnetizable member, and means connected to receive the manifestations and adapted to provide an indication if the number of manifestations is odd.

13. In a data processing system, a storage medium storing data representations coordinately arranged in rows and columns, means first reading said storage medium to provide signals representing said data, a first group of indicating devices, corresponding individually to said rows, connected to receive signals from corresponding rows as the storage medium is first read and adapted to provide one indication if the number of received signals is odd and a second indication if the number of received signals is even, means to store the odd-even indications, means controlling said reading means to reread said storage medium to provide signals representing said data, a second group of indicating devices corresponding individually to said rows, connected to receive signals from corresponding rows as the storage medium is reread and adapted to provide one indication if the number of received signals is odd and a second indication if the number of received signals is even, and means connected to compare the odd-even indications of each corresponding group from said store means and said second indicating means and responsive to indicate an erroneous compare.

14. In combination, means emitting signals representing data according to a code, a group of transmission lines, each line corresponding to a position of said code, control means connecting said emitting means to said transmission lines whereby signals representing data are transferred from said emitting means to said transmission lines, and a means for each position of said code responsive to the number of signals transferred on each transmission line to operate said control means without the transfer of a data signal from said emitting means and in accordance with the number of signals transferred from said emitting means to selectively produce a parity signal on each line.

15. In combination, means emitting signals representing data according to a code, a group of transmission lines each corresponding to a position of said code, control means connecting said emitting means to said transmission lines whereby signals representing data are transferred from said emitting means to said transmission lines, and means effective upon completion of transfer of said data to operate said control means without the transfer of data signals to emit signals to provide an even number of total signals transferred on each transmission line.

16. In a data processing system, the combination of a data storage device having data representations stored therein, reading means for reading said storage device to provide signals representing said data, means controlling said reading means to first read said storage device, first indicating means connected to said reading means to receive, in groups, signals representing said data during the first reading means responsive to said first indicating means to provide one indication on the reception of an odd number of signals and a second indication on the reception of an even number of signals for each group, means to store the group odd-even indications, said controlling means thereupon controlling said reading means to again read said storage device, second indicating means connected to said reading means to receive signals representing said data during the second reading, means responsive to said second indication means to provide one indication on the reception of an odd number of signals and a second indication on the reception of an even number of signals for each group, and means connected to compare the odd-even indications of each corresponding group from said store means and said second indicating means and responsive to indicate an erroneous compare.

17. In combination, a moving magnetizable member, a plurality of recording heads positioned in operative relation to record in tracks on the magnetizable member, means individual to each of said recording heads, upon receiving signals, controlling the recording heads to record manifestations on said tracks, means emitting signals representing data according to a code, means connecting said emitting means to said controlling means whereby manifestations representing said data are recorded on the respective tracks of the magnetizable member by the recording heads, and a biconditional means for each track settable alternately to a first and second condition by each signal emitted for the respective track, said biconditional means effective only when in the first condition upon completion of recording of the data on said magnetizable member to operate the individual controlling means to record another manifestation to provide an even number of recorded manifestations on each track.

18. In combination, a moving magnetizable member, a plurality of recording heads positioned in operative relation to record in tracks on the magnetizable member, means individual to each of said recording heads, upon receiving signals, controlling the recording heads to record manifestations on said tracks, means emitting signals representing data according to a code, means connecting said emitting means to said controlling means whereby manifestations representing said data are recorded on the respective tracks of the magnetizable member by the recording heads, and means operated by each signal emitted to indicate the reception of an odd or even number of manifestations on each track and effective at a predetermined time to operate the individual controlling means to record manifestations to provide an even number of recorded manifestations on each track.

19. In combination, means emitting signals representing data according to a code, a group of transmission lines, each line corresponding to a position of said code, control means connecting said emitting means to said transmission lines whereby signals representing data are transferred from said emitting means to said transmission lines and a biconditional means for each line settable alternately to a first and second condition by each signal emitted on a respective line, said biconditional means effective only when in the first condition upon completion of transfer of said data to operate the individual control means to transfer another signal to provide an even number of signals on each line.

20. In combination, means emitting signals representing data according to a code, a group of transmission lines, each line corresponding to a position of said code, control means connecting said emitting means to said transmission lines whereby signals representing data are transferred from said emitting means to said transmission lines and means operated by each signal emitted to indicate the transfer of an odd or even number of signals on each line and effective at a predetermined time to operate the individual controlling means to transfer signals to provide an even number of signals on each transmission line.

References Cited in the file of this patent

UNITED STATES PATENTS

| | | |
|---|---|---|
| Re. 24,447 | Block | Mar. 25, 1958 |
| 2,674,727 | Spielberg | Apr. 6, 1954 |
| 2,702,380 | Brustman | Feb. 15, 1955 |
| 2,708,267 | Weidenhammer | May 10, 1955 |
| 2,826,359 | Deerhake et al. | Mar. 11, 1958 |